US009695368B2

(12) United States Patent
Tonkovich et al.

(10) Patent No.: US 9,695,368 B2
(45) Date of Patent: Jul. 4, 2017

(54) PROCESS AND APPARATUS EMPLOYING MICROCHANNEL PROCESS TECHNOLOGY

(71) Applicant: Velocys, Inc., Plain City, OH (US)

(72) Inventors: Anna Lee Tonkovich, Gilbert, AZ (US); Ravi Arora, New Albany, OH (US); John Brophy, Bath (GB); Francis P. Daly, Delaware, OH (US); Soumitra Deshmukh, Dublin, OH (US); Maddalena Fanelli, Columbus, OH (US); Kai Tod Paul Jarosch, Bexley, OH (US); Timothy J. LaPlante, Powell, OH (US); Richard Q. Long, New Albany, OH (US); Terry Mazanec, Solon, OH (US); Daniel Francis Ryan, Brewster, MA (US); Laura J. Silva, Dublin, OH (US); Wayne W. Simmons, Dublin, OH (US); Bruce Stangeland, Berkeley, OH (US); Yong Wang, Richland, WA (US); Thomas Yuschak, Lewis Center, OH (US); Steven T. Perry, Galloway, OH (US); Jeffrey Dale Marco, South Charleston, OH (US); Michael Alan Marchiando, London, OH (US); Robert Lewis Litt, Westerville, OH (US)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 15/041,119

(22) Filed: Feb. 11, 2016

(65) Prior Publication Data
US 2016/0194563 A1    Jul. 7, 2016

Related U.S. Application Data

(63) Continuation of application No. 14/288,936, filed on May 28, 2014, which is a continuation of application
(Continued)

(51) Int. Cl.
*C10G 47/00*    (2006.01)
*C10G 45/02*    (2006.01)
(Continued)

(52) U.S. Cl.
CPC .......... *C10G 47/14* (2013.01); *B01J 19/0093* (2013.01); *B01J 23/42* (2013.01); *B01J 23/75* (2013.01);
(Continued)

(58) Field of Classification Search
CPC .......... C10G 2/32; C10G 45/02; C10G 47/00; C10G 47/02; C10G 47/14; B01J 19/0093;
(Continued)

(56) References Cited

U.S. PATENT DOCUMENTS 3,882,049 A    5/1975    Bertolacini et al.
3,972,837 A    8/1976    Acres et al.
(Continued)

FOREIGN PATENT DOCUMENTS

CA    2664028    10/2009
DE    246257    6/1987
(Continued)

OTHER PUBLICATIONS

Cybulski et al.; "Monoliths in Heterogeneous Catalysis"; Catal. Rev.—Sci. Eng., 36(2), 179-270 (1994).
(Continued)

*Primary Examiner* — Brian McCaig
(74) *Attorney, Agent, or Firm* — Renner, Otto, Boisselle & Sklar, LLP

(57) ABSTRACT

This invention relates to a process for conducting a hydrocracking or a hydrotreating process in a microchannel reactor. This invention also relates to a process and apparatus for flowing a vapor and liquid into a plurality of microchannels in a microchannel processing unit.

11 Claims, 67 Drawing Sheets

Related U.S. Application Data

No. 12/576,458, filed on Oct. 9, 2009, now Pat. No. 8,747,656.

(60) Provisional application No. 61/234,453, filed on Aug. 17, 2009, provisional application No. 61/171,884, filed on Apr. 23, 2009, provisional application No. 61/104,432, filed on Oct. 10, 2008.

(51) Int. Cl.

| | |
|---|---|
| *C10G 47/02* | (2006.01) |
| *C10G 47/14* | (2006.01) |
| *B01J 19/00* | (2006.01) |
| *B01J 23/42* | (2006.01) |
| *B01J 23/75* | (2006.01) |
| *B01J 23/96* | (2006.01) |
| *B01J 35/02* | (2006.01) |
| *C10G 2/00* | (2006.01) |
| *B01J 21/12* | (2006.01) |

(52) U.S. Cl.
CPC .............. *B01J 23/96* (2013.01); *B01J 35/023* (2013.01); *C10G 2/32* (2013.01); *C10G 45/02* (2013.01); *C10G 47/00* (2013.01); *C10G 47/02* (2013.01); *B01J 21/12* (2013.01); *B01J 2219/00783* (2013.01); *B01J 2219/00788* (2013.01); *B01J 2219/00835* (2013.01); *B01J 2219/00873* (2013.01); *B01J 2219/00889* (2013.01); *B01J 2219/00891* (2013.01); *B01J 2219/00984* (2013.01); *C10G 2300/202* (2013.01); *C10G 2300/4018* (2013.01); *Y02P 20/582* (2015.11)

(58) Field of Classification Search
CPC ... B01J 21/12; B01J 23/42; B01J 23/75; B01J 23/96; B01J 35/023
See application file for complete search history.

(56) References Cited

U.S. PATENT DOCUMENTS

| | | | |
|---|---|---|---|
| 4,089,810 A | 5/1978 | Diwell et al. | |
| 4,096,095 A | 6/1978 | Cairns | |
| 4,122,110 A | 10/1978 | Sugier et al. | 260/449.5 |
| 4,130,575 A | 12/1978 | Jorn | 260/449 |
| 4,289,652 A | 9/1981 | Hunter et al. | |
| 4,298,354 A | 11/1981 | Hardman et al. | 44/56 |
| 4,342,643 A | 8/1982 | Kyan | 208/134 |
| 4,348,487 A | 9/1982 | Goldstein et al. | 518/704 |
| 4,423,272 A | 12/1983 | Forbus et al. | 585/640 |
| 4,492,773 A | 1/1985 | Ball et al. | 518/713 |
| 4,525,482 A | 6/1985 | Ohsaki et al. | 518/707 |
| 4,540,714 A | 9/1985 | Pedersen et al. | 518/713 |
| 4,588,560 A | 5/1986 | Degnan et al. | 422/211 |
| 4,675,344 A | 6/1987 | Conway et al. | 518/714 |
| 4,752,622 A | 6/1988 | Stevens | 518/714 |
| 4,752,623 A | 6/1988 | Stevens et al. | 518/714 |
| 4,762,858 A | 8/1988 | Hucul et al. | 518/714 |
| 4,795,841 A | 1/1989 | Elliott et al. | 585/240 |
| 4,843,101 A | 6/1989 | Klier et al. | 518/713 |
| 5,180,868 A | 1/1993 | Baker et al. | 585/240 |
| 5,248,251 A | 9/1993 | Dalla Betta et al. | |
| 5,290,744 A | 3/1994 | Degnan, Jr. et al. | 502/67 |
| 5,492,617 A | 2/1996 | Trimble et al. | 208/148 |
| 5,525,311 A | 6/1996 | Girod et al. | 422/200 |
| 5,538,700 A | 7/1996 | Koves | 422/200 |
| 5,540,899 A | 7/1996 | Koves | 422/200 |
| 5,600,053 A | 2/1997 | Girod et al. | 585/654 |
| 5,660,715 A | 8/1997 | Trimble et al. | 208/148 |
| 5,703,133 A | 12/1997 | Vanderspurt et al. | 518/707 |
| 5,948,240 A | 9/1999 | Mulvaney, III et al. | 208/79 |
| 6,040,266 A | 3/2000 | Fay, III et al. | |
| 6,159,358 A | 12/2000 | Mulvaney, III et al. | 208/46 |
| 6,248,796 B1 | 6/2001 | Jackson et al. | 518/714 |
| 6,274,101 B1 | 8/2001 | Sechrist | 422/198 |
| 6,312,586 B1 | 11/2001 | Kalnes et al. | 208/80 |
| 6,326,326 B1 | 12/2001 | Feng et al. | 502/62 |
| 6,334,994 B1 | 1/2002 | Wendelbo et al. | 423/718 |
| 6,409,072 B1 | 6/2002 | Breuer et al. | 228/111.5 |
| 6,432,369 B1 | 8/2002 | Mulvaney, III et al. | 422/213 |
| 6,440,895 B1 | 8/2002 | Tonkovich et al. | 502/439 |
| 6,488,838 B1 | 12/2002 | Tonkovich et al. | 208/108 |
| 6,531,224 B1 | 3/2003 | Fryxell et al. | 428/405 |
| 6,534,677 B1 | 3/2003 | White et al. | 562/486 |
| 6,555,725 B1 | 4/2003 | Wittenbrink et al. | 585/734 |
| 6,570,047 B1 | 5/2003 | Mart et al. | 585/899 |
| 6,579,343 B2 | 6/2003 | Brennecke et al. | 95/51 |
| 6,620,398 B2 | 9/2003 | Kindig et al. | 423/359 |
| 6,663,681 B2 | 12/2003 | Kindig et al. | 48/127.5 |
| 6,682,714 B2 | 1/2004 | Kindig et al. | 423/657 |
| 6,685,754 B2 | 2/2004 | Kindig et al. | 48/210 |
| 6,703,429 B2 | 3/2004 | O'Rear et al. | 518/706 |
| 6,713,036 B1 | 3/2004 | Vanden Bussche | 423/584 |
| 6,733,835 B2 | 5/2004 | Fryxell et al. | 427/299 |
| 6,743,962 B2 | 6/2004 | O'Rear et al. | 585/717 |
| 6,753,038 B2 | 6/2004 | Fryxell et al. | 427/337 |
| 6,768,035 B2 | 7/2004 | O'Rear et al. | 585/331 |
| 6,846,554 B2 | 1/2005 | Fryxell et al. | 428/307.3 |
| 6,969,506 B2 | 11/2005 | Tonkovich et al. | 423/652 |
| 7,012,104 B2 | 3/2006 | Espinoza et al. | 518/715 |
| 7,019,038 B2 | 3/2006 | Espinoza et al. | 518/700 |
| 7,045,114 B2 | 5/2006 | Tonkovich et al. | 423/659 |
| 7,067,560 B2 | 6/2006 | Bowe | 518/700 |
| 7,067,561 B2 | 6/2006 | Bowe | 518/706 |
| 7,071,239 B2 | 7/2006 | Ortego, Jr. et al. | 518/715 |
| 7,084,180 B2 | 8/2006 | Wang et al. | 518/712 |
| 7,087,651 B2 | 8/2006 | Lee-Tuffnell et al. | 518/700 |
| 7,108,070 B2 | 9/2006 | Hall et al. | 166/357 |
| 7,109,248 B2 | 9/2006 | Bowe | 518/700 |
| 7,122,106 B2 | 10/2006 | Lin et al. | 205/109 |
| 7,183,329 B2 | 2/2007 | Green et al. | 518/715 |
| 7,232,472 B2 | 6/2007 | Kindig et al. | 48/127.5 |
| 7,294,734 B2 | 11/2007 | Brophy et al. | 558/317 |
| 7,304,012 B2 | 12/2007 | Green et al. | 502/180 |
| 2002/0028164 A1 | 3/2002 | Schutte et al. | 422/198 |
| 2002/0192118 A1 | 12/2002 | Zech et al. | 422/99 |
| 2003/0007904 A1 | 1/2003 | Tonkovich et al. | 422/180 |
| 2003/0225169 A1 | 12/2003 | Yetman | 518/726 |
| 2004/0034111 A1 | 2/2004 | Tonkovich et al. | 518/726 |
| 2004/0134660 A1 | 7/2004 | Hall et al. | 166/357 |
| 2004/0188326 A1 | 9/2004 | Tonkovich et al. | 208/139 |
| 2004/0229752 A1 | 11/2004 | Long et al. | 502/303 |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |
| 2005/0282918 A1 | 12/2005 | Bowe | 518/726 |
| 2006/0020155 A1 | 1/2006 | Beech, Jr. et al. | 585/639 |
| 2006/0036106 A1 | 2/2006 | Mazanec et al. | 549/533 |
| 2006/0041029 A1 | 2/2006 | Bowe et al. | 518/700 |
| 2006/0074134 A1 | 4/2006 | O'Rear et al. | 518/726 |
| 2006/0102519 A1 | 5/2006 | Tonkovich et al. | 208/107 |
| 2006/0135630 A1 | 6/2006 | Bowe | 518/702 |
| 2006/0142400 A1 | 6/2006 | Bowe | 518/703 |
| 2006/0251552 A1 | 11/2006 | Wang et al. | 422/190 |
| 2006/0251558 A1 | 11/2006 | Chinn et al. | 423/230 |
| 2007/0004810 A1 | 1/2007 | Wang et al. | 518/718 |
| 2007/0197801 A1 | 8/2007 | Bolk et al. | 549/229 |

(56) References Cited

U.S. PATENT DOCUMENTS

| | | | |
|---|---|---|---|
| 2007/0197808 A1 | 8/2007 | Bolk et al. | 549/536 |
| 2007/0244000 A1 | 10/2007 | Molinier et al. | 502/300 |
| 2008/0210596 A1 | 9/2008 | Litt et al. | 208/20 |

FOREIGN PATENT DOCUMENTS

| | | |
|---|---|---|
| DE | 3926466 | 2/1991 |
| EP | 1 434 652 B1 | 2/2005 |
| EP | 1 248 675 B1 | 8/2005 |
| EP | 1 559 475 A1 | 8/2005 |
| EP | 1 567 616 B1 | 8/2006 |
| EP | 1102628 | 11/2006 |
| GB | 1531134 | 11/1978 |
| GB | 2077136 | 12/1981 |
| WO | 9421372 | 9/1994 |
| WO | 9700442 | 1/1997 |
| WO | 9828073 | 7/1998 |
| WO | 9838147 | 9/1998 |
| WO | 9916542 | 4/1999 |
| WO | 0006301 | 2/2000 |
| WO | 01/93976 | 12/2001 |
| WO | 02/34863 | 5/2002 |
| WO | 02/064248 | 8/2002 |
| WO | 03/006149 | 1/2003 |
| WO | 03/048035 | 6/2003 |
| WO | 03/049835 | 6/2003 |
| WO | 03/106386 | 12/2003 |
| WO | 2004/037418 | 6/2004 |
| WO | 2004/091771 | 10/2004 |
| WO | 2004/096952 | 11/2004 |
| WO | 2005/003025 | 1/2005 |
| WO | 2005/003632 | 1/2005 |
| WO | 2005/090521 | 9/2005 |
| WO | 2005/090522 | 9/2005 |
| WO | 2005/102511 | 11/2005 |
| WO | 2005/123883 | 12/2005 |
| WO | 2006/033025 | 3/2006 |
| WO | 2006/043111 | 4/2006 |
| WO | 2006/075130 | 7/2006 |
| WO | 2006/075193 | 7/2006 |
| WO | 2006/079848 | 8/2006 |
| WO | 2006/090189 | 8/2006 |
| WO | 2006/095204 | 9/2006 |
| WO | 2006/127889 | 11/2006 |
| WO | 2007/008495 | 1/2007 |
| WO | 2007/027767 | 3/2007 |
| WO | 2007/076393 | 5/2007 |
| WO | 2007/076394 | 5/2007 |
| WO | 2007/076395 | 5/2007 |
| WO | 2007/076397 | 5/2007 |
| WO | 2007/076400 | 5/2007 |
| WO | 2007/076402 | 5/2007 |
| WO | 2007/076404 | 5/2007 |
| WO | 2007/076406 | 5/2007 |
| WO | 2007/071737 | 6/2007 |
| WO | 2007/071741 | 6/2007 |
| WO | 2007/071744 | 6/2007 |
| WO | 2008/030467 | 3/2008 |
| WO | 2008/104793 | 9/2008 |
| ZA | 855317 | 7/1985 |

OTHER PUBLICATIONS

Bennett et al.; "Microchannel cooled heatsinks for high average power laser diode arrays"; SPIE, vol. 1865; 1993; pp. 144-153.

"Smaller Scale GTL Plants Solve Associated Gas, Remote Location Problems"; *Syngas Refiner*, Dec. 1, 2006; pp. 15, 17.

Miller et al.; "Selection of a Hydrogen Separation Process"; presented at the 1989 NPRA Annual Meeting held Mar. 19-21, San Francisco; pp. 1-27.

Iglesia; "Design, synthesis, and use of cobalt-based Fischer-Tropsch synthesis catalysts"; *Applied Catalysis A*: General 161 (1997); pp. 59-78.

Subramani et al.; "A Review of Recent Literature to Search for an Efficient Catalytic Process for the Conversion of Syngas to Ethanol"; *Energy & Fuels*, vol. xxx, No. xx, XXX. Published on Web Jan. 31, 2008.

Elliott; "Historical Developments in Hydroprocessing Bio-oils"; *Energy & Fuels*, 2007, 21, pp. 1792-1815.

Green Car Congress, Energy, Technologies, Issues and Policies for Sustainable Mobility, www.greencarcongress.com, Jan. 16, 2008.

Kandlikar; Exploring Roughness Effect on Laminar Internal Flow—Are We Ready for Change?; *Nanoscale and Microscale Thermophysical Engineering*, 12; 2008; pp. 61-82.

Technology Review: Fuel from Waste; Technology Review published by MIT; Dec. 21, 2007; www.technologyreview.com/Energy/19974.

U.S. Department of Energy, Energy Efficiency and Renewable Energy, Biomass Program; "Pyrolysis and Other Thermal Processing"; www.eere.energy.gov/biomass/pyrolysis.html; content last updated Oct. 13, 2005.

Holmen; Direct conversion of methane to fuels and chemicals;; *Catalysis Today*, 142 (2009); pp. 2-8.

Chinese Office Action, Application No. 200980149810.0 issued Jul. 9, 2013.

International Preliminary Report on Patentability, Application No. PCT/US2009/060128, mailed Apr. 12, 2011.

International Search Report and Written Opinion, Application No. PCT/US2009/060128, mailed Oct. 28, 2010.

Chen et al.; "Performance analysis of a folding flow micromixer"; Microfluid Nanofluid (2009) 6:763-774.

MacInnes et al.; "Investigation of alternating-flow mixing in microchannels"; Chemical Engineering Science 60; 2005; pp. 3453-3467.

MacInnes et al.; "Numerial characterization of floding flow microchannel mixers"; Chemical Engineering Science 62; 2007; pp. 2718-2727.

MacInnes et al.; "Mixing Strategies for Flow in Microchannel Devices"; Chemical and Process Engineering, University of Sheffield, Nov. 24, 2004.

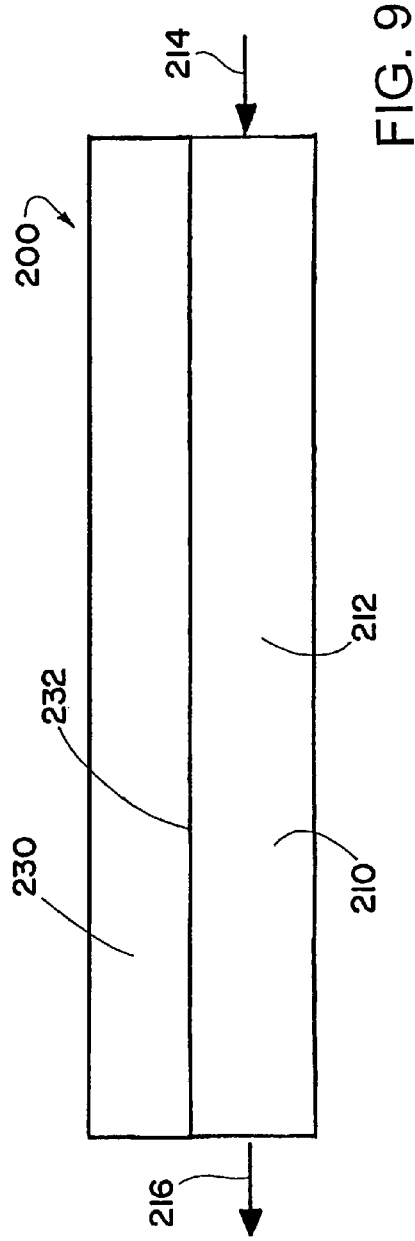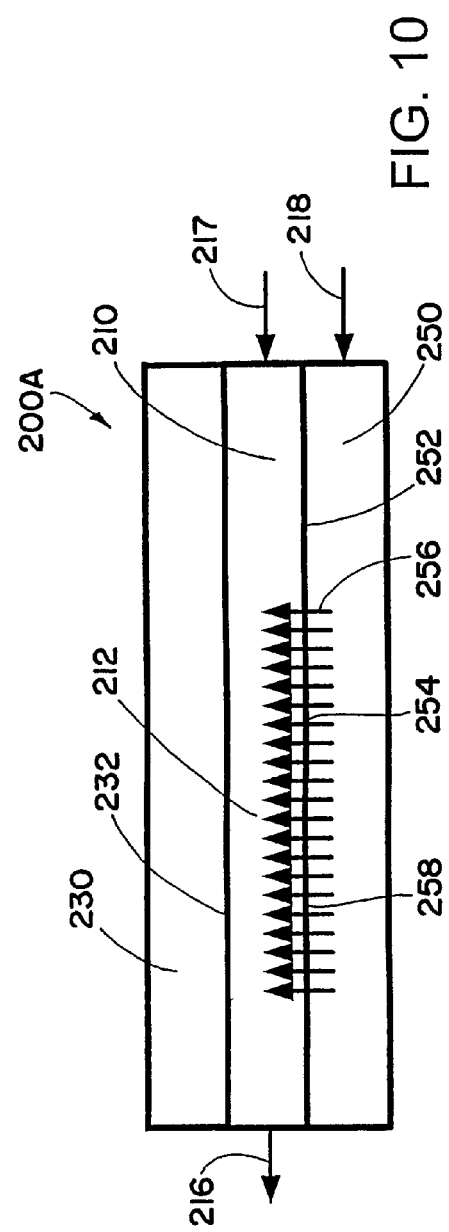

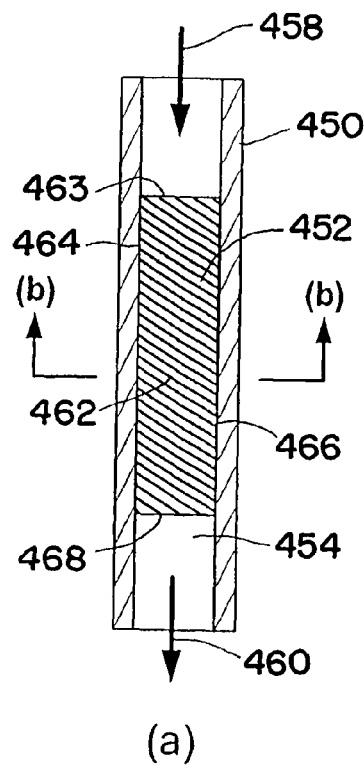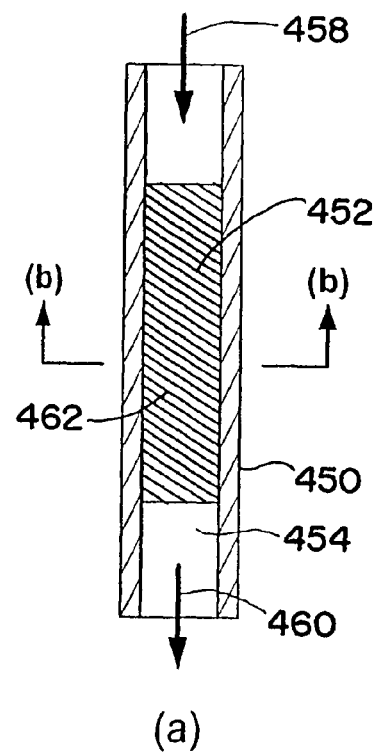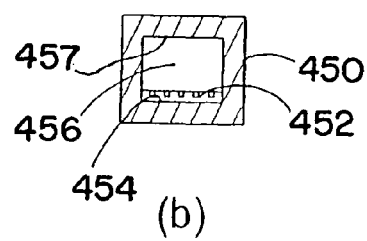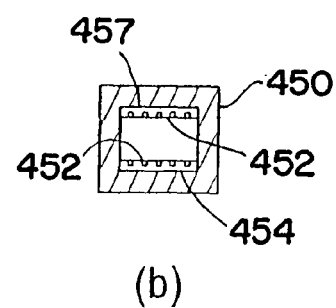
FIG. 23　　　　　　　FIG. 24

Schematic of a microchannel hydrocracking device configuration. The upstream Mott/filter disk shown in the schematic is inserted directly between the process tube and the feed block outlet. The downstream Mott/filter disk is not explicitly shown, but is placed downstream of the catalyst bed as a particle bed retainer.

Carbon number distributions of the condensed products for the experimental cases of Reactor 2. Vapor product is not included.

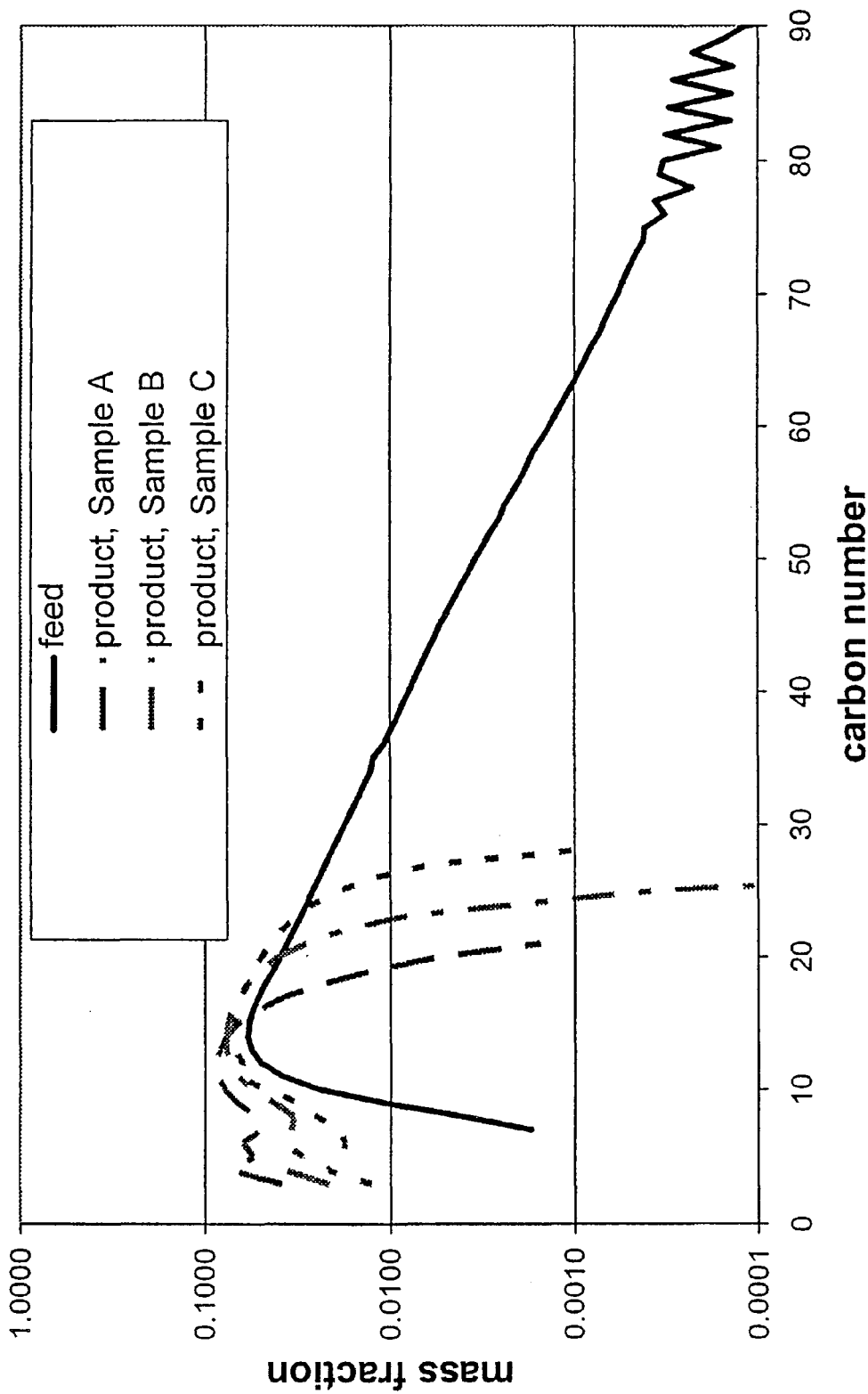
FIG. 35b Carbon number distribution for feed and products of Reactor #2.

Simulated distillation curves of the feed and condensed products of Reactor #2. Vapor product is not included.

Relationship of boiling point to carbon number hydrogen is mixed into liquid stream within reactor unit hydrocarbon is mixed into hydrogen comprising
gas stream within reactor unit Feed concentration profiles over the course of the current run set. Core samples of the remaining feed batches, evaluated at the beginning of March, 2009, verified consistent composition.

Run conditions and performance measures for Reactor #2 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Performance measures for Reactor #2, as a function of wax WHSV. Conversion of the fraction with carbon number greater than or equal to 23 is noted as C, selectivity to diesel as S, diesel yield measured on a converted basis is noted as Y, L, and diesel yield measured on a total basis is noted as Y, R.

Ratio of non-normal (mostly isomer) to normal fractions in the feed and products to Reactor #2.

Ratio of olefin to paraffin fractions in the products to Reactor #2.

Run conditions and performance measures for Reactor #5 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Run conditions and performance measures for Reactor #3 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Run conditions and performance measures for regenerated Reactor #3 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Run conditions and performance measures for Reactor #4 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Run conditions and performance measures for regenerated Reactor #4 over the course of its operation. Conversion of the fraction with carbon number greater than or equal to 23 is noted as C, selectivity to diesel as S, diesel yield measured on a converted basis is noted as Y, L, and diesel yield measured on a total basis is noted as Y, R.

Hydrocarbon Composition of Five SPK Fuels Using GCxGC

Jet fuel iso and normal paraffin distributions for synthetic jet fuel. Figures were taken 2008 Universal Technology Corporation report (CRC Project AV-2-04a).

Distribution of Hydrocarbons in Five SPK Fuels Using GCxGC

Jet fuel iso and normal paraffin distributions for synthetic jet fuel. Figures were taken 2008 Universal Technology Corporation report (CRC Project AV-2-04a).

Cold flow pressure drops for the fresh and regenerated reactors.

Pressure transducer configuration in the test stand.

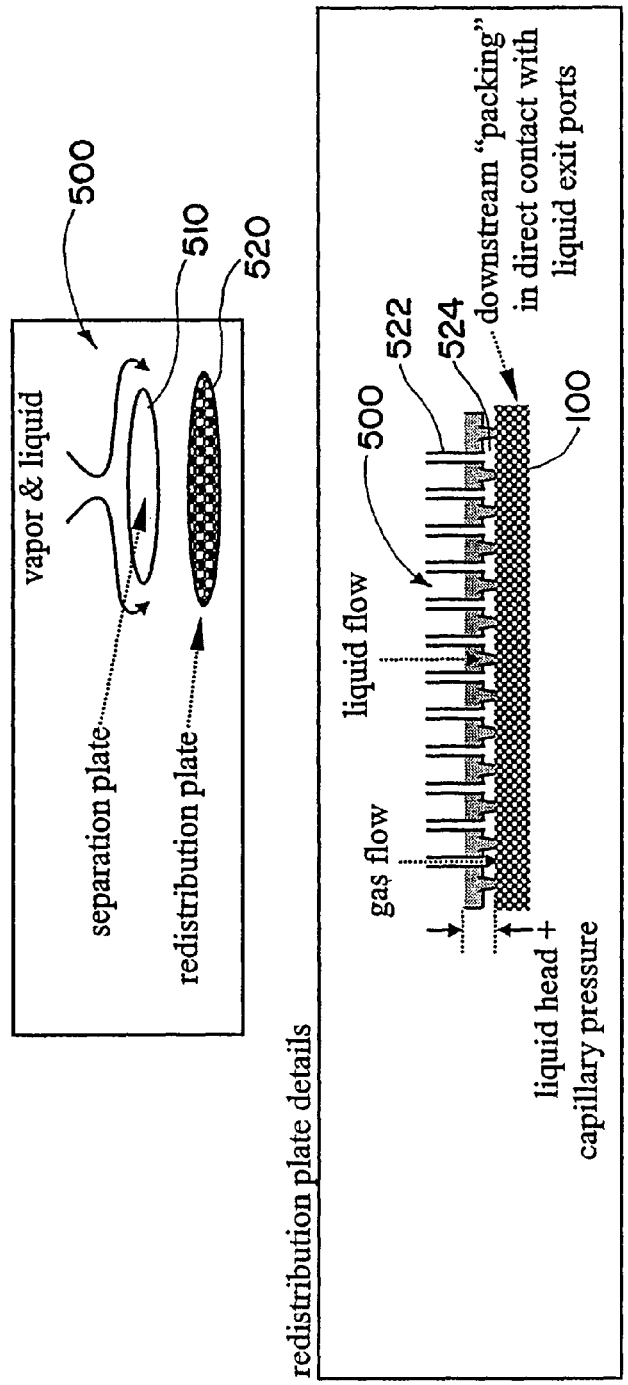

FIG. 66

Sketch of a configuration for multiphase redistribution. The separation plate facilitates phase separation to ensure uniform downstream phase re-distribution. The height and diameter of the gas flow channels in the redistribution plate need to allow for a balanced pressure drop across the liquid head and capillary features (also appropriately designed) to allow uniform liquid flow across the whole packing material.

Sketch of a multiphase feeding shim stack configuration. This configuration is assumed to lead to jet-like flow, for relatively high volumetric gas-liquid flow at the feed point.

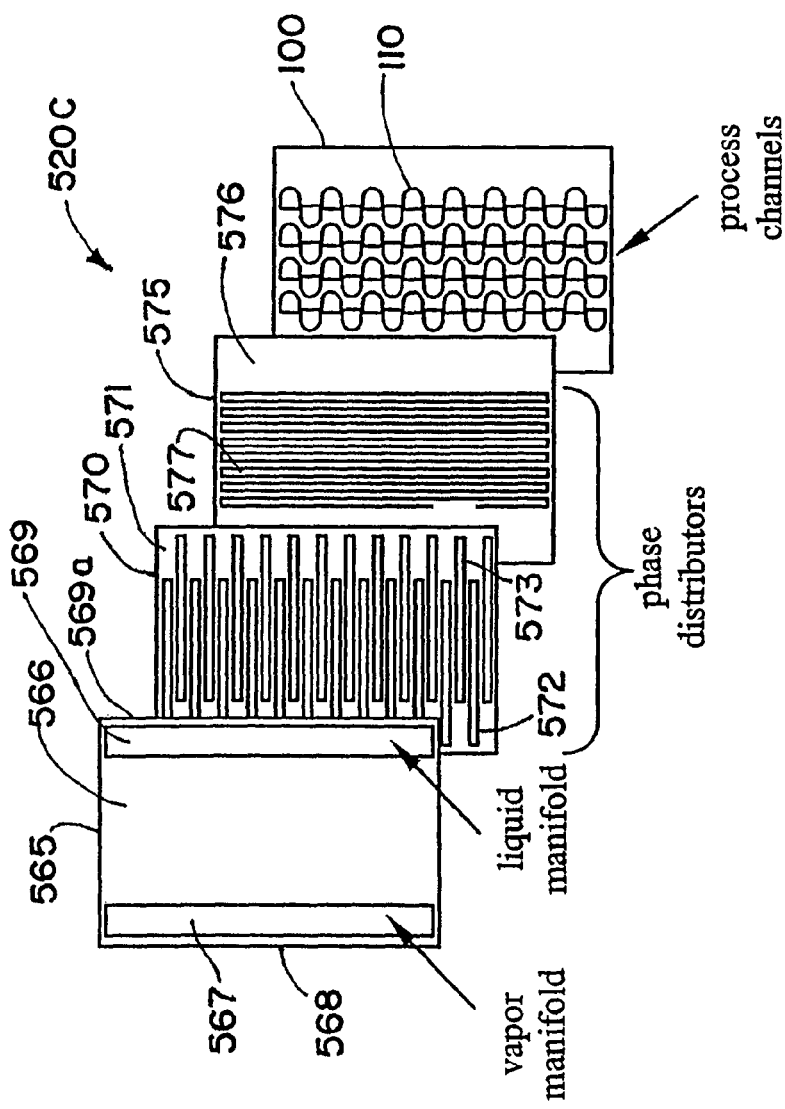

FIG. 69

Sketch of a multiphase feeding shim stack configuration. Phase distributor channel gap sizes are very small, to help distribution across the whole shim width (large dP relative to the dP in the manifolds) and to help maintain a Taylor flow profile after phase mixing (intercalating liquid and vapor phases prior to entering process channels (whether packed or void of particles).

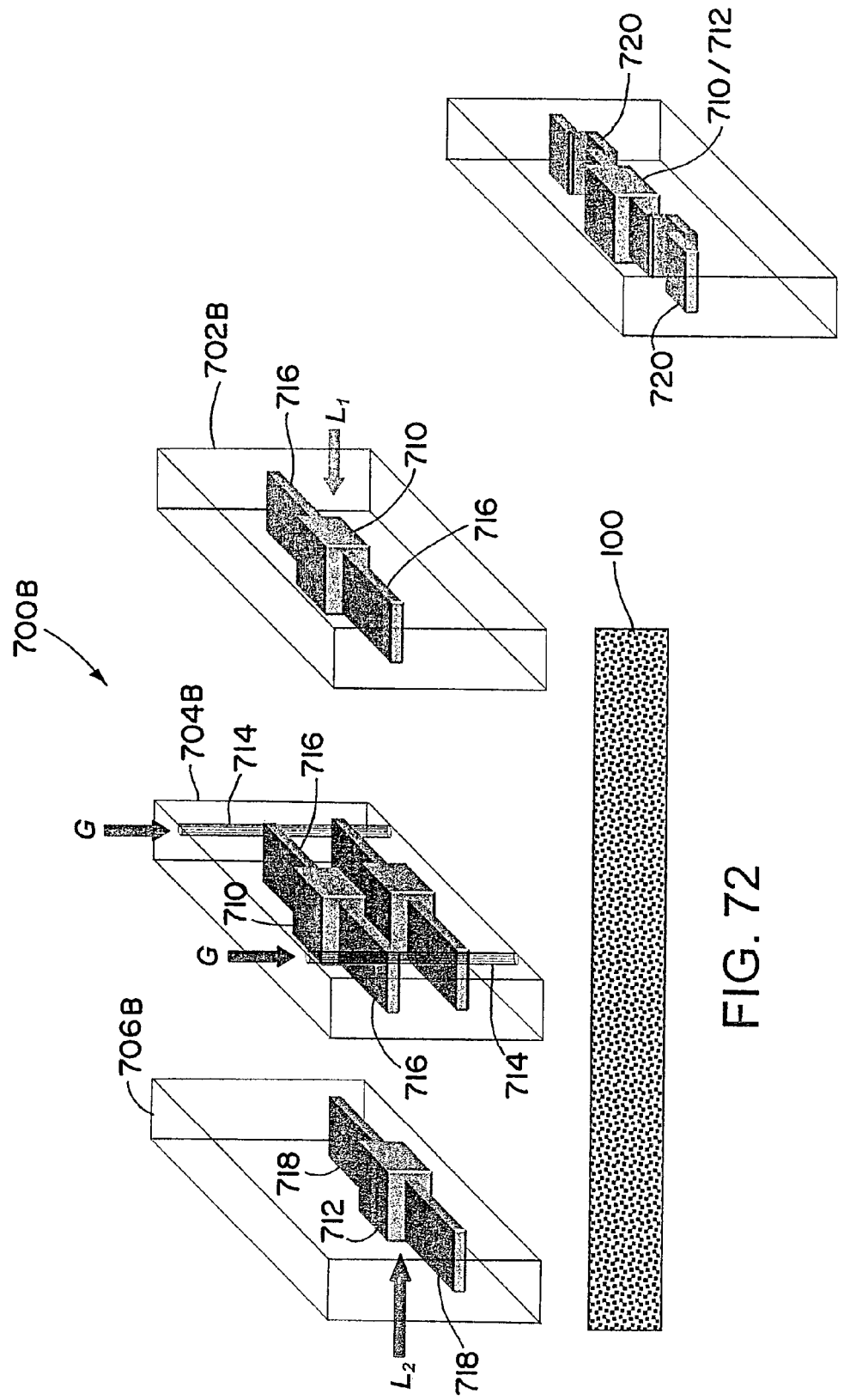

PROCESS AND APPARATUS EMPLOYING MICROCHANNEL PROCESS TECHNOLOGY

This application is a continuation under 35 U.S.C. §120 of U.S. application Ser. No. 14/288,936, filed May 28, 2014, which is a continuation of U.S. application Ser. No. 12/576, 458, filed Oct. 9, 2009 (now U.S. Pat. No. 8,747,656). A claim of priority is made herein under 35 U.S.C. §119(e) to U.S. Provisional Application 61/104,432, filed Oct. 10, 2008, U.S. Provisional Application 61/171,884, filed Apr. 23, 2009, and U.S. Provisional Application 61/234,453, filed Aug. 17, 2009. These applications are incorporated herein by reference.

This invention was made with Government support under Contract W56HZV-07-C-0276 awarded by the United States Army. The Government has certain rights in this invention.

TECHNICAL FIELD

This invention relates to a process and an apparatus employing microchannel process technology. More particularly, this invention relates to a process for hydrocracking a hydrocarbon reactant in a microchannel reactor. The hydrocarbon reactant that is hydrocracked may comprise a Fischer-Tropsch product which may be formed in a microchannel reactor. The invention also relates to a hydrotreating process which is conducted in a microchannel reactor. The invention also relates to a process and apparatus for feeding a vapor and one or more liquids to a microchannel processing unit.

BACKGROUND OF THE INVENTION

Hydrocracking processes are used commercially in petroleum refineries to process a variety of hydrocarbon feeds ranging from naphtha to heavy crude oil residual fractions. The hydrocracking processes are typically used to split molecules in a feed into smaller molecules having a higher average volatility and economic value.

SUMMARY OF THE INVENTION

A problem associated with commercial hydrocracking processes relates to the formation of hot spots and coking that tend to form in the hydrocracking reactors. These hot spots and coking may be created by inadequate mixing, inadequate contacting with the catalyst and/or inefficient temperature control. The present invention provides a solution to these problems. With this invention it is possible to obtain significantly reduced coking over that observed in conventional hydrocracking processes. It is also possible to obtain higher rates of reaction and more precise temperature control. The invention provides the advantage of higher selectivity to desired products over conventional hydrocrackers. These advantages may be achieved with the invention as a result of enhanced mass and energy transfer that is due in part to the microchannel construction of the microchannel reactors used to treat the reactants.

This invention relates to a process, comprising: flowing reactants comprising a hydrocarbon reactant and hydrogen in a process microchannel in contact with a catalyst to form one or more products, the hydrocarbon reactant comprising a liquid; and removing the product from the process microchannel; wherein: (a) the hydrocarbon reactant comprises a hydrocarbon with a first hydrocarbon chain length, the hydrocarbon reactant being converted to two or more hydrocarbon products, the hydrocarbon products having chain lengths that are shorter than the first hydrocarbon chain length; or (b) the hydrocarbon reactant comprises one or more heteroatoms bonded to the hydrocarbon reactant and at least one of the heteroatoms reacts with the hydrogen to form a heteroatom containing compound, the product comprising a hydrocarbon product characterized by the absence of heteroatoms or a reduced heteroatom content as compared to the hydrocarbon reactant.

This invention relates to a process, comprising: flowing reactants comprising a hydrocarbon reactant and hydrogen in a process microchannel in contact with a catalyst to form one or more products, the reactants comprising one or more liquids, the flow-rate of the liquid reactants in the process microchannel being at least about 1 liter, and in one embodiment at least about 5 liters, of liquid reactants per hour per liter of catalyst volume in the process microchannel; and removing the product from the process microchannel; wherein: (a) the hydrocarbon reactant comprises one or more hydrocarbons with boiling points above about 350° C. and at least about 50% by weight of the hydrocarbons with boiling points above about 350° C. are converted to one or more hydrocarbons with boiling points below about 350° C.; or (b) the hydrocarbon reactant comprises one or more heteroatoms bonded to the hydrocarbon reactant and at least about 50% by weight of the heteroatoms react with the hydrogen to form a heteroatom containing compound, the product comprising a hydrocarbon characterized by a reduced heteroatom content or the absence of heteroatoms.

This invention relates to a hydrocracking process, comprising: flowing reactants comprising a hydrocarbon reactant and hydrogen in a process microchannel in contact with a hydrocracking catalyst to form one or more hydrocracked products, and removing the hydrocracked product from the process microchannel; the temperature within the process microchannel being in the range from about 50° C. to about 500° C., and in one embodiment in the range from about 100° C. to about 400° C.; the pressure within the process microchannel being in the range from about 1 to about 25 MPa, and in one embodiment in the range from about 1 to about 15 MPa, and in one embodiment from about 1 to about 7 MPa, and in one embodiment from about 1 to about 4 MPa; and the hydrogen to hydrocarbon reactant volume ratio for the reactants entering the process microchannel being in the range from about 10 to about 6000 standard cubic centimeters (sccm) of hydrogen per cubic centimeter (ccm) of hydrocarbon reactant, and in one embodiment the hydrogen to hydrocarbon reactant ratio may be from about 50:1 to about 4000:1 sccm/ccm, and in one embodiment from about 100:1 to about 2000:1 sccm/ccm, and in one embodiment from about 300:1 to about 1500:1 sccm/ccm.

This invention relates to a hydrocracking process, comprising: (A) flowing CO and $H_2$ in a Fischer-Tropsch process microchannel in contact with a Fischer-Tropsch (FT) catalyst to form a Fischer-Tropsch synthesis product; and (B) flowing reactants comprising the Fischer-Tropsch synthesis product from step (A) and hydrogen in a hydrocracking process microchannel in contact with a hydrocracking catalyst to form one or more hydrocracked products and removing the hydrocracked product from the hydrocracking process microchannel; the temperature within the hydrocracking process microchannel being in the range from about 50° C. to about 500° C., and in one embodiment from about 100° C. to about 400° C.; the pressure within the hydrocracking process microchannel being in the range from about 1 to about 25 MPa, and in one embodiment in the range from about 1 to about 15 MPa, and in one embodiment from about 1 to about 7 MPa, and in one embodiment from about 1 to about 4 MPa; and the hydrogen to Fischer-Tropsch synthesis product volume ratio for the reactants entering the hydrocracking process microchannel being in the range from about 10 to about 6000 sccm of hydrogen per ccm of Fischer-Tropsch synthesis product, and in one embodiment from about 50:1 to about 4000:1 sccm/ccm, and in one embodiment from about 100:1 to about 2000:1 sccm/ccm, and in one embodiment from about 300:1 to about 1500:1 sccm/ccm. The Fischer-Tropsch process microchannel and the hydrocracking process microchannel may comprise the same process microchannel. Alternatively, the Fischer-Tropsch process microchannel and the hydrocracking process microchannel may comprise different process microchannels. The Fischer-Tropsch catalyst and the hydrocracking catalyst may be positioned in the same process microchannel. These catalysts may be mixed together in the same reaction zone. The hydrocracking catalyst may be positioned in the same process microchannel as the Fischer-Tropsch catalyst, but downstream of the Fischer-Tropsch catalyst. The hydrocracking catalyst may be downstream of the Fischer-Tropsch catalyst in another process microchannel. Part of the hydrocracking catalyst may be mixed with the Fischer-Tropsch catalyst and part of the hydrocracking catalyst may be positioned downstream of the Fischer-Tropsch catalyst, the downstream hydrocracking catalyst being positioned in either in the same process microchannel and/or in another downstream process microchannel. In one embodiment, a footer and/or header may be positioned intermittent between the Fischer-Tropsch catalyst and the hydrocracking catalyst.

Processes employing multiphase feeds are integral to chemical processing and the use of microchannel technology with these processes offers significant advantages. This is especially true when using microchannel processing units employing a plurality of parallel operated process microchannels. However, a problem associated with employing a multiphase feed with a microchannel processing unit relates to providing effective mixing of the multiphase feed and distribution of that feed to the process microchannels employed in the microchannel processing unit. This invention, in one embodiment, provides a solution to this problem. This invention relates to the use of a distribution apparatus for flowing a vapor/liquid mixture into a plurality of microchannels in a microchannel processing unit. This distribution apparatus is adapted to be positioned at the entrance to the microchannels. This distribution apparatus may be used with any microchannel processing unit, including any microchannel reactor. The microchannel reactor may be suitable for conducting the disclosed hydrocracking and/or hydrotreating processes, as well as other processes requiring the use of a multiphase feed. This distribution apparatus may comprise: a separation plate; and a redistribution plate, the separation plate overlying the redistribution plate; the separation plate being adapted to permit a mixture of a vapor and a liquid to separate into a vapor phase and a liquid phase and flow to the redistribution plate; the redistribution plate comprising a plurality of openings, the openings in the redistribution plate being aligned with the entrances to the microchannels, the openings in the redistribution plate being adapted to permit the vapor phase and the liquid phase to contact each other, form a vapor/liquid mixture and flow into the microchannels. In one embodiment, the liquid is distributed laterally within a microchannel layer to an array of parallel microchannels through the use of a submanifold while the vapor may flow from a large plenum into the microchannels. In one embodiment, the vapor may flow through a submanifold. In one embodiment, the liquid may flow through a flow duct that is placed in close proximity to the entrances for the microchannels and the liquid may be sprayed into the microchannels. The spray may be held in close proximity to the microchannels. The term "close proximity" refers to the distance from the spray device at which the loss of liquid velocity is less than 50% when compared to velocity of the liquid flowing out of the spray device.

This invention relates to a distribution apparatus for flowing a vapor and two liquids into a plurality of microchannels in a microchannel processing unit, the distribution apparatus being adapted to be positioned at the entrance to the microchannels, the distribution apparatus comprising: a distributive plate, the distributive plate comprising: a first liquid manifold slot; a second liquid manifold slot; a vapor pathway; a first distribution channel extending from the first liquid manifold slot to the vapor pathway; a second distribution channel extending from the second liquid manifold slot to the vapor pathway; the apparatus being adapted to permit vapor to flow through the vapor pathway, a first liquid to flow from the first liquid manifold slot through the first distribution channel into the vapor pathway in contact with the vapor flowing in the vapor pathway, and a second liquid to flow from the second liquid manifold slot through the second distribution channel into the vapor pathway in contact with the vapor flowing in the vapor pathway and the first liquid flowing in the vapor pathway.

This invention relates to a distribution apparatus for flowing a vapor and two liquids into a plurality of microchannels in a microchannel processing unit, the distribution apparatus being adapted to be positioned at the entrance to the microchannels, the distribution apparatus comprising: a first distributive section; a second distributive section, the first distributive section overlying the second distributive section; and a third distributive section, the second distributive section overlying the third distributive section; the apparatus being adapted to permit a vapor to flow from the first distributive section through the second distributive section and the third distributive section into the microchannels, a first liquid to flow from the second distributive section in contact with the vapor through the third distributive section into the microchannels, and a second liquid to flow from the third distributive section in contact with the vapor and the first liquid into the microchannels.

This invention relates to a hydrocracked Fischer-Tropsch synthesis product, comprising at least about 95% by weight straight chain aliphatic compounds having 5 or more carbon atoms; and at least about 0.05% by weight alicyclic compounds having from 5 to about 13 carbon atoms, and/or at least about 0.01% by weight aromatic compounds having from 6 to about 18 carbon atoms.

With the inventive process, increased process efficiency may be achieved as a result of relatively high rates of heat and mass transfer. This may provide for the following advantages when compared to conventional processing:
significant increases in productivity,
significant reductions in process footprint for the same throughput,
increased processing windows and operational flexibility (opportunities to operate at lower pressures and temperatures),
increased process control (reduced problems with hot spots),
reduced operating costs,
reduced energy consumption,
easy variation in process throughput (by numbering-up scaling approach), integration of multiple unit operations in single and movable device systems, optimization of catalyst functionality, easy implementation of catalyst regeneration schemes.

Overall, these benefits can eliminate cost and distribution issues that often constrain operation, allowing energy to be produced on site, adopting readily available, local and renewable feedstocks that may include agricultural resources, waste and/or other biological materials.

BRIEF DESCRIPTION OF THE DRAWINGS

In the annexed drawings, like parts and features have like designations.

FIGS. 9-14 are schematic illustrations of repeating units that may be used in the microchannel reactor used with the inventive process.

FIGS. 17-25 are schematic illustrations of catalysts or catalyst support structures that may be used in the microchannel reactor used with the inventive process. FIG. 23(b) is a cross sectional view of FIG. 23(a) taken along line (b)-(b) in FIG. 23(a). FIG. 24(b) is a cross sectional view of FIG. 24(a) taken along line (b)-(b) in FIG. 24(a).

FIG. 66 is a schematic illustration of an apparatus and process for flowing a vapor/liquid mixture into a plurality of microchannels in a microchannel processing unit, the apparatus comprising a separation plate and a redistribution plate.

FIG. 69 is a schematic illustration of still another embodiment of the redistribution plate illustrated in FIG. 66, the redistribution plate comprising three shims adapted to be stacked one above another.

FIG. 72 is a schematic illustration of another alternate embodiment of the apparatus and process illustrated in FIG. 70.

FIG. 73 is a schematic illustration of an alternate embodiment of a liquid manifold slot and distribution channel that may be used in the distribution apparatus illustrated in FIGS. 70-72.

DETAILED DESCRIPTION OF THE INVENTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The term "hydrocracking process" refers to a process wherein hydrocarbon molecules are split into smaller molecules. For example, a $C_{12}$ alkane may be hydrocracked to form a $C_7$ alkane and a $C_5$ alkane. The hydrocracked products may be isomerized. The hydrocracked products may comprise straight chain hydrocarbons, branched chain hydrocarbons (e.g., isoparaffins) and/or ring compounds.

The term "hydrotreating process" refers to a process wherein heteroatoms bonded to one or more hydrocarbons are reacted with hydrogen to form heteroatom containing compounds. The heteroatom containing compounds are then separated from the hydrocarbon. The heteratoms may include sulfur, nitrogen, oxygen, and/or metals (e.g., Ni, V, and the like).

The term "hydroprocessing" refers to a hydrocracking process or a hydrotreating process.

The term "Fischer-Tropsch reaction" or "FT reaction" refers to a catalyzed reaction in which a mixture of carbon monoxide and hydrogen is converted into a liquid hydrocarbon.

The term "hydrocarbon" may refer to purely hydrocarbon compounds; that is, aliphatic compounds, (e.g., alkane, alkene or alkyne), alicyclic compounds (e.g., cycloalkane, cycloalkylene), aromatic compounds, aliphatic- and alicyclic-substituted aromatic compounds, aromatic-substituted aliphatic compounds, aromatic-substituted alicyclic compounds, and the like. The term "hydrocarbon" may refer to substituted hydrocarbon compounds; that is, hydrocarbon compounds containing non-hydrocarbon substituents. Examples of the non-hydrocarbon substituents may include hydroxyl, acyl, nitro, etc. The term "hydrocarbon" may refer to hetero substituted hydrocarbon compounds; that is, hydrocarbon compounds which contain atoms other than carbon in a chain or ring otherwise containing carbon atoms. The hetero atoms may include, for example, nitrogen, oxygen, sulfur, and the like.

Figure 1:
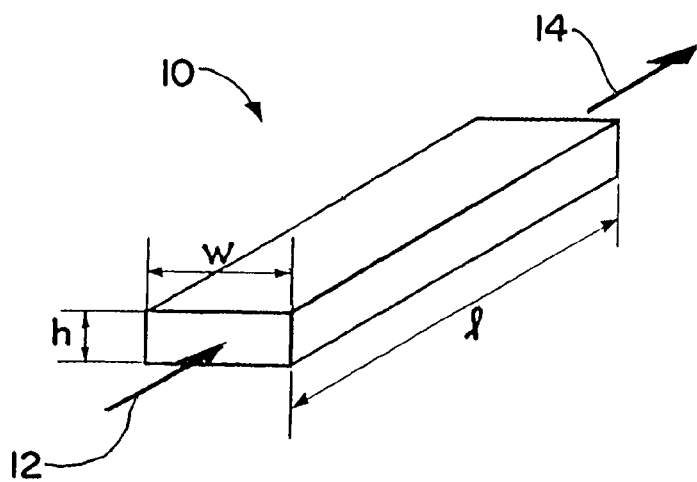
FIG. 1 is a schematic illustration of a microchannel that may be used with the inventive process.

The term "microchannel" refers to a channel having at least one internal dimension of height or width of up to about 10 millimeters (mm), and in one embodiment up to about 5 mm, and in one embodiment up to about 2 mm. An example of a microchannel that may be used with the inventive process is illustrated in FIG. 1. Referring to FIG. 1, microchannel 10 has a height (h), width (w) and length (I). Fluid flows through the microchannel 10 in the direction indicated by arrows 12 and 14. Both the height (h) and width (w) are perpendicular to the flow of fluid in the microchannel 10. The microchannel may comprise at least one inlet and at least one outlet wherein the at least one inlet is distinct from the at least one outlet. The microchannel may not be merely an orifice. The microchannel may not be merely a channel through a zeolite or a mesoporous material. The length of the microchannel may be at least about two times the height or width, and in one embodiment at least about five times the height or width, and in one embodiment at least about ten times the height or width. The height or width may be referred to as the gap between opposed internal walls of the microchannel. The internal height or width of the microchannel may be in the range of about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment from about 0.05 to about 0.75 mm, and in one embodiment from about 0.05 to about 0.5 mm. The other internal dimension of height or width may be of any dimension, for example, up to about 3 meters, and in one embodiment about 0.01 to about 3 meters, and in one embodiment about 0.1 to about 3 meters. The length of the microchannel may be of any dimension, for example, up to about 10 meters, and in one embodiment from about 0.1 to about 10 meters, and in one embodiment from about 0.1 to about 6 meters, and in one embodiment from about 0.1 to about 3 meters, and in one embodiment about 0.1 to about 2 meters, and in one embodiment from 0.1 to about 1 meter. The microchannel may have a cross section having any shape, for example, a square, rectangle, circle, semi-circle, trapezoid, etc. The shape and/or size of the cross section of the microchannel may vary over its length. For example, the height or width may taper from a relatively large dimension to a relatively small dimension, or vice versa, over the length of the microchannel. The microchannel may be formed from a fin structure with rectangular-like channels that may not have perfectly square channels nor constant cross sections for any channel dimension. The channels may be discrete from each other or they may have regions of fluid connection to aid in flow distribution and providing for flow to move around channel blockages.

The term "process microchannel" refers to a microchannel wherein a process is conducted. The process may relate to a hydrocracking or hydrotreating process. The process may relate to forming a Fischer-Tropsch (FT) synthesis product and then hydrocracking the FT synthesis product.

The term "microchannel reactor" refers to an apparatus comprising one or more process microchannels wherein a reaction process is conducted. The process may be a hydrocracking process or a hydrotreating process. The process may comprise a hydrocracking process conducted in combination with a Fischer-Tropsch (FT) synthesis process wherein the FT process is conducted upstream of the microchannel reactor used for hydrocracking or in the same microchannel used for hydrocracking. When two or more process microchannels are used, the process microchannels may be operated in parallel. The microchannel reactor may include a header or manifold assembly for providing for the flow of reactants into the one or more process microchannels, and a footer or manifold assembly providing for the flow of product out of the one or more process microchannels. The microchannel reactor may further comprise one or more heat exchange channels adjacent to and/or in thermal contact with the one or more process microchannels. The heat exchange channels may provide heating and/or cooling for the fluids in the process microchannels. The heat exchange channels may be microchannels. The microchannel reactor may include a header or manifold assembly for providing for the flow of heat exchange fluid into the heat exchange channels, and a footer or manifold assembly providing for the flow of heat exchange fluid out of the heat exchange channels.

The term "conventional reactor" refers to a reactor that is not a microchannel reactor.

The term "microchannel processing unit" refers to an apparatus comprising one or more process microchannels wherein a process is conducted. The process may be a reaction process or it may be any other unit operation wherein one or more fluids are treated.

The term "volume" with respect to volume within a process microchannel includes all volume in the process microchannel a process fluid may flow through or flow by. This volume may include volume within surface features that may be positioned in the process microchannel and adapted for the flow of fluid in a flow-through manner or in a flow-by manner.

The term "adjacent" when referring to the position of one channel relative to the position of another channel means directly adjacent such that a wall or walls separate the two channels. In one embodiment, the two channels may have a common wall. The common wall may vary in thickness. However, "adjacent" channels may not be separated by an intervening channel that may interfere with heat transfer between the channels. One channel may be adjacent to another channel over only part of the another channel. For example, a process microchannel may be longer than and extend beyond one or more adjacent heat exchange channels.

The term "thermal contact" refers to two bodies, for example, two channels, that may or may not be in physical contact with each other or adjacent to each other but still exchange heat with each other. One body in thermal contact with another body may heat or cool the other body.

The term "fluid" refers to a gas, a liquid, a mixture of a gas and a liquid, or a gas or a liquid containing dispersed solids, liquid droplets and/or gaseous bubbles. The droplets and/or bubbles may be irregularly or regularly shaped and may be of similar or different sizes.

The terms "gas" and "vapor" have the same meaning and are sometimes used interchangeably.

The term "residence time" or "average residence time" refers to the internal volume of a space within a channel occupied by a fluid flowing in the space divided by the average volumetric flow rate for the fluid flowing in the space at the temperature and pressure being used.

The terms "upstream" and "downstream" refer to positions within a channel (e.g., a process microchannel) or in a process or process flow sheet that is relative to the direction of flow of a fluid in the channel or process or process flow sheet. For example, a position within a channel or a process or process flow sheet not yet reached by a portion of a fluid stream flowing toward that position would be downstream of that portion of the fluid stream. A position within the channel or a process or process flow sheet already passed by a portion of a fluid stream flowing away from that position would be upstream of that portion of the fluid stream. The terms "upstream" and "downstream" do not necessarily refer to a vertical position since the channels used herein may be oriented horizontally, vertically or at an inclined angle.

The term "shim" refers to a planar or substantially planar sheet or plate. The thickness of the shim may be the smallest dimension of the shim and may be up to about 4 mm, and in one embodiment in the range from about 0.05 to about 2 mm, and in one embodiment in the range of about 0.05 to about 1 mm, and in one embodiment in the range from about 0.05 to about 0.5 mm. The shim may have any length and width.

Figure 15:
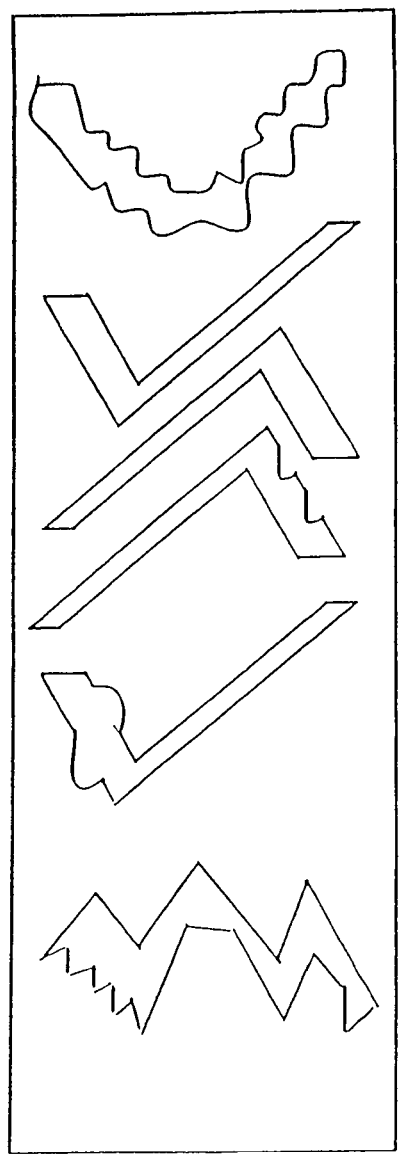
FIGS. 15 and 16 are schematic illustrations of surface features that may be used in the microchannel reactor used with the inventive process.
Figure 16:
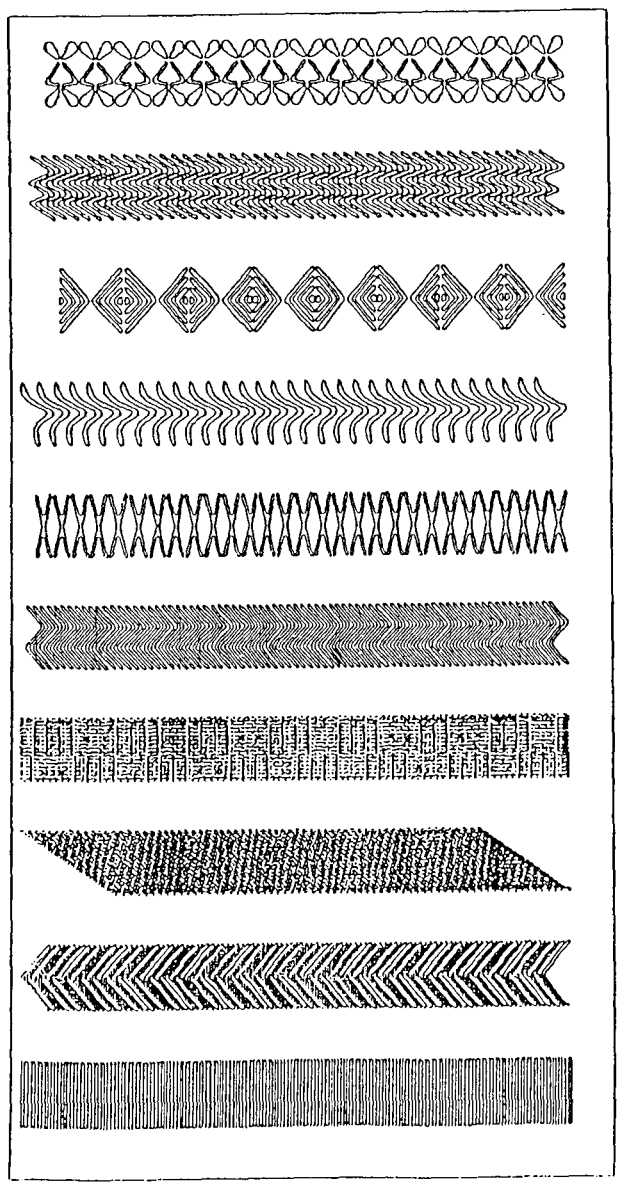
Figure 25:
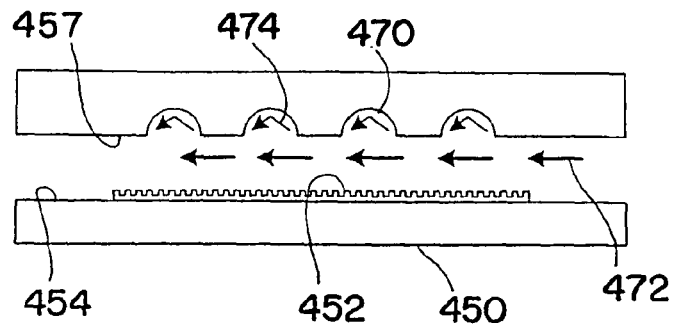

The term "surface feature" refers to a depression in a channel wall and/or internal channel structure (e.g., internal fin) and/or a projection from a channel wall and/or internal channel structure that disrupts flow within the channel. Examples of surface feature designs that may be used are illustrated in FIGS. 15, 16 and 25. The surface features may be in the form of circles, spheres, hemispheres, frustrums, oblongs, squares, rectangles, angled rectangles, checks, chevrons, vanes, airfoils, wavy shapes, and the like. Combinations of two or more of the foregoing may be used. The surface features may contain subfeatures where the major walls of the surface features further contain smaller surface features that may take the form of notches, waves, indents, holes, burrs, checks, scallops, and the like. The surface features may have a depth, a width, and a length. The surface features may be formed on or in one or more of the interior walls of the process microchannels and/or heat exchange channels used in accordance with the inventive process. The surface features may be referred to as passive surface features or passive mixing features. The surface features may be used to disrupt flow (for example, disrupt laminar flow streamlines) and create advective flow at an angle to the bulk flow direction.

The term "waveform" refers to a contiguous piece of thermally conductive material that is transformed from a planar object to a three-dimensional object. The waveform may be used to form one or more microchannels. The waveform may comprise a right angled corrugated insert which may be sandwiched between opposed planar sheets or shims. Alternatively, the corrugated insert may not have right angles and may be formed from a material with holes, apertures, or openings which may be of any dimension. In this manner one or more microchannels may be defined on three sides by the waveform and on the fourth side by one of the planar sheets or shims. The waveform may be made of any of the thermally conductive materials disclosed herein as being useful for making the microchannel reactor. These may include copper, aluminum, stainless steel, and the like. The thermal conductivity of the waveform may be about 1 W/m-K or higher. The waveform may comprise a composite material which includes two or more layers, where the thermal conductivity of the two or more materials may differ by about 20% or more. The waveform may comprise three layered constructions wherein, for example, an aluminum or copper layer may be positioned between two stainless steel layers. A thermally conductive waveform may be used to remove the heat of reaction while retaining an inert surface for contacting the catalyst. A composite waveform may be used for any exothermic reaction, including hydrocracking and/or hydroprocessing reactions.

The term "bulk flow direction" refers to the vector through which fluid may travel in an open path in a channel.

The term "bulk flow region" refers to open areas within a channel (e.g., a process microchannel). A contiguous bulk flow region may allow rapid fluid flow through a channel without significant pressure drop. In one embodiment, the flow in the bulk flow region may be laminar. A bulk flow region may comprise at least about 5% of the internal volume and/or cross-sectional area of a microchannel, and in one embodiment from about 5% to about 100%, and in one embodiment from about 5% to about 99%, and in one embodiment about 5% to about 95%, and in one embodiment from about 5% to about 90%, and in one embodiment from about 30% to about 80% of the internal volume and/or cross-sectional area of the microchannel.

The term "open channel" refers to a channel (e.g., a microchannel) with a gap of at least about 0.01 mm that extends all the way through the channel such that fluid may flow through the channel without encountering a barrier to flow. The gap may extend up to about 10 mm.

The term "cross-sectional area" of a channel (e.g., process microchannel) refers to an area measured perpendicular to the direction of the bulk flow of fluid in the channel and may include all areas within the channel including any surface features that may be present, but does not include the channel walls. For channels that curve along their length, the cross-sectional area may be measured perpendicular to the direction of bulk flow at a selected point along a line that parallels the length and is at the center (by area) of the channel. Dimensions of height and width may be measured from one interior channel wall to the opposite interior channel wall. These dimensions may be average values that account for variations caused by surface features, surface roughness, and the like.

The term "open cross-sectional area" of a channel (e.g., process microchannel) refers to an area open for bulk fluid flow in a channel measured perpendicular to the direction of the bulk flow of fluid flow in the channel. The open cross-sectional area may not include internal obstructions such as surface features and the like which may be present.

The term "superficial velocity" for the velocity of a fluid flowing in a channel refers to the velocity resulting from dividing the volumetric flow rate of the fluid at the inlet temperature and pressure of the channel divided by the cross-sectional area of the channel.

The term "free stream velocity" refers to the velocity of a stream flowing in a channel at a sufficient distance from the sidewall of the channel such that the velocity is at a maximum value. The velocity of a stream flowing in a channel is zero at the sidewall if a no slip boundary condition is applicable, but increases as the distance from the sidewall increases until a constant value is achieved. This constant value is the "free stream velocity."

The term "process fluid" refers to reactants, product, diluent and/or other fluid that enters, flows in and/or flows out of a process microchannel.

The term "reactants" refers to hydrocarbon reactants and hydrogen when used with reference to the inventive hydrocracking process. When referring to a Fischer-Tropsch (FT) synthesis process, the term reactants refers to CO and $H_2$.

The term "reaction zone" refers to the space within a microchannel wherein a chemical reaction occurs or wherein a chemical conversion of at least one species occurs. The reaction zone may contain one or more catalysts.

The term "graded catalyst" refers to a catalyst with one or more gradients of catalytic activity. The graded catalyst may have a varying concentration or surface area of a catalytically active metal. The graded catalyst may have a varying turnover rate of catalytically active sites. The graded catalyst may have physical properties and/or a form that varies as a function of distance. For example, the graded catalyst may have an active metal concentration that is relatively low at the entrance to a process microchannel and increases to a higher concentration near the exit of the process microchannel, or vice versa; or a lower concentration of catalytically active metal nearer the center (i.e., midpoint) of a process microchannel and a higher concentration nearer a process microchannel wall, or vice versa, etc. The thermal conductivity of a graded catalyst may vary from one location to another within a process microchannel. The surface area of a graded catalyst may be varied by varying size of catalytically active metal sites on a constant surface area support, or by varying the surface area of the support such as by varying support type or particle size. A graded catalyst may have a porous support where the surface area to volume ratio of the support is higher or lower in different parts of the process microchannel followed by the application of the same catalyst coating everywhere. A combination of two or more of the preceding embodiments may be used. The graded catalyst may have a single catalytic component or multiple catalytic components (for example, a bimetallic or trimetallic catalyst). The graded catalyst may change its properties and/or composition gradually as a function of distance from one location to another within a process microchannel. The graded catalyst may comprise rimmed particles that have "eggshell" distributions of catalytically active metal within each particle. The graded catalyst may be graded in the axial direction along the length of a process microchannel or in the lateral direction. The graded catalyst may have different catalyst compositions, different loadings and/or numbers of active catalytic sites that may vary from one position to another position within a process microchannel. The number of catalytically active sites may be changed by altering the porosity of the catalyst structure. This may be accomplished using a washcoating process that deposits varying amounts of catalytic material. An example may be the use of different porous catalyst thicknesses along the process microchannel length, whereby a thicker porous structure may be left where more activity is required. A change in porosity for a fixed or variable porous catalyst thickness may also be used. A first pore size may be used adjacent to an open area or gap for flow and at least one second pore size may be used adjacent to the process microchannel wall.

The term "volume of catalyst" or "cubic meter of catalyst" refers to the volume of the catalytically active portion of a catalyst. For a bed of particulate solids the terms "volume of catalyst" or "cubic meter of catalyst" may refer to the volume of the space in which the active catalyst is loaded.

The term "heat exchange channel" refers to a channel having a heat exchange fluid in it that gives off heat and/or absorbs heat. The heat exchange channel may absorb heat from or give off heat to an adjacent channel (e.g., process microchannel) and/or one or more channels in thermal contact with the heat exchange channel. The heat exchange channel may absorb heat from or give off heat to channels that are adjacent to each other but not adjacent to the heat exchange channel. In one embodiment, one, two, three or more channels may be adjacent to each other and positioned between two heat exchange channels.

The term "heat transfer wall" refers to a common wall between a process microchannel and an adjacent heat exchange channel where heat transfers from one channel to the other through the common wall. In one embodiment multiple process microchannels may be adjacent to each other and these process microchannels may exchange heat with one or more heat exchange channels. In one embodiment, two, three or more process microchannels may be placed atop each other and transfer heat to a heat exchange channel. In this latter embodiment, the heat from the first process microchannel may go to the second process microchannel before going to a third process microchannel or the heat exchange channel. This may be enabled by stacking multiple process waveforms on top of each with or without intervening planar walls before adding an adjacent heat exchange layer.

The term "heat exchange fluid" refers to a fluid that may give off heat and/or absorb heat.

The term "heat exchange medium" refers to a substance or device that absorbs heat or gives off heat and may be used to cool or heat another substance or device. The another substance or device may be, for example, a channel that is adjacent to or in thermal contact with the heat exchange medium. An example of a heat exchange medium would be a heat exchange fluid in a heat exchange channel.

The term "conversion of reactant" refers to the reactant mole change between a fluid flowing into a microchannel reactor and a fluid flowing out of the microchannel reactor divided by the moles of reactant in the fluid flowing into the microchannel reactor.

The term "converted basis yield" or "CBY" is used herein with respect to a hydrocracking process to refer to the mass of product with 10 to 22 carbon atoms, minus the mass of feed with 10 to 22 carbon atoms, divided by the mass of feed with more than 22 carbon atoms. Converted basis yield or CBY may be represented by the expression:

$$CBY = [(\text{Mass } C_{10}\text{-}C_{22} \text{ Product}) - (\text{Mass } C_{10}\text{-}C_{22} \text{ Feed})] \div (\text{Mass } C_{22}^{+} \text{ Feed})$$

The term "total basis yield" or "TBY" is used herein with respect to hydrocracking to refer to the mass of product with 10 to 22 carbon atoms minus the mass of feed with 10-22 carbon atoms divided by the mass of feed. Total base yield or TBY may be represented by the expression:

$$TBY = [(\text{Mass } C_{10}\text{-}C_{22} \text{ Product}) - (\text{Mass } C_{10}\text{-}C_{22} \text{ Feed})] \div (\text{Mass Feed})$$

The term "selectivity" is used herein with respect to a hydrocracking process to refer to the mass of product with 10 to 22 carbon atoms minus the mass of feed with the 10-22 carbon atoms divided by the mass of feed with more than 22 carbon atoms minus the mass of product with more than 22 carbon atoms. Selectivity may be represented by the expression:

$$\text{Selectivity} = [(\text{Mass } C_{10}\text{-}C_{22} \text{ Product}) - (\text{Mass } C_{10}\text{-}C_{22} \text{ Feed})] \div [(\text{Mass } C_{22}{}^+ \text{ Feed}) - (\text{Mass } C_{22}{}^+ \text{ Product})]$$

The terms "light" and "heavy" are used herein in their normal sense within the refining industry to refer respectively to relatively low and high boiling point ranges.

The term "cycle" is used herein to refer to a single pass of the reactants through a process microchannel.

The term "solid substrate" may refer to a granular particle with a mean diameter less than about 2 mm, and in one embodiment less than about 1 mm, and in one embodiment in the range from about 0.05 mm to about 0.5 mm. The solid substrate may comprise a continuous porous medium that substantially spans the gap of a microchannel. The porous medium may be in the form of a foam, wad, strands, and/or monolith with either regular or irregular pores that interconnect. The porous medium may comprise a waveform with a porosity throughout the thickness of the waveform of from about 5% to about 95% or with a porosity for a portion of the thickness of the waveform ranging from about 5% to about 95%. The solid substrate may be housed continuously throughout the entire length of a process microchannel or part of the length of a process microchannel. The solid substrate may be housed in several regions along the length of a process microchannel. The width and/or height of the process microchannel within the one or more regions may vary along the length of the process microchannel.

The term "quench" refers to a process by which a chemical reaction is terminated using a rapid reduction in temperature of the reaction mixture, a rapid introduction of a reactant or non-reactant fluid into the reaction mixture, or flowing the reaction mixture through a restricted opening or passageway having a dimension at or below the quench diameter.

The term "quench diameter" refers to the internal dimension (e.g., height, width, diameter) of an opening or passageway for a reaction mixture to flow through below which the reaction terminates.

The term "Taylor flow" refers to a flow regime for two-phase, vapor-liquid flow. Taylor flow typically occurs when a wall of a flow path is wetted, and there is one or more bubbles moving along the flow path. Trains of these bubbles separated by a liquid phase may occur. Taylor flow is described in Ghiaasiaan, "Two-Phase Flow, Boiling and Condensation in Conventional and Miniature System," Cambridge University Press, 2007, ISBN 0521882761, 9780521882767. This publication is incorporated herein by reference.

The term "mm" may refer to millimeter. The term "nm" may refer to nanometer. The term "ms" may refer to millisecond. The term "µs" may refer to microsecond. The term "µm" may refer to micron or micrometer. The terms "micron" and "micrometer" have the same meaning and may be used interchangeably. The term m/s may refer to meters per second. Unless otherwise indicated, all pressures are expressed in terms of absolute pressure.

The hydrocracking reaction requires the reaction between hydrogen and one or more hydrocarbon reactants. The hydrocarbon reactants may comprise long chain hydrocarbons. The long chain hydrocarbons may comprise a Fischer-Tropsch (FT) synthesis product. A desired diesel fraction may be increased by cracking a $C_{23}+$ fraction to mid range carbon numbers of $C_{12}$ to $C_{22}$. A wax fraction produced from FT may be fed with excess hydrogen for a triple phase reaction. Under reaction conditions at elevated temperatures and pressures, a fraction of the liquid feed may convert to a gas phase, while the remaining liquid fraction may flow slowly along the catalyst. In conventional hydrocracking systems, a liquid stream forms.

The inventive hydrocracking process may employ the use of a homogenous feed of oil and hydrogen mixed with the oil to optimize particle size and mixing prior to introduction of the feed into the reactor. A homogenizer may be used to provide desired pressure and flow. A spray nozzle may be used to provide desired size distribution and mixing prior to introduction into the reactor.

Hydrocracking and hydrotreating are fundamental to hydrocarbon processing across the chemical industry. Applications may include converting a hydrocarbon feed to directly usable forms of jet and diesel fuels.

Using an FT product as the feed, the use of a microchannel reactor may provide for pushing the processing envelope to allow flow rates from about 2 to about 500 times greater than in standard hydrocracking operations using a non-microchannel or conventional reactor. A conventional hydrocracking catalyst may be used. Examples of conventional hydrocracking catalysts may include those with a support which may comprise an amorphous material (such as alumina, silica alumina, titania, zirconia, or a combination), a zeolite, a layered clay, a pillared clay, or another material with acid sites, or a combination of two or more of the foregoing materials. The support may be further impregnated with a metal species which enhances hydrogenation. The metal species may comprise platinum, palladium, nickel, molybdenum, tungsten, or a combination of two or more of the foregoing metals.

The use of microchannels for a hydrocracking reaction, as well as other gas-liquid-solid reactions, including FT synthesis reactions, hydrotreating reactions, and the like, enables unique advantages on a number of fronts. These may include kinetics, pressure drop, heat transfer, and mass transfer.

Conventional hydroprocessing reactions (e.g., hydrocracking reactions and hydrotreating reactions) as well as other multiphase reactions may be constrained by heat removal and require catalysts of sufficient but not high activity. Microchannels may allow for higher activity catalysts than may be typically useful with conventional reactors. For example, the heat of reaction may be removed more effectively with a microchannel reactor than with a conventional reactor by using heat exchange channels interspersed with process microchannels in the microchannel reactor. In one embodiment, a microchannel processing unit may be used as a polishing unit downstream of a conventional hydroprocessing unit in order to add additional hydrocracking or hydrotreating to the product produced by the conventional hydroprocessing unit.

Although the microchannel dimension of height or width may be smaller than the diameter of a conventional reactor, pressure drop may be dominated by flow through the catalyst bed, which may comprise a packed bed, porous media, or other catalyst forms. The catalyst may take the form of a foam, wad, a structure that is either regular or irregular, as well as pellets, beads, or particles. Flow lengths may range from about 0.1 to 2 meters for a microchannel reactor versus conventional reactors on the order of about 2 to 10 meters or greater. Shorter bed lengths may allow for a reduction in catalyst particle diameter to achieve a net neutral or lower process pressure drop than with a conventional hydrocracker. In some embodiments, a higher pressure drop may be useful. Further, the inlet pressure of the liquid stream and the gaseous stream to the individual reactor or reactor assembly may not be the same, where the reactor assembly comprises two or more discrete reactors operated in parallel. A pressure drop or pressure let down before the reaction chamber may be useful to control the flow distribution of the gas and liquid. In one embodiment, the inlet pressure of the liquid may be greater than the gas. The pumping power for a liquid may be less than the compression required for a gas. In one embodiment, the gas may be at a higher inlet pressure than the liquid.

For the hydrocracking reaction, heat release control may require reactor designs with interstage cooling, liquid redistribution, and quench sections. Microchannel reactors employing process microchannels for conducting the hydrocracking reaction may employ local heat removal with coolant channels interspersed with the process microchannels. For the hydrocracking of an FT wax, the heat release may be relatively low. Other hydrocarbons, including vacuum gas oils, feed stocks containing aromatics, olefins, and/or molecules containing heteroatoms such as sulphur, nitrogen, or oxygen, may have relatively high heat release characteristics.

Microchannel reactors may be used to enable a reduction in both intraparticle and interparticle mass transfer resistance. The catalyst particle diameter used in a microchannel reactor on average may be in the range from about 0.01 to about 1.5 mm, and in one embodiment from about 0.05 to about 0.5 mm, and in one embodiment from about 0.1 to about 0.3 mm. On the other hand, a conventional hydrocracker or other conventional multiphase reactor may use a catalyst pellet with an average diameter that ranges from about 2 to about 10 mm.

The reduction in catalyst particle diameter may improve the effective use of internal catalyst sites over conventional hydrocracking reactors. The effectiveness factor for a catalyst may be a function of the Thiele modulus. For a spherical catalyst particle, the Thiele modulus is proportional to the radius divided by 3. For equal intrinsic reaction rates on the active catalyst sites, a ten-fold reduction in the catalyst diameter will result in a ten fold reduction in the Thiele modulus. The Thiele modulus is not directly proportional to effectiveness factor. For a Thiele modulus less than one a fairly high effectiveness factor may be expected. As the Thiele modulus is far greater than one, a much steeper decline in the effectiveness factor may be expected. The actual impact of particle size depends upon the intrinsic reaction rates, the diffusivity of reactants within the catalyst pellet, and the tortuosity of mass diffusion within the catalyst particle.

The reduction in interparticle mass transfer resistance may be less straightforward. The microchannel dimension and associated small catalyst particles housed therein may promote capillary forces over viscous and body forces. The net result may be a well dispersed liquid film that improves the contact of all phases with the catalyst to improve the apparent catalyst activity.

The Capillary number (Ca) defines the ratio of viscous to interfacial forces $$Ca = \frac{\mu \text{ velocity}}{\sigma}$$

where the viscosity of a liquid FT feedstock can been approximated using known high temperature and high pressure hydrocarbon data and surface tension values for the liquid Fischer-Tropsch feedstock. In this formula μ velocity refers to viscosity, and δ refers to surface tension. The viscosity of an eicosane fluid at 200 psi and 261° C. is 0.338 cP. Creating a functional dependency on temperature for this fluid results in an exponential dependency, where the viscosity is proportional to 3.53×exp(−0.0091×Temperature (in C)). For a 370° C. hydrocracking reaction mixture, the viscosity is approximated as 0.12 cP. Measurements of the surface tension of the FT feedstock on the catalyst particle are roughly one-third the surface tension of water. For a reaction system with an actual linear velocity of 0.3 m/s (which corresponds to a hydrocracking process with a LHSV of 30 hr$^{-1}$, a bed void of 0.35, and 1500:1 hydrogen to feed ratio, the estimated capillary number is about 1.5× 10$^{-3}$. For this reaction condition, the conversion of an FT wax to product with a boiling point below 350° C. may be essentially complete, or greater than 99%. In one embodiment, the conversion may be greater than 50%, or greater than 80%, per pass.

The capillary number for a multiphase reaction in a microchannel reactor may be in the range from about 10$^{-2}$ to about 10$^{-6}$.

The Bond number (Bo) defines the ratio of body forces (e.g., gravity) to interfacial forces (capillary forces). For low Bond numbers, interfacial capillary forces that spread the liquid throughout the reaction chamber may be stronger than gravitational forces that force the liquid to coalesce and drip or trickle through the reactor.

$$Bo = \frac{\rho g L^2}{\sigma},$$

where the density of the FT feedstock can be approximated by known high temperature and high pressure hydrocarbon data and surface tension values for the liquid Fischer Tropsch feedstock. In this formula, ρ refers to density, g refers to the gravitational constant, L refers to the critical length, and δ refers to surface tension. A bond number may be calculated for the microchannel, e.g. channel bond number, where the critical length is the smallest channel dimension which is typically the channel gap. A bond number may be calculated for the particle, e.g. particle bond number, where the critical length is the particle diameter. A bond number may be calculated for the microchannel length, e.g. length bond number, where the critical length is the flow length of the reactor itself. The three bond numbers may help determine whether the hydrocracker liquid may preferentially spread via capillary forces in the defined critical length or fall with gravity.

The channel bond number may be in the range from about 0.001 to about 2. The bond number may be less than about 1, and in one embodiment in the range from about 0.001 to about 0.999, and in one embodiment from about 0.01 to about 0.95, and in one embodiment from about 0.1 to about 0.9. Using the numbers from the previous example for a microchannel reaction chamber of 1.75 mm and a liquid density of 0.6 gm/cc, the Bond number is 0.75. For smaller reaction chambers, the Bond number reduces further and is 0.25 for a 1 mm reaction chamber.

The channel Bond number for a hydrocracking reaction chamber or other multiphase reaction chambers with an internal dimension below about 2 mm may be less than about 1. This suggests that the interfacial forces to disperse the liquid within the microchannel chamber may be greater than gravitational forces thus showing the propensity for the liquid to wet the walls of the microchannel rather than coalesce and flow down the channel walls with rivulets. The channel Bond number for a conventional hydrocracking reactor bed with a diameter as large as 4.5 meters may be greater than about 10, and typically greater than about 100 or greater than about 1000. This suggests that gravity dominates in flow of liquid within the reactor vessel. The conventional hydrocracker or multiphase reaction chamber faces challenges to keep the liquid well dispersed and to avoid liquid flow channeling or rivulets within the packed bed.

The particulate Bond number for a catalyst particle placed within a microchannel may be many orders of magnitude below about 1, suggesting the capillary force may be sufficient to overcome those forces exerted by gravity and thus the liquid may well wet the particles rather than coalesce and trickle around the particles in poorly dispersed streams. For a conventional hydrocracking reactor pellet diameter, the particle Bond number may exceed 1 because the catalyst particle exceeds 2 mm and is typically in the range of 3 to 50 mm. For the hydrocracking reaction fluid properties, the particle Bond number may approach 1 for a pellet diameter of about 2 mm. The flow of liquid in a conventional hydrocracking reactor or other multiphase reactor may be dominated by gravity and viscous forces rather than the capillary forces which may act to spread the liquid laterally throughout the bed. Experiments have been conducted with a 1.5 mm particle and a 3 mm particle, where an FT liquid oil flows in a downflow orientation with a co-flow of nitrogen gas under ambient conditions. The experiment with the 3 mm particle forms uneven flow and rivulets where the liquid does not full wet the particle. In comparison, the experiment with the 1.5 mm particle demonstrates a well wet liquid and stable flow. There are no rivulets observed for liquid flow past the 1.5 mm particles where the particle bond number is less than about 1.

In an alternate embodiment with the use of a structured catalyst which is made of any contiguous porous material unlike a discontinuous particle bed which is comprised of discrete particles touching each other but not otherwise joined or fused, the critical length is defined by the minimum dimension of the porous structure. As an example, if a porous felt, foam, wad, regular structure, or graded structure with internal porosity has a thickness of 1 mm and a length and width greater than 1 mm, then the particle bond number would be calculated to be roughly 0.5 for the test conditions of a flowing oil at 370° C. The use of a particle bond number includes the extension to a porous structure with a small critical dimension such that the particle bond number is less than about one.

Laboratory test reactors for conventional hydrocrackers are often tested with very small particles interspersed around conventional pellets to improve the lateral flow of liquid in the reactor. While this dual sized particle solution may not be practical from a pressure drop perspective for a conventional hydrocracker, it shows the importance of internal liquid distribution on the performance of the catalyst and that the large catalyst particles selected for conventional hydrocracking reactors may retain poor wetting by the liquid.

The net result may be that the small catalyst particles in microchannels may create a fluidic environment dominated by capillary forces for the reaction. Unlike conventional hydrocrackers, where the liquid channels within the bed, liquid flow in a microchannel may remain well dispersed across the channel. A conventional reactor requires the periodic collection and redistribution of liquid within the reactor, whereas the microchannel may not. Further, a laterally well distributed liquid flow allows a gas to shear or thin the liquid film rather than segment the reactor bed into unsteady and intermittent zones of gas and liquid films.

The length bond number for a microchannel will typically exceed 1 as it does for a conventional hydroprocessing reactor. The length bond number may not be the critical parameter, where the particle and channel bond number are more important for establishing well wetted catalyst particles with stable liquid flow. An additional component to reducing mass transfer resistance for the contact of the gas, liquid, and solid catalyst may be built upon processes with a particle bond number less than about one. The stable and thin films may be further thinned by the high gas velocity.

With a laterally well dispersed liquid film within a microchannel reactor, that has sufficient capillary force to resist segmentation or flow rivulets, the film thickness may be further thinned by high gas velocity in the microchannel. The reduction in liquid film around the particle may reduce the mass transfer resistance for a gas such as hydrogen to access the catalyst particle. For the Fischer-Tropsch (FT) reaction, the mean film thickness for hydrogen containing a gas with a 0.24 m/s superficial velocity may be about 5 microns. For a hydrogen containing gas with a velocity of 0.009 m/s passing against a thin film of the FT liquid, a mean film thickness of about 20 microns may be expected. For these two cases, a four-fold reduction in liquid film thickness may correspond to a 16 fold reduction in time for the gaseous hydrogen to diffuse through the liquid film to the catalyst surface. Further, the time for the liquid reactant to diffuse within the liquid film to the catalyst on and in the catalyst particles or surface may also be reduced roughly with the square of the film thickness. Given that diffusivity of a liquid may be two to three orders of magnitude greater than the diffusion of a gas, the liquid diffusion within the liquid layer to the catalyst surface may dominate the transport resistance contribution to the overall apparent rate of reaction. In one embodiment, the surface rate of reaction on the catalyst may be rate limiting. From a control volume analysis around a catalyst pellet, a comparison of diffusion time to convection time may suggest the importance of reduced film thickness on the hydrocracking reaction rate. As the amount of time available for a gas such as hydrogen to diffuse through a thicker liquid film increases, the corresponding amount of additional gas fed to the reaction system in excess may decrease thus providing surprising results with a lower excess hydrogen required for a microchannel hydrocracker.

The diffusion time for a thin film can be derived from first principles as the square of the diffusion distance divided the diffusivity. The diffusivity for hydrogen in an FT liquid may be about $4.3 \times 10^{-4}$ cm$^2$/s. For a 20 micron film thickness, the diffusion time may be about 10 ms. For a 5 micron film thickness, the time for diffusion across the thin film surrounding a catalyst pellet may be about 0.5 ms.

The convection time in a control volume around a catalyst particle of about 110 microns diameter for a superficial gas velocity of about 0.3 m/s may be about 1 ms. For the same microchannel dimensioned particle size of a mean diameter of about 110 microns, the impact of a film thickness ranging from about 5 microns to about 20 microns imparts a capture number difference of about 2 to about 0.1. The capture number is defined as the time for convection to the time for diffusion. For the 5 micron thin film, the gas spends roughly twice the amount of time around the catalyst as it takes to diffuse to the active catalyst sites. For the 20 micron film at equal superficial gas velocity, the gas requires roughly ten times more time to diffuse to the catalyst sites (10 ms) than available as it flows around the particle (1 ms). In this latter case, there may be much more catalyst required to achieve the same level of hydrocarbon conversion. This excess catalyst may range from about 2 to about 200 times more catalyst as compared to a high velocity microchannel. The net result may be that a higher excess amount of hydrogen is required as the capture number drops below 1.

For a larger particle size, as expected in a conventional reactor (where roughly 2 mm is near the low end of diameter), the convection time in a control volume around a catalyst particle is longer. However, the flow dynamics of the lower velocity gas around this larger particle also give rise to much thicker films. For a 100 micron liquid film that is either regular or intermittent flowing or trickling down a conventional reactor, the required time for diffusion across the film is roughly about 200 milliseconds. Correspondingly, for a superficial velocity of about 0.02 m/s (or roughly 15 times lower than the high LHSV experiments demonstrated in the microchannel), the convection time in a control volume around a 2 mm particle is roughly 100 ms. The capture number may remain less than one, near one or even greater than one suggesting the importance of excess hydrogen that may remain in the liquid film to conduct the reaction in a conventional hydrocracker. The thick films found in a conventional hydrocracker may require substantially more mass transfer time for the hydrogen and liquid reactants to reach the solid catalyst particle to react.

The net impact may be less access of the hydrogen to the catalyst. A conventional hydrocracker may overcome this limitation by increasing the amount of hydrogen excess fed to the system. A microchannel reaction system offers the potential to reduce the amount of excess hydrogen.

A microchannel hydrocracking reactor may be operated with a particle bond number and/or channel bond number less than about 1. This indicates a surprisingly high hydrocracking conversion of an FT liquid may be achieved with a liquid hourly space velocity (LHSV) as high as 30 hr$^{-1}$, or as high as 100 hr$^{-1}$. In one embodiment, the LHSV may be as high as 200 hr$^{-1}$ when the catalyst activity is sufficiently high and the liquid film is sufficiently thin. The productivity of this reactor using a conventional catalyst may be from about 2 to about 200 times greater than for a conventional hydrocracker. With the conversion of the FT liquid essentially complete for this run, the productivity may be further increased.

A test run may be conducted with an inlet hydrogen to hydrocarbon volume ratio of 1500:1. The superficial gas velocity may be 0.3 m/s. Conventional hydrocrackers typically operate with an LHSV ranging from 0.1 to 2.5 hr$^{-1}$. For the conventional hydrocracker with equal hydrogen feed ratios, the relative gas velocity may be about 10 to about 60 times less than with a microchannel reactor and the corresponding increase in film thickness may give rise to a disproportionate increase in the time needed for the hydrogen to penetrate the liquid film.

Figure 36:
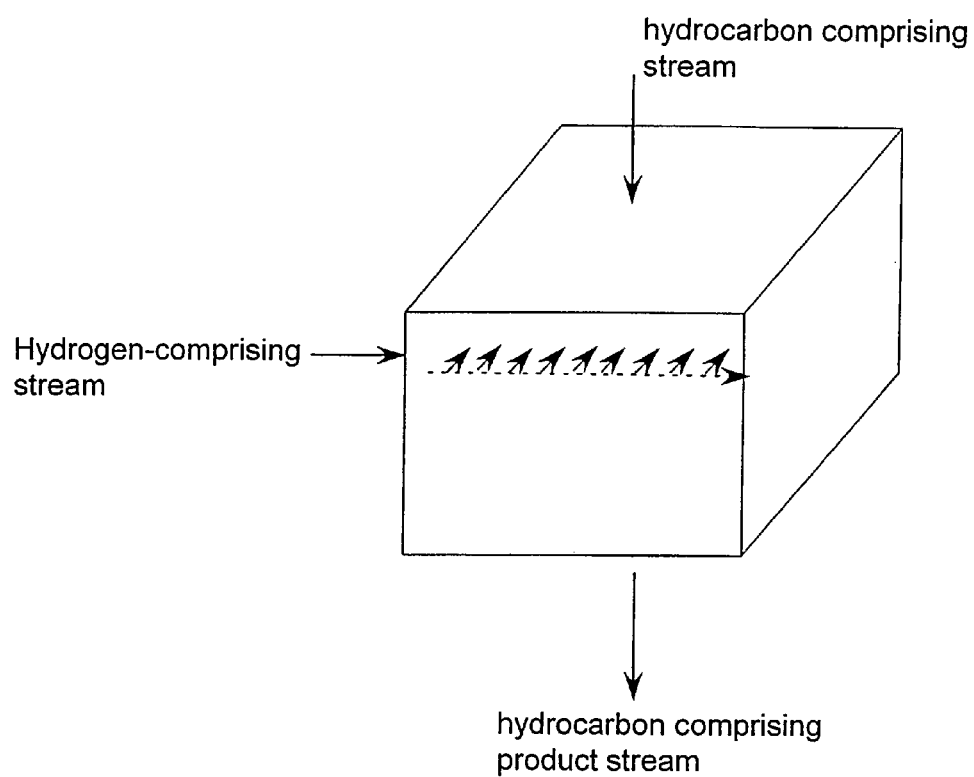
FIGS. 36 and 37 are schematic illustrations showing the mixing of hydrogen and a hydrocarbon reactant in a microchannel.
Figure 37:
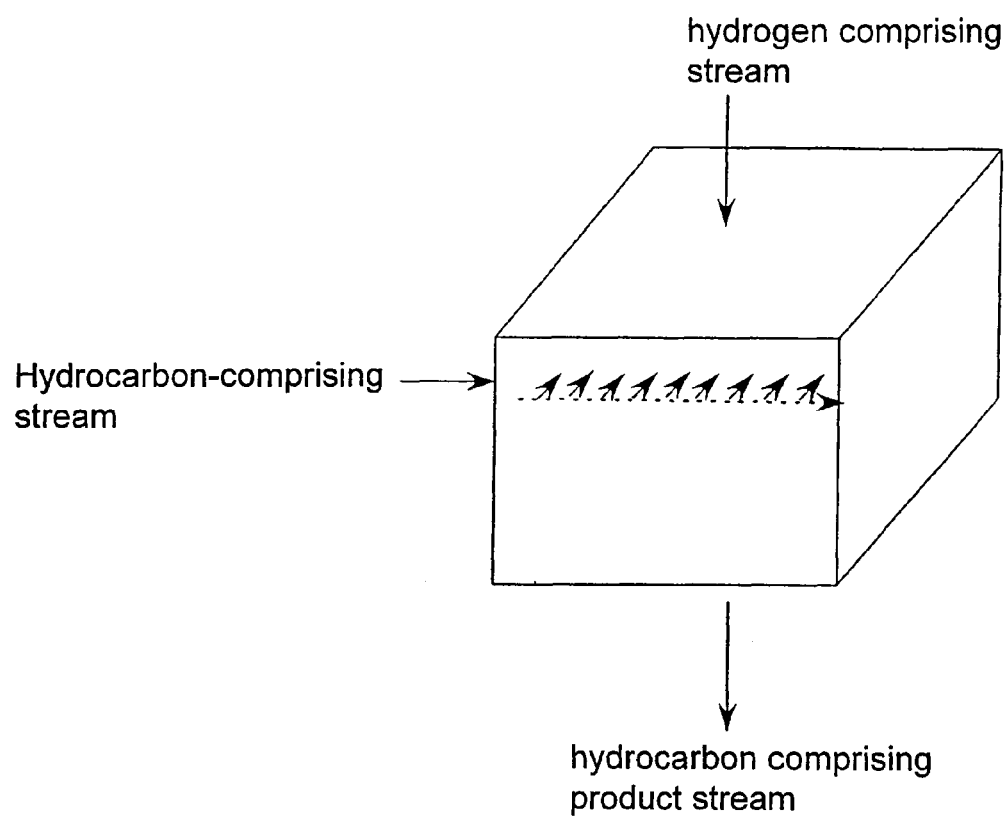

A microchannel reactor may be expected to allow a hydrocracking process to be operated with a lower excess of hydrogen at high superficial velocities. The corresponding thin liquid films may pose little additional mass transport resistance. These are shown in FIGS. 36 and 37.

The invention may be applicable to any gas-liquid reaction or mass transfer process conducted over a porous solid substrate when the particle Bond number is less than about 1 and/or the channel Bond number is less than about 1. As an example for the Fischer-Tropsch reaction, described in Example 2 below, the particle Bond number is less than about 0.2 and the channel Bond number is less than about 0.25. The small liquid fraction formed under reaction conditions may have sufficient capillary forces to full wet the small particles and laterally spread throughout the microchannel. The resulting thin layer of liquid has been shown to reduce the liquid film thickness as well. The net result is a very stable and well dispersed liquid film. The data on the FT reactor shown in Example 2 demonstrates very stable pressure drop over a long duration (660 hour test). The pressure drop of 1.40 psi represents a 1.7 times increase in pressure drop over a dry bed based on the reactant flowrates and based on the experimentally measured conversion. The pressure drop data is collected with a differential pressure drop transducer with a span of 74.0 psid and an accuracy of +/−0.055 psi and a resolution of 0.018 psi. The pressure drop is steady to within the resolution of the differential transducer. The surprising experimental results show no evidence of temporal distortions to the pressure reading and confirming the presence of a stable and thin liquid film.

Figure 38:
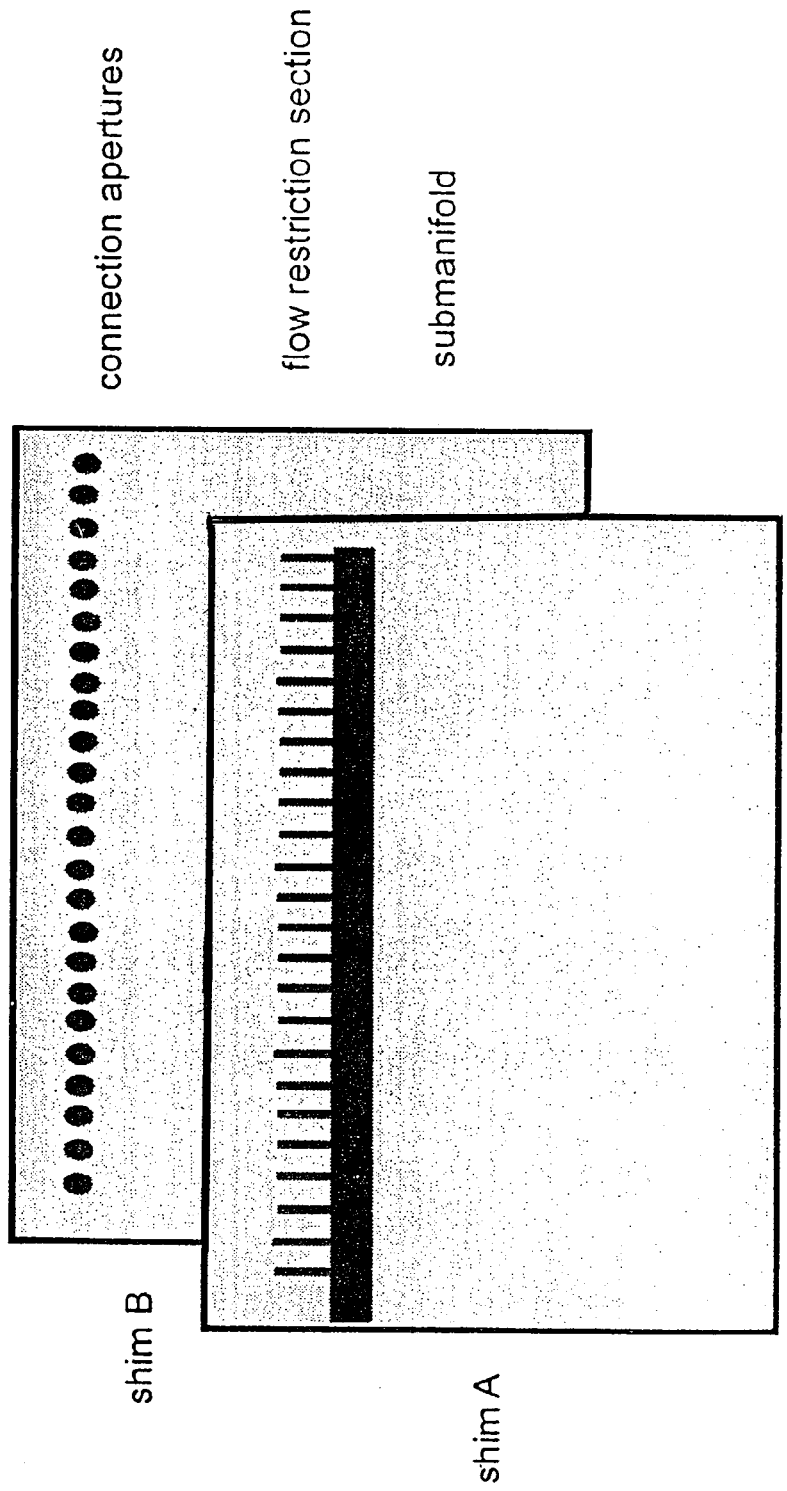
FIG. 38 is a schematic illustration showing a manifold for controlling hydrogen and hydrocarbon reactant feed ratios.

In one embodiment, a feed may be introduced into a manifold on one side of the reactor. Flow may traverse laterally across the reactor or a shim through a submanifold. From the submanifold, flow may pass through a flow restriction section, where pressure drop may be imparted to improve the uniformity of the flow in each of the mating microchannels. The flow may then pass through connection apertures to enter the reactor. The connection apertures may be positioned upstream from the catalyst, but in alternate embodiments the connection apertures may be adjacent to the catalyst. In one embodiment, the liquid may flow through the submanifold and through adjacent connection apertures. The connection apertures may be regular or irregular in shape. This is shown in FIG. 38.

The hydrocarbon reactants that may be used in the feed composition may comprise any hydrocarbon that may be hydrocracked. These may include hydrocarbons that contain one or more C—C bonds capable of being ruptured in a cracking process. The hydrocarbons that may be used in the feed composition may include saturated aliphatic compounds (e.g., alkanes), unsaturated aliphatic compounds (e.g., alkenes, alkynes), hydrocarbyl (e.g., alkyl) substituted aromatic compounds, hydrocarbylene (e.g., alkylene) substituted aromatic compounds, and the like.

The feed composition may comprise one or more hydrocarbon reactants that may vary from naptha to heavy crude oil residual fractions. The feed composition may have a 5% by volume boiling point above about 175° C., and in one embodiment above about 205° C. In one embodiment, at least about 90% by volume of the feed composition may fall within the boiling point range of about 150° C. to about 570° C., and in one embodiment from about 320° C. to about 540° C. The feed composition may comprise one or more petroleum fractions such as atmospheric and vacuum gas oils (AGO and VGO). The feed composition may comprise one or more mineral or synthetic oils, or a mixture of one or more fractions thereof. The feed composition may comprise one or more straight run gas oils, vacuum gas oils, demetallized oils, deasphalted vacuum residues, coker distillates, cat cracker distillates, shale oil, tar sand oil, coal liquids, or a mixture of two or more thereof, and the like.

The feed composition may include one or more diluent materials. Examples of such diluents may include inert compounds such as nitrogen or non-reactive hydrocarbon diluents, and the like. The diluent concentration may be in the range from zero to about 99% by weight based on the weight of the hydrocarbon reactant, and in one embodiment from zero to about 75% by weight, and in one embodiment from zero to about 50% by weight. The diluents may be used to reduce the viscosity of viscous liquid reactants. An advantage of at least one embodiment of the invention may be that when the use of such diluents is avoided, operation of the inventive process may be more efficient and compact.

The viscosity of the feed composition may be in the range from about 0.001 to about 1000 centipoise, and in one embodiment from about 0.01 to about 100 centipoise, and in one embodiment from about 0.1 to about 10 centipoise.

The ratio of hydrogen to hydrocarbon reactant in the feed composition entering the process microchannel or microchannel reactor may be in the range from about 10 to about 6000 standard cubic centimeters (sccm) of hydrogen per cubic centimeter (ccm) of hydrocarbon reactant, and in one embodiment from about 50:1 to about 4000:1 sccm/ccm, and in one embodiment from about 100:1 to about 2000:1 sccm/ccm, and in one embodiment from about 300:1 to about 1500:1 sccm/ccm. The hydrogen feed may further comprise water, methane, carbon dioxide, carbon monoxide or nitrogen.

The $H_2$ in the hydrogen feed may be derived from another process such as a steam reforming process (product stream with $H_2$/CO mole ratio of about 3), a partial oxidation process (product stream with $H_2$/CO mole ration of about 2), an autothermal reforming process (product stream with $H_2$/CO mole ratio of about 2.5), a $CO_2$ reforming process (product stream with $H_2$/CO mole ratio of about 1), a coal gasification process (product stream with $H_2$/CO mole ratio of about 1), and combinations thereof. With each of these feed streams the $H_2$ may be separated from the remaining ingredients using conventional techniques such as membranes or adsorption.

The hydrocracked product made by the inventive hydrocracking process may be a middle distillate fraction boiling in the range of about 260-700° F. (127-371° C.). The term "middle distillate" is intended to include the diesel, jet fuel and kerosene boiling range fractions. The terms "kerosene" and "jet fuel" boiling range are intended to refer to a temperature range of 260-550° F. (127-288° C.) and "diesel" boiling range is intended to refer to hydrocarbon boiling points between about 260 to about 700° F. (127-371° C.). The distillate product may be a gasoline or naphtha fraction. These are normally considered to be the $C_5$ to 400° F. (204° C.) endpoint fractions.

The hydrocarbon reactants may have an iso/normal mass fraction ratio that is less than about 0.2, and in one embodiment less than about 0.1. The product produced from the inventive process may comprise $C_5^+$ hydrocarbons with an iso/normal ratio greater than about 0.5. The product may comprise $C_{20}^+$ hydrocarbons with an iso/normal ratio that is greater than about 1. The product may comprise $C_{10}^+$ hydrocarbons with an iso/normal ratio greater than about 1 when the weight hourly space velocity (WHSV) for the flow of liquid product is less than about 20 $hr^{-1}$. The cloud point for the product may be less than about −10° C.

When the inventive hydrocracking process is used to hydrocrack a FT synthesis product and the process is pushed hard in the process microchannels using, for example, a low operating pressure or low hydrogen partial pressure, the resulting hydrocracked FT synthesis product that is formed may comprise straight chain aliphatic compounds as well as alicyclic and aromatic compounds. The formation of the alicyclic and aromatic compounds is undesirable and avoided in conventional processing due to the fact that these compounds tend to interfere with the catalyst. However, the formation of these compounds is permissible with the inventive process due to the fact that the catalyst can be regenerated periodically without causing significant production disruptions. As such, in one embodiment, the invention comprises a hydrocracked FT synthesis product comprising: at least about 95% by weight, and in one embodiment at least about 98% by weight, and in one embodiment at least about 99% by weight, of straight chain aliphatic compounds having 5 or more carbon atoms; and at least about 0.05% by weight, and in one embodiment at least about 0.1% by weight, and in one embodiment at least about 0.25% by weight of alicyclic compounds having from 5 to about 13 carbon atoms and/or at least about 0.1% by weight, and in one embodiment at least about 0.05% by weight, and in one embodiment at least about 0.2% by weight of aromatic compounds having from 6 to about 18 carbon atoms.

The reactants or process feed may further comprise a recycle stream from which the hydrocracked products, and optionally other components, have been separated out.

The reactants may comprise one or more gases at reaction conditions which react to form a liquid, e.g., Fischer-Tropsch reaction. The reactants may comprise one or more gases that form a liquid that continues to react. The reactants may comprise a liquid and gas at reaction conditions that flow concurrently through the process microchannel. The reactants may comprise one or more liquids that are fed with an inert gas to improve interfacial contact over a solid porous medium to enhance the reaction rate.

The local conditions in the microchannel reactor may be controlled via tailoring temperature and/or composition profiles via one or more of the following: heat exchange with heat exchange channels adjacent to or in thermal contact with the one or more process microchannels in the microchannel reactor; heat exchange with multiple combinations of heat exchange channels strategically placed to correspond to individual reaction sections within the process microchannels; addition of one or more reactants and/or diluents using staged addition along the axial length of the process microchannels. An isothermal reactor profile may be employed. With such a thermal profile, a partial boiling heat exchange fluid may be used. A tailored temperature profile along the length of the process microchannels may be used. Heat may be removed with a single phase fluid, such as a hot oil, steam, a gas or the like. The heat exchange fluid may flow in a direction that is co-current, counter-current or cross-current to the flow of the process fluids in the process microchannels. The heat exchange fluid may be used to remove exothermic reaction heat from the process microchannels, and to preheat the reactants entering the process microchannels. The reactants may be preheated to substantially the reaction conditions or they may be partially preheated from the inlet temperature of the feed to an intermediate temperature between the average reaction temperature and the inlet temperature. In one embodiment, the hydrocarbon reactant may enter the reactor at a temperature below the reaction temperature to minimize coking and then be heated to the reaction temperature in the reactor. In one embodiment, the hydrocarbon reactant entering the microchannel reactor may be at a temperature that is about 10° C., or about 50° C., or about 100° C., or more, less than the reaction temperature. In one embodiment, the hydrocarbon reactant entering the microchannel reactor may be at a temperature that is between 200° C. and 250° C., and the reaction temperature may be between about 300° C. and 400° C. In one embodiment, the reactor may be operated in a non-isothermal mode where the reaction temperature at the top of the reaction channel is less than or greater than the temperature at the reactor outlet by 10° C., or 20° C., or 100°

C. or more. It may be desired to have a cooler front end of the process microchannel to create a desired thermal profile between the fluid manifold region and the catalytic reaction region.

In order to control the exothermic reaction via heat exchange with a heat exchange medium, for example, a heat exchange fluid, the process may employ a heat flux at or near the entrance to the microchannel reactor that is higher than the heat flux near the outlet of the microchannel reactor.

Figure 2:
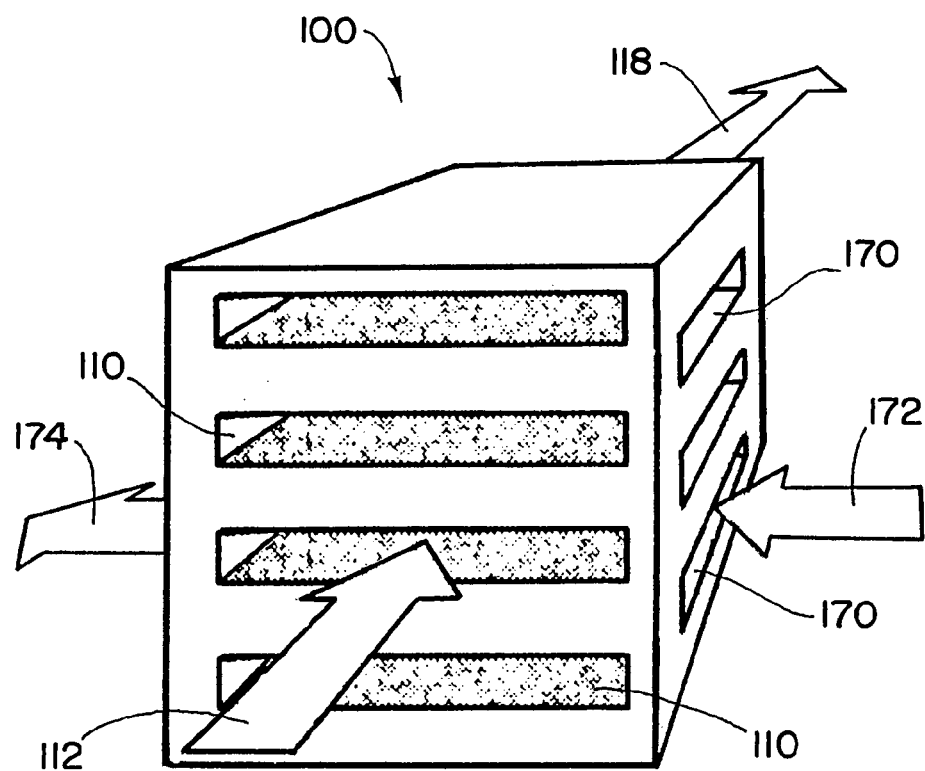
FIG. 2 is a schematic illustration of a microchannel reactor that may be used to conduct the inventive process. This microchannel reactor comprises a plurality of process microchannels and heat exchange channels stacked one above another. Reactants and product flow in the process microchannels and heat exchange fluid flows in the heat exchange channels. The reactants and products flow in a direction that is cross-current to the flow of the heat exchange fluid.

The microchannel reactor may be constructed as illustrated in FIG. 2. Referring to FIG. 2, microchannel reactor 100 comprises a plurality of process microchannels 110 and heat exchange channels 170 stacked one above the other. The microchannel reactor 100 may be in the form of a cubic block. The cubic block may have a length in the range from about 10 to about 1000 cm, and in one embodiment in the range from about 20 to about 200 cm. The cubic block may have a width in the range from about 10 to about 1000 cm, and in one embodiment in the range from about 20 to about 200 cm. The cubic block may have a height in the range from about 10 to about 1000 cm, and in one embodiment in the range from about 20 to about 200 cm. The reactants may enter the process microchannels 110 as indicated by arrow 112. Product may flow out of the process microchannels as indicated by arrow 118. Heat exchange fluid may enter the heat exchange channels 170 as indicated by arrow 172. Heat exchange fluid may flow out of the heat exchange channels 170 as indicated by arrow 174. The microchannel reactor 100 may have a feed stream header or manifold to provide for the flow of the reactants into the process microchannels 110, a product footer or manifold to provide for the flow of product out of the process microchannels 110, a heat exchange inlet manifold to provide for the flow of heat exchange fluid into the heat exchange channels 170, and a heat exchange outlet manifold to provide for the flow of heat exchange fluid out of the heat exchange channels 170.

The microchannel reactor 100 may contain one or more repeating units. Each repeating unit contains one or more process microchannels and one or more heat exchange channels. Examples of some of the repeating units that may be used are illustrated in FIGS. 9-14 and 26-27. These are discussed below. Each of the process microchannels may contain one or more reaction zones wherein the reactants react to form the desired product. A catalyst in solid form may be present in the one or more reaction zones. The catalyst may comprise a homogeneous catalyst immobilized on a solid. Each repeating unit may contain one or more heat exchange channels. In one embodiment, each process microchannel may be combined with one or more adjacent reactant stream channels to provide for the staged addition of hydrogen into the process microchannel. The process microchannel and the adjacent reactant stream channel may have a common wall with a plurality of openings in the common wall. These openings may be used to provide for the flow of one of the hydrogen reactants from the adjacent reactant stream channel into the process microchannel. The feed stream header may comprise one or more manifolds for distributing mixtures of the reactants to the process microchannels. Alternatively, the feed stream header may comprise separate manifolds for distributing the reactants separately to the process microchannels and to the adjacent reactant stream channels.

Figure 3:
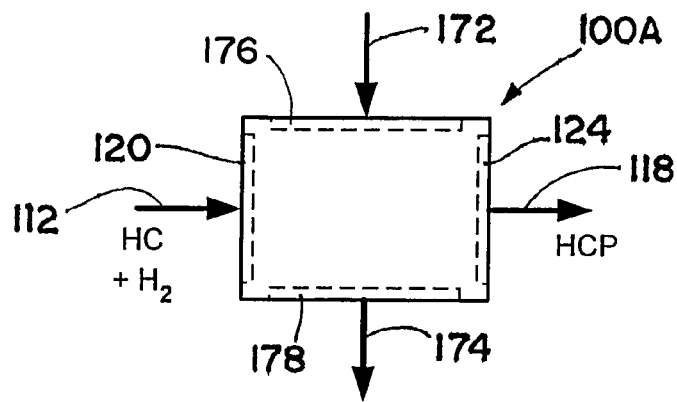
FIGS. 3 and 4 are flow sheets illustrating the inventive process for hydrocracking a hydrocarbon reactant (HC) to form one or more hydrocracked products (HCP). The process may be conducted in the microchannel reactor illustrated in FIG. 2. The reaction is exothermic. A heat exchange fluid is used to control temperature. With the process illustrated in FIG. 3, the hydrocarbon reactant (HC) and hydrogen ($H_2$) are mixed upstream of the microchannel reactor. With the process illustrated in FIG. 4, the hydrocarbon reactant (HC) and hydrogen ($H_2$) are mixed in the microchannel reactor.
Figure 4:
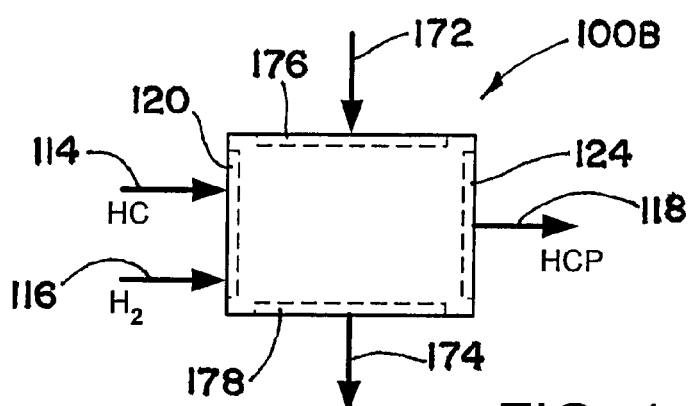

The inventive hydrocracking process may be conducted in the microchannel reactor 100A or 100B as illustrated in FIGS. 3 and 4. Referring to FIG. 3, a process feed stream or reactant composition comprising a mixture of hydrocarbon reactant (HC) and hydrogen ($H_2$) flows, as indicated by arrow 112, into feed stream header or manifold 120, and from the feed stream header or manifold 120 into the one or more process microchannels 110 in the microchannel reactor 100A. In the process microchannels 110, the reactants contact the catalyst and react to form the desired hydrocracked product (HCP). The hydrocracked product flows out of the process microchannels 110 through product footer or manifold 124. The hydrocracked product flows from the product footer or manifold 124 out of the microchannel reactor 100A, as indicated by arrow 118.

Alternatively, referring to FIG. 4, the microchannel reactor 100B may comprise one or more process microchannels and one or more adjacent reactant stream channels. Each process microchannel and adjacent reactant stream channel may have a common wall with a plurality of openings in the common wall. The hydrocarbon reactant (HC) may flow into the header 120, as indicated by arrow 114, and from the header 120 into the one or more process microchannels in the microchannel reactor 100. The hydrogen ($H_2$) may flow into the header 120, as indicated by arrow 116, and from the header 120 into the one or more reactant stream channels in the microchannel reactor 100B. The hydrogen may then flow from each reactant stream channel through the openings in the common walls between the reactant stream channels and process microchannels into the adjacent process microchannels. The hydrocarbon reactant (HC) flowing directly into the process microchannels may be referred to as a first reactant, and the $H_2$ reactant flowing into the adjacent reactant stream channels and then into the process microchannels may be referred to as a second reactant. In the process microchannels the hydrocarbon reactant and hydrogen contact each other and the catalyst and react to form the desired hydrocracked product (HCP). The product flows out of the process microchannels through product footer or manifold 124, and from product footer or manifold 124 out of the microchannel reactor 100B, as indicated by arrow 118.

Although an advantage of the inventive process is that a high converted basis yield to the desired hydrocracked product may be obtained with one pass through the microchannel reactor, in one embodiment, one or more heavy hydrocarbon reactants may be separated from the hydrocracked product using conventional or microchannel techniques and recycled back through the microchannel reactor. The heavy hydrocarbon reactants may be recycled through the microchannel reactor 100 any number of times, for example, one, two, three, four times, etc.

The reactants may be preheated prior to entering the microchannel reactor. The reactants may be preheated to the average temperature employed in the reaction zone of the one or more process microchannels used in the microchannel reactor or to a temperature that is less than the average temperature employed in the reaction zone. The hydrocracking process is exothermic. In order to control the reaction, heat may be transferred from the process microchannels to a heat exchange medium. That is, during the inventive process the process microchannels may be cooled using a heat exchange medium. The heat exchange medium may comprise a heat exchange fluid in one or more heat exchange channels. The heat exchange channels may be adjacent to and/or in thermal contact with the process microchannels. Referring to FIGS. 3 and 4, the heat exchange fluid flows into heat exchange manifold 176, as indicated by arrow 172, and from the heat exchange manifold 176 through the heat exchange channels 170 in the microchannel reactor 100A or 100B. The heat exchange fluid absorbs heat from the process microchannels, and then flows out of the heat exchange channels into and through the heat exchange manifold 178, and then from the heat exchange manifold 178 out of the microchannel reactor 100A or 100B, as indicated by arrow 174. Heat transfer between the process fluids and heat exchange fluid may be effected using convective heat transfer. In one embodiment, heat transfer may be enhanced using a heat exchange fluid wherein the heat exchange fluid undergoes an endothermic reaction and/or a full or partial phase change (e.g., partial boiling). Multiple heat exchange zones may be employed along the length of the process microchannels 110 to provide for different temperatures at different locations along the axial lengths of the process microchannels. Also, at the end of the reaction the product may be quenched in order to reduce or eliminate the formation of undesired by-products. Quenching may be effected in the microchannel reactor 100A or 100B or downstream of the microchannel reactor.

Figure 5:
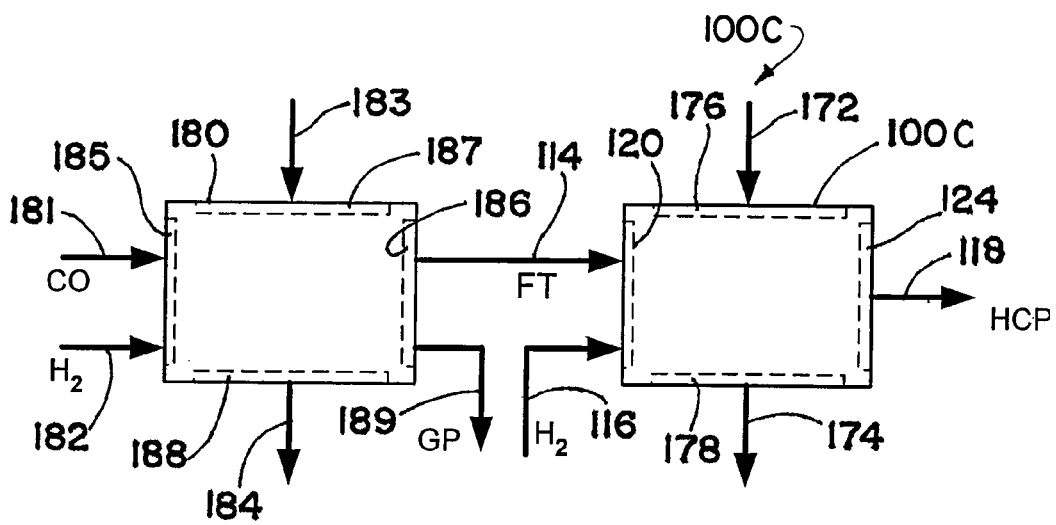
FIG. 5 is a flow sheet for a process that is similar to the process illustrated in FIG. 4 with the exception that the hydrocarbon reactant (HC) is a Fischer-Tropsch (FT) synthesis product which is formed upstream of the microchannel reactor. The hydrocracking process is conducted in a hydrocracking microchannel reactor. The Fischer-Tropsch synthesis product may be formed in a conventional reactor or in a microchannel reactor.

The hydrocarbon reactant (HC) may comprise a Fischer-Tropsch (FT) synthesis product which may be formed using an FT synthesis process. The FT synthesis product may be formed in a reactor positioned upstream of the microchannel reactor used for hydrocracking. This is illustrated in FIG. 5. Referring to FIG. 5, an FT synthesis product is formed in reactor 180 upstream of the hydrocracking microchannel reactor 100C. The reactor 100C may be the same as the reactor 100B. The reactor 180 may be a conventional reactor or it may be a microchannel reactor. CO and $H_2$ enter the reactor 180, as indicated by arrows 181 and 182, and undergo reaction in the reactor 180 to form the FT synthesis product. The FT synthesis product (FT) flows out of the reactor 180 as indicated by arrow 114. Gaseous and/or light hydrocarbon products (GP) may be separated from the FT synthesis product as indicated by arrow 189. Water produced in the Fischer-Tropsch process may also be separated from the FT synthesis product prior to flowing the liquid hydrocarbon portion of the FT synthesis product to the downstream hydroprocessing unit. The FT synthesis product flows into microchannel reactor 100C where it is converted to a hydrocracked product (HCP) as discussed above. The FT synthesis process is exothermic. The reaction is cooled using a heat exchange fluid which flows through the reactor 180 as indicated by arrows 183 and 184. The reactor 180 may comprise a microchannel reactor similar to the microchannel reactor 100 illustrated in FIG. 2. This microchannel reactor may comprise a plurality of process microchannels and heat exchange channels stacked one above the other. The microchannel reactor 180 may have a feed stream header or manifold 185 to provide for the flow of the reactants into the process microchannels, a product footer or manifold 186 to provide for the flow of product out of the process microchannels, a heat exchange inlet manifold 187 to provide for the flow of heat exchange fluid into the heat exchange channels, and a heat exchange outlet manifold 188 to provide for the flow of heat exchange fluid out of the heat exchange channels.

Figure 6:
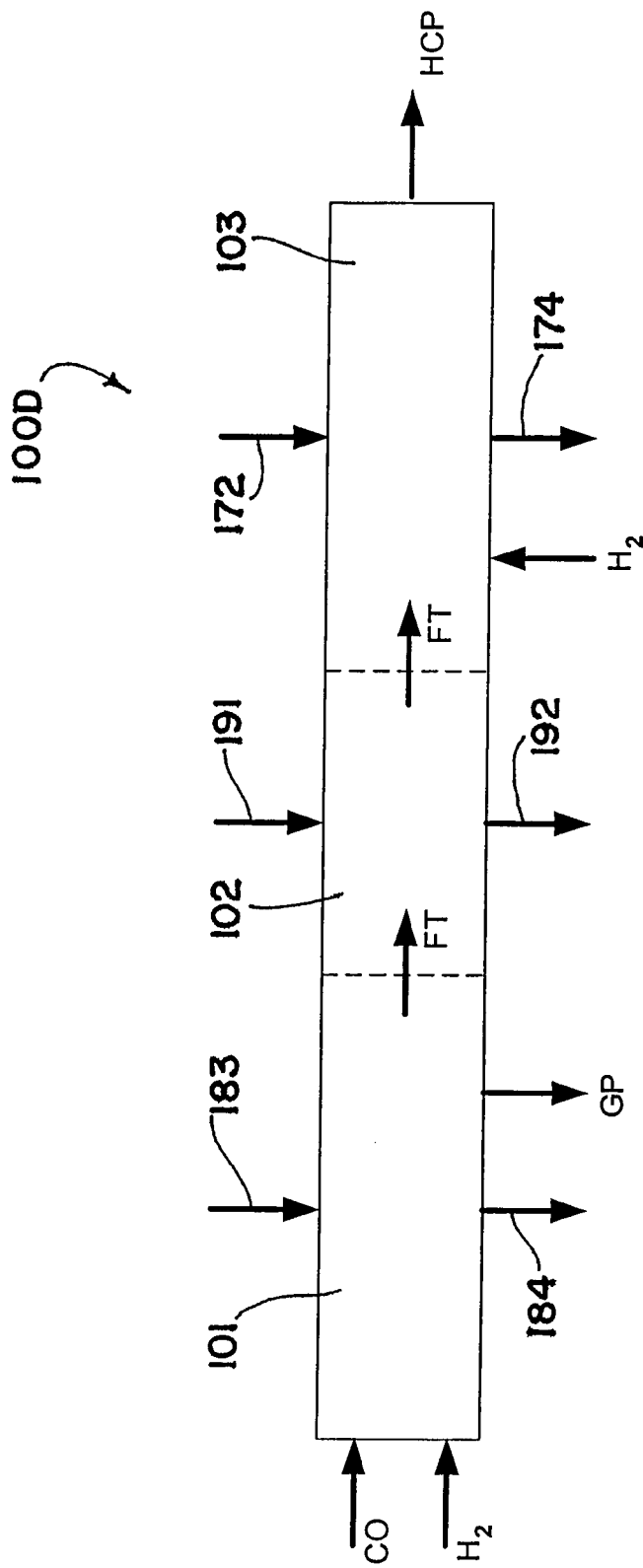
FIG. 6 is a flow sheet of a process that is similar to the process illustrated in FIG. 5 with the exception that the Fischer-Tropsch synthesis process and the hydrocracking process are conducted in the same microchannel reactor.

In one embodiment, a first portion of a process microchannel or a microchannel reactor may be used to form an FT synthesis product. This may be followed by heat exchange in a second portion of the process microchannel or microchannel reactor to adjust the temperature of the FT synthesis product to a temperature suitable for entering a third portion of the process microchannel or microchannel reactor for conducting a hydrocracking process. The FT synthesis product is then hydrocracked in the third portion of the process microchannel or microchannel reactor. This is illustrated in FIG. 6. The process shown in FIG. 6 is similar to the process illustrated in FIG. 5 with the exception that both the FT synthesis process and the hydrocracking process are conducted in microchannel reactor 100D. Microchannel reactor 100D is similar to the microchannel reactor 100 illustrated in FIG. 2. Microchannel reactor 100D includes an FT synthesis product forming section 101, an intermediate heat exchange section 102 and a hydrocracking section 103. This microchannel reactor may comprise a plurality of process microchannels and heat exchange channels stacked one above the other. The microchannel reactor 100D may have a feed stream header or manifold to provide for the flow of the reactants into the process microchannels, and a product footer or manifold to provide for the flow of product out of the process microchannels. The process microchannels contain an FT synthesis catalyst and a hydrocracking catalyst, the FT synthesis catalyst being positioned upstream of the hydrocracking catalyst. CO and $H_2$ contact the FT synthesis catalyst and react to form an FT synthesis product in the FT synthesis section 101. Light hydrocarbons and/or gaseous products (GP) may be separated from the FT synthesis product. The temperature of the FT synthesis product may be adjusted in the heat exchange section 102. The FT synthesis product and hydrogen may then flow in the hydrocracking section 103 and contact the hydrocracking catalyst and react to form the hydrocracked product (HCP). A heat exchange fluid is used to control temperature. The FT synthesis section 101 is cooled using a heat exchange fluid as indicated by arrows 183 and 184. The temperature of the FT synthesis product (FT) is adjusted in the intermediate heat exchange section 102 as indicated by arrows 191 and 192. The hydrocracking section 103 is cooled using a heat exchange fluid as indicated by arrows 172 and 174.

Figure 6A:
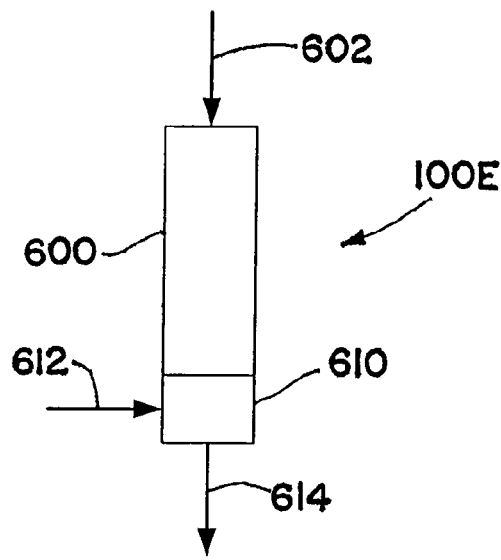
FIGS. 6A-6C are flow sheets showing additional embodiments of a process wherein a Fischer-Tropsch synthesis product is formed and then is hydrocracked in a microchannel reactor.
Figure 6B:
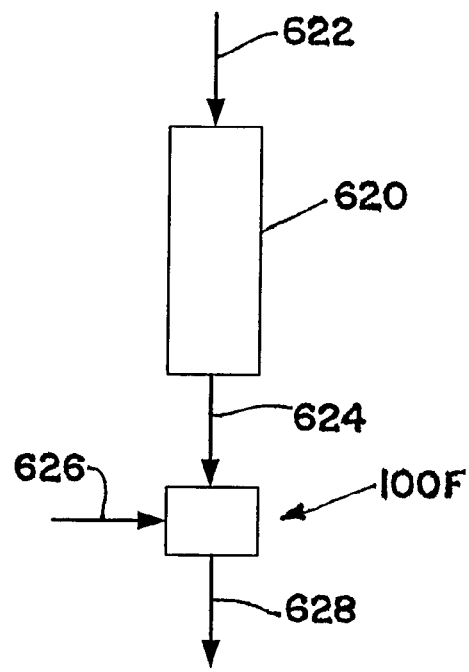
Figure 6C:
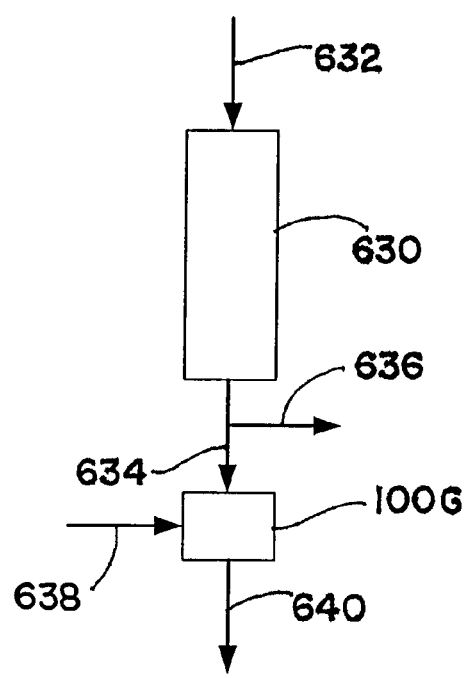

Additional embodiments employing a FT synthesis product as the hydrocarbon reactant for processing in a microchannel reactor used for hydrocracking are illustrated in FIGS. 6A, 6B and 6C. Referring to FIG. 6A, microchannel reactor 100E contains an FT synthesis product forming section 600 and a hydrocracking section 610. Both the FT synthesis product forming section 600 and the hydrocracking section 610 may comprise a plurality of process microchannels and a plurality of heat exchange channels. The heat exchange channels may be interspersed with or in thermal contact with the process microchannels. CO and $H_2$ flow into the FT synthesis product forming section 600 as indicated by arrow 602, react in the presence of a FT catalyst and form a FT synthesis product. The FT synthesis product flows into the hydrocracking section 610. Excess $H_2$ flows into the hydrocracking section 610 as indicated by arrow 612 and reacts with the FT synthesis product in the presence of a hydrocracking catalyst to form a hydrocracked FT synthesis product. The hydrocracked product flows out of the microchannel reactor 100E as indicated by arrow 614. In this embodiment, the whole FT product flows from the FT synthesis product forming section 600 into the hydrocracking section 610. The catalysts used in the FT synthesis product forming section 600 and the hydrocracking section 610 may be in the form of an integrated and sequential FT-hydrocracking catalyst bed wherein each bed may be in the form of particulate solids. Alternatively, the catalysts may be in the form of monoliths, for example, foams, felts, wads, fins, and the like. The FT synthesis reaction and the hydrocracking reaction are exothermic. These reactions may be cooled using the heat exchange channels.

The flow sheet shown in FIG. 6B is for a process similar to the process illustrated in FIG. 6A with the exception that the Fischer-Tropsch synthesis product is formed in a separate reactor 620 upstream of the hydrocracking microchannel reactor 100F. Referring to FIG. 6B, CO and $H_2$ flow into the FT synthesis product forming reactor 620 as indicated by arrow 622, react in the presence of a FT catalyst and form an FT synthesis product. The FT synthesis product flows out of the FT synthesis reactor 620, as indicated by arrow 624, and into the hydrocracking reactor 100F. Excess $H_2$ flows into the hydrocracking reactor 100F as indicated by arrow 626 and reacts with the FT synthesis product in the presence of a hydrocracking catalyst to form a hydrocracked product. The hydrocracked product flows out of the hydrocracking reactor 100F as indicated by arrow 628. The reactor 620 may comprise a conventional non-microchannel reactor or a microchannel reactor. The reactor 620 and the reactor 100F may be similar in design and construction.

The process illustrated in FIG. 6C is similar to the process illustrated in FIG. 6B with the exception that the process illustrated in FIG. 6C allows for removal of lighter hydrocarbons from the FT product resulting in the processing of a heavier FT synthesis product, which may be in the form of a wax, in the hydrocracking microchannel reactor 100G. Referring to FIG. 6C, CO and $H_2$ flow into the FT synthesis product forming reactor 630 as indicated by arrow 632, react in the presence of a FT catalyst and form a FT synthesis product. The FT synthesis product flows out of the FT synthesis product forming reactor 630, as indicated by arrow 634, and into the hydrocracking microchannel reactor 100G. Prior to entering the hydrocracking reactor 100G, light hydrocarbons such as hydrocarbon oils are separated from the FT synthesis product as indicated by arrow 636. The light hydrocarbons may be separated from the FT synthesis product using conventional techniques such as temperature controlled knockout drums. The light hydrocarbons may be separated using microchannel processing. The FT synthesis product, which is in the form of a heavier hydrocarbon, such as a FT wax, then flows into the hydrocracking microchannel reactor 100G. Excess $H_2$ flows into the hydrocracking reactor 100G as indicated by arrow 638 and reacts with the heavier hydrocarbons in the presence of a hydrocracking catalyst to form a hydrocracked product. The hydrocracked product flows out of the microchannel reactor 100G as indicated by arrow 640.

The FT synthesis catalyst used in the processes illustrated in FIGS. 6A, 6B and 6C may be in the form of beds of particulate solids. Similarly, the hydrocracking catalyst employed in the processes illustrated in FIGS. 6A, 6B and 6C may be in the form of beds of particulate solids. Alternatively, the FT synthesis catalyst and/or the hydrocracking catalyst employed in the hydrocracking reactors illustrated in FIGS. 6A, 6B and 6C may be in the form of monoliths, for example, foams, felts, wads, fins, and the like. Also, thermostatic controls for the individual catalyst beds or monoliths employed in the processes illustrated in FIGS. 6A, 6B and 6C may be integrated or operated separately.

With each of the processes illustrated in FIGS. 6A, 6B and 6C, the intermixing of the gaseous and liquid phases and the FT synthesis and hydrocracking reactions may be enhanced using catalyst beds employing relatively small particulate solids, for example, particulate solids with average diameters in the range from about 0.01 to about 1.5 mm, and in one embodiment from about 0.05 to about 0.5 mm, and in one embodiment from about 0.1 to about 0.3 mm.

The reactants for the FT synthesis process may comprise a mixture of $H_2$ and CO. This mixture may be referred to as synthesis gas or syngas. The molar ratio of $H_2$ to CO may range from about 0.8 to about 10, and in one embodiment about 0.8 to about 5, and in one embodiment about 1 to about 3. The reactant composition may also contain $CO_2$ and/or $H_2O$, as well as light hydrocarbons of 1 to about 4 carbon atoms. The reactant composition for the FT synthesis process may comprise a process stream from another process such as a steam reforming process (product stream with $H_2$/CO mole ratio of about 3), a partial oxidation process (product stream with $H_2$/CO mole ration of about 2), an autothermal reforming process (product stream with $H_2$/CO mole ratio of about 2.5), a $CO_2$ reforming process (product stream with $H_2$/CO mole ratio of about 1), a coal gasification process (product stream with $H_2$/CO mole ratio of about 1), and combinations thereof.

The FT catalyst may comprise any Fischer-Tropsch catalyst. When the FT synthesis process is conducted in a microchannel reactor, the catalyst may be in any of the forms discussed below that may be used for the hydrocracking process. The catalyst may comprise at least one catalytically active metal or oxide thereof. In one embodiment, the catalyst further comprises a catalyst support. In one embodiment, the catalyst further comprises at least one promoter. The catalytically active metal may comprise Co, Fe, Ni, Ru, Re, Os, or a combination of two or more thereof. The support material may comprise alumina, zirconia, silica, aluminum fluoride, fluorided alumina, bentonite, ceria, zinc oxide, silica-alumina, silicon carbide, a molecular sieve, or a combination of two or more thereof. The support material may comprise a refractory oxide. The promoter may comprise a Group IA, IIA, IIIB or IVB metal or oxide thereof, a lanthanide metal or metal oxide, or an actinide metal or metal oxide. The FT catalyst may comprise Co supported by alumina; the loading of Co being at least about 25% by weight, and in one embodiment at least about 28% by weight, and in one embodiment at least about 30% by weight, and in one embodiment at least about 32% by weight; and the Co dispersion is at least about 3%, and in one embodiment at least about 5%, and in one embodiment at least about 7%.

The contact time of the FT reactants with the catalyst may range up to about 5000 milliseconds (ms), and in one embodiment from about 10 ms to about 1000 ms, and in one embodiment about 20 ms to about 500 ms. The space velocity (or gas hourly space velocity (GHSV)) for the flow of the FT reactants and product through the FT reactor may be at least about 1000 $hr^{-1}$ (normal liters of feed/hour/liter of volume within the process microchannels), and in one embodiment from about 1000 to about 1,000,000 $hr^{-1}$. The temperature of the reactants and product in the FT reactor may range from about 200° C. to about 300° C., and in one embodiment from about 220° C. to about 270° C. The pressure within the FT reactor may be at least about 5 bars, and in one embodiment at least about 10 bars.

The FT synthesis product may comprise a gaseous product fraction and a liquid product fraction. The gaseous product fraction may include hydrocarbons boiling below about 350° C. at atmospheric pressure (e.g., tail gases through middle distillates). The liquid product fraction (the condensate fraction) may include hydrocarbons boiling above about 350° C. (e.g., vacuum gas oil through heavy paraffins). The product fraction boiling below about 350° C. may be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may be separated into a wax fraction boiling in the range of about 350° C. to about 650° C. after removing one or more fractions boiling above about 650° C. The wax fraction may contain linear paraffins of about 20 to about 50 carbon atoms with relatively small amounts of higher boiling branched paraffins. The separation may be effected using fractional distillation. The FT synthesis product may include methane, wax and other heavy or high molecular weight products. The FT synthesis product may include olefins such as ethylene, normal and isoparaffins, as well as alcohols and combinations of two or more thereof. These may include hydrocarbons in the distillate fuel ranges, including the jet or diesel fuel ranges.

The FT synthesis process may be conducted in a microchannel reactor as disclosed in US 2006/0251552 A1, US 2007/0004810 A1, and U.S. Pat. No. 7,084,180 B2, which are incorporated herein by reference.

The microchannel reactor 100 may be used in combination with one or more storage vessels, pumps, compressors, valves, microprocessors, flow control devices, and the like, which are not shown in the drawings, but would be apparent to those skilled in the art.

The microchannel reactor 100 (or reactors 100A-100D) may contain a plurality of repeating units, each of which may include one or more process microchannels and one or more heat exchange channels. When staged addition is used with the inventive process, the repeating units may contain one or more reactant stream channels positioned adjacent to each process microchannel. The repeating units that may be used include repeating units 200, 200A, 200B, 200C, 200D, 200E, 200F and 200G illustrated in FIGS. 9-14 and 26-27, respectively. The microchannel reactor 100 may comprise from 1 to about 1000 of the repeating units 200, 200A, 200B, 200C, 200D, 200E, 200F or 200G, and in one embodiment from about 10 to about 500 of such repeating units. The catalyst used in the repeating units 200, 200A, 200B, 200C, 200D, 200E, 200F or 200G may be in any form, including the various catalyst structured forms described below. In the following discussion relating to the repeating units that may be used in the microchannel reactor, it is assumed that the reaction process conducted is a hydrocracking process. However, it is to be understood that a Fischer-Tropsch synthesis process or a hydrotreating process could be conducted in the microchannel reactor.

Repeating unit 200 is illustrated in FIG. 9. Referring to FIG. 9, process microchannel 210 is positioned adjacent to heat exchange channel 230. The heat exchange channel 230 may be a microchannel. A common wall 232 separates the process microchannel 210 and the heat exchange channel 230. The common wall 232 may be referred to as a heat transfer wall. The process microchannel 210 includes reaction zone 212. A catalyst (not shown in the drawing) is positioned in the reaction zone 212. The reactants or reactant composition (i.e., hydrocarbon reactant and hydrogen) flow into the reaction zone 212, as indicated by arrow 214, contact the catalyst in reaction zone 212, and react to form the desired product. The product comprises a hydrocracked hydrocarbon. The product flows out of the process microchannel 210 as indicated by arrow 216. Heat exchange fluid flows in the heat exchange channel 230 in a direction that is cross-current to the flow of reactants and product in the process microchannel 210 (that is, into or out of the page, as illustrated in FIG. 9). The process conducted in the process microchannel 210 is exothermic and the heat exchange fluid provides cooling for the reaction. Alternatively, the heat exchange fluid may flow through the heat exchange channel 230 in a direction that is counter-current to the flow of reactants and product in the process microchannel 210 or co-current to the flow of the reactants and product in the process microchannel 210. The total cross sectional area of the process microchannels in a reactor may be greater than or less than the total cross sectional area of the heat exchange fluid channels in the reactor. In one embodiment, the cross-sectional area of the process microchannels in a reactor may be more than 50% greater than the total cross-sectional area of the heat exchange fluid channels in the reactor.

Repeating unit 200A is illustrated in FIG. 10. Referring to FIG. 10, process microchannel 210 is positioned adjacent to reactant stream channel 250. The process microchannel 210 includes reaction zone 212. The process microchannel 210 and reactant stream channel 250 have a common wall 252. The common wall 252 has a plurality of openings 254 that are of sufficient dimension to permit the flow of hydrogen from the reactant stream channel 250 into the process microchannel 210 as indicated by arrows 256. This hydrogen reactant may be referred to as a staged addition reactant or the second reactant. The openings 254 may be referred to as apertures. The section 258 in the common wall 252 containing the openings 254 may be referred to as an apertured section. Heat exchange channel 230 is positioned adjacent to the process microchannel 210. The heat exchange channel 230 and the process microchannel 210 have a common wall 232. The common wall 232 may be referred to as a heat transfer wall. In operation, the hydrocarbon reactant flows into the process microchannel 210 as indicated by arrow 217. The hydrogen reactant flows into the reactant stream channel 250 as indicated by arrow 218, and from the reactant stream channel 250 through the openings 254 into the process microchannel 210. In the process microchannel 210, the reactants contact the catalyst in the reaction zone 212 and react to form the desired product which comprises a hydrocracked hydrocarbon. The reaction is exothermic, and the heat exchange channel 230 provides cooling to control the temperature of the reaction. The heat exchange fluid may flow in the heat exchange channel 230 in a direction that is cross-current relative to the flow of reactants and product in the process microchannel 210. Alternatively, the heat exchange fluid may flow in a direction that is counter-current or co-current to the flow of reactants and product in the process microchannel 210.

Figure 11:
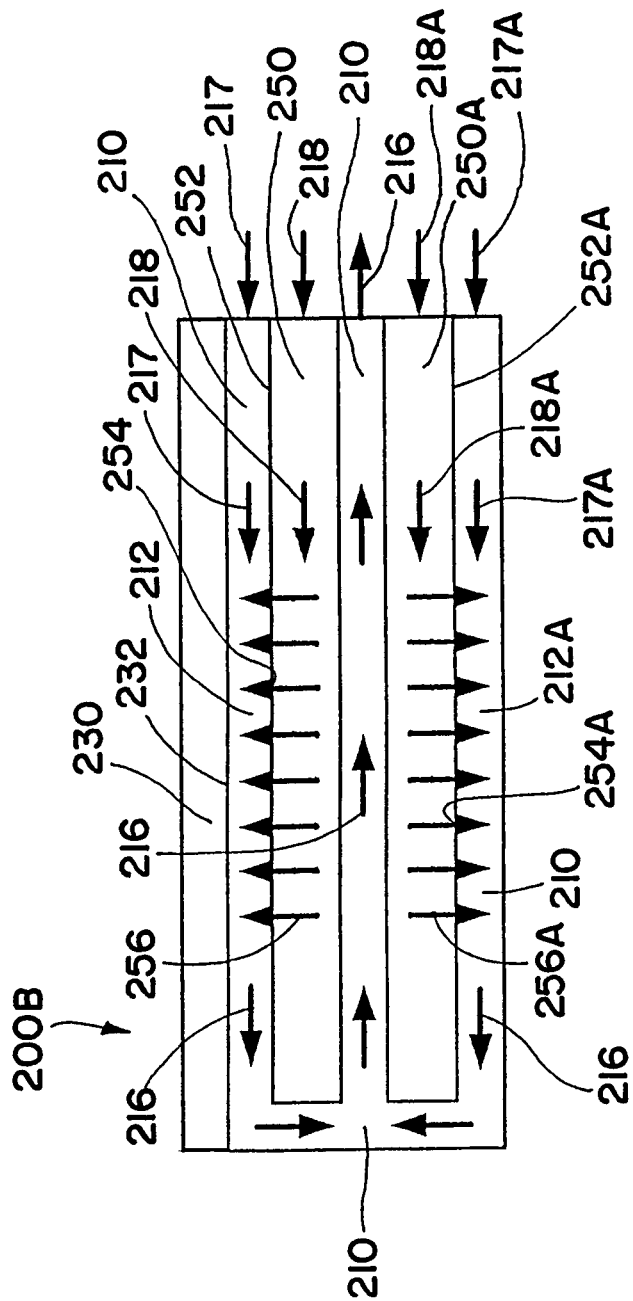

The repeating unit 200B illustrated in FIG. 11 is similar to the repeating unit 200A illustrated in FIG. 10, with the exception that the process microchannel 210 is an E-shaped microchannel which includes two reaction zones. Also, two adjacent reactant stream channels are used. With this embodiment, staged addition of the hydrogen is provided for the reaction process. The process microchannel 210 has an E-shape with entrances indicated by arrows 217 and 217A and an outlet indicated by arrow 216. The process microchannel 210 includes reaction zones 212 and 212A. Reactant stream channels 250 and 250A are positioned between the legs of the E-shaped process microchannel 210. The reactant stream channel 250 and process microchannel 210 have a common wall 252 which contains a plurality of openings 254. The reactant stream channel 250A and the process microchannel 210 have a common wall 252A which contains a plurality of openings 254A. The hydrocarbon reactant enters the process microchannel 210 as indicated by arrows 217 and 217A, and flows into the reaction zones 212 and 212A, respectively. The hydrogen enters the reactant stream channels 250 and 250A as indicated by arrows 218 and 218A, respectively. The hydrogen flows from the reactant stream channels 250 and 250A to and through openings 254 and 254A into the reaction zones 212 and 212A, contacts the hydrocarbon reactant and the catalyst, and reacts to form the hydrocracked product. The product flows out of the E-shaped process microchannel 210 as indicated by arrow

216. Heat exchange fluid flows in the heat exchange channel 230 in a direction that is cross-current relative to the flow of reactants and product in the process microchannel 210 and provides cooling for the exothermic reaction. Alternatively, the heat exchange fluid may flow in a direction that is co-current or counter-current relative to the flow of reactants and product in the reaction zones 212 and 212A.

Figure 12:
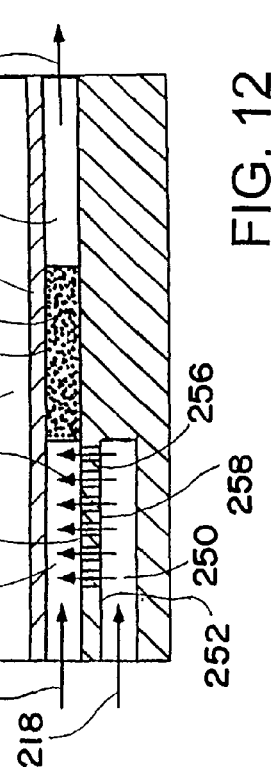

Repeating unit 200C is illustrated in FIG. 12. Referring to FIG. 12, repeating unit 200C comprises process microchannel 210, heat exchange channel 230, reactant stream channel 250, and apertured section 258. A common wall 252 separates process microchannel 210 and reactant stream channel 250. The apertured section 258, which contains openings 254, is positioned in common wall 252. The apertured section 258 extends partially along the axial length of process microchannel 210. The process microchannel 210 has a mixing zone 211, and a reaction zone 212. A catalyst 215 is positioned in the reaction zone 212. The mixing zone 211 is upstream from the reaction zone 212. The hydrocarbon reactant flows into process microchannel 210, as indicated by the arrow 217, and then into the mixing zone 211. The hydrogen flows into reactant stream channel 250, as indicated by arrow 218, and from the reactant stream channel 250 through the openings 254 into mixing zone 211, as indicated by arrows 256. The hydrocarbon reactant and the hydrogen contact each other in the mixing zone 211 and form a reactant mixture. The reactant mixture flows from the mixing zone 211 into the reaction zone 212, contacts the catalyst 215, and reacts to form the desired product which comprises a hydrocracked hydrocarbon. The product flows out of the process microchannel 210, as indicated by arrow 216. Heat exchange fluid flows in heat exchange channel 230 in a direction that is cross-current to the flow of fluid flowing in process microchannel 210. Alternatively, the heat exchange fluid may flow in a direction that is counter-current or co-current to the flow of fluid in the process microchannel 210.

In an alternate embodiment of the repeating unit 200C illustrated in FIG. 12, a supplemental mixing zone may be provided in the process microchannel 210 between the mixing zone 211 and reaction zone 212. The residence time for mixing in the supplemental mixing zone may be defined using the sum of the total of the flow through the openings 254 and the flow of the first reactant in process microchannel 210, at standard conditions of temperature (i.e., 0° C.) and pressure (i.e., atmospheric pressure), and the volume defined by the process microchannel 210 between the end of the mixing zone 211 and the beginning of the reaction zone 212. This residence time for mixing in the supplemental mixing zone may be in the range up to about 500 milliseconds (ms), and in one embodiment from about 0.25 ms to about 500 ms, and in one embodiment from about 0.25 ms to about 250 ms, and in one embodiment from about 0.25 to about 50 ms, and in one embodiment from about 0.25 to about 2.5 ms.

Figure 13:
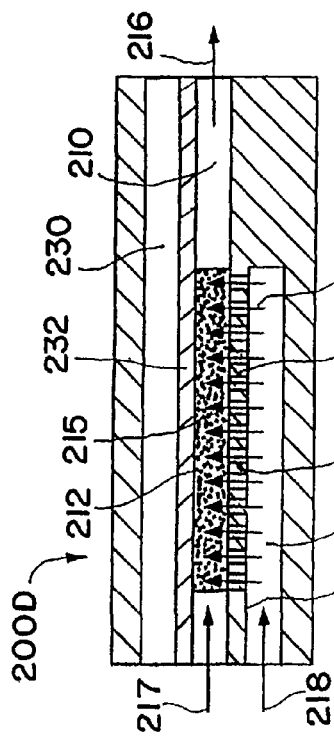

The repeating unit 200D illustrated in FIG. 13 is the same as the repeating unit 200C illustrated in FIG. 12 with the exception that the repeating unit 200D does not contain the separate mixing zone 211. With repeating unit 200D, the hydrogen flows through the openings 254 into the reaction zone 212 where it contacts the hydrocarbon reactant and the catalyst 215, and reacts to form the desired product which comprises a hydrocracked hydrocarbon. The product then flows out of the process microchannel 210, as indicated by arrow 216.

Figure 14:
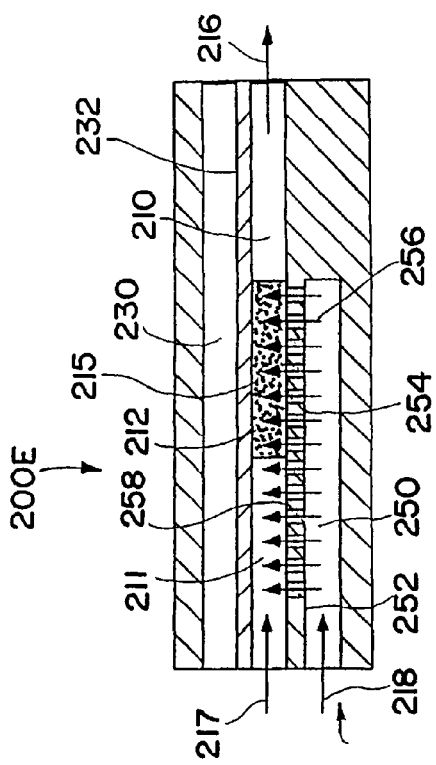

The repeating unit 200E illustrated in FIG. 14 is the same as the repeating unit 200C illustrated in FIG. 12 with the exception that part of the hydrogen mixes with the hydrocarbon reactant in the mixing zone 211, and the remainder of the hydrogen mixes with the resulting reactant mixture in the reaction zone 212. The amount of the hydrogen that mixes with the hydrocarbon reactant in the mixing zone 211 may be from about 1% to about 99% by volume of the second reactant, and in one embodiment from about 5% to about 95% by volume, and in one embodiment from about 10% to about 90% by volume, and in one embodiment from about 20% to about 80% by volume, and in one embodiment from about 30% to about 70% by volume, and in one embodiment from about 40% to about 60% by volume of the second reactant. The remainder of the hydrogen mixes with the resulting reactant mixture in the reaction zone 212.

Figure 26:
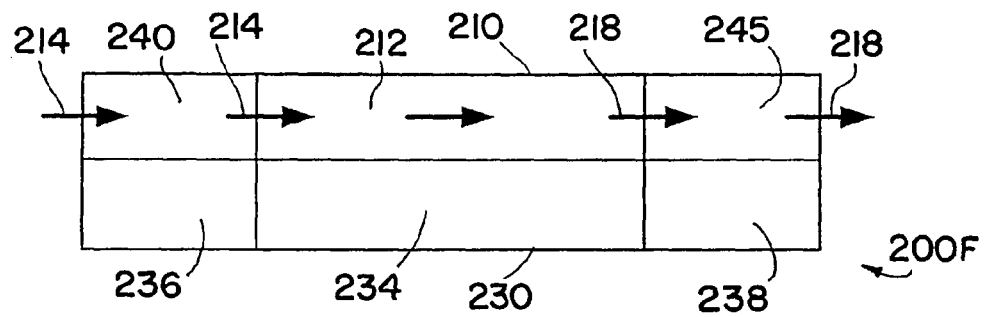
FIGS. 26 and 27 are schematic illustrations of repeating units that may be used in the microchannel reactor used with the inventive process. Each of these repeating units includes a section for preheating the reactants and a section for quenching the product.

The repeating unit 200F illustrated in FIG. 26 is the same as the repeating unit 200 in FIG. 9 with the exception that the process microchannel 210 illustrated in FIG. 26 includes a reaction zone 220, a preheating zone 240 and a quenching zone 245. The preheating zone 240 is upstream of the reaction zone 212. The quenching zone 245 is downstream of the reaction zone 212. The preheating zone 240 is heated by heating section 236. The reaction zone 212 is cooled by cooling section 234. The quenching zone 245 is cooled by cooling section 238. The heating section 236, and the cooling sections 234 and 238 may each comprise heat exchange channels with appropriate heat exchange fluids flowing in the heat exchange channels. The reactants enter the preheating section 240, as indicated by 214, and flow through the preheating section 240 where they are preheated to a desired temperature for entering the reaction zone 212. The reactants flow from the preheating section 240 into the reaction zone 212 where they undergo reaction to form the product. The product flows from the reaction zone 212 through the quenching zone 245 wherein the product is quenched. The product flows from the quenching zone 245 out of the process microchannel 210 as indicated by arrow 218.

Figure 27:
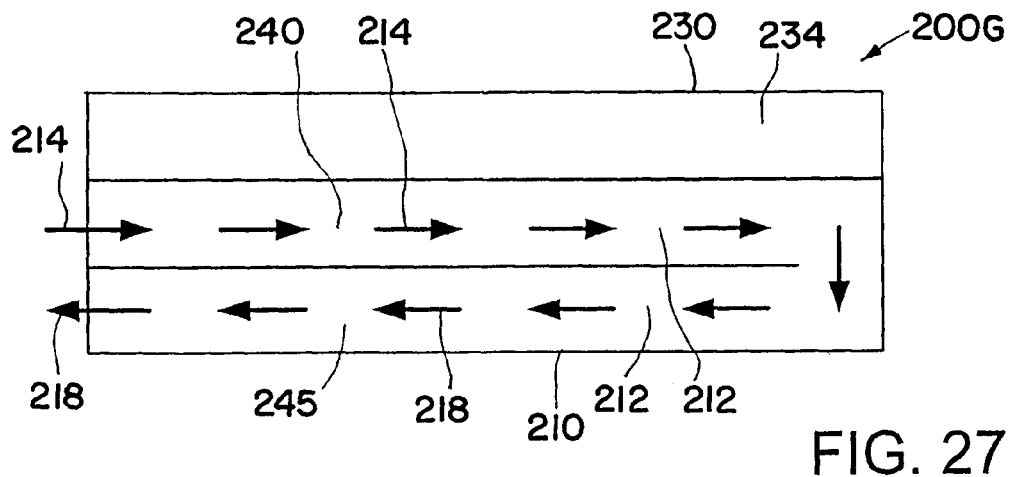

The repeating unit 200G illustrated in FIG. 27 is similar to the repeating unit 200F with the exception that the process microchannel 210 is in the form of a U laying on its side. Also, the preheating zone 240 and the quenching zone 245 are adjacent to each other and exchange heat with each other. The reaction zone 212 of the process microchannel 210 is cooled by the cooling section 234 of heat exchange channel 230. The reactants enter the process microchannel 210 as indicated by arrow 214, flow through preheating section 240 where they are preheated and then through reaction zone 212 where the reactants undergo reaction to form the product. The product flows from the reaction zone 212 through the quenching zone 245 where the reaction is quenched. The product flows out of the process microchannel 210 as indicated by arrow 218. The relatively cool reactants flowing in the preheating zone 240 are heated by the relatively hot product flowing through the quenching zone 245. As a result, heat transfers from the quenching zone 245 to the preheating zone 240.

The repeating units 200F and 200G provide for quenching the product in the microchannel reactor 100. Alternatively, the product may be quenched downstream of the microchannel reactor 100. The product quenching may involve reducing the temperature of the product by at least about 200° C. within a period of up to about 500 milliseconds (ms). The temperature may be reduced by at least about 150° C., and in one embodiment at least about 100° C., within a time period of up to about 500 ms, and in one embodiment up to about 400 ms, and in one embodiment up to about 300 ms, and in one embodiment up to about 200 ms, and in one embodiment up to about 100 ms, and in one embodiment up to about 50 ms, and in one embodiment up to about 35 ms, and in one embodiment up to about 20 ms, and in one embodiment up to about 15 ms, and in one embodiment up to about 10 ms, and in one embodiment within a time period of up to about 5 ms. The temperature may be reduced by at least about 200° C., and in one embodiment at least about 100° C., and in one embodiment at least about 50° C., within a time period of about 5 to about 100 ms, and in one embodiment about 10 to about 50 ms. The product may be quenched in the microchannel reactor as illustrated in FIGS. 26 and 27, or it may be quenched in a quenching device that is separate from the microchannel reactor. The quenching device may comprise a microchannel heat exchanger. The quenching device may comprise a heat exchanger that is adjacent to or interleaved with the product stream exiting the microchannel reactor. The quenching device may comprise a mixer capable of rapidly mixing the product with a secondary cooling fluid. The secondary cooling fluid may be a low temperature steam.

Alternatively, the quenching device may comprise a narrow gap or passageway for the process fluids to flow through. The gap or passageway may have a dimension equal to or below the quench diameter for the reaction. In this embodiment, the reaction may terminate as the reactants flow through the gap or passageway as a result of wall collisions. The gap or passageway may have a height or width of up to about 5 mm, and in one embodiment up to about 3 mm, and in one embodiment up to about 1 mm, and in one embodiment up to about 0.5 mm, and in one embodiment up to about 0.1 mm, and in one embodiment up to about 0.05 mm. This quenching device may comprise a microchannel or a plurality of parallel microchannels. This quenching device may comprise part of the process microchannels used with the inventive process downstream of the catalyst contained within the microchannels. The narrow gap or passageway may be used in conjunction with one or more of the other quenching devices (e.g., heat exchangers).

The heat exchange channels and reactant stream channels may be microchannels or they may have dimensions that would characterize them as not being microchannels. For example, these channels may have internal heights or widths up to about 50 mm, and in one embodiment up to about 25 mm, and in one embodiment up to about 15 mm. The process microchannels are microchannels. Each of the channels may have a cross-section having any shape, for example, a square, rectangle, circle, semi-circle, etc. Each microchannel may have an internal height of up to about 10 mm, and in one embodiment up to about 5 mm, and in one embodiment up to about 2 mm, and in one embodiment up to about 2 mm. In one embodiment, the height may be in the range of about 0.05 to about 10 mm, and in one embodiment from about 0.05 to about 5 mm, and in one embodiment from about 0.05 to about 2 mm, and in one embodiment about 0.05 to about 1.5 mm. The width of each of these microchannels may be of any dimension, for example, up to about 3 meters, and in one embodiment from about 0.01 to about 3 meters, and in one embodiment about 0.1 to about 3 meters. The length of each microchannel may be of any dimension, for example, up to about 10 meters, and in one embodiment about 0.2 to about 10 meters, and in one embodiment from about 0.2 to about 6 meters, and in one embodiment from 0.2 to about 3 meters.

The process microchannels, heat exchange channels and reactant stream channels may have rectangular cross sections and be aligned in side-by-side vertically oriented planes or horizontally oriented stacked planes. These planes may be tilted at an inclined angle from the horizontal. These configurations may be referred to as parallel plate configurations. These channels may be arranged in modularized compact units for scale-up.

The microchannel reactor 100 may be made of any material that provides sufficient strength, dimensional stability and heat transfer characteristics to permit operation of the inventive process. These materials may include aluminum; titanium; nickel; copper; chromium; alloys of any of the foregoing metals; brass; steel; quartz; silicon; or a combination of two or more thereof. Use of non-metal materials of construction, (e.g., plastic or ceramic materials) may be employed.

The microchannel reactor 100 may be fabricated using known techniques including wire electrodischarge machining, conventional machining, laser cutting, photochemical machining, electrochemical machining, molding, water jet, stamping, etching (for example, chemical, photochemical or plasma etching) and combinations thereof.

The microchannel reactor 100 may be constructed by forming shims with portions removed that allow flow passage. A stack of shims may be assembled via diffusion bonding, welding, diffusion brazing, and similar methods to form an integrated device. The microchannel reactor may be assembled using a combination of shims or laminae and partial sheets or strips. In this method, the channels or void areas may be formed by assembling strips or partial sheets to reduce the amount of material required.

The microchannel reactor 100 may be constructed using waveforms in the form of right angled corrugated inserts. These inserts may be sandwiched between opposing planar sheets or shims. In this manner the microchannels may be defined on three sides by the corrugated insert and on the fourth side by one of the planar sheets. The process microchannels as well as the reactant stream channels and heat exchange channels may be formed in this manner. Microchannel reactors made using waveforms are disclosed in WO 2008/030467, which is incorporated herein by reference.

The feed entering the microchannel reactor 100 may comprise a liquid hydrocarbon reactant and gaseous or vaporous hydrogen. The microchannel reactor 100 may comprise a manifold providing a flow passageway for the reactants to flow into the process microchannels 110. The microchannel reactor 100 may comprise separate manifolds for flowing the reactants into the process microchannels 110, one of the manifolds being for the hydrocarbon reactant and the other manifold being for the hydrogen.

The feed may be manifolded using a distribution apparatus in the form of a two-tier assembly, one of the tiers being used to separate a liquid/gas mixture into separate liquid and vapor phases, the other tier being used to redistribute the two phases evenly to the entrances for the process microchannels 110. The entrances for the process microchannels are downstream of the distribution apparatus. These entrances may include packed or structured beds, monoliths, or other configurations. The liquid exit ports from the downstream part of the distribution apparatus may come in contact with the structures in the process microchannel entrances. This may be useful in preventing recoalescence of the liquid stream and "breakdown" of the effective redistribution. The distribution apparatus is schematically illustrated in FIG. 66. This distribution apparatus may be used with the microchannel reactor 100 as well as any microchannel processing unit wherein a liquid and vapor are used as the feed for the microchannel processing unit.

Referring to FIG. 66, the distribution apparatus 500 comprises: a separation plate 510 and a redistribution plate 520. The separation plate 510 overlies the redistribution plate 520. The separation plate 510 may have a thickness in the range from about 0.01 to about 2 mm, and in one embodiment from about 0.1 to about 1 mm. The gap between the separation plate 510 and the redistribution plate 520 may be in the range from about 0.01 to about 2 mm, and in one embodiment in the range from about 0.1 to about 1 mm. The apparatus 500 may be made using any of the materials discussed above for making the microchannel reactor 100. The separation plate 510 is adapted to permit a mixture of vapor and liquid to separate into separate vapor and liquid phases and flow to the redistribution plate 520. The redistribution plate 520 may be aligned with the entrances to the process microchannels 110 of the microchannel reactor 100. The openings 522 and 524 are adapted to permit the vapor phase and the liquid phase to contact each other, form a vapor/liquid mixture and flow into the process microchannels 110 of the microchannel reactor 100. The distribution apparatus 500 may provide for effective multiphase feeding in multichannel (pilot or commercial scale) modules. This approach may involve layering shims with aligned channel openings and through-holes. Liquid and vapor flow from the channel openings, which may be referred to as manifolds, into small through-holes which connect flow directly to the process microchannels. The liquid may intercalate with the vapor, leading to Taylor like flow at the feed point.

Figure 67:
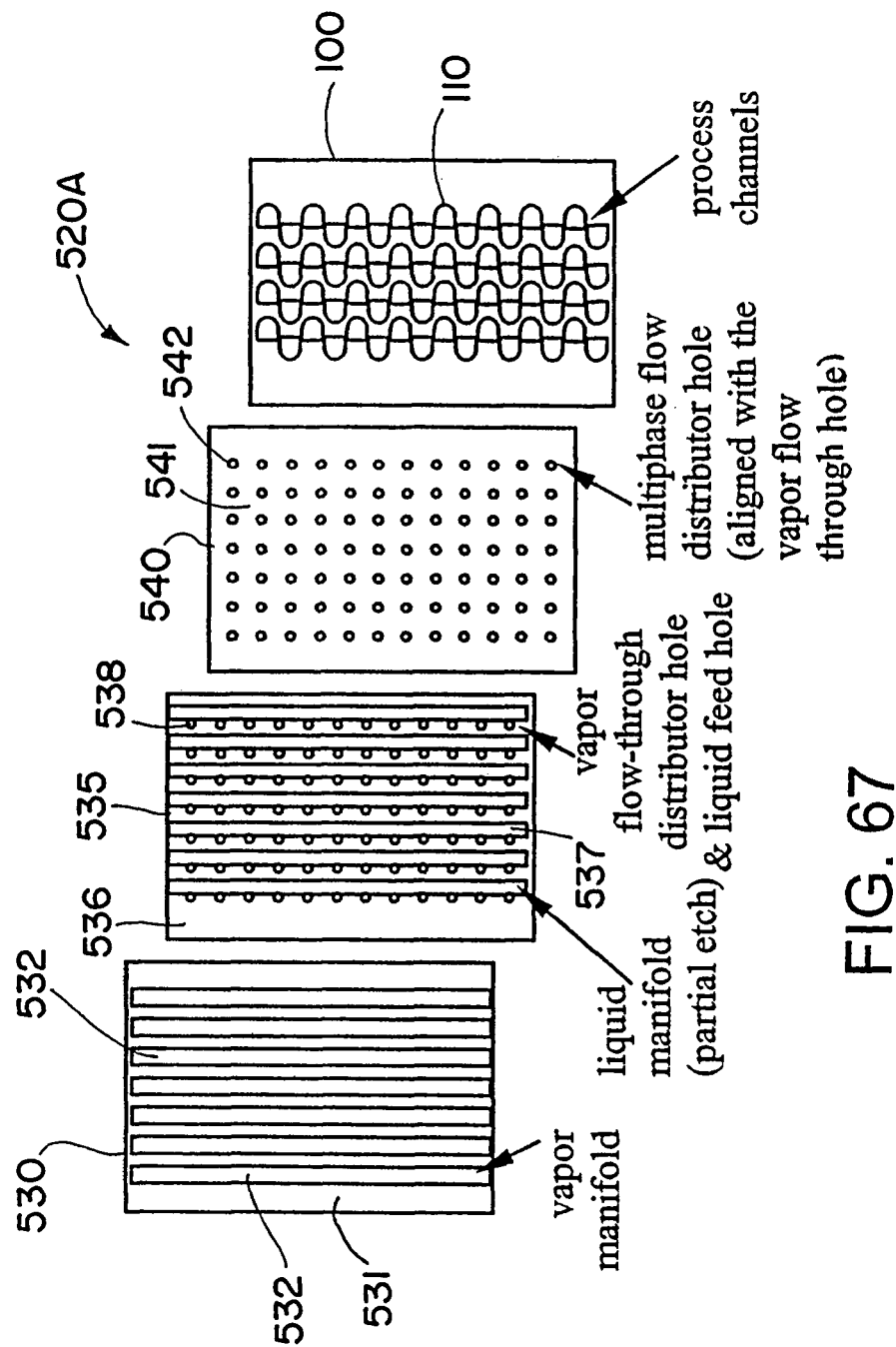
FIG. 67 is a schematic illustration of one embodiment of the redistribution plate illustrated in FIG. 66, the redistribution plate comprising three shims adapted to be stacked one above the other.

The redistribution plate 520, in one embodiment, may be in the form of redistribution plate 520A which comprises three shims as illustrated in FIG. 67. Referring to FIG. 67, redistribution plate 520A comprises a first shim 530 comprising a first planar surface 531 and a plurality of first openings 532 in the first planer surface 531; a second shim 535 comprising a second planar surface 536, a plurality of second openings 537 in the second planar surface 536, and a plurality of first through-holes 538 in the second planar surface 536, the first shim 536 overlying the second shim 535; and a third shim 540 comprising a third planar surface 541 and a plurality of second through-holes 542 in the third planar surface 541, the second shim 535 overlying the third shim 540, the second through-holes 542 being aligned with the first through-holes 538, the third shim 540 being adapted to overlie the entrances to the microchannels 110, the second through-holes 542 being adapted to be aligned with the entrances to the microchannels 110. The apparatus is adapted to permit vapor to flow through the first openings 532 into the first through-holes 538 and from the first through-holes 538 into the second through-holes 542; and to permit liquid to flow through the second openings 537 onto the third planar surface 541 and from the third planar surface 541 into the second through-holes 542. The second through-holes 542 are adapted to permit the vapor and liquid to mix, form a vapor/liquid mixture and flow into the microchannels 110. The first openings 532 may comprise channels which may function as a vapor manifold. The second openings 537 may comprise channels which may function as a liquid manifold. The shims 530, 535 and 540 may have thicknesses in the range from about 0.01 to about 2 mm, and in one embodiment from about 0.1 to about 1 mm. The shims may be constructed using any of the materials discussed above for making the microchannel reactor 100. The openings 532 and 537 may have lengths of any dimension (for example, from about 0.1 to about 2000 cm) and widths in the range from about 0.1 to about 2000 mm, and in one embodiment from about 1 to about 100 mm. The through-holes 538 may have diameters in the range from about 0.01 to about 10 mm, and in one embodiment from about 0.1 to about 1 mm. The through-holes 542 may have diameters in the range from about 0.01 to about 10 mm, and in one embodiment from about 0.1 to about 1 mm.

Figure 68:
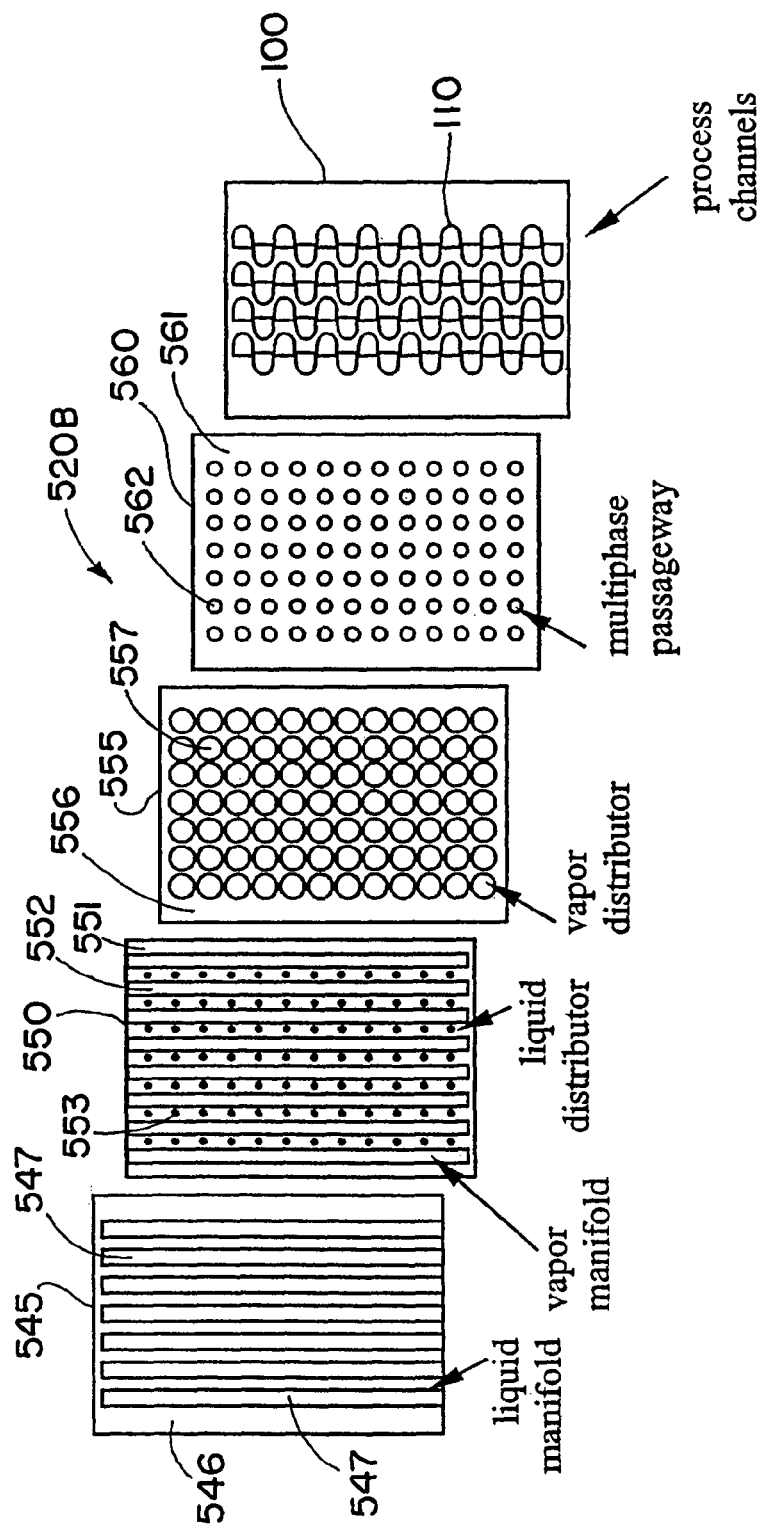
FIG. 68 is a schematic illustration of another embodiment of the redistribution plate illustrated in FIG. 66, the redistribution plate comprising four shims adapted to be stacked one above the other.

The redistribution plate 520 may be in the form of redistribution plate 520B which is illustrated in FIG. 68. Redistribution plate 520B involves the use of layered shims with large gas and liquid manifold channels that feed into through-holes, allowing jet-like/aerosol flow to develop. The liquid may enter through narrow jet through-holes and be squeezed by vapor entering through larger through-holes surrounding the jet through-holes. A shim with intermediate size through-holes may increase the pressure drop and force the liquid and vapor streams to exit into the process microchannel as an aerosol. Referring to FIG. 68, the redistribution plate 520B comprises: a first shim 545 comprising a first planar surface 546 and a plurality of first openings 547 in the first planer surface 546; a second shim 550 comprising a second planar surface 551, a plurality of second openings 552 in the second planar surface 551, and a plurality of first through-holes 553 in the second planar surface 551, the first shim 545 overlying the second shim 550; a third shim 555 comprising a third planar surface 556 and a plurality of second through-holes 557 in the third planar surface 556, the second shim 550 overlying the third shim 555, the second through-holes 557 being aligned with the first through holes 553; and a fourth shim 560 comprising a fourth planar surface 561 and a plurality of third through-holes 562 in the fourth planar surface 561, the third shim 555 overlying the fourth shim 560, the third through-holes 562 being aligned with the second through-holes 557, the fourth shim 560 being adapted to overlie the entrances to the microchannels 110, the third through-holes 562 being adapted to be aligned with the entrances to the microchannels 110. The apparatus is adapted to permit liquid to flow through the first openings 547 into the first through-holes 553, from the first through-holes 553 into the second through-holes 557 and from the second through-holes 557 into the third-through holes 562; and to permit vapor to flow through the second openings 552 into the second through-holes 557 and from the second through-holes 557 into the third through-holes 562; the second and third through-holes 557 and 562 being adapted to permit the vapor and liquid to mix, form a vapor/liquid mixture and flow into the microchannels 110. The first openings 547 may comprise channels which may function as a liquid manifold. The second openings 552 may comprise channels which may function as a vapor manifold. The shims 545, 550, 555 and 560 may have thicknesses in the range from about 0.01 to about 5 mm, and in one embodiment from about 0.1 to about 1 mm. The shims may be constructed using any of the materials discussed above for making the microchannel reactor 100. The openings 547 and 552 may have lengths of any dimension (for example, from about 0.1 to about 1000 cm) and widths in the range from about 1 to about 100 mm, and in one embodiment from about 1 to about 10 mm. The through-holes 553 may have diameters in the range from about 0.01 to about 10 mm, and in one embodiment from about 0.01 to about 1 mm. The through-holes 555 may have diameters in the range from about 0.01 to about 10 mm, and in one embodiment from about 0.1 to about 1 mm. The through-holes 562 may have diameters in the range from about 0.01 to about 10 mm, and in one embodiment from about 0.1 to about 1 mm.

The redistribution plate 520 may comprise a plurality of layered shims with perpendicular, narrow channels that provide high pressure drop (for effective distribution from a larger manifolding area) and small enough channels that allow intercalation of phases in Taylor like flow. This configuration may allow for slight positional variations that may ensue in processing of large quantities of shims. This is shown in FIG. 69 wherein redistribution plate 520C is illustrated. Referring to FIG. 69, redistribution plate 520C comprises: a first shim 565 comprising a first planar surface 566, a first opening 567 in the first planer surface 565 on a first side 568 of the first planar surface 566, and a second opening 569 in the first planar surface 566 on a second side 569a of the first planar surface 566, the first and second openings 567 and 569 being in the form of open channels extending parallel to each other; a second shim 570 comprising a second planar surface 571, a plurality of third openings 572 in the second planar surface 571, and a plurality of fourth openings 573 in the second planar surface 571, the third openings 572 and the fourth openings 573 being in the form of open channels extending parallel to each other, the first shim 565 overlying the second shim 570, the first opening 567 being aligned with part of the third openings 572, the second opening 569 being aligned with part of the fourth openings 573; and a third shim 575 comprising a third planar surface 576 and a plurality of fifth openings 577 in the third planar surface 576, the second shim 570 overlying the third shim 575, the fifth openings 577 being in the form of open channels extending parallel to each other and perpendicular to the third and fourth openings 572 and 573, the third shim 575 being adapted to overlie the entrances to the microchannels 110. The apparatus is adapted to permit vapor to flow through the first openings 567 into the third openings 572 and from the third openings 572 into the fifth openings 577; and to permit liquid to flow through the second openings 569 into the fourth openings 573 and from the fourth openings 573 into the fifth openings 577. The openings 577 are adapted to permit the vapor and liquid to mix, form a vapor/liquid mixture and flow into the microchannels 110. The first opening 567 in the first planar surface 566 may function as a vapor manifold. The second opening 569 in the first planar surface 566 may function as a liquid manifold. The shims 565, 570 and 575 may have thicknesses in the range from about 0.01 to about 10 mm, and in one embodiment from about 0.1 to about 1 mm. The shims may be constructed using any of the materials discussed above for making the microchannel reactor 100. The openings 567 and 569 may have lengths of any dimension (for example, from about 0.01 to about 100 cm) and widths in the range from about 0.1 to about 100 mm, and in one embodiment from about 0.1 to about 10 mm. The openings 572 and 573 may have lengths of any dimension (for example, from about 0.01 to about 100 cm) and widths in the range from about 0.1 to about 10 mm, and in one embodiment from about 1 to about 10 mm. The openings 577 may have lengths of any dimension (for example, from about 0.01 to about 100 cm) and widths in the range from about 0.1 to about 10 mm, and in one embodiment from about 0.1 to about 1 mm.

The feed may be manifolded using a distribution apparatus suitable for distributing a vapor and two liquids to the process microchannels. This is illustrated in FIGS. 70-78. The two liquids may be referred to as a first liquid and a second liquid. The first liquid and the second liquid may be the same or they may be different. The first liquid, referred to in the drawings as $L_1$, may flow through the distribution apparatus at a relatively high flow rate. The second liquid, referred to in the drawings as $L_2$, may flow through the distribution apparatus at a relatively low flow rate. The first liquid may comprise a light hydrocarbon fraction and the second liquid may comprise a heavy hydrocarbon fraction. The entrances for the process microchannels are downstream of the distribution apparatus. These entrances may include packed or structured beds, monoliths, or other configurations. The liquid exit ports from the downstream part of the distribution apparatus may come in contact with the structures in the process microchannel entrances. This may be useful in preventing re-coalescence of the liquid stream and "breakdown" of the effective redistribution.

Figure 70:
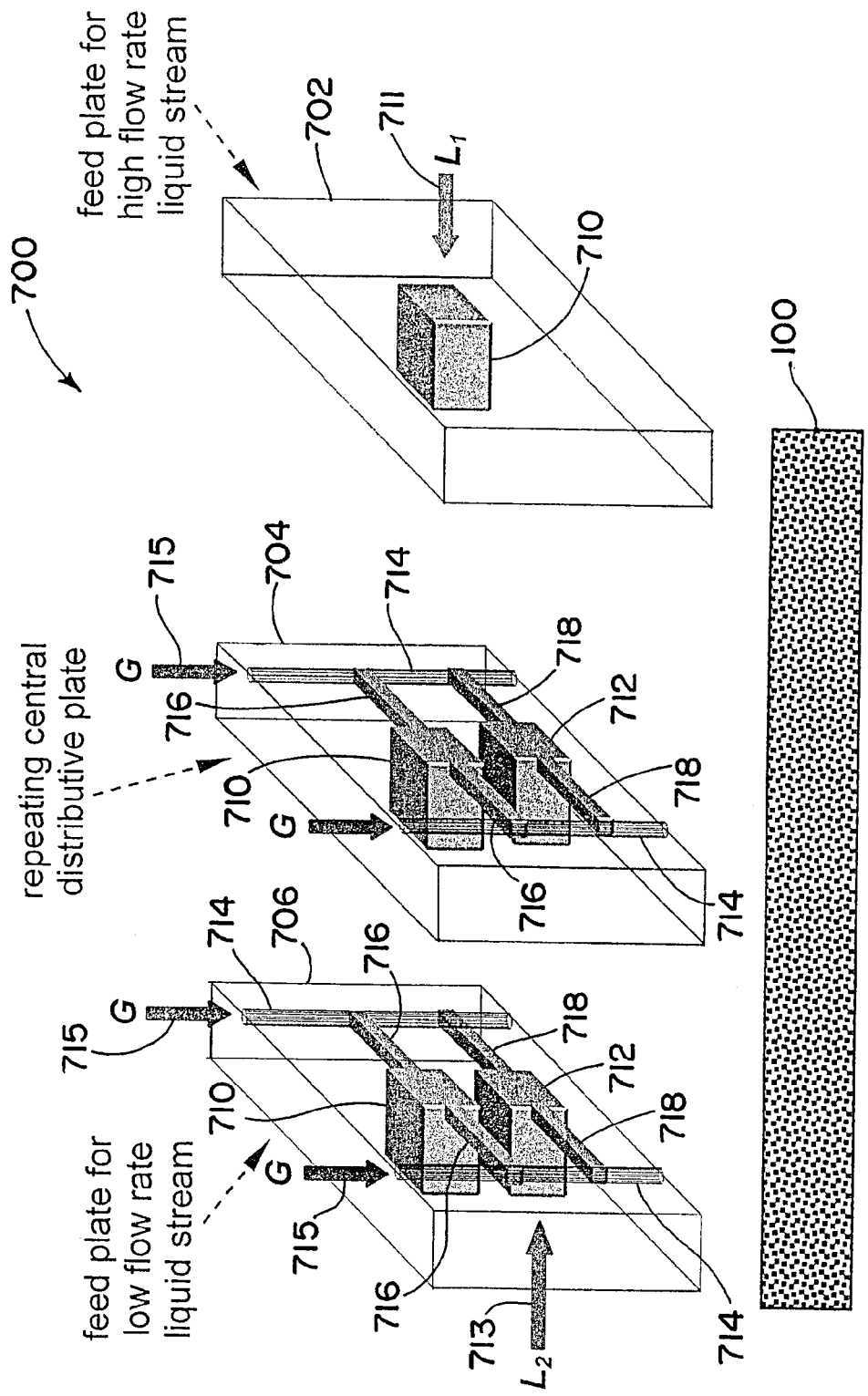
FIG. 70 is a schematic illustration of an apparatus and process for flowing a mixture of a vapor and two liquids into a plurality of microchannels in a microchannel processing unit.

Referring to FIG. 70, distribution apparatus 700 is adapted to be positioned at the entrance to the microchannel reactor 100 and provide a flow of a mixture of the vapor, the first liquid and the second liquid to the process microchannels 110. The distribution apparatus 700 comprises a first liquid feed plate 702, a plurality of distributive plates 704 positioned side-by-side, and a second liquid feed plate 706. The distributive plates 704 are positioned between the feed plates 702 and 706. The number of distributive plates 704 in the distribution apparatus 700 may be any number, of example, from 1 to about 100, and in one embodiment from about 2 to about 10. A first liquid manifold slot 710 extends from the feed plate 702 through the distributive plates 704 to the feed plate 706. A second liquid manifold slot 712 extends from the feed plate 706 through the distributive plates 704. Each distributive plate 704 comprises two vapor pathways 714, first distribution channels 716 extending from the first liquid manifold slot 710 to the vapor pathways 714; and second distribution channels 718 extending from the second liquid manifold slot 712 to the vapor pathways 714. The apparatus 700 is adapted to permit vapor to flow through the vapor pathway 714 in the direction indicated by arrows 715. The first liquid may flow through the feed plate 702 into the first liquid manifold slot 710, as indicated by arrow 711, and from the manifold slot 710 through the first distribution channels 716 into the vapor pathways 714 where it may contact the vapor flowing in the vapor pathways 714. The second liquid may flow through the second feed plate 706 into the second liquid manifold slot 712 and from the second manifold slot 712, as indicated by arrow 713, through the second distribution channels 718 into the vapor pathways 714 in contact with the vapor flowing in the vapor pathway 714 and the first liquid flowing in the vapor pathway 714. The apparatus 700 is suitable for providing Taylor flow of the vapor, first liquid and second liquid through the vapor pathway 714 into the process microchannels 110.

Figure 71:
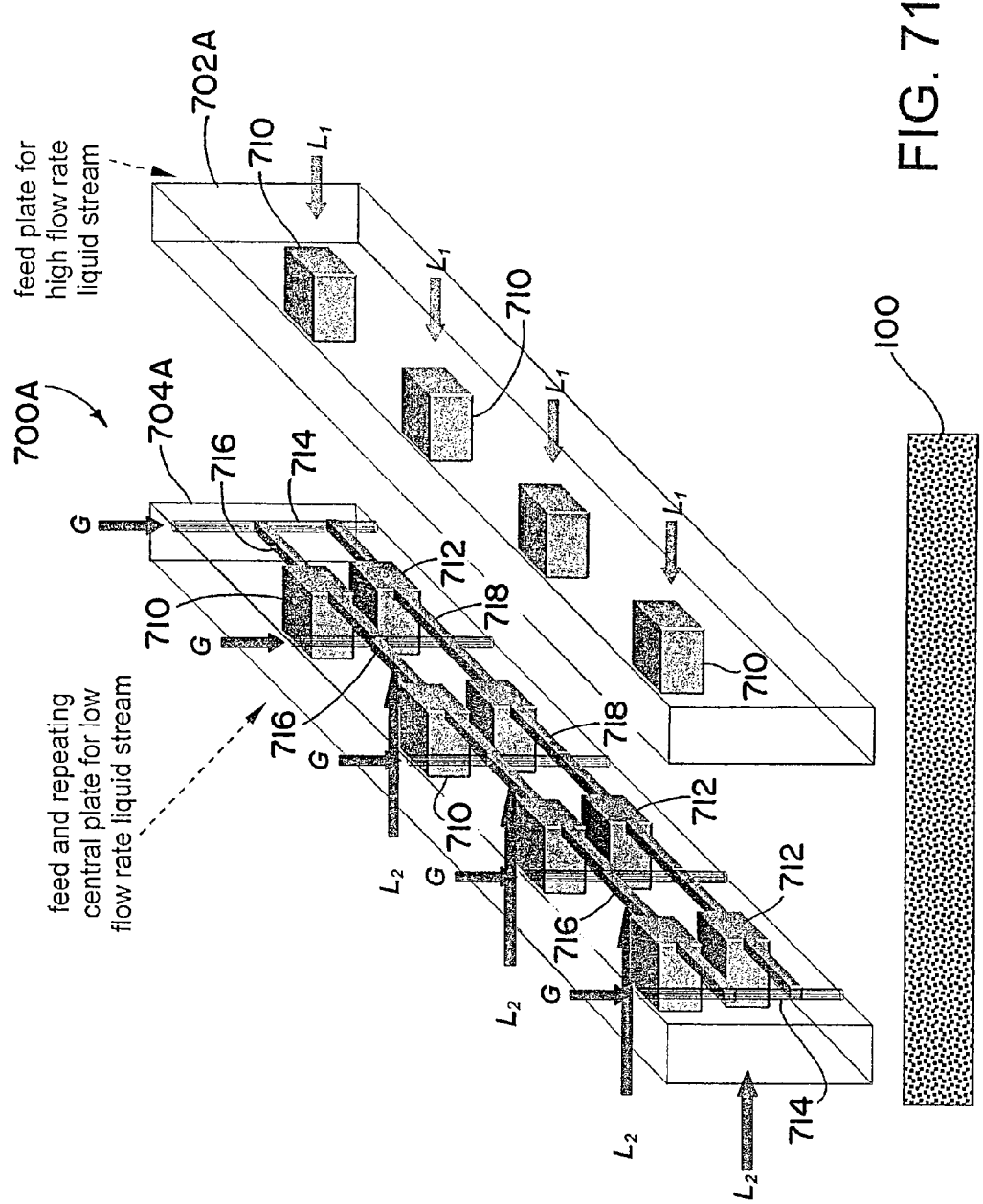
FIG. 71 is a schematic illustration of an alternate embodiment of the apparatus and process illustrated in FIG. 70.

A plurality of the first liquid manifold slots 710, second liquid manifold slots 712, vapor pathways 714, and distribution channels 716 and 718 may be formed in each distributive plate 704. This is shown in FIG. 71 where in distribution apparatus 700A the distributive plate 704A has replaced the distributive plate 704 shown in FIG. 70. Also, in FIG. 71, first liquid feed plate 702A contains a plurality of the first liquid manifold slots 710 which are adapted to be aligned with the manifold slots 710 in the distributive plate 704A. Any desired number of the distributive plates 704A may be positioned side-by-side in the distribution apparatus 700A, this number being, for example, from 1 to about 100, and in one embodiment from about 2 to about 10. Also, any desired number of liquid manifold slots 710 and 712, as well as corresponding numbers of vapor pathways 714 and distribution channels 716 and 718, may be provided in each distributive plate 704A, this number being, for example, from 2 to about 100, and in one embodiment from about 2 to about 10.

In an alternate embodiment, the feed plate 702 may contain a first manifold slot 710 and distribution channels 716 extending from the manifold slot 710. Similarly, the feed plate 706 may contain a second manifold slot 712 and distribution channels 718 extending from the manifold slot 712. This is shown in FIG. 72 wherein distribution apparatus 700B contains feed plates 702B and 706B, and distributive plate 704B.

The first distribution channels 716 and/or the second distribution channels 718 may be may be curved or constricted to increase pressure drop for fluid flowing in the channels. This is shown in FIG. 73 where curved or constricted channels 720 extend from the manifold slots 710 and/or 712.

Figure 74:
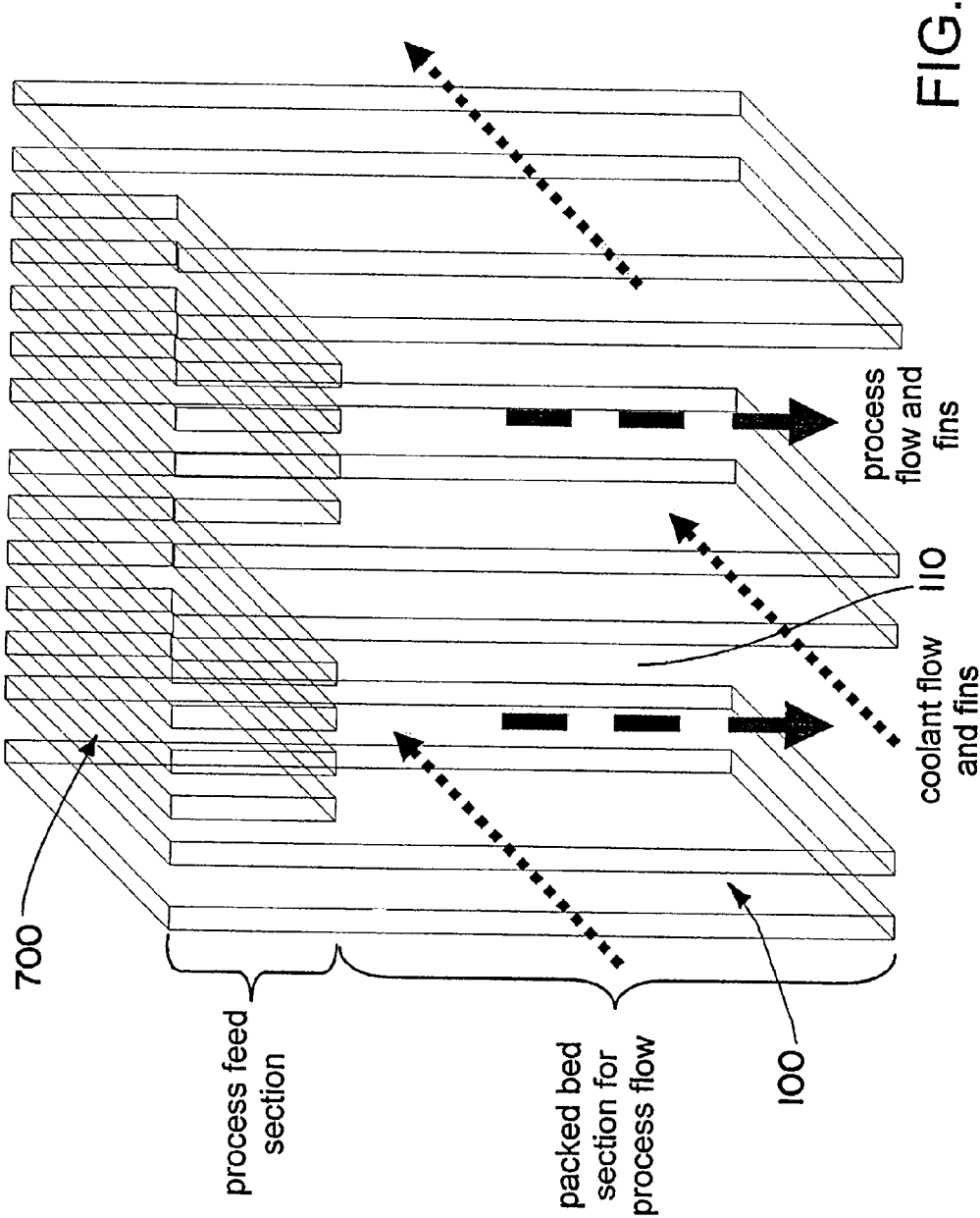
FIG. 74 is a schematic illustration of a microchannel processing unit in combination with the distribution apparatus illustrated in FIG. 70, the microchannel processing unit being in the form of a microchannel reactor employing a catalytic bed of particulate solids.
Figure 75:
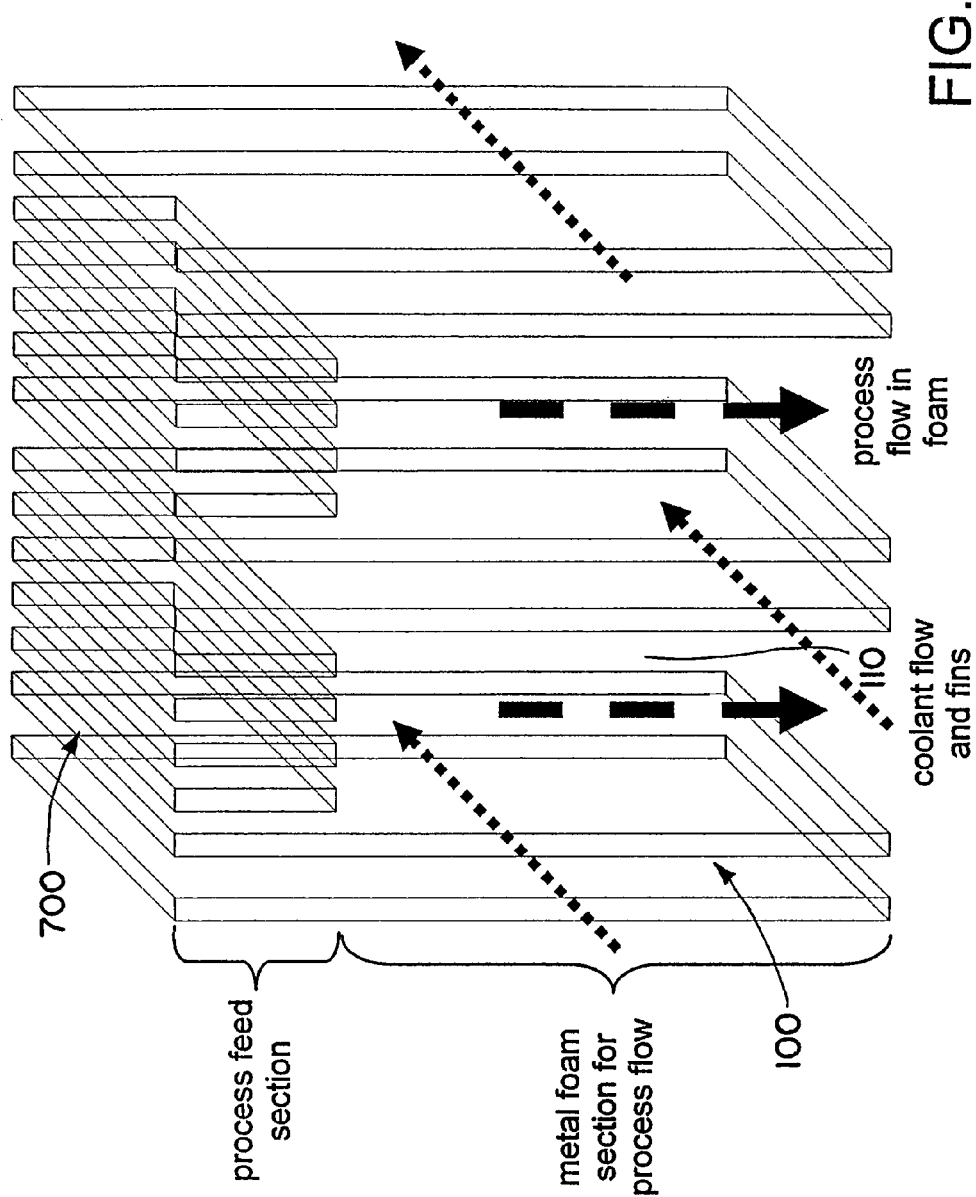
FIG. 75 is a schematic illustration of a microchannel processing unit similar to the microchannel processing unit illustrated in FIG. 74 with the exception that the catalyst is in the form of a metal foam rather than a bed of particulate solids.

The distribution apparatus 700 may be mounted on microchannel reactor 100 with the outlets from the distribution apparatus 700 aligned with the entrances for the process microchannels 110. This is shown in FIGS. 74 and 75. The microchannel reactors 100 shown in FIGS. 74 and 75 are the same except that the reactor shown in FIG. 74 employs a catalytic bed of particulate solids and the reactor shown in FIG. 75 employs a metal foam to support the catalyst.

The distribution apparatus 700, 700A and 700B may be made of any of the materials of construction used to make the microchannel reactor 100. The feed plates 702 and 704, and the distributive plates 706 may have heights (as viewed in FIG. 70) of any desired dimension, for example, in the range from about 1 to about 1000 cm, and in one embodiment from about 10 to about 100 cm; widths of any desired dimension, for example, in the range from about 1 to about 1000 cm, and in one embodiment from about 10 to about 100 cm; and thicknesses of any desired dimension, for example, in the range from about 0.1 to about 100 mm, and in one embodiment from about 1 to about 10 mm. The vapor pathways 714 may have depths in the range from about 0.1 to about 10 mm, and in one embodiment from about 1 to about 5 mm; and widths in the range from about 1 to about 1000 mm, and in one embodiment from about 1 to about 100 mm. The manifold slots 710 and 712 may have heights in the range from about 1 to about 1000 mm, and in one embodiment in the range from about 1 to about 100 mm; and widths in the range from about 1 to about 1000 mm, and in one embodiment from about 1 to about 100 mm. The channels 716 and 718 may have depths in the range from about 0.1 to about 1000 mm, and in on embodiment from about 1 to about 100 mm, and widths in the range from about 1 to about 1000 mm, and in one embodiment from about 1 to about 100 mm.

Figure 76:
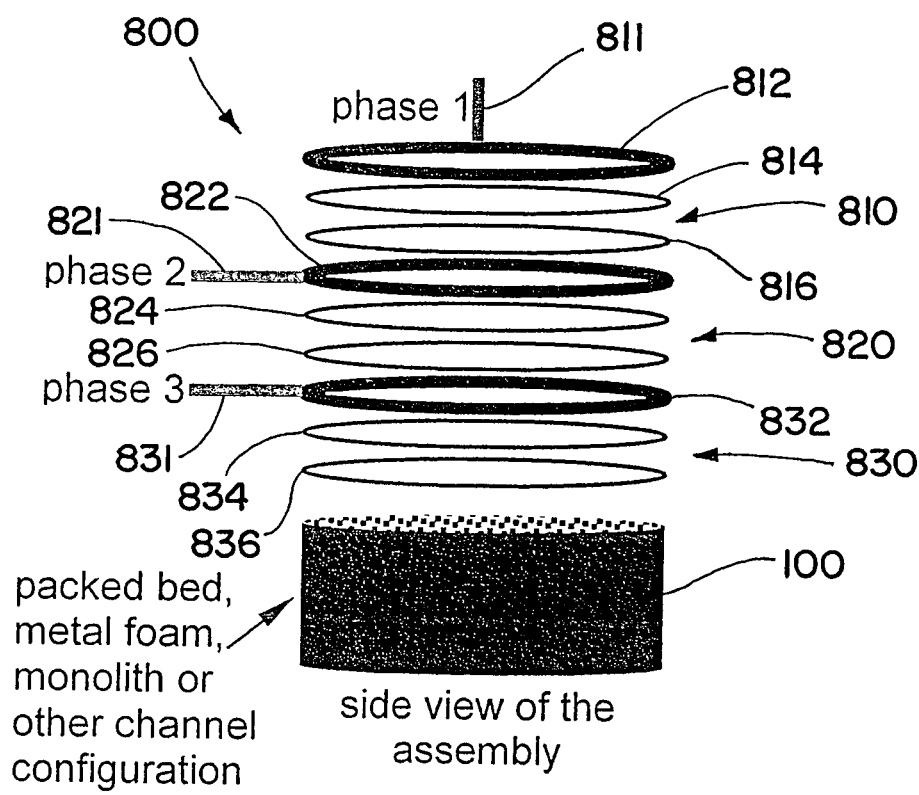
FIGS. 76-78 are schematic illustrations showing an alternate embodiment of a distribution apparatus for flowing a vapor and two liquids into a plurality of microchannels in a microchannel processing unit.
Figure 77:
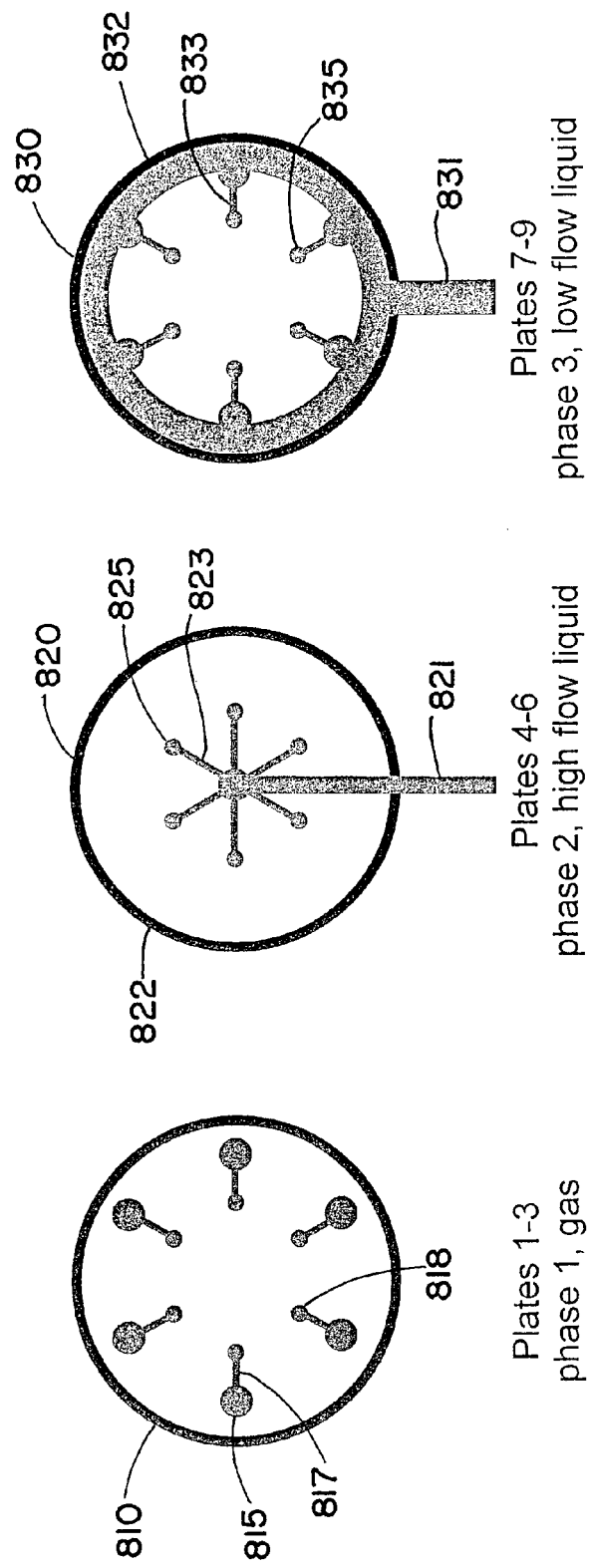
Figure 78:
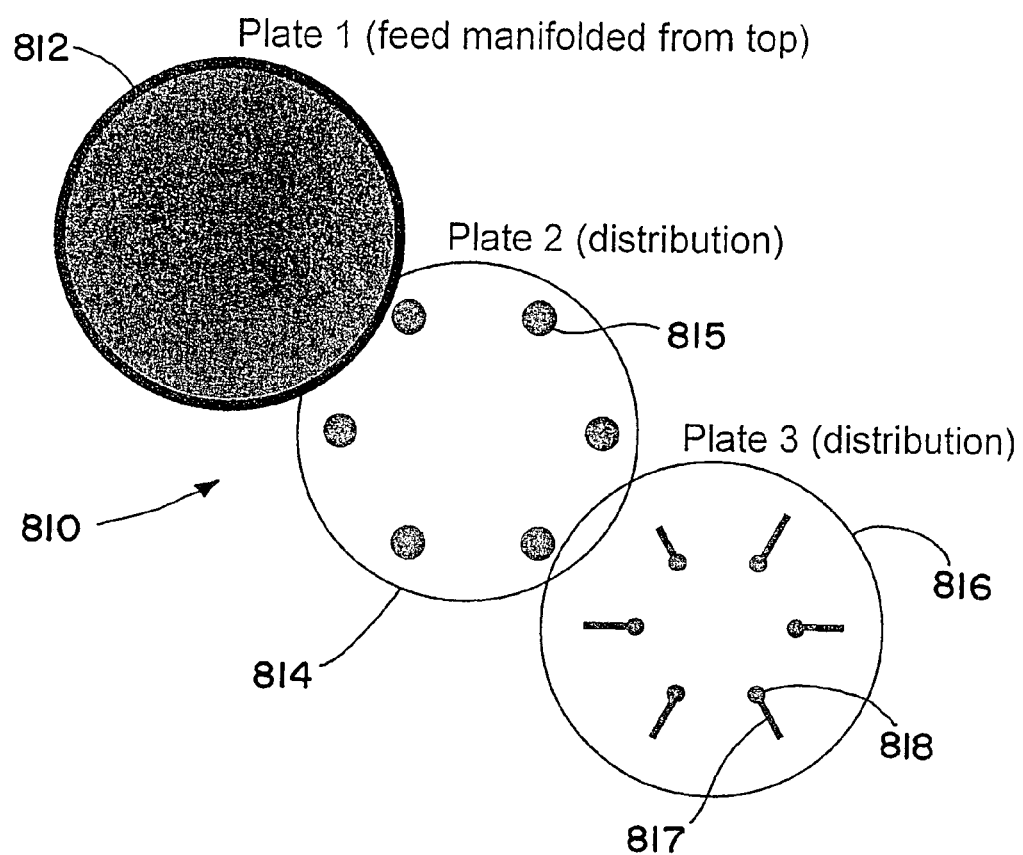

An alternate embodiment of a distribution apparatus for flowing a vapor and two liquids into a plurality of microchannels in a microchannel reactor is shown in FIGS. 76-78. Referring to FIGS. 76-78, distribution apparatus 800 is positioned on the microchannel reactor 100 to provide for the flow of a gas and two liquids into the process microchannels. The distribution apparatus 800 comprises: a first distributive section 810; a second distributive section 820, the first distributive section 810 overlying the second distributive section 820; and a third distributive section 830, the second distributive section 820 overlying the third distributive section 830. The apparatus 800 is adapted to permit vapor to flow from the first distributive section 810 through the second distributive section 820 and the third distributive section 830 into the process microchannels. The first liquid may flow from the second distributive section 820, contact the vapor, and flow through the third distributive section 830 into the process microchannels. The second liquid may flow from the third distributive section 830, contact the vapor and the first liquid, and flow into the process microchannels.

The first distributive section 810 may comprises three plates stacked one above another, the three plates comprising: manifold plate 812; first distributive plate 814, the manifold plate 812 overlying the first distributive plate 814; and second distributive plate 816, the first distributive plate 814 overlying the second distributive plate 816. The first distributive section 810 is adapted to permit vapor to flow through inlet channel 811 to manifold plate 812 and from the manifold plate 812 through openings 815 to and through channels 817 and openings 818 to the second distributive section 820.

The second distributive section 820 may comprises three plates stacked one above another, the three plates comprising: manifold plate 822; first distributive plate 824, the manifold plate 822 overlying the first distributive plate 824; and second distributive plate 826, the first distributive plate 824 overlying the second distributive plate 826. The second distributive section 820 is adapted to permit the first liquid to flow through inlet channel 821 to and through channel openings 823 to openings 825, and through openings 825, in contact with vapor from the first distributive section 810, to the third distributive section 830.

The third distributive section 830 may comprise three plates stacked one above another, the three plates comprising: manifold plate 832; first distributive plate 834, the manifold plate 832 overlying the first distributive plate 834; and second distributive plate 836, the first distributive plate 834 overlying the second distributive plate 836. The third distributive section 830 is adapted to permit the second liquid to flow through inlet channel 831 to and through channel openings 833 to openings 835. The second liquid contacts the vapor and the first liquid in the openings 835 and flows into the microchannels.

The distribution apparatus 800 may be made of any of the materials of construction used to make the microchannel reactor 100. The plates 812, 814, 816, 822, 824, 826, 832, 834 and 836 may have diameters of any desired dimension, for example, in the range from about 1 to about 100 cm, and in one embodiment from about 5 to about 50 cm; and thicknesses of any desired dimension, for example, in the range from about 0.1 to about 10 mm, and in one embodiment from about 0.5 to about 5 mm. The inlet channels 811, 821 and 831 may have widths in the range from about 0.1 to about 100 mm, and in one embodiment from about 0.5 to about 10 mm. The channel openings 817, 823 and 833 may have widths in the range from about 0.1 to about 100 mm, and in one embodiment from about 0.5 to about 10 mm. The openings 815 may have diameters in the range from about 0.001 to about 10 mm, and in one embodiment from about 0.01 to about 1 mm. The openings 818, 825 and 835 may have diameters in the range from about 0.001 to about 10 mm, and in one embodiment from about 0.01 to about 1 mm.

In an embodiment, the invention relates to the use of hydrogen cascading in a petroleum refinery process. Hydrogen in a refinery may come from a variety of sources, with various pressure levels and compositions. A microchannel hydroprocessing unit may be used with make-up hydrogen that does not come from reforming, pressuring swing adsorption (PSA), or membrane purification. The microchannel hydroprocessing unit may involve the use of multiple stages, with hydrogen for one stage coming from a different source than hydrogen for another stage.

HP (hydroprocessing) may be achieved where there is superior wetting of the catalyst due to the assistance of capillary forces. These may be further assisted by thin layers of liquid on the catalyst for enhanced mass transfer. The architecture for conducting HP may include structures such as honeycomb monoliths (metal and/or ceramic), which may be filled with catalyst particles.

An assembly for microchannel mixing of hydrogen and liquid may be installed upstream of or inside a conventional trickle bed reactor in order to achieve improved contacting. For example, the distribution apparatus shown in FIGS. 66-69 may be used inside a conventional trickle bed reactor upstream of a catalyst bed to provide for uniform distribution of liquid and gas.

Figure 7:
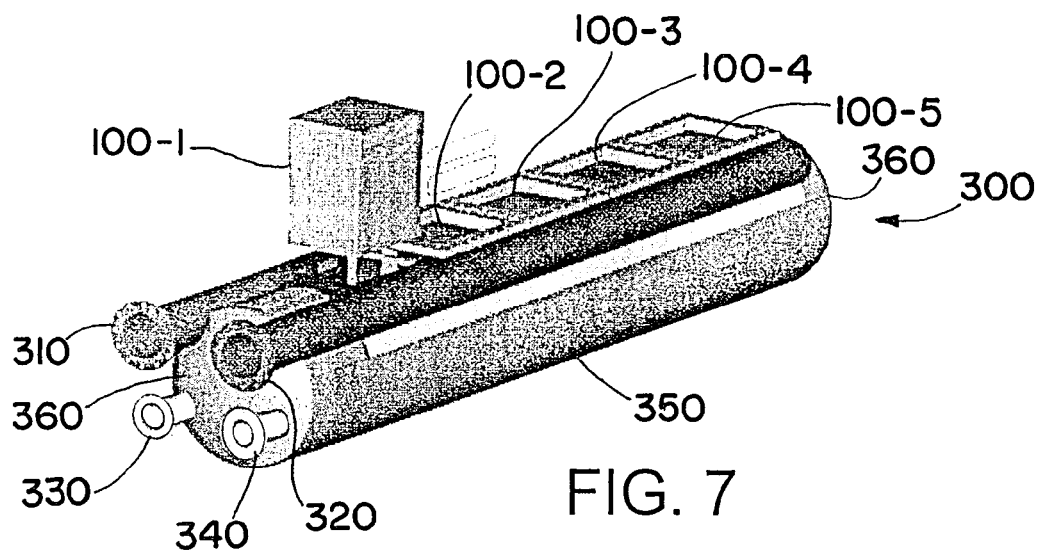
FIGS. 7 and 8 are schematic illustrations of a reaction vessel which may be used for housing a plurality of the microchannel reactors used with the inventive process.
Figure 8:
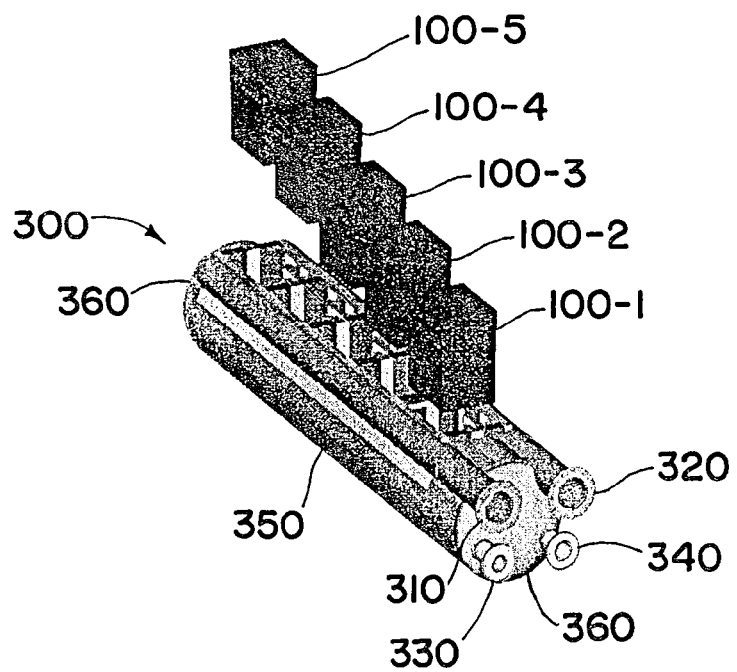

One or more of the microchannel reactors 100 may be housed in housing vessel 300 which is illustrated in FIGS. 7 and 8. Referring to FIGS. 7 and 8, the vessel 300 contains five microchannel reactors 100. These are identified in FIGS. 7 and 8 as microchannel reactors 100-1, 100-2, 100-3, 100-4 and 100-5. Although five microchannel reactors 100 are disclosed in the drawings, it will be understood that the vessel 300 may contain any desired number of microchannel reactors 100. For example, the vessel 300 may contain from about 1 to about 1000 microchannel reactors 100, and in one embodiment from 1 to about 750, and in one embodiment from 1 to about 500, and in one embodiment from 1 to about 250, and in one embodiment from 1 to about 100, and in one embodiment from about 1 to about 50, and in one embodiment from 1 to about 20 microchannel reactors 100. The vessel 300 may be a pressurizable vessel. The vessel 300 includes inlets 310 and 320, and outlets 330 and 340. The inlet 310 is connected to a manifold which is provided for flowing reactants or process feed to the process microchannels in the microchannel reactors 100. The inlet 320 is connected to a manifold which is provided for flowing heat exchange fluid to heat exchange channels in the microchannel reactors 100. The outlet 330 is connected to a manifold which provides for the flow of product from the process microchannels in the microchannel reactors 100. The outlet 340 is connected to a manifold to provide for the flow of the heat exchange fluid out of the heat exchange channels in the microchannel reactors 100.

The housing vessel 300 may be constructed using any suitable material sufficient for operating under the pressures and temperatures required for operating the microchannel reactors 100. For example, the shell 350 and heads 360 of the vessel 300 may be constructed of cast steel. The flanges, couplings and pipes may be constructed of 316 stainless steel. The vessel 300 may have any desired diameter, for example, from about 10 to about 1000 cm, and in one embodiment from about 50 to about 300 cm. The axial length of the vessel 300 may be of any desired value, for example, from about 0.5 to about 50 meters, and in one embodiment from about 1 to about 20 meters.

In the design and operation of the microchannel reactor 100 it may be advantageous to provide a tailored heat exchange profile along the length of the process microchannels in order to optimize the reaction. This may be accomplished by matching the local release of heat given off by the hydrocracking reaction conducted in the process microchannels with heat removal or cooling provided by heat exchange fluid in heat exchange channels in the microchannel reactor. The extent of the hydrocracking reaction and the consequent heat release provided by the reaction may be higher in the front or upstream sections of the reaction zones in the process microchannels as compared to the back or downstream sections of the reaction zones. Consequently, the matching cooling requirements may be higher in the upstream section of the reaction zones as compared to the downstream sections of the reaction zones. Tailored heat exchange may be accomplished by providing more heat exchange or cooling channels, and consequently the flow of more heat exchange or cooling fluid, in thermal contact with upstream sections of the reaction zones in the process microchannels as compared to the downstream sections of the reaction zones. Alternatively or additionally, a tailored heat exchange profile may be provided by varying the flow rate of heat exchange fluid in the heat exchange channels. In areas where additional heat exchange or cooling is desired, the flow rate of the heat exchange fluid may be increased as compared to areas where less heat exchange or cooling is required. For example, a higher rate of flow of heat exchange fluid may be advantageous in the heat exchange channels in thermal contact with the upstream sections of the reaction zones in the process microchannels as compared to the heat exchange channels in thermal contact with the downstream sections of the reaction zones. Heat transfer from the process microchannels to the heat exchange channels may be designed for optimum performance by selecting optimum heat exchange channel dimensions and/or the rate of flow of heat exchange fluid per individual or groups of heat exchange channels. Additional design alternatives for tailoring heat exchange may relate to the selection and design of the catalyst (such as, particle size, catalyst formulation, packing density, use of a graded catalyst, or other chemical or physical characteristics) at specific locations within the process microchannels. These design alternatives may impact both heat release from the process microchannels as well as heat transfer to the heat exchange fluid. Temperature differentials between the process microchannels and the heat exchange channels, which may provide the driving force for heat transfer, may be constant or may vary along the length of the process microchannels.

The process microchannels and/or heat exchange channels may contain one or more surface features in the form of depressions in and/or projections from one or more interior walls or interior structures of the process microchannels and/or heat exchange channels. Examples are shown in FIGS. 15, 16 and 25. The surface features may be used to disrupt the flow of fluid flowing in the channels. These disruptions in flow may enhance mixing and/or heat transfer. The surface features may be in the form of patterned surfaces. The microchannel reactors may be made by laminating a plurality of shims together. One or both major surfaces of the shims may contain surface features. Alternatively, the microchannel reactors may be assembled using some sheets or shims and some strips, or partial sheets to reduce the total amount of metal required to construct the device. In one embodiment, a shim containing surface features may be paired (on opposite sides of a microchannel) with another shim containing surface features. Pairing may create better mixing or heat transfer enhancement as compared to channels with surface features on only one major surface. In one embodiment, the patterning may comprise diagonal recesses that are disposed over substantially the entire width of a microchannel surface. The patterned surface feature area of a wall may occupy part of or the entire length of a microchannel surface. In one embodiment, surface features may be positioned over at least about 10%, and in one embodiment at least about 20%, and in one embodiment at least about 50%, and in one embodiment at least about 80% of the length of a channel surface. Each diagonal recess may comprise one or more angles relative to the flow direction. Successive recessed surface features may comprise similar or alternate angles relative to other recessed surface features.

In embodiments wherein surface features may be positioned on or in more than one microchannel wall, the surface features on or in one wall may have the same (or similar) pattern as found on a second wall, but rotated about the centerline of the main channel mean bulk flow direction. In embodiments wherein surface features may be on or in opposite walls, the surface features on or in one wall may be approximately mirror images of the features on the opposite wall. In embodiments wherein surface features are on or in more than one wall, the surface features on or in one wall may be the same (or similar) pattern as found on a second wall, but rotated about an axis which is orthogonal to the main channel mean bulk flow direction. In other words, the surface features may be flipped 180 degrees relative to the main channel mean bulk flow direction and rotated about the centerline of the main channel mean bulk flow. The surface features on or in opposing or adjacent walls may or may not be aligned directly with one another, but may be repeated continuously along the wall for at least part of the length of the wall. Surface features may be positioned on three or more interior surfaces of a channel. For the case of channel geometries with three or fewer sides, such as triangular, oval, elliptical, circular, and the like, the surface features may cover from about 20% to about 100% of the perimeter of the microchannel.

In one embodiment, a patterned surface may comprise multiple patterns stacked on top of each other. A pattern or array of holes may be placed adjacent to a heat transfer wall and a second pattern, such as a diagonal array of surface features may be stacked on top and adjacent to an open channel for flow. A sheet adjacent to an open gap may have patterning through the thickness of the sheet such that flow may pass through the sheet into an underlying pattern. Flow may occur as a result of advection or diffusion. As an example, a first sheet with an array of through holes may be placed over a heat transfer wall, and a second sheet with an array of diagonal through slots may be positioned on the first sheet. This may create more surface area for adhering a catalyst. In one embodiment, the pattern may be repeated on at least one other wall of the process microchannel. The patterns may be offset on opposing walls. The innermost patterned surfaces (those surfaces bounding a flow channel) may contain a pattern such as a diagonal array. The diagonal arrays may be oriented both "with" the direction of flow or one side oriented with the direction of flow and the opposing side oriented "against" the direction of flow. By varying surface features on opposing walls, different flow fields and degrees of vorticity may be created in the fluid that travels down the center and open gap.

The surface features may be oriented at angles relative to the direction of flow through the channels. The surface features may be aligned at an angle from about 1° to about 89°, and in one embodiment from about 30° to about 75°, relative to the direction of flow. The angle of orientation may be an oblique angle. The angled surface features may be aligned toward the direction of flow or against the direction of flow. The flow of fluid in contact with the surface features may force some of the fluid into depressions in the surface features, while other fluids may flow above the surface features. Flow within the surface features may conform with the surface feature and be at an angle to the direction of the bulk flow in the channel. As fluid exits the surface features it may exert momentum in the x and y direction for an x,y,z coordinate system wherein the bulk flow is in the z direction. This may result in a churning or rotation in the flow of the fluids. This pattern may be helpful for mixing.

Two or more surface feature regions within the process microchannels may be placed in series such that mixing of the fluids may be accomplished using a first surface feature region, followed by at least one second surface feature region where a different flow pattern may be used.

The surface features may have two or more layers stacked on top of each other or intertwined in a three-dimensional pattern. The pattern in each discrete layer may be the same or different. Flow may rotate or advect in each layer or only in one layer. Sub-layers, which may not be adjacent to the bulk flow path of the channel, may be used to create additional surface area. The flow may rotate in the first level of surface features and diffuse molecularly into the second or more sublayers to promote reaction. Three-dimensional surface features may be made via metal casting, photo-chemical machining, laser cutting, etching, ablation, or other processes where varying patterns may be broken into discrete planes as if stacked on top of one another. Three-dimensional surface features may be provided adjacent to the bulk flow path within the microchannel where the surface features have different depths, shapes, and/or locations accompanied by sub-features with patterns of varying depths, shapes and/or locations.

An example of a three-dimensional surface feature structure may comprise recessed oblique angles or chevrons at the interface adjacent the bulk flow path of the microchannel. Beneath the chevrons there may be a series of three-dimensional structures that connect to the surface features adjacent to the bulk flow path but are made from structures of assorted shapes, depths, and/or locations. It may be further advantageous to provide sublayer passages that do not directly fall beneath an open surface feature that is adjacent to the bulk flow path within the microchannel but rather connect through one or more tortuous two-dimensional or three-dimensional passages. This approach may be advantageous for creating tailored residence time distributions in the microchannels, where it may be desirable to have a wider versus more narrow residence time distribution.

The length and width of a surface feature may be defined in the same way as the length and width of a channel. The depth may be the distance which the surface feature sinks into or rises above the microchannel surface. The depth of the surface features may correspond to the direction of stacking a stacked and bonded microchannel device with surface features formed on or in the sheet surfaces. The dimensions for the surface features may refer the maximum dimension of a surface feature; for example the depth of a rounded groove may refer to the maximum depth, that is, the depth at the bottom of the groove.

The surface features may have depths that are up to about 5 mm, and in one embodiment up to about 2 mm, and in one embodiment in the range from about 0.01 to about 5 mm, and in one embodiment in the range from about 0.01 to about 2 mm, and in one embodiment in the range from about 0.01 mm to about 1 mm. The width of the surface features may be sufficient to nearly span the microchannel width (for example, herringbone designs), but in one embodiment (such as fill features) may span about 60% or less of the width of the microchannel, and in one embodiment about 50% or less, and in one embodiment about 40% or less, and in one embodiment from about 0.1% to about 60% of the microchannel width, and in one embodiment from about 0.1% to about 50% of the microchannel width, and in one embodiment from about 0.1% to about 40% of the microchannel width. The width of the surface features may be in the range from about 0.05 mm to about 100 cm, and in one embodiment in the range from about 0.5 mm to about 5 cm, and in one embodiment in the range from about 1 to about 2 cm.

Multiple surface features or regions of surface features may be included within a channel, including surface features that recess at different depths into one or more microchannel walls. The spacing between recesses may be in the range from about 0.01 mm to about 10 mm, and in one embodiment in the range from about 0.1 to about 1 mm. The surface features may be present throughout the entire length of a microchannel or in portions or regions of the channel. The portion or region having surface features may be intermittent so as to promote a desired mixing or unit operation (for example, separation, cooling, etc.) in tailored zones. For example, a one-centimeter section of a channel may have a tightly spaced array of surface features, followed by four centimeters of a flat channel without surface features, followed by a two-centimeter section of loosely spaced surface features. The term "loosely spaced surface features" may be used to refer to surface features with a pitch or feature to feature distance that is more than about five times the width of the surface feature.

The surface features may be positioned in one or more surface feature regions that extend substantially over the entire axial length of a channel. In one embodiment, a channel may have surface features extending over about 50% or less of its axial length, and in one embodiment over about 20% or less of its axial length. In one embodiment, the surface features may extend over about 10% to about 100% of the axial length of the channel, and in one embodiment from about 20% to about 90%, and in one embodiment from about 30% to about 80%, and in one embodiment from about 40% to about 60% of the axial length of a channel.

Each surface feature leg may be at an oblique angle relative to the bulk flow direction. The feature span length or span may be defined as being normal to the feature orientation. As an example, one surface feature may be a diagonal depression at a 45 degree angle relative to a plane orthogonal to the mean direction of bulk flow in the main channel with a 0.38 mm opening or span or feature span length and a feature run length of 5.6 mm. The run length may be the distance from one end to the other end of the surface feature in the longest direction, whereas the span or feature span length may be in the shortest direction (that is not depth). The surface feature depth may be the distance way from the main channel. For surface features with a nonuniform width (span), the span may be the average span averaged over the run length.

A surface feature may comprise a recess or a protrusion based on the projected area at the base of the surface feature or the top of the surface feature. If the area at the top of the surface feature is the same or exceeds the area at the base of the surface feature, then the surface feature may be considered to be recessed. If the area at the base of the surface feature exceeds the area at the top of the surface feature, then it may be considered to be protruded. For this description, the surface features may be described as recessed although it is to be understood that by changing the aspect ratio of the surface feature it may be alternatively defined as a protrusion. For a process microchannel defined by walls that intersect only the tops of the surface features, especially for a flat channel, all surface features may be defined as recessed and it is to be understood that a similar channel could be created by protruding surface features from the base of a channel with a cross section that includes the base of the surface features.

The process microchannels and/or heat exchange channels may have at least about 20%, and in one embodiment at least about 35%, and in one embodiment at least about 50%, and in one embodiment at least about 70%, and in one embodiment at least about 90% of the interior surface of the channel (measured in cross-section perpendicular to length; i.e., perpendicular to the direction of net flow through the channel) that contains surface features. The surface features may cover a continuous stretch of at least about 1 cm, and in one embodiment at least about 5 cm. In the case of an enclosed channel, the percentage of surface feature coverage may be the portion of a cross-section covered with surface features as compared to an enclosed channel that extends uniformly from either the base or the top of the surface feature or a constant value in-between. The latter may be a flat channel. For example, if a channel has patterned top and bottom surfaces that are each 0.9 cm across (wide) and unpatterned side walls that are 0.1 cm high, then 90% of the surface of the channel would contain surface features.

The process microchannel may be enclosed on all sides, and in one embodiment the channel may have a generally square or rectangular cross-section (in the case of rectangular channel, surface feature patterning may be positioned on both major faces). For a generally square or rectangular channel, the channel may be enclosed on only two or three sides and only the two or three walled sides may be used in the above described calculation of percentage surface features. In one embodiment, the surface features may be positioned on cylindrical channels with either constant or varying cross section in the axial direction.

Each of the surface feature patterns may be repeated along one face of the channel, with variable or regular spacing between the surface features in the channel bulk flow direction. Some embodiments may have only a single leg to each surface feature, while other embodiments may have multiple legs (two, three, or more). For a wide-width channel, multiple surface features or columns of repeated surface features may be placed adjacent to one another across the width of the channel. For each of the surface feature patterns, the feature depth, width, span, and spacing may be variable or constant as the pattern is repeated along the bulk flow direction in the main channel. Also, surface feature geometries having an apex connecting two legs at different angles may have alternate embodiments in which the surface feature legs may not be connected at the apex.

An advantage of the inventive process, at least in one embodiment, is that the gap distances between the process microchannels, optional reactant stream channels, and heat exchange channels may be the same whether the process is intended for laboratory or pilot plant scale or for full production scale. As a result, the dispersion of the second reactant into the reaction mixture used in the inventive process may be substantially the same whether the microchannel reactor is built on a laboratory, pilot plant scale or as a full scale plant unit.

The catalyst may be segregated into separate reaction zones in the process microchannels in the direction of flow through the process microchannels. The same or different catalyst or catalyst composition may be used in each reaction zone. In each reaction zone the length of one or more adjacent heat exchange zone(s) may vary in their dimensions. For example, in one embodiment, the length of the one or more adjacent heat exchange zones may be less than about 50% of the length of each reaction zone. Alternatively, the one or more heat exchange zones may have lengths that are more than about 50% of the length of each reaction zone up to about 100% of the length of each reaction zone.

The catalyst may be in the form of a catalyst bed that is graded in composition or graded with a thermally conductive inert material. The thermally conductive inert material may be interspersed with the active catalyst. Examples of thermally conductive inert materials that may be used include diamond powder, silicon carbide, aluminum, alumina, copper, graphite, and the like. The bed fraction may range from 100% by weight active catalyst to less than about 10% by weight active catalyst. In an alternate embodiment the thermally conductive inert material may be deployed at the center or within the catalyst particles. The active catalyst may be deposited on the outside, inside or intermittent within a composite structure that includes the thermally conductive inert. The resulting catalyst composite structure may have an effective thermal conductivity when placed in a process microchannel that is at least about 0.5 W/m/K, and in one embodiment at least about 1 W/m/K, and in one embodiment at least about 2 W/m/K.

The catalyst may be in the form of a catalyst bed that is graded only locally within the reactor. For example, a process microchannel may contain a catalyst bed with a first reaction zone and a second reaction zone. The top or bottom (or front or back) of the catalyst bed may be graded in composition whereby a more or less active catalyst is employed in all or part of the first or second reaction zone. The composition that is reduced in one reaction zone may generate less heat per unit volume and thus reduce the hot spot and potential for the production of undesirable by-products. The catalyst may be graded with an inert material in the first and/or second reaction zone, in full or in part. The first reaction zone may contain a first composition of catalyst or inert material, while the second reaction zone may contain a second composition of catalyst or inert material.

In one embodiment, different particle sizes may be used in different axial length regions of the process microchannels to provide for graded catalyst beds. For example, very small particles may be used in a first reaction zone while larger particles may be used in a second reaction zone. The average particle diameters may be less than half the height or gap of the process microchannels. The very small particles may be less than one-fourth of the process microchannel height or gap. Larger particles may cause lower pressure drops per unit length of the process microchannels and may also reduce the catalyst effectiveness. The effective thermal conductivity of the catalyst bed may be lower for larger size particles. Smaller particles may be used in regions where improved heat transfer is sought throughout the catalyst bed or alternatively larger particles may be used to reduce the local rate of heat generation.

In one embodiment, relatively short contact times, high selectivity to the desired product and relatively low rates of deactivation of the catalyst may be achieved by limiting the diffusion path required for the catalyst. This may be achieved when the catalyst is in the form of a thin layer on an engineered support such as a metallic foam or on the wall of the process microchannel. This allows for increased space velocities. In one embodiment, the thin layer of catalyst may be produced using chemical vapor deposition or by a chemical reaction in a solution, for example, electroless plating. This thin layer may have a thickness in the range up to about 5 microns, and in one embodiment from about 0.1 to about 5 microns, and in one embodiment from about 0.5 to about 3 microns, and in one embodiment from about 1 to about 3 microns, and in one embodiment about 2.5 microns. These thin layers may reduce the time the reactants are within the active catalyst structure by reducing the diffusional path. This decreases the time the reactants spend in the active portion of the catalyst. The result may be increased selectivity to the product and reduced unwanted by-products. An advantage of this mode of catalyst deployment is that, unlike conventional catalysts in which the active portion of the catalyst may be bound up in an inert low thermal conductivity binder, the active catalyst film may be in intimate contact with either the engineered structure or the wall of the process microchannel. This may leverage high heat transfer rates attainable in the microchannel reactor and allow for close control of temperature. This may result in the ability to operate at increased temperature (faster kinetics) without promoting the formation of undesired by-products, thus producing higher productivity and yield and prolonging catalyst life.

The microchannel reactor configuration may be tailored to match the reaction kinetics. For example, near the entrance or top of a first reaction zone of the reactor, the microchannel height or gap may be smaller than in a second reaction zone near the exit or bottom of the reactor. Alternatively, the zones may be much smaller than half the reactor length. For example, a first process microchannel height or gap may be used for the first 25%, 50%, 75%, or 90% of the length of the process microchannel, while a larger second height or gap may be used in a second reaction zone downstream from the first reaction zone. Alternatively, different configurations may be used. For example, a larger process microchannel height or gap may be used near the entrance of the process microchannels and a smaller process microchannel height or gap may be used near the reactor exit. In one embodiment, other gradations in the process microchannel height or gap may be used. For example, a first height or gap may be used near the entrance of the microchannel to provide a first reaction zone, a second height or gap downstream from the first reaction zone may be used to provide a second reaction zone, and a third height or gap may be used to provide a third reaction zone near the exit of the microchannel. The first and third heights or gaps may be the same or different. The first and third heights or gaps may be larger or smaller than the second height or gap. The third height or gap may be smaller or larger than the second height or gap. The second height or gap may be larger or smaller than the third height or gap.

The openings or apertures 254 (FIGS. 10-14) may be of sufficient size to permit the flow of the hydrogen reactant through the apertured sections. The openings 254 may be referred to as pores. The apertured section 258 may have thicknesses in the range from about 0.01 to about 50 mm, and in one embodiment about 0.05 to about 10 mm, and in one embodiment about 0.1 to about 2 mm. The openings 254 may have average diameters in the range up to about 1000 microns, and in one embodiment up to about 250 microns, and in one embodiment up to about 50 microns, and in one embodiment in the range from about 0.001 to about 50 microns, and in one embodiment from about 0.05 to about 50 microns, and in one embodiment from about 0.1 to about 50 microns. In one embodiment, the openings 254 may have average diameters in the range from about 0.5 to about 10 nanometers (nm), and in one embodiment about 1 to about 10 nm, and in one embodiment about 5 to about 10 nm. The number of openings 254 in the apertured section 258 may be in the range from about 1 to about $5 \times 10^8$ openings per square centimeter, and in one embodiment about 1 to about $1 \times 10^6$ openings per square centimeter. The openings 254 may or may not be isolated from each other. A portion or all of the openings 254 may be in fluid communication with other openings 254 within the apertured section 258; that is, a fluid may flow from one opening to another opening. The ratio of the thickness of the apertured section 258 to the length of the apertured section along the flow path of the fluids flowing through the process microchannels 210 may be in the range from about 0.001 to about 1, and in one embodiment about 0.01 to about 1, and in one embodiment about 0.03 to about 1, and in one embodiment about 0.05 to about 1, and in one embodiment about 0.08 to about 1, and in one embodiment about 0.1 to about 1.

The apertured section 258 may be constructed of any material that provides sufficient strength and dimensional stability to permit the operation of the inventive process. These materials include: steel (e.g., stainless steel, carbon steel, and the like); monel; inconel; aluminum; titanium; nickel; copper; chromium; brass; alloys of any of the foregoing metals; polymers (e.g., thermoset resins); ceramics; glass; composites comprising one or more polymers (e.g., thermoset resins) and fiberglass; quartz; silicon; microporous carbon, including carbon nanotubes or carbon molecular sieves; zeolites; or a combination of two or more thereof. The openings 254 may be formed using known techniques such as laser drilling, microelectro machining system (MEMS), lithography electrodeposition and molding (LIGA), electrical sparkling, or electrochemical or photochemical etching. The openings 254 may be formed using techniques used for making structured plastics, such as extrusion, or membranes, such as aligned carbon nanotube (CNT) membranes. The openings 254 may be formed using techniques such as sintering or compressing metallic powder or particles to form tortuous interconnected capillary channels and the techniques of membrane fabrication. The openings 254 may be reduced in size from the size provided by any of these methods by the application of coatings over the apertures internal side walls to partially fill the apertures. The selective coatings may also form a thin layer exterior to the porous body that provides the smallest pore size adjacent to the continuous flow path. The smallest average pore opening may be in the range from about one nanometer to about several hundred microns depending upon the desired droplet size for the emulsion. The aperatures may be reduced in size by heat treating as well as by methods that form an oxide scale or coating on the internal side walls of the apertures. These techniques may be used to partially occlude the aperatures to reduce the size of the openings for flow.

The apertured section 258 may be made from a metallic or nonmetallic porous material having interconnected channels or pores of an average pore size in the range from about 0.01 to about 200 microns. These pores may function as the openings 254. The porous material may be made from powder or particulates so that the average inter-pore distance is similar to the average pore size. When very small pore sizes are used, the inter-pore distance may also be very small. The porous material may be tailored by oxidization at a high temperature in the range from about 300° C. to about 1000° C. for a duration of about 1 hour to about 20 days, or by coating a thin layer of another material such as alumina by sol coating or nickel using chemical vapor deposition over the surface and the inside of pores to block the smaller pores, decrease pore size of larger pores, and in turn increase the inter-pore distance.

The cooling of the process microchannels during the inventive process, in one embodiment, is advantageous for reducing the formation of undesired coke. As a result of this cooling, in one embodiment, the temperature of the feed streams entering the entrance to the process microchannels may be within about 200° C., and in one embodiment within about 100° C., and in one embodiment within about 50° C., and in one embodiment within about 20° C., of the temperature of the product exiting the process microchannels.

The hydrocracking catalyst may be any hydrocracking catalyst. These catalysts may include zeolite catalysts including beta zeolite, omega zeolite, L-zeolite, ZSM-5 zeolites and Y-type zeolites. The hydrocracking catalyst may comprise one or more pillared clays, MCM-41, MCM-48, HMS, or a combination of two or more thereof. The hydrocracking catalyst may comprise Pt, Pd, Ni, Co, Mo, W, or a combination of two or more thereof. The hydrocracking catalyst may include a refractory inorganic oxide such as alumina, magnesia, silica, titania, zirconia and silica-alumina. The hydrocracking catalyst may comprise a hydrogenation component. Examples of suitable hydrogenation components include metals of Group IVB and Group VIII of the Periodic Table and compounds of such metals. Molybdenum, tungsten, chromium, iron, cobalt, nickel, platinum, palladium, iridium, osmium, rhodium and ruthenium may be used as the hydrogenation component. These catalysts are described in U.S. Pat. No. 6,312,586 B1, which is incorporated herein by reference.

The hydrotreating catalyst may be any hydrotreating catalyst. The hydrotreating catalyst may comprise Ni, Mo, Co, W, or combinations of two or more thereof supported on alumina. The catalyst may comprise Mo—W/$Al_2O_3$.

The FT catalysts, hydrocracking and hydrotreating catalysts that are used in the microchannel reactor may have any size and geometric configuration that fits within the process microchannels. The catalyst may be in the form of particulate solids (e.g., pellets, powder, fibers, and the like) having a median particle diameter of about 1 to about 1000 μm (microns), and in one embodiment from about 10 to about 500 μm, and in one embodiment from about 25 to about 300 μm, and in one embodiment from about 80 to about 300 μm. In one embodiment, the catalyst is in the form of a fixed bed of particulate solids.

Figures 17, 18, 19:
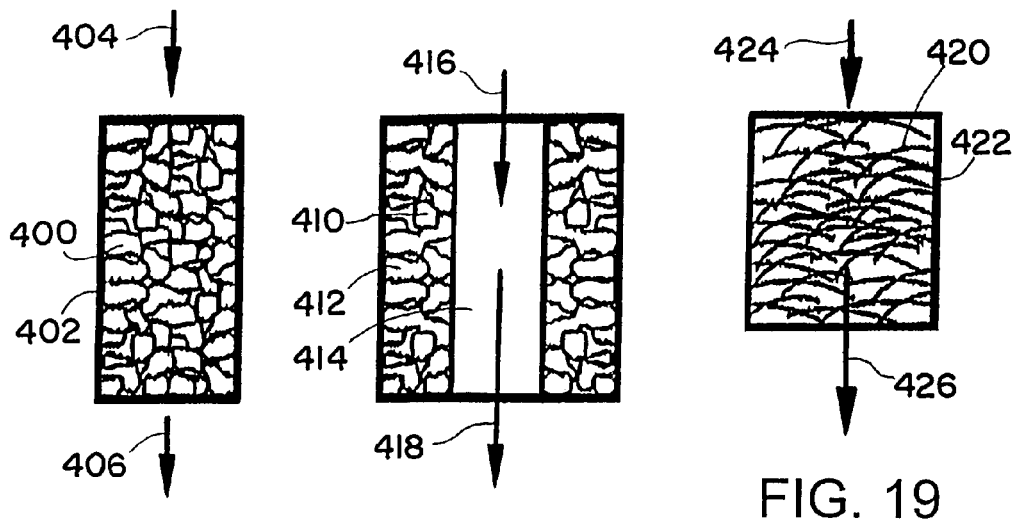

The catalyst may be in the form of a bed of particulate solids. The median particle diameter may be in the range from about 1 to about 1500 μm, and in one embodiment from about 10 to about 500 μm. This is shown in FIG. 17 wherein a bed of particulate solids 400 is packed in process microchannel 402. Reactants flow into the process microchannel as indicated by arrow 404 and product flows out of the process microchannel as indicated by arrow 406. Microfibers (e.g. within a catalyst bed or catalyst bale and/or coated with catalyst) to promote good liquid distribution across a catalyst may be used.

Foams for retaining catalyst particles and/or coated foams, including graphite foams, silicon carbide, metal, ceramic, and/or internal coatings of graphene for high thermal conductivity coating may be used.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces there between. The term "wad" is used herein to refer to a structure of tangled strands, like steel wool. The catalyst may be supported on a honeycomb structure.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 18. In FIG. 18, the catalyst 410 is contained within process microchannel 412. An open passage way 414 permits the flow of fluid through the process microchannel 412 in contact with the catalyst 410 as indicated by arrows 416 and 418.

The catalyst may be supported on a flow-through support structure such as a foam, wad, pellet, powder, or gauze. An example of a flow-through structure is illustrated in FIG. 19. In FIG. 19, the flow-through catalyst 420 is contained within process microchannel 422 and the fluid flows through the catalyst 420 as indicated by arrows 424 and 426.

The support structure for a flow-through catalyst may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels, grown on the walls from solution, or coated in situ on a fin structure or other support structure. The catalyst may be in the form of one or more pieces of porous contiguous material. In one embodiment, the catalyst may be comprised of a contiguous material and has a contiguous porosity such that molecules can diffuse through the catalyst. In this embodiment, the fluids flow through the catalyst rather than around it. In one embodiment, the cross-sectional area of the catalyst occupies about 1 to about 99%, and in one embodiment about 10 to about 95% of the cross-sectional area of the process microchannels. The catalyst may have a surface area, as measured by BET, of greater than about 0.5 $m^2/g$, and in one embodiment greater than about 2 $m^2/g$.

The catalyst may comprise a porous support, an interfacial layer on the porous support, and a catalyst material on the interfacial layer. The interfacial layer may be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 µm. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 µm, and in one embodiment about 0.05 to about 5 µm.

In one embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 µm, and in one embodiment from about 1 to about 50 µm. The interfacial layer may be either crystalline or amorphous. The interfacial layer may have a BET surface area of at least about 1 $m^2/g$.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i.e., interfacial layer) surface, in crevices in the support layer, and in open pores in the support layer.

The catalyst may be in the form of a bed of particulate solids positioned in a reaction zone wherein one or more interior walls of the reaction zone includes additional catalyst washcoated and/or grown thereon. The catalyst in the bed of particulate solids may be the same as the catalyst washcoated and/or grown on the interior walls of the reaction zone, or it may be different.

Figure 20:
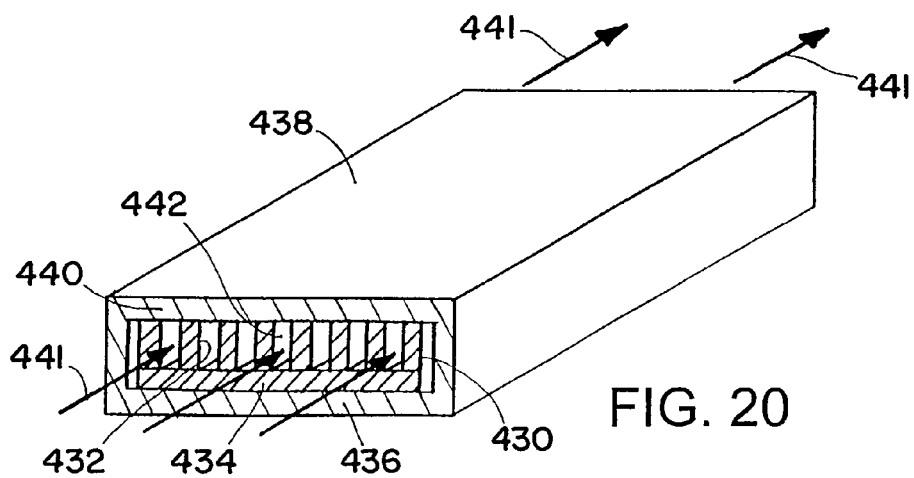
Figures 21, 22:
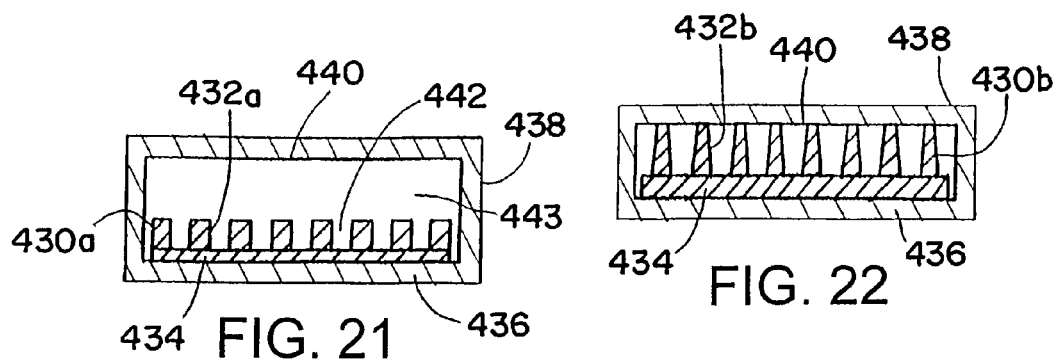

The catalyst may be supported on an assembly of one or more fins or other structures positioned within the process microchannels. Examples are illustrated in FIGS. 20-22. Referring to FIG. 20, fin assembly 430 includes fins 432 which are mounted on fin support 434 which overlies base wall 436 of process microchannel 438. The fins 432 project from the fin support 434 into the interior of the process microchannel 438. The fins 432 extend to and may contact the interior surface of upper wall 440 of process microchannel 438. Fin channels 442 between the fins 432 provide passage ways for fluid to flow through the process microchannel 438 parallel to its length. Each of the fins 432 has an exterior surface on each of its sides, this exterior surface provides a support base for the catalyst. With the inventive process, the reactant composition flows through the fin channels 442, contacts the catalyst supported on the exterior surface of the fins 432, and reacts to form the product. The fin assembly 430a illustrated in FIG. 21 is similar to the fin assembly 430 illustrated in FIG. 20 except that the fins 432a do not extend all the way to the interior surface of the upper wall 440 of the microchannel 438. The fin assembly 430b illustrated in FIG. 22 is similar to the fin assembly 430 illustrated in FIG. 20 except that the fins 432b in the fin assembly 430b have cross sectional shapes in the form of trapezoids. Each of the fins may have a height ranging from about 0.02 mm up to the height of the process microchannel 438, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 438, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 438 may range from about 1 to about 50 fins per centimeter of width of the process microchannel 438, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 20 or 21, or a trapezoid as illustrated in FIG. 22. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); aluminum; titanium; nickel; platinum; rhodium; copper; chromium; alloys of any of the foregoing metals; monel; inconel; brass; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

The catalyst may be supported by a microgrooved support strip. Examples of these support strips are illustrated in FIGS. 23 and 24. Referring to FIG. 23, process microchannel 450 includes support strip 452 mounted on interior wall 454 of the process microchannel 450. Bulk flow region 456 is defined by the space within the process microchannel 450 between the support strip 452 and the top channel wall 457. Process fluid flows through the process microchannel 450 as indicated by arrows 458 and 460. In flowing through the process microchannel 450, the process fluid flows through the bulk flow region 456 in contact with the catalyst support strip 452. The catalyst may be in the form of microsized particulates positioned in the microgrooves 462. The support strip 452 is a flow-by support strip. However, some of the process fluid may flow in the microgrooves 462 in contact with the catalyst. The flow of the process fluid through the microgrooves 462 may be in the general direction from the front edge 463 and the first side edge 464 toward the second side edge 466 and the back edge 468. The process microchannel illustrated in FIG. 24 is similar to the process microchannel illustrated in FIG. 23 with the exception that the process microchannel 450 illustrated in FIG. 24 contains opposite interior walls 454 and 457 and a catalyst supporting support strip 452 mounted on each of the opposite interior walls. Additional details concerning the construction and use of the microgrooved support strip 452 can be found in US Patent Publication No. U.S. 2007-0225532A1, which is incorporated herein by reference.

Surface features can be used in combination with a supported catalyst to enhance contact between the reactants and the catalyst. This is shown in FIG. 25. Referring to FIG. 25, process microchannel 450 which has support strip 452 mounted on interior wall 454 and surface features 470 formed in the opposite interior wall 457. Process fluid flows through the process microchannel 450 as indicated by arrows 472. The flow of the process fluid is modified as the process fluid flows through surface features 470. The surface features 470 illustrated in FIG. 25 are in the form of hemispherical depressions in the microchannel wall 457. The modification of the flow of the process fluids by the surface features 470 enhances contact between the process fluid and the catalyst supported by the support strip 452.

A sintered ceramic or metal material (e.g., one micron, Inconel sintered metal) may be used to contact the catalyst or to support the catalyst in the microchannel reactor. The sintered material may be contained or attached to interior walls of solid metal "sleeves" to form a unit, which may serve as individual pressure vessels and may be added for capacity/replacement. The sintered metal and/or metal sleeves may comprise a high thermal conductivity metal such as copper, aluminum or titanium. Catalyst particles may be loaded into the subassemblies. The catalyst may be coated using solution coating, slurry coating, sol-gel coating, physical vapor deposition, chemical vapor deposition or electroless plating onto the sintered metal.

The catalyst may be regenerated. This may be done by flowing a regenerating fluid through the process microchannels in contact with the catalyst. The regenerating fluid may comprise hydrogen or a diluted hydrogen stream, hydrogen sulphide (or other sulphur containing compound) or a diluted hydrogen sulphide (or other sulphur containing compound) stream, oxygen or an oxygen containing stream, or a stream containing a halogen containing gas or a mixture of oxygen and a halogen containing gas. Halogen compounds may include metal halides and organic halides. The diluent may comprise nitrogen, argon, helium, methane, ethylene, carbon dioxide, steam, or a mixture of two or more thereof. The regenerating fluid may flow from the header through the process microchannels and to the footer, or in the opposite direction from the footer through the process microchannels to the header. The temperature of the regenerating fluid may be from about 20 to about 600° C., and in one embodiment about 150 to about 400° C. The pressure within the process microchannels during this regeneration step may range from about 0.1 to about 4 MPa, and in one embodiment about 0.1 to about 2 MPa, and in one embodiment about 0.1 to about 0.5 MPa. The residence time for the regenerating fluid in the process microchannels may range from about 0.01 to about 1000 seconds, and in one embodiment about 0.1 second to about 100 seconds.

The catalyst may be regenerated in-situ in the process microchannels by oxidizing a carbonaceous material on the surface of the catalyst or by removing carbonaceous materials via hydrogenation. The catalysts may be regenerated via sulphiding.

The plant facility used for conducting the inventive process may comprise a plurality of process microchannels, microchannel reactors, or reaction vessels containing one or more microchannel reactors. The catalyst in one or more of the process microchannels, microchannel reactors or reaction vessels may be regenerated, while the inventive process may be carried out simultaneously in other process microchannels, microchannel reactors or reaction vessels in the plant facility.

The inventive process may be conducted using a regenerated catalyst at relatively high weight hourly space velocities (WHSV), for example, at least about 2 $hr^{-1}$, or at least about 5 $hr^{-1}$, or at least about 10 $hr^{-1}$. The process may be conducted under stable operating conditions using the regenerated catalyst for extended periods of time, for example, periods in excess of about 1000 hours.

The process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels.

The heat exchange fluid may be any fluid. These may include air, steam, liquid water, steam, gaseous nitrogen, other gases including inert gases, carbon monoxide, molten salt, oils such as mineral oil, a gaseous hydrocarbon, a liquid hydrocarbon, heat exchange fluids such as Dowtherm A and Therminol which are available from Dow-Union Carbide, or a mixture of two or more thereof.

The heat exchange fluid may comprise a stream of one or more of the reactants and/or the product. This can provide process cooling for the process microchannels and/or pre-heat for the reactants and thereby increase the overall thermal efficiency of the process.

The heat exchange channels may comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range from about 200° C. to about 300° C. is an example of an endothermic process suited for an exothermic reaction such as an ethylene oxide synthesis reaction in the same temperature range. The incorporation of a simultaneous endothermic reaction to provide an improved heat sink may enable a typical heat flux of roughly an order of magnitude above the convective cooling heat flux.

The heat exchange fluid may undergo a partial or full phase change as it flows through the heat exchange channels. This phase change may provide additional heat removal from the process microchannels beyond that provided by convective cooling. For a liquid heat exchange fluid being vaporized, the additional heat being transferred from the process microchannels would result from the latent heat of vaporization required by the heat exchange fluid. An example of such a phase change would be a heat exchange fluid such as oil or water that undergoes partial boiling. In one embodiment, up to about 50% by weight of the heat exchange fluid may be vaporized.

The gaseous fraction of reactants and products may flow in the reaction zone in contact with the catalyst to produce a particle Reynolds number up to about 100000, and in one embodiment up to about 10000, and in one embodiment up to about 100, and in one embodiment in the range from about 10 to about 100, and in another in the range from about 0.01 to about 10, and in one embodiment in the range from about 0.1 to about 5.

The heat flux for heat exchange in the microchannel reactor may range from about 0.01 to about 500 watts per square centimeter of surface area of the heat transfer walls ($W/cm^2$) in the microchannel reactor, and in one embodiment from about 0.1 to about 350 $W/cm^2$, and in one embodiment from about 1 to about 250 $W/cm^2$, and in one embodiment from about 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$.

The cooling of the process microchannels during the inventive process, in one embodiment, is advantageous for controlling selectivity towards the main or desired product due to the fact that such added cooling reduces or eliminates the formation of undesired by-products from undesired parallel reactions with higher activation energies. As a result of this cooling, in one embodiment, the temperature of the reactants at the entrance to the process microchannels may be within about 20° C., and in one embodiment within about 10° C., and in one embodiment within about 5° C., and in one embodiment within about 3° C., and in one embodiment within about 2° C., and in one embodiment within about 1° C., of the temperature of the product (or mixture of product and unreacted reactants) at the outlet of the process microchannels. In one embodiment, the process microchannels may be operated with an isothermal or substantially isothermal temperature profile.

The contact time of the gaseous reactants with the catalyst in the process microchannels may range from about 1 to about 2000 milliseconds (ms), and in one embodiment from about 10 to about 1000 ms, and in one embodiment from about 100 to about 500 ms. The contact time of the liquid reactants is a function of the hold up time and may range from about 1 to about 20,000 ms, and in one embodiment from about 10 to about 5,000 ms.

The liquid hourly space velocity (LHSV) for the flow of liquid reactant in the process microchannels may be at least about 5 liters of liquid reactant per hour per liter of volume in the process microchannel ($hr^{-1}$), and in one embodiment at least about 10 $hr^{-1}$, and in one embodiment at least about 15 $hr^{-1}$, and in one embodiment at least about 20 $hr^{-1}$, and in one embodiment at least about 25 $hr^{-1}$, and in one embodiment at least about 30 hr$^{-1}$, and in one embodiment at least about 35 hr$^{-1}$, and in one embodiment at least about 40 hr$^{-1}$, and in one embodiment from about 5 to about 40 hr$^{-1}$, and in one embodiment from about 10 to about 40 hr$^{-1}$, and in one embodiment from about 20 to about 40 hr$^{-1}$, and in one embodiment from about 20 to about 30 hr$^{-1}$.

The weight hourly space velocity (WHSV) for the flow of the hydrocarbon reactant in the feed may be at least about 5 grams of hydrocarbon reactant per hour per gram of catalyst (hr$^{-1}$), and in one embodiment at least about 10 hr$^{-1}$, and in one embodiment at least about 15 hr$^{-1}$, and in one embodiment at least about 20 hr$^{-1}$, and in one embodiment at least about 25 hr$^{-1}$, and in one embodiment at least about 30 hr$^{-1}$, and in one embodiment at least about 35 hr$^{-1}$, and in one embodiment at least about 40 hr$^{-1}$, and in one embodiment in the range from about 5 to about 40 hr$^{-1}$, and in one embodiment in the range from about 10 to about 40 hr$^{-1}$, and in one embodiment in the range from about 15 to about 40 hr$^{-1}$, and in one embodiment in the range from about 20 to about 40 hr$^{-1}$, and in one embodiment in the range from about 20 to about 30 hr$^{-1}$.

In the hydrocracking process, the conversion of hydrocarbons with boiling points above about 350° C. to hydrocarbons with boiling points below about 350° C. may be at least about 50% by weight, and in one embodiment at least about 55% by weight, and in one embodiment at least about 60% by weight, and in one embodiment at least about 65% by weight, and in one embodiment at least about 70% by weight, and in one embodiment at least about 75% by weight, and in one embodiment at least about 80% by weight, and in one embodiment at least about 85% by weight, and in one embodiment at least about 90% by weight.

The average temperature of the process fluids in the process microchannels may be in the range from about 50° C. to about 500° C., and in one embodiment from about 100° C. to about 400° C., and in one embodiment from about 200° C. to about 450° C., and in one embodiment from about 300° C. to about 400° C., and in one embodiment from about 300° C. to about 390° C.

The pressure in the process microchannels may be in the range from about 2 to about 200 bars (0.2 to 20 MPa), and in one embodiment from about 2 to about 100 bars (0.2 to 10 MPa), and in one embodiment from about 10 to about 50 bars (1 to 5 MPa), and in one embodiment from about 15 to about 40 bars (1.5 to 4 MPa). The pressure may be in the range from about 1.3 to about 3.5 MPa. The pressure may be in the range from about 200 to about 500 psig (1.38 to 3.45 MPa).

The pressure drop for the process fluids as they flow in the process microchannels may range up to about 25 bars per foot of length of the process microchannel (bars/ft) (0.08 MPa/cm), and in one embodiment up to about 10 bars/ft (0.032 MPa/cm), and in one embodiment up to about 1.5 bars/ft (0.005 MPa/cm), and in one embodiment up to 1 bar/ft (0.0033 MPa/cm), and in one embodiment up to about 0.5 bar/ft (0.0016 MPa/cm).

The flow of the process fluids in the process microchannels may be laminar or in transition, and in one embodiment it is laminar. The Reynolds Number for the flow of process fluids in the process microchannels may be up to about 10,000, and in one embodiment up to about 4000, and in one embodiment up to about 2300, and in one embodiment in the range of about 1 to about 2000, and in one embodiment in the range from about 100 to about 1500.

The superficial velocity for process gas flowing in the process microchannels may be at least about 0.01 meters per second (m/s), and in one embodiment in the range from about 0.01 to about 5 m/s, and in one embodiment in the range from about 0.01 to about 2 m/s, and in one embodiment in the range from about 0.01 to about 1 m/s, and in one embodiment in the range from about 0.05 to about 0.5 m/s.

The heat exchange fluid in the heat exchange channels may have a temperature in the range from about 100° C. to about 800° C., and in one embodiment from about 250° C. to about 500° C. The difference in temperature between the heat exchange fluid and the process fluids in the process microchannel may be up to about 50° C., and in one embodiment up to about 30° C., and in one embodiment up to about 10° C. The residence time of the heat exchange fluid in the heat exchange channels may range from about 1 to about 1000 ms, and in one embodiment about 1 to about 500 ms, and in one embodiment from 1 to about 100 ms. The pressure drop for the heat exchange fluid as it flows in the heat exchange channels may be up to about 3 bar/ft, and in one embodiment up to about 1 bar/ft. The flow of the heat exchange fluid in the heat exchange channels may be laminar or in transition, and in one embodiment it is laminar. The Reynolds Number for the flow of heat exchange fluid in the heat exchange channels may be up to about 10,000, and in one embodiment up to about 4000, and in one embodiment up to about 2300, and in one embodiment in the range of about 10 to about 2000, and in one embodiment about 10 to about 1500.

The control of heat exchange during the hydrocracking process may be advantageous for controlling selectivity towards the desired product due to the fact that added cooling may reduce or eliminate the formation of undesired by-products from undesired parallel reactions with higher activation energies.

The pressure within each individual heat exchange channel in the microchannel reactor 100 may be controlled using passive structures (e.g., obstructions), orifices and/or mechanisms upstream of the heat exchange channels or in the channels. By controlling the pressure within each heat exchange channel, the temperature within each heat exchange channel can be controlled. A higher inlet pressure for each heat exchange channel may be used where the passive structures, orifices and/or mechanisms let down the pressure to the desired pressure. By controlling the temperature within each heat exchange channel, the temperature in the process microchannels may be controlled. Thus, for example, each process microchannel may be operated at a desired temperature by employing a specific pressure in the heat exchange channel adjacent to or in thermal contact with the process microchannel. This may provide the advantage of precisely controlled temperatures for each process microchannel. The use of precisely controlled temperatures for each process microchannel provides the advantage of a tailored temperature profile and an overall reduction in the energy requirements for the process.

In a scale up device, for certain applications, it may be required that the mass of the process fluid be distributed uniformly among the microchannels. Such an application may be when the process fluid is required to be cooled down with adjacent heat exchange channels. The uniform mass flow distribution may be obtained by changing the cross-sectional area from one parallel microchannel to another microchannel. The uniformity of mass flow distribution may be defined by Quality Index Factor (Q-factor) as indicated below. A Q-factor of 0% means absolute uniform distribution.

$$Q = \frac{\dot{m}_{max} - \dot{m}_{min}}{\dot{m}_{max}} \times 100$$

A change in the cross-sectional area may result in a difference in shear stress on the wall. In one embodiment, the Q-factor for the microchannel reactor 100 may be less than about 50%, and in one embodiment less than about 20%, and in one embodiment less than about 5%, and in one embodiment less than about 1%.

The free stream gaseous velocity for process fluid flowing in the process microchannels may be at least about 0.001 m/s, and in one embodiment at least about 0.01 m/s, and in one embodiment in the range from about 0.001 to about 200 m/s, and in one embodiment in the range from about 0.01 to about 100 m/s, and in one embodiment in the range from about 0.01 to about 200 m/s.

Advantages of the inventive process may include the potential for process intensification. Conventional processes of the prior art (that is, non-microchannel processes) often operate under conditions of reactant dilution to prevent runaway reactions, while the inventive process may be operated, if desired, under more intense conditions leading to greater throughput.

Example 1

Figure 28:
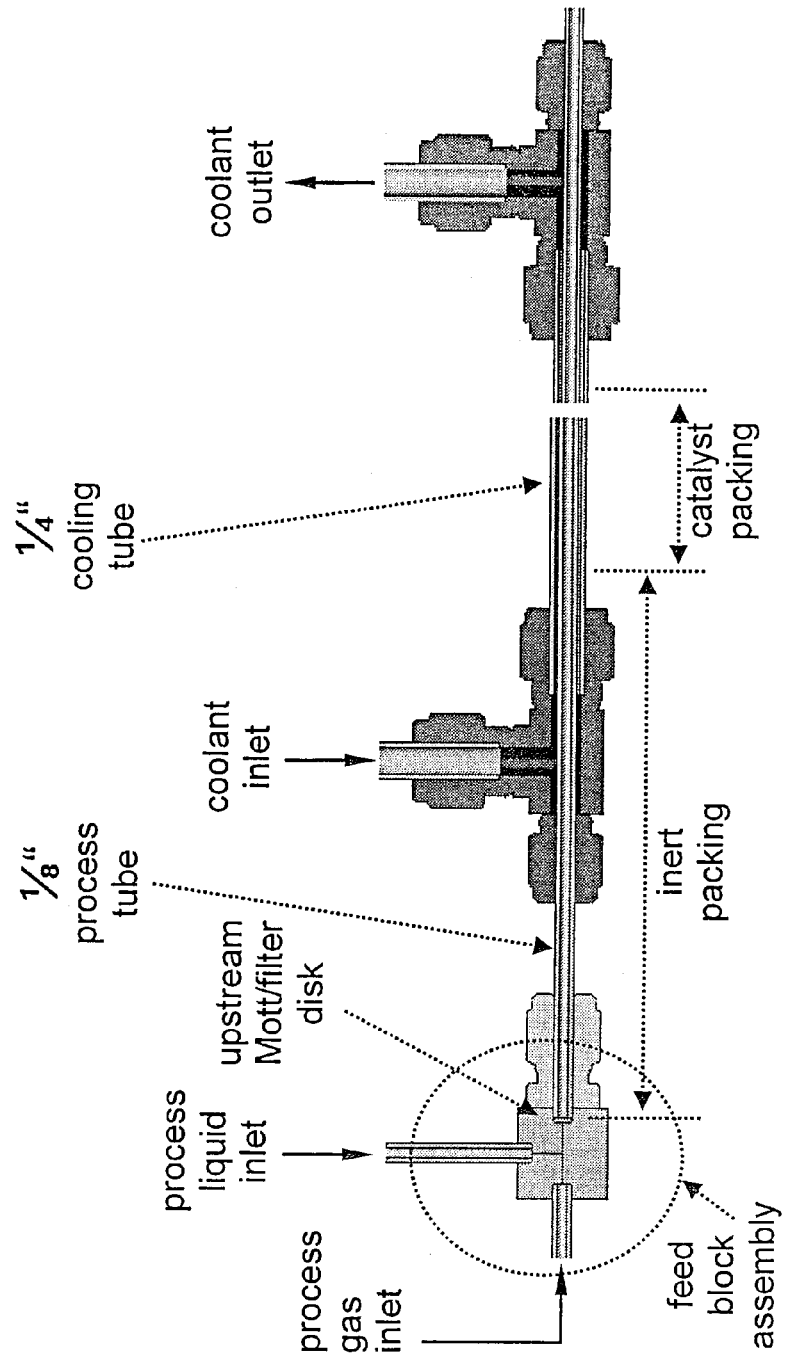
FIG. 28 is a schematic illustration of the laboratory test set-up used in Example 1.

A test device is used to conduct the inventive process. A schematic of the test device is shown in FIG. 28. The test device is a tube-in-tube type reactor assembly consisting of an inner tube with an ⅛ inch (0.32 cm) outer diameter and a outer tube with an ¼ inch (0.64 cm) outer diameter. The inner 0.125 inch tube contains the catalyst and inner diameter of the tube was 0.069 inch. A thermostatic fluid, that could be either liquid or vapor, is allowed to flow in the annulus formed between the outer wall of the 0.125 inch tube and the inner wall of the 0.25 inch tube. The reactants flow in the inner tube and contact the catalyst to form product. The coolant may flow cocurrently or countercurrently with respect to the flow of the reactants and product but in the example given here the thermostatic fluid and reactants flow co-currently.

The particle packing is retained in the device by porous metal frits located both upstream and downstream of the catalyst bed (sintered stainless steel with a 40 μm pore size provided by Mott Corporation). The upstream retainer serves to promote uniform distribution of them multiphase feed to the packed while preventing particle from leaving the reactor and moving upstream in the event of an upset; the downstream retainer prevents loss of packed material while allowing free flow of product from the device. The downstream retainer is held in place using rolled stainless steel shims. A short bed of silica-alumina support material (the catalyst support without active metal), of smaller particle size than the catalyst material, serves to promote the multiphase feed distribution and allows preheating of the feed mixture to the intended reaction temperature. All components are stainless steel. The current experimental configuration is down flow of fluids through the packed bed.

The packed bed of catalyst can be of any depth up to 30 inches (76.2 cm) (limited by the length of cooling tube). In the present example both 6 and 18 inch (15.24 and 45.72 cm) catalyst bed heights and 2-5 in (5.1-10.2 cm) of pre-bed support material are used. Shorter bed heights allow higher weight hourly space velocities (WHSV) to be achieved without changes to the hydrocarbon feed system. The surface temperature of the catalyst containing tube is measured with thermocouples (touching the outer wall of the catalyst containing tube) inserted at regular points along the cooling tube.

A feed block assembly is specifically designed to allow mixing of vapor and liquid streams. To this end, the inlet and outlet channels are designed to have small diameters, 0.013 inch (330 μm). The small diameter enhances the likelihood of intercalating the phases and thus obtaining slug flow as opposed to the segregation that results from annular flow that occurs when the liquid flows along the sidewalls and the vapor flows in the annulus. The liquid and vapor phases alternate as they come in contact with the packed bed and/or foam structure, and distribute evenly in response to capillary forces across the cross-sectional surface of the flow path. In addition, bringing in the liquid feed perpendicular to the axial flow path facilitates shearing of the interface (and droplet formation) by the vapor stream.

All device connections are made with Swagelok compression fittings. The catalyst loading process requires careful tightening of the fittings onto the feed block prior to catalyst loading to avoid powder over-compression and potential for pressure drop increase and/or blockage. Accurate placement of the beds and device loading are important to ensure the catalyst bed is fully placed within the thermostatic sleeve. Bed height is measured using a loading rod.

All reactors are packed with a pre-bed of silica alumina and a bed of catalyst. The pre-bed length is between 2-5 in (5.1-10.2 cm) with a constant packing density of 0.6 g/cc. An 18 inch (45.7 cm) bed contains approximately 0.66 g of catalyst.

Figure 29:
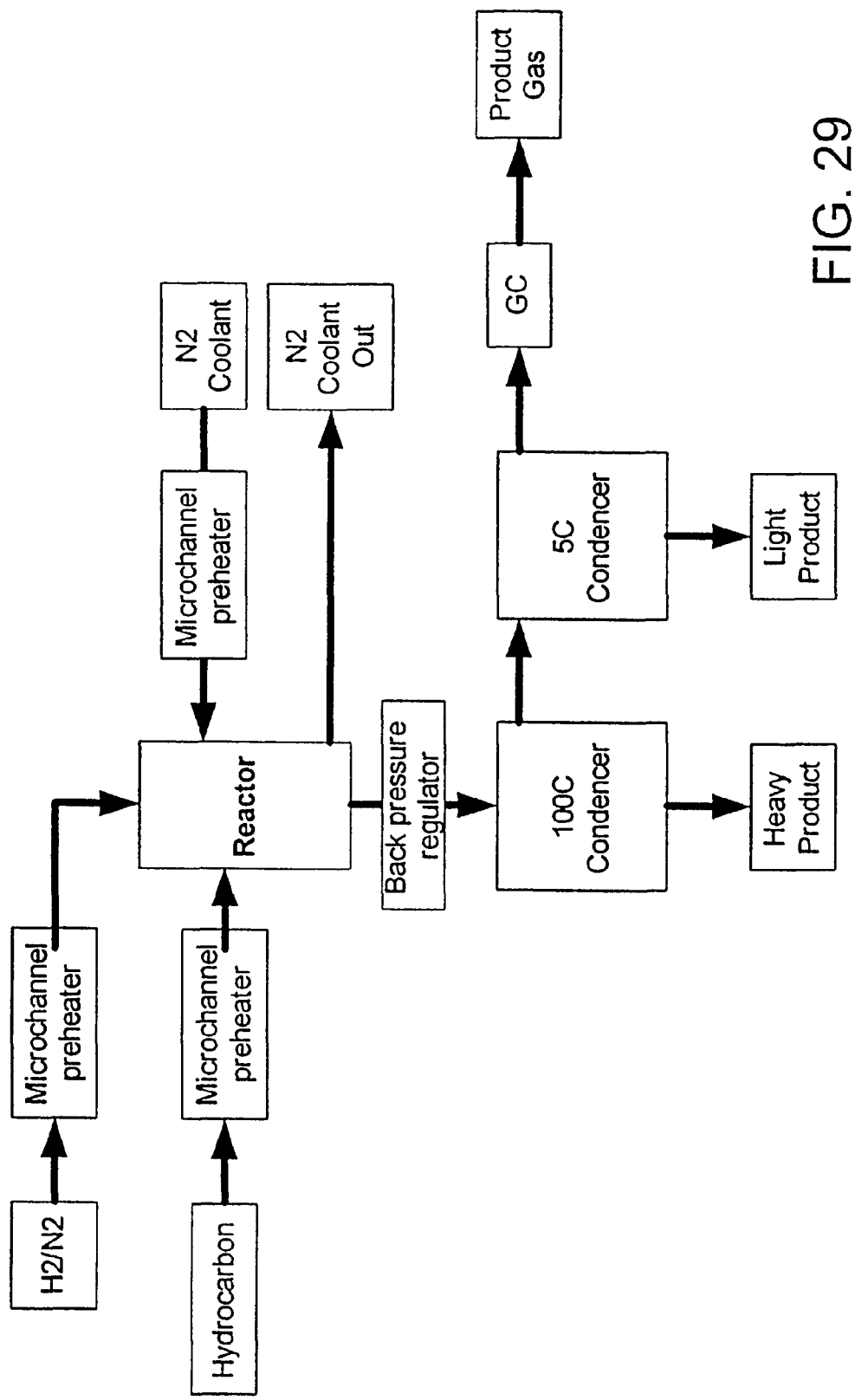
FIG. 29 is a flow sheet showing the process set up used in Example 1.
Figure 30:
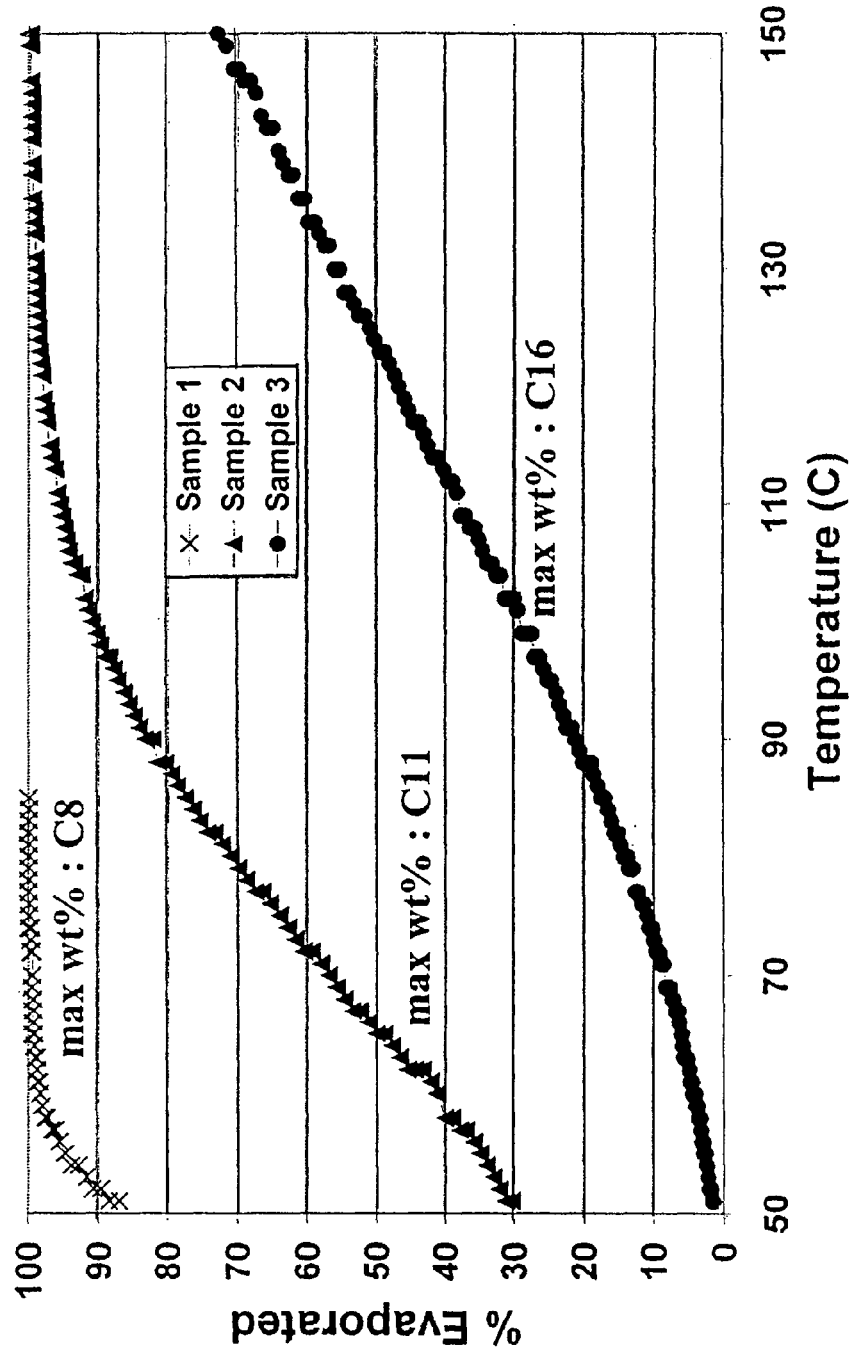
FIGS. 30 and 31 are graphs showing evaporation curves and carbon distribution curves used for product analysis in Example 1.
Figure 31:
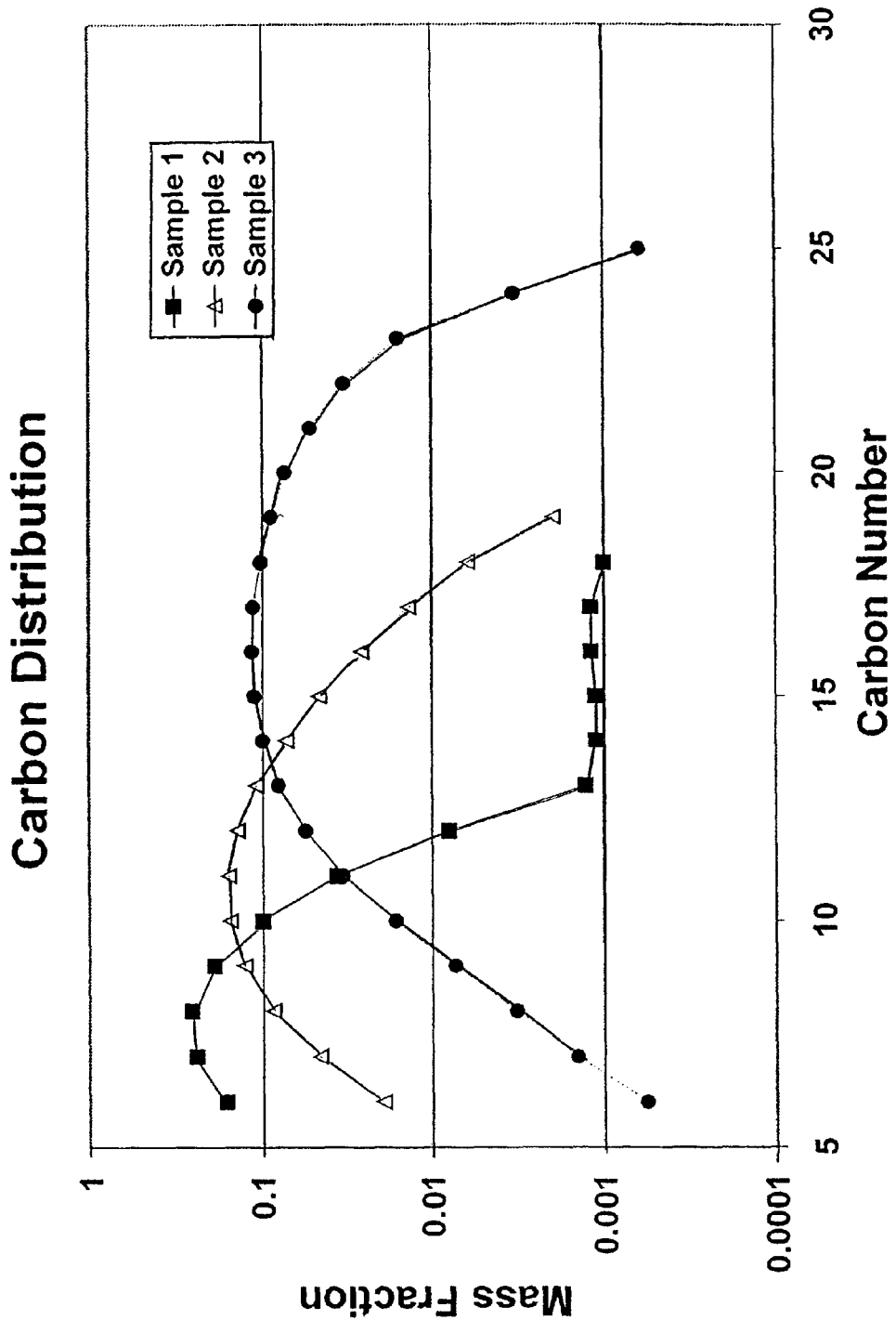

A schematic of the experimental set-up used in this example is shown in FIG. 29. A pre-mixed stream of hydrogen and nitrogen (5 mol %) is fed to the system with a mass flow controller. Nitrogen is used as a tracer. The vapor feed flow rate could be varied from 20 to 1000 sccm, depending of the desired hydrogen to wax feed ratio. The hydrocarbon wax is melted at 100° C. and delivered to the system through a high pressure dual syringe ISCO pump. The flow rate of the liquid feed could be varied from 0.001 to 0.5 ccm. Gas flow rates are calibrated with a DryCal flow calibrator. Liquid feed rates are verified by collection of a known volume of liquid over time. Both feed streams are heated by electrical resistance microchannel pre-heaters; the streams were also heat traced to ensure delivery into the reactor at a temperature range of 150 to 250° C. Temperatures in the system are measured with type K thermocouples; pressures are monitored with electronic pressure transducers.

The reactor was is at pressure by a back pressure regulator located on the product exit. It was possible to vary the reactor pressure in a range of 0 to 750 psig. The temperature is regulated between 20 and 450° C. using the combination of an electrical resistance clamshell ceramic heater placed around the reactor assembly (to set a thermal boundary condition and minimize the impact of heat loss) and a pre-heated nitrogen stream (acting as a thermostatic fluid). The nitrogen thermostatic fluid is allowed to flow in the annulus around the catalyst tube. The nitrogen thermostatic fluid is independently metered with a mass flow controller at rates ranging between 5 and 100 SLPM and heated by an electrical resistance microchannel pre-heater to a temperature ranging between 20 and 450° C.

The products are cooled and sent into a knockout drum condenser held at 100° C.; the material condensed in this first drum was collected and called the "heavy condensed product". The process stream is further cooled to 5° C. and the condensed fraction was collected in a second knockout drum. The material collected in the second drum is called the "light condensed product". The remaining gaseous process stream is sent to an Agilent micro GC (gas chromatograph). The product gas is analyzed for hydrogen, nitrogen, methane, ethane, ethylene, propane, n-butane, i-butane, and higher carbon number hydrocarbons ranging from pentane, C5, to octane, C8. For the C5 and higher vapor fractions, the GC method grouped all isomers of the same carbon number in a single fraction. The GC is regularly calibrated using premixed gas standards. The outlet dry gas flow rate is measured with a bubble flow meter. Once the liquid products are collected, their mass, density and light-to-heavy split ratio could be directly measured. The liquids are analyzed via GC for carbon number distribution (ASTMD2887, D6352), iso/normal distribution, and simulated distillation (ASTM D29887, ASTMD6352).

The catalyst is synthesized on support material, obtained from Grace Davison, having the trade designation SiAl 3113 and a composition of 86% $SiO_2$ and 13% $Al_2O_3$. The $SiO_2$—$Al_2O_3$ support is sieved to a size range of 106-225 μm. A solution containing 1.85 g of $Pt(NH_3)_4(OH)_2$ solution (9.09% Pt, Alfa) was diluted in 10.95 g of water. The resulting mixture is used to impregnate 16.60 g of $SiO_2$—$Al_2O_3$ by the incipient wetness technique. The resulting sample is dried at 120° C. for 1 hr and calcined at 450° C. for 3 hrs. Prior to use the catalyst is once again sieved to a particle size of 106-225 μm. Support particles with a size cut (determined via sieving) of 88-106 μm, are collected to be used as catalyst bed pre-packing material (material placed before the catalyst bed).

Figure 32:
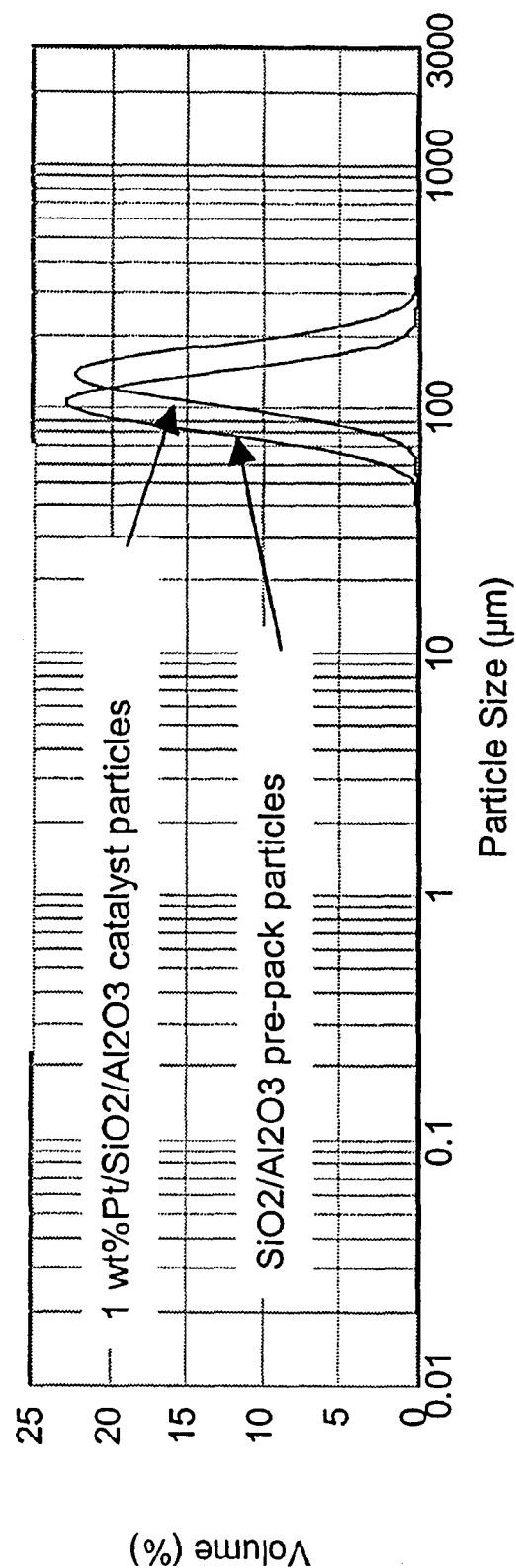
FIG. 32 shows Malvern analysis results for the packing material and catalyst used in Example 1.
Figure 33:
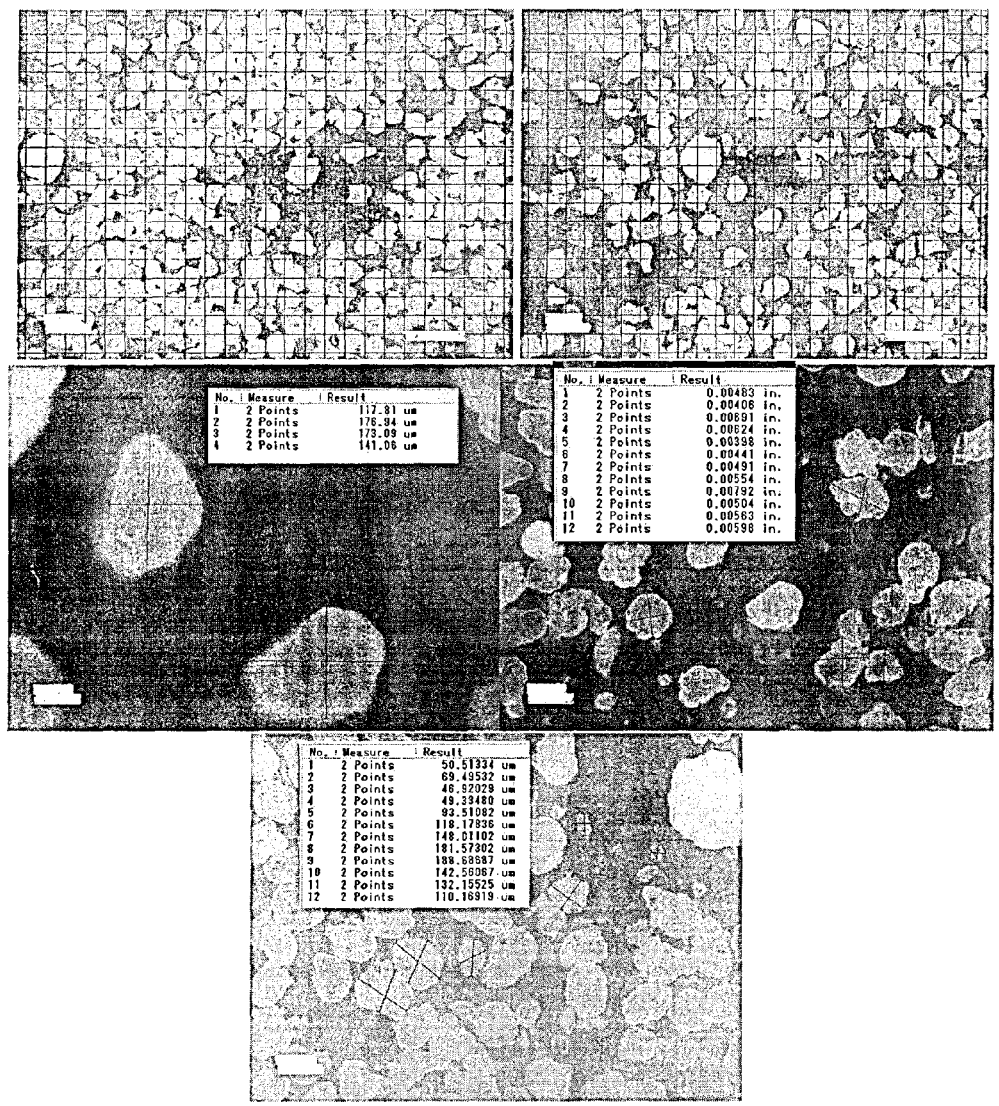
FIG. 33 show microscope pictures of the catalyst used in Example 1.

Particle size is assessed via a light scattering method using a Malvern Mastersizer. The results of particle size analysis for the inert packing material and the catalyst material are shown in FIG. 32 and indicate mean particle sizes of 100 and 140 μm, respectively. Microscope pictures of the catalyst are shown in FIG. 33. These indicate slightly smaller dimensions, on the order of 127 μm. Estimates of particle sphericity (ratio of the surface area of the particle to the surface area of a sphere with the same volume), made from the micrographs, range from 0.7 to 0.9.

Catalyst activation is performed insitu, prior to operation. A 95 mol % hydrogen, 5 mol % nitrogen stream flows through the packed bed at a constant flow rate. The reactor temperature is ramped at 1° C./min from ambient to 400° C. The temperature is maintained at 400° C. for at least 4 hours before allowing the bed to equilibrate to the intended operating condition.

Reactor performance for the tabulated and plotted runs is measured in terms of conversion, selectivity, yield, and hydrogen consumption. Definitions for these terms are given in the following expressions. Specific hydrogen consumption is calculated with the appropriate conversions to express hydrogen and carbon mass flow rates in terms of sccm.

$$conversion = \frac{\text{mass heavier than diesel fed} - \text{mass heavier than diesel in product}}{\text{mass heavier than diesel fed}} 100$$

$$selectivity = \frac{\text{mass of diesel in product} - \text{mass of diesel fed}}{\text{mass heavier than diesel fed} - \text{mass heavier than diesel in product}} 100$$

$$yield_{converted\,basis} = \frac{\text{mass of diesel in product} - \text{mass of diesel fed}}{\text{mass heavier than diesel fed}} 100$$

$$yield_{total\,basis} = \frac{\text{mass of diesel in product}}{\text{mass wax fed}} 100$$

$$specific\,H2_{consumption} = \left[\frac{\text{mass of } H_2}{\text{mass of } C_{product}} - \frac{\text{mass of } H_2}{\text{mass of } C_{feed}}\right][\text{mass of } C \text{ fed}]$$

Conversion, selectivity and yield (converted basis) were calculated from the carbon number distributions. For purposes of description here the diesel fraction is defined as containing hydrocarbons with 10 to 22 carbon atoms (inclusive) and that this carbon number range corresponds to a boiling point ranging from 175° C. to 370° C. These boiling point cut-off designations for the diesel fraction are based on FIG. 35*d*, which presents alkane boiling point relationship to its carbon number.

Figure 41:
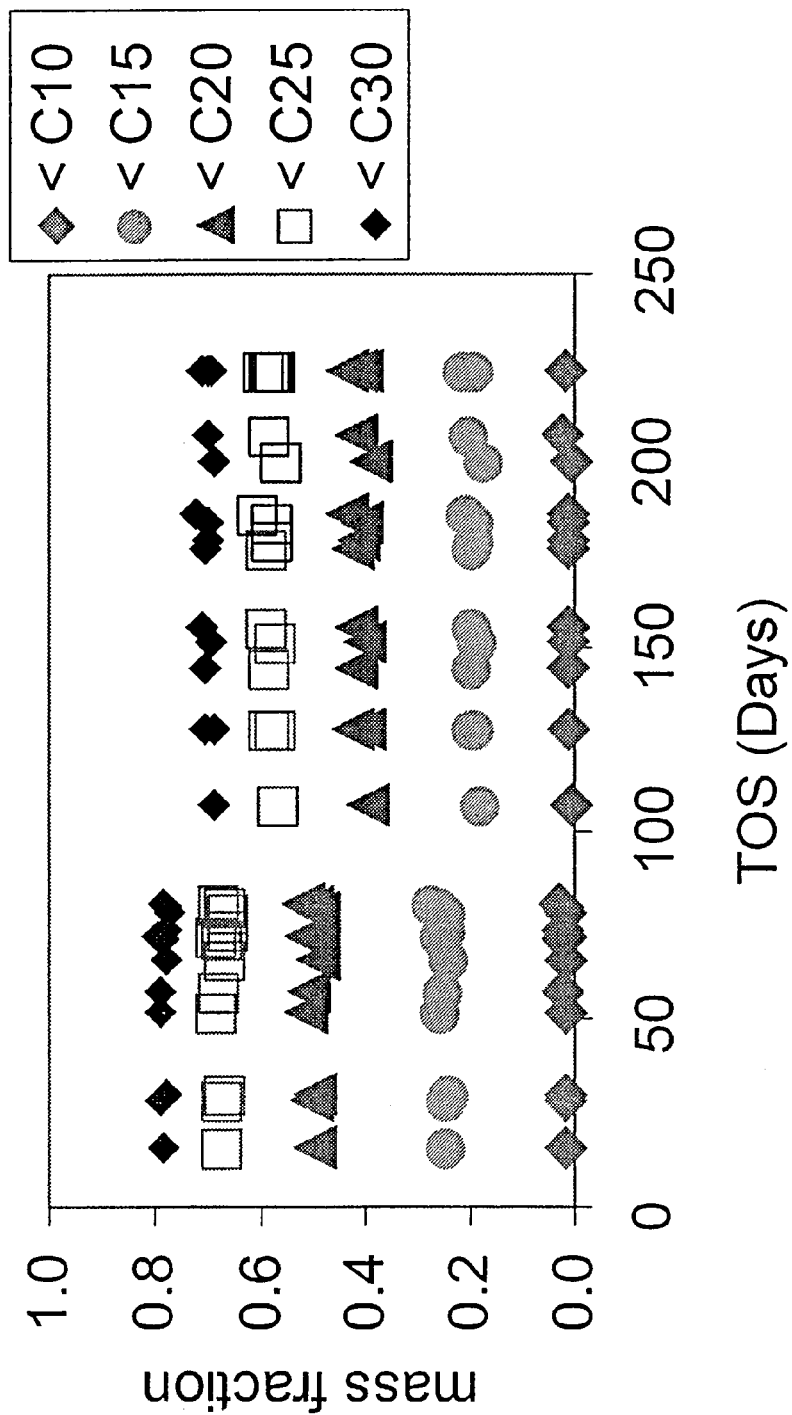
FIG. 41 is a plot showing the change in the feed concentration profile over time for the hydrocarbon feed used in the test runs described in Example 1.

Fischer-Tropsch (FT) wax is used to feed the hydrocracking process test runs. Periodic sampling of the feed reveals change in the carbon number distribution over the course of the test runs, as shown in FIG. 41. Test runs shown in Tables 4-7 use a feed that has higher molecular weight fractions than the feed used in the test runs shown in Tables 2 and 3. This change may have an impact on the absolute concentration profiles of the product, and is reflected in some performance estimates, including selectivity and conversion. Performance measurements in terms of yield take these variations into consideration, allowing comparison across reactors and feeds. Following recognition of feed variation, core samples of the remaining feed batches are tested. FIG. 41 reports these results, and allows validation of consistency of the remaining feed samples.

Operating parameters for the test runs are chosen to meet and exceed some of typical hydrocracking operating limits towards lower cost alternatives using as the hydrocarbon reactant an FT synthesis product in the form of a wax: higher weight and liquid hourly space velocities, lower operating pressures, and lower hydrogen to wax feed ratios.

Eight test runs are used. For convenience, these are identified as being different reactors, the reactors being Reactor A and Reactors 1-5. Reactor A is packed with inert silica alumina. Reactors 1-5 are packed with a pre-bed of inert silica alumina and a bed of catalyst. The catalysts in Reactors 1-5 are fresh catalysts, that is, these catalysts have not been previously used. The inert bed length is between 2-5 in (5.1-10.2 cm) with a constant packing density of 0.6 g/cc. 0.66 g of catalyst is used in the 18 inch (45.7 cm) beds and 0.22 g is used in the 6 inch (15.2 cm) beds. The packing density is held constant at 0.6 g/cc. The catalysts in Reactors 3 and 4 are regenerated after the first test runs, and additional test runs are then conducted using the regenerated catalysts.

Reactor A is loaded with alumina particles and is used to provide an overview of the baseline performance. The bed length is 21 inches (53.3 cm).

Reactor 1 has a catalyst bed length of 18 inches (45.7 cm). It is used to complete the system shakedown and allow preliminary confirmation of catalyst hydrocracking functionality at relatively standard conditions as well as slightly elevated feed flow rates.

Reactor 2 is used to confirm reactor functionality at increased feed flow rates and relatively standard pressures, temperatures, and hydrogen/wax feed ratios. The catalyst bed length is 6 inches (15.24 cm).

Reactor 3 is used for high feed flow rates and a variety of process changes, including reduced operating pressure and hydrogen/wax feed ratios and increased operating temperatures relative to the reference conditions. The catalyst bed length is 6 inches (15.24 cm).

Reactor 4 is used at the reference conditions and an alternate parameter set, involving significantly lower hydrogen/wax feed ratios and pressures. The catalyst bed length is 6 inches (15.24 cm).

Reactor 5 is operated at the reference conditions and at a lower weight hourly space velocity (WHSV). The catalyst bed length is 6 inches (15.24 cm).

The reference conditions are as follows:

Weight hourly space velocity (WHSV) of 30 hr$^{-1}$
Nominal temperature of 370° C.
Nominal pressure of 500 psig (3.45 MPa)
$H_2$ to wax volume ratio of 1500:1 sccm/ccm The findings show enhanced performance, measured in terms of high WHSV and reactor productivity on an order of magnitude greater than what is typical of standard industrial operating practices.

Low upstream wax line temperatures (less than 300° C.) are useful for preventing coking or clogging during operation.

The findings indicate that the following operational ranges are useful:

Temperature of 300-390° C.
Pressure of 200-500 psig (1.38-3.45 MPa)
$H_2$ to wax volume ratio of 300-1500:1 sccm/ccm.

A stand shake-down test run is performed with Reactor A. This preliminary test run is used to evaluate stand functionality for the two-phase systems that are to be tested and ensure mass balance closure. A flow run is performed with the reactor at 200° C., feed pressure of 500 psig (3.45 MPa), $H_2$:wax feed ratio of 1500:1 sccm/ccm, and wax WHSV of 2 hr$^{-1}$ for an overall mass balance of 100.7 wt %.

The results for Reactors 1-5 are provided in the following Tables 1-5. Also, in an additional test run, the catalyst in Reactor 3 is regenerated and the results for this test run are shown in Table 6. Similarly, the catalyst in Reactor 4 is regenerated and the results are shown in Table 7.

TABLE 1

| Reactor 1 Catalyst Mass (g) | 0.665 | | | |
|---|---|---|---|---|
| Sample | A | B | C | D |
| Days between Sample A and indicated Sample | — | 7 | 10 | 11 |
| WHSV, g wax feed/h/g of catalyst (hr−1) | 2 | 2 | 2 | 10 |
| LHSV, cc 100° C. wax feed/h/cc of catalyst reactor volume (hr−1) | 1.6 | 1.6 | 1.6 | 8.1 |
| Reactor Temperature (C.) | 370 | 370 | 370 | 400 |
| Reactor Inlet Pressure (psig) | 500 | 500 | 500 | 500 |
| H2 to Wax Feed Ratio (sccm/ccm) | 1482 | 1482 | 1482 | 1496 |
| H2 to Wax Feed Ratio (g/g) | 0.181 | 0.181 | 0.181 | 0.181 |
| Minimum vapor/liquid volume ratio at the bed inlet (ccm/ccm) | 106 | 106 | 106 | 111 |
| Interstitial vapor feed velocity through the catalyst bed (mm/s) | 62 | 62 | 62 | 323 |
| Interstitial liquid feed velocity through the catalyst bed (mm/s) | 0.6 | 0.6 | 0.6 | 2.9 |
| Tracer N2 in Vapor Feed (mol %) | 3.30 | 5.32 | 5.32 | 5.00 |
| H2 in Product Gas (mol %) | 86.8 | 85.15 | 83.83 | 82.37 |
| N2 in Product Gas (mol %) | 3.38 | 6.21 | 6.16 | 7.21 |
| C1 in Product Gas (mol %) | 1.51 | 0.047 | 0.061 | 0.05 |
| C2 in Product Gas (mol %) | 2.04 | 0.042 | 0.046 | 0.04 |
| C3 in Product Gas (mol %) | 0.183 | 1.95 | 1.99 | 1.41 |
| i-C4 in Product Gas (mol %) | 0.734 | 1.76 | 1.85 | 1.21 |
| n-C4 in Product Gas (mol %) | 1.92 | 1.6 | 1.57 | 1.21 |
| C5 in Product Gas (mol %) | 1.83 | 0.00 | 0.00 | 3.22 |
| C6 in Product Gas (mol %) | 0.834 | 1.22 | 1.13 | 0.92 |
| C7 in Product Gas (mol %) | 0.145 | 0.077 | 0.09 | 0.39 |
| C8 in Product Gas (mol %) | 0.004 | 0.005 | 0.005 | 0.025 |
| Outlet Vapor Flow (sccm) | 44.38 | 40.26 | 40.58 | 163.66 |
| Wax Feed Recovery as Condensed Product (wt %) | 34.1 | 30.1 | 36.2 | 56.0 |
| Condensed Product Distribution (wt % Lights) | 98.4 | 97.3 | 95.7 | 99.0 |
| Density of Light Condensed Product at 25° C. (g/ml) | 0.71 | 0.71 | 0.67 | 0.70 |
| Pressure drop across reactor (psid) | 2 | 2 | 3 | 18 |
| Overall Mass Balance, Out/In (g/g) | 75.8% | 62.2% | 68.5% | 92.7% |
| H2 Conversion, (In-Out)/In (mol/mol) | 13.3% | 22.9% | 23.5% | 39.9% |

Table 1. Hydrocracking process conditions and results for Reactor 1 packed with 18 inches (45.7 cm) of catalyst. Catalyst activation is performed with no backpressure. Mixed condensed product density is not measured; the light condensed product density is reported instead. Wax feed recovery as condensed product is the mass of condensed product divided by the mass of wax fed. Condensed product distribution is a ratio of the mass collected in the cold collection drum divided by the mass collected in both hot and cold collection drums. Vapor mass balances are calculated using N2 flow as the tracer. N2 reactor sleeve flow rate is kept constant at 35 slpm for all runs.

TABLE 2

| Reactor 2 Catalyst Mass (g) | 0.229 | | |
|---|---|---|---|
| Sample | A | B | C |
| Time on Stream, TOS (hrs) | 98 | 125 | 146 |
| Actual WHSV, g wax feed/h/g of catalyst (hr−1) | 10.1 | 20.0 | 30.1 |
| Actual LHSV, cc 100° C. wax feed/h/cc of catalyst reactor volume (hr−1) | 8.5 | 16.8 | 25.3 |

TABLE 2-continued

| Reactor 2 Catalyst Mass (g) | 0.229 | | |
|---|---|---|---|
| Sample | A | B | C |
| nom. Reactor Temperature (C.) | 370 | 370 | 370 |
| nom. Reactor Inlet Pressure (psig) | 500 | 500 | 500 |
| nom. H2 to Wax Feed Ratio (sccm/ccm) | 1500 | 1500 | 1500 |
| nom. H2 to Wax Feed Ratio (g/g) | 0.183 | 0.183 | 0.183 |
| act. minimum vapor/liquid volume ratio at the bed inlet (ccm/ccm) | 105.1 | 106.2 | 105.8 |
| ~interstitial vapor feed vel. to cat. bed, given void fraction (mm/s) | 111.10 | 222.26 | 333.32 |
| ~interstitial liq. feed vel. to cat. bed, given void fraction, liq. all liq. (mm/s) | 1.06 | 2.09 | 3.15 |
| ~superficial velocity in bed, vapor (m/s) | 0.038 | 0.076 | 0.113 |
| ~superficial velocity in bed, liq. all liq. (m/s) | 0.00036 | 0.00071 | 0.00107 |
| H2 GHSV, sccm H2 feed/cc catalyst (hr−1) | 12,913 | 25,224 | 37,829 |
| act. total GHSV, sccm H2 feed/cc catalyst (hr−1) | 13,593 | 26,552 | 39,820 |
| Tracer N2 in Vapor Feed (mol %) | 5.00 | 5.00 | 5.00 |
| C1 in Product Gas (mol %) | 0.0105 | 0.009 | 0.011 |
| C2 in Product Gas (mol %) | 0 | 0 | 0 |
| C3 in Product Gas (mol %) | 0.959 | 0.537 | 0.302 |
| i-C4 in Product Gas (mol %) | 0.595 | 0.286 | 0.156 |
| n-C4 in Product Gas (mol %) | 0.738 | 0.417 | 0.24 |
| C5 in Product Gas (mol %) | 0.83 | 0.454 | 0.266 |
| C6 in Product Gas (mol %) | 0.57 | 0.396 | 0.184 |
| C7 in Product Gas (mol %) | 0.2 | 0.216 | 0.107 |
| C8 in Product Gas (mol %) | 0.03 | 0.053 | 0.063 |
| Condensed Product Distribution (wt % lights) | 62.7% | 35.3% | 24.6% |
| Density of Mixed Condensed Product at 25° C. (g/ml) | 0.71 | 0.7 | 0.68 |
| Overall Mass Balance, Out/In (g/g) (%) | 99.55 | 103.06 | 100.10 |
| hydrocarbon balance check (g out/g in) | 0.92 | 0.99 | 0.98 |
| ASSUMED FEED COMPOSITIONS | | | |
| Days between first feed sample in average and last feed sample in average | 62 | 62 | 62 |
| <C10 mass % | 1.92% | 1.92% | 1.92% |
| <C15 mass % | 24.82% | 24.82% | 24.82% |
| <C20 mass % | 50.07% | 50.07% | 50.07% |
| <C25 mass % | 66.92% | 66.92% | 66.92% |
| <C30 mass % | 78.24% | 78.24% | 78.24% |
| <C23 mass % | 60.98% | 60.98% | 60.98% |
| <C24 mass % | 64.07% | 64.07% | 64.07% |
| H mass/C mass, % | 17.68% | 17.68% | 17.68% |
| H mass % | 15.03% | 15.03% | 15.03% |
| PRODUCT COMPOSITIONS, INCLUDING GAS PHASE | | | |
| <C5 mass % | 11.0% | 5.9% | 3.4% |
| <C10 mass % | 39.6% | 23.6% | 14.5% |
| <C15 mass % | 80.4% | 58.2% | 45.8% |
| <C20 mass % | 99.2% | 90.2% | 77.1% |
| <C25 mass % | 99.9% | 99.9% | 96.3% |
| <C30 mass % | 99.9% | 100.0% | 100.0% |
| <C23 mass % | 99.9% | 98.9% | 90.4% |
| <C24 mass % | 99.9% | 99.7% | 93.7% |
| H mass/C mass, % | 18.8% | 18.4% | 18.1% |
| H mass % | 15.8% | 15.5% | 15.3% |
| PRODUCT COMPOSITIONS, w/o GAS PHASE | | | |
| <C10 mass % iso | 12.8% | 5.1% | 2.5% |
| <C17 mass % iso | 62.5% | 34.7% | 20.7% |
| <C23 mass % iso | 71.7% | 57.0% | 40.7% |
| <C10 mass % normal | 8.7% | 5.5% | 4.1% |
| <C17 mass % normal | 27.2% | 33.5% | 34.8% |
| <C23 mass % normal | 28.2% | 41.6% | 48.8% |
| C10-C16, iso/normal | 2.69 | 1.06 | 0.59 |
| C17-C22, iso/normal | 9.20 | 2.75 | 1.43 |
| ASSUMED FEED COMPOSITIONS | | | |
| ASTM correlation | D2887 H~D63 52 | D2887 H~D63 52 | D2887 H~D63 52 |
| Days between date for first feed sample in average and date for last feed sample in average | 62 | 62 | 62 |
| ≤150° C. mass % | 1.91 | 1.91 | 1.91 |
| ≤160° C. mass % | 2.60 | 2.60 | 2.60 |
| ≤175° C. mass % | 4.05 | 4.05 | 4.05 |
| ≤200° C. mass % | 7.58 | 7.58 | 7.58 |
| ≤250° C. mass % | 20.01 | 20.01 | 20.01 |

TABLE 2-continued

| Reactor 2 Catalyst Mass (g) | | 0.229 | |
|---|---|---|---|
| Sample | A | B | C |
| ≤260° C. mass % | 24.39 | 24.39 | 24.39 |
| ≤300° C. mass % | 39.03 | 39.03 | 39.03 |
| ≤350° C. mass % | 53.53 | 53.53 | 53.53 |
| ≤370° C. mass % | 59.48 | 59.48 | 59.48 |
| ≤400° C. mass % | 67.67 | 67.67 | 67.67 |
| ≤450° C. mass % | 79.01 | 79.01 | 79.01 |
| PRODUCT COMPOSITIONS, EXCLUDING GAS PHASE | | | |
| ASTM correlation | ASTM D 2887 | ASTM D 2887 | ASTM D 2887 |
| ≤150° C. mass % | 22.11 | 8.75 | 4.67 |
| ≤160° C. mass % | 26.35 | 12.12 | 6.89 |
| ≤175° C. mass % | 31.15 | 14.96 | 8.86 |
| ≤200° C. mass % | 43.62 | 24.17 | 16.52 |
| ≤250° C. mass % | 68.94 | 44.15 | 32.03 |
| ≤260° C. mass % | 74.03 | 49.80 | 37.04 |
| ≤300° C. mass % | 91.54 | 68.27 | 52.49 |
| ≤350° C. mass % | 99.35 | 90.17 | 75.06 |
| ≤370° C. mass % | 99.70 | 95.65 | 83.25 |
| ≤400° C. mass % | 99.95 | 99.03 | 93.36 |
| ≤450° C. mass % | 100.00 | 100.00 | 100.00 |
| Carbon Number Derived Diesel Yield (total basis), wt. based (g C10-C22 in product)/(g total wax fed) | 0.56 | 0.74 | 0.74 |
| Carbon Number Derived Conversion, wt. based (g ≥ C23 fed-g ≥ C23 in product)/(g ≥ C23 fed) | 1.00 | 0.97 | 0.76 |
| Carbon Number Derived Diesel (C10-C22) Selectivity, wt. based (g C10-C22 generated)/(g ≥ C23 consumed) | −0.09 | 0.40 | 0.51 |
| Carbon Number Derived Diesel (C10-C22) Yield (converted basis), wt. based (g C10-C22 generated)/(g ≥ C23 fed) | −0.09 | 0.39 | 0.39 |
| H2 consumption, based on chemical analyses, carbon basis (H2 scc change hydrocarbon assmg all paraffin)/min | 3.91 | 4.91 | 4.80 |
| H2 consumption, based on chemical analyses, carbon basis (H2 sccm consumed assmg all paraffin)/ccm wax fed | 75.21 | 47.70 | 30.98 |

Table 2. Hydrocracking process conditions and results for Reactor 2 packed with 6 inches (15.2 cm) of catalyst. Catalyst activation is performed at nominal pressure of 500 psig (3.45 MPa). Wax feed recovery as condensed product is the mass of condensed product divided by the mass of wax fed. Condensed product distribution is a ratio of the mass collected in the cold collection drum divided by the mass collected in both hot and cold collection drums. Vapor mass balances are calculated using N2 flow as the tracer. N2 reactor sleeve flow rate was kept constant at 35 slpm for all runs.

TABLE 3

| Reactor 3 Catalyst Mass (g) | | | 0.226 | | | | |
|---|---|---|---|---|---|---|---|
| Sample | A | B | C | D | E | F | G |
| TOS (hrs) | 132 | 155 | 179 | 251 | 275 | 300 | 323 |
| actual WHSV, g wax feed/h/g of catalyst (hr−1) | 29.9 | 29.9 | 29.9 | 29.9 | 29.9 | 29.9 | 29.9 |
| actual LHSV, cc 100° C. wax feed/h/cc of catalyst reactor volume (hr−1) | 24.8 | 24.8 | 24.8 | 24.8 | 24.8 | 24.8 | 24.8 |
| nom. Reactor Temperature (C.) | 370 | 370 | 370 | 370 | 370 | 370 | 370 |
| nom. Reactor Inlet Pressure (psig) | 500 | 500 | 500 | 500 | 500 | 500 | 325 |
| nom. H2 to Wax Feed Ratio (sccm/ccm) | 1500 | 1500 | 1500 | 1500 | 1500 | 356 | 356 |
| nom. H2 to Wax Feed Ratio (g/g) | 0.183 | 0.183 | 0.183 | 0.183 | 0.183 | 0.043 | 0.043 |
| act. minimum vapor/liquid volume ratio at the bed inlet (ccm/ccm) | 106.5 | 106.5 | 106.5 | 106.5 | 106.5 | 25.3 | 38.3 |
| ~interstitial vapor feed vel. to cat. bed, given void fraction (mm/s) | 328.93 | 328.93 | 328.93 | 328.93 | 328.93 | 328.93 | 328.93 |
| ~interstitial liq. feed vel. to cat. bed, given void fraction, liq. all liq. (mm/s) | 3.09 | 3.09 | 3.09 | 3.09 | 3.09 | 0.75 | 1.13 |
| ~superficial velocity in bed, vapor (m/s) | 0.112 | 0.112 | 0.112 | 0.112 | 0.112 | 0.0265 | 0.0402 |
| ~superficial velocity in bed, liq. all liq. (m/s) | 0.00105 | 0.00105 | 0.00105 | 0.00105 | 0.00105 | 0.00105 | 0.00105 |

TABLE 3-continued

| Reactor 3<br>Catalyst Mass (g) | | | 0.226 | | | | |
|---|---|---|---|---|---|---|---|
| Sample | A | B | C | D | E | F | G |
| H2 GHSV, sccm H2 feed/cc catalyst (hr−1) | 37,333 | 37,333 | 37,333 | 37,333 | 37,333 | 8,853 | 8,853 |
| act. total GHSV, sccm H2 feed/cc catalyst (hr−1) | 39,298 | 39,298 | 39,298 | 39,298 | 39,298 | 9,319 | 9,319 |
| Tracer N2 in Vapor Feed (mol %) | 5.00 | 5.00 | 5.00 | 5.00 | 5.00 | 5.00 | 5.00 |
| C1 in Product Gas (mol %) | 0 | 0 | 0 | 0 | 0 | 0 | 0 |
| C2 in Product Gas (mol %) | 0.005 | 0.005 | 0.005 | 0.005 | 0.005 | 0.021 | 0.019 |
| C3 in Product Gas (mol %) | 0.28 | 0.28 | 0.29 | 0.29 | 0.29 | 1.04 | 0.89 |
| i-C4 in Product Gas (mol %) | 0.16 | 0.15 | 0.16 | 0.16 | 0.16 | 0.60 | 0.56 |
| n-C4 in Product Gas (mol %) | 0.23 | 0.23 | 0.24 | 0.24 | 0.23 | 0.83 | 0.75 |
| C5 in Product Gas (mol %) | 0.25 | 0.26 | 0.27 | 0.24 | 0.24 | 0.79 | 0.81 |
| C6 in Product Gas (mol %) | 0.17 | 0.2 | 0.2 | 0.18 | 0.19 | 0.18 | 0.49 |
| C7 in Product Gas (mol %) | 0.07 | 0.11 | 0.12 | 0.12 | 0.12 | 0.13 | 0.21 |
| C8 in Product Gas (mol %) | 0.02 | 0.1 | 0.12 | 0.09 | 0.12 | 0.12 | 0.13 |
| Condensed Product Distribution (wt % lights) | 27.1% | 27.3% | 26.8% | 24.7% | 27.1% | 14.1% | 12.5% |
| Density of Mixed Condensed Product at 25° C. (g/ml) | 0.7326 | 0.708 | 0.7313 | 0.7326 | 0.7346 | 0.7548 | 0.7329 |
| Overall Mass Balance, Out/In (g/g) | 98.79% | 97.92% | 101.33% | 98.28% | 100.44% | 99.72% | 98.28% |
| hydrocarbon balance check (g out/g in) | 0.97 | 0.96 | 0.99 | 0.96 | 0.98 | 0.98 | 0.97 |
| ASSUMED FEED COMPOSITIONS | | | | | | | |
| Days between date for first feed sample in average and date for last feed sample in average | 62 | 62 | 62 | 62 | 62 | 62 | 62 |
| <C10 mass % | 1.92% | 1.92% | 1.92% | 1.92% | 1.92% | 1.92% | 1.92% |
| <C15 mass % | 24.82% | 24.82% | 24.82% | 24.82% | 24.82% | 24.82% | 24.82% |
| <C20 mass % | 50.07% | 50.07% | 50.07% | 50.07% | 50.07% | 50.07% | 50.07% |
| <C25 mass % | 66.92% | 66.92% | 66.92% | 66.92% | 66.92% | 66.92% | 66.92% |
| <C30 mass % | 78.24% | 78.24% | 78.24% | 78.24% | 78.24% | 78.24% | 78.24% |
| <C23 mass % | 60.98% | 60.98% | 60.98% | 60.98% | 60.98% | 60.98% | 60.98% |
| <C24 mass % | 64.07% | 64.07% | 64.07% | 64.07% | 64.07% | 64.07% | 64.07% |
| H mass/C mass, % | 17.68% | 17.68% | 17.68% | 17.68% | 17.68% | 17.68% | 17.68% |
| H mass % | 15.03% | 15.03% | 15.03% | 15.03% | 15.03% | 15.03% | 15.03% |
| PRODUCT COMPOSITIONS, INCLUDING GAS PHASE | | | | | | | |
| <C5 mass % | 3.2% | 3.2% | 3.3% | 3.2% | 3.3% | 2.7% | 2.3% |
| <C10 mass % | 14.4% | 15.7% | 15.7% | 15.2% | 15.8% | 13.7% | 14.0% |
| <C15 mass % | 46.2% | 46.9% | 46.6% | 46.8% | 47.2% | 47.8% | 48.2% |
| <C20 mass % | 79.0% | 79.3% | 79.5% | 79.2% | 79.7% | 80.3% | 80.2% |
| <C25 mass % | 98.4% | 98.4% | 98.5% | 98.4% | 98.4% | 96.5% | 96.8% |
| <C30 mass % | 100.0% | 100.0% | 100.0% | 100.0% | 100.0% | 100.0% | 100.2% |
| <C23 mass % | 93.3% | 93.5% | 93.6% | 93.3% | 93.6% | 92.1% | 92.2% |
| <C24 mass % | | | | | | | |
| H mass/C mass, % | 18.1% | 18.1% | 18.1% | 18.1% | 18.1% | 18.1% | 18.1% |
| H mass % | 15.3% | 15.4% | 15.4% | 15.4% | 15.4% | 15.3% | 15.4% |
| PRODUCT COMPOSITIONS, w/o GAS PHASE | | | | | | | |
| <C10 mass % iso | 3.1% | 3.0% | 2.8% | 2.9% | 2.9% | 4.1% | 3.9% |
| <C17 mass % iso | 23.8% | 23.8% | 23.7% | 22.7% | 23.5% | 30.8% | 27.6% |
| <C23 mass % iso | 48.7% | 48.9% | 49.0% | 47.2% | 48.2% | 54.6% | 49.6% |
| <C10 mass % normal | 4.9% | 4.8% | 4.4% | 4.8% | 4.8% | 5.3% | 5.3% |
| <C17 mass % normal | 33.2% | 33.0% | 32.8% | 34.4% | 33.8% | 29.6% | 32.6% |
| <C23 mass % normal | 44.2% | 43.9% | 43.9% | 45.5% | 44.8% | 37.1% | 42.0% |
| C10-C16, iso/normal | 0.73 | 0.74 | 0.74 | 0.67 | 0.71 | 1.10 | 0.87 |
| C17-C22, iso/normal | 2.26 | 2.30 | 2.28 | 2.21 | 2.25 | 3.17 | 2.34 |
| ASSUMED FEED COMPOSITIONS | | | | | | | |
| TM correlation | D2887H~D6352 | D2887H~D6352 | D2887H~D6352 | D2887H~D6352 | D2887H~D6352 | D2887H~D6352 | D2887H~D6352 |
| Days between date for first feed sample in average and date for last feed sample in average | 62 | 62 | 62 | 62 | 62 | 62 | 62 |
| ≤150° C. mass % | 1.91 | 1.91 | 1.91 | 1.91 | 1.91 | 1.91 | 1.91 |
| ≤160° C. mass % | 2.60 | 2.60 | 2.60 | 2.60 | 2.60 | 2.60 | 2.60 |
| ≤175° C. mass % | 4.05 | 4.05 | 4.05 | 4.05 | 4.05 | 4.05 | 4.05 |
| ≤200° C. mass % | 7.58 | 7.58 | 7.58 | 7.58 | 7.58 | 7.58 | 7.58 |

TABLE 3-continued

| Reactor 3 Catalyst Mass (g) | | | 0.226 | | | | |
|---|---|---|---|---|---|---|---|
| Sample | A | B | C | D | E | F | G |
| ≤250° C. mass % | 20.01 | 20.01 | 20.01 | 20.01 | 20.01 | 20.01 | 20.01 |
| ≤260° C. mass % | 24.39 | 24.39 | 24.39 | 24.39 | 24.39 | 24.39 | 24.39 |
| ≤300° C. mass % | 39.03 | 39.03 | 39.03 | 39.03 | 39.03 | 39.03 | 39.03 |
| ≤350° C. mass % | 53.53 | 53.53 | 53.53 | 53.53 | 53.53 | 53.53 | 53.53 |
| ≤370° C. mass % | 59.48 | 59.48 | 59.48 | 59.48 | 59.48 | 59.48 | 59.48 |
| ≤400° C. mass % | 67.67 | 67.67 | 67.67 | 67.67 | 67.67 | 67.67 | 67.67 |
| ≤450° C. mass % | 79.01 | 79.01 | 79.01 | 79.01 | 79.01 | 79.01 | 79.01 |
| ASSUMED FEED COMPOSITIONS | | | | | | | |
| ASTM correlation | D1160 (reducd P) | D1160 (reducd P) | D1160 (reducd P) | D1160 (reducd P) | D1160 (reducd P) | D1160 (reducd P) | D1160 (reducd P) |
| Days between date for first feed sample in average and date for last feed sample in average | 62 | 62 | 62 | 62 | 62 | 62 | 62 |
| ≤150° C. vol % | 0.012 | 0.012 | 0.012 | 0.012 | 0.012 | 0.012 | 0.012 |
| ≤160° C. vol % | 0.018 | 0.018 | 0.018 | 0.018 | 0.018 | 0.018 | 0.018 |
| ≤175° C. vol % | 0.026 | 0.026 | 0.026 | 0.026 | 0.026 | 0.026 | 0.026 |
| ≤200° C. vol % | 0.041 | 0.041 | 0.041 | 0.041 | 0.041 | 0.041 | 0.041 |
| ≤250° C. vol % | 0.138 | 0.138 | 0.138 | 0.138 | 0.138 | 0.138 | 0.138 |
| ≤260° C. vol % | 0.166 | 0.166 | 0.166 | 0.166 | 0.166 | 0.166 | 0.166 |
| ≤300° C. vol % | 0.332 | 0.332 | 0.332 | 0.332 | 0.332 | 0.332 | 0.332 |
| ≤350° C. vol % | 0.497 | 0.497 | 0.497 | 0.497 | 0.497 | 0.497 | 0.497 |
| ≤370° C. vol % | 0.543 | 0.543 | 0.543 | 0.543 | 0.543 | 0.543 | 0.543 |
| ≤400° C. vol % | 0.610 | 0.610 | 0.610 | 0.610 | 0.610 | 0.610 | 0.610 |
| ≤450° C. vol % | 0.751 | 0.751 | 0.751 | 0.751 | 0.751 | 0.751 | 0.751 |
| PRODUCT COMPOSITIONS, EXCLUDING GAS PHASE | | | | | | | |
| ASTM correlation | ASTM D 2887 | ASTM D 2887 | ASTM D 2887 | ASTM D 2887 | ASTM D 2887 | ASTM D 2887 | ASTM D 2887 |
| ≤150° C. mass % | 5.94 | 5.93 | 5.83 | 5.80 | 5.93 | 7.20 | 6.88 |
| ≤160° C. mass % | 8.57 | 8.48 | 7.83 | 7.75 | 8.51 | 9.50 | 9.17 |
| ≤175° C. mass % | 11.33 | 11.25 | 11.00 | 11.00 | 11.50 | 12.60 | 12.00 |
| ≤200° C. mass % | 19.18 | 19.15 | 18.50 | 18.43 | 19.32 | 19.53 | 19.23 |
| ≤250° C. mass % | 35.67 | 35.87 | 35.29 | 35.21 | 36.21 | 36.09 | 35.13 |
| ≤260° C. mass % | 41.00 | 41.17 | 40.62 | 40.48 | 41.50 | 40.45 | 39.74 |
| ≤300° C. mass % | 58.19 | 58.35 | 58.13 | 57.67 | 58.60 | 56.18 | 55.41 |
| ≤350° C. mass % | 81.46 | 81.69 | 81.62 | 81.09 | 81.69 | 74.38 | 75.00 |
| ≤370° C. mass % | 89.50 | 89.69 | 89.64 | 89.23 | 89.64 | 80.39 | 81.63 |
| ≤400° C. mass % | 97.39 | 97.47 | 97.50 | 97.33 | 97.48 | 87.48 | 89.38 |
| ≤450° C. mass % | 100.00 | 100.00 | 100.00 | 100.00 | 100.00 | 94.69 | 96.40 |
| PRODUCT COMPOSITIONS, EXCLUDING GAS PHASE | | | | | | | |
| ASTM correlation | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) |
| ≤150° C. vol % | 0.08 | 0.04 | | | | 1.80 | 1.28 |
| ≤160° C. vol % | 2.19 | 2.15 | 1.79 | 1.79 | 2.15 | 3.84 | 3.35 |
| ≤175° C. vol % | 5.36 | 5.32 | 5.00 | 5.00 | 5.44 | 6.90 | 6.45 |
| ≤200° C. vol % | 11.19 | 11.12 | 10.65 | 10.65 | 11.67 | 13.45 | 12.77 |
| ≤250° C. vol % | 34.56 | 34.67 | 34.22 | 33.96 | 35.38 | 34.80 | 33.56 |
| ≤260° C. vol % | 40.11 | 40.23 | 39.78 | 39.45 | 40.90 | 39.90 | 38.51 |
| ≤300° C. vol % | 63.22 | 63.45 | 63.26 | 62.79 | 63.71 | 58.76 | 58.17 |
| ≤350° C. vol % | 90.07 | 90.29 | 90.30 | 89.90 | 90.22 | 78.26 | 80.55 |
| ≤370° C. vol % | 97.43 | 97.54 | 97.76 | 97.33 | 97.69 | 83.64 | 86.04 |
| ≤400° C. vol % | 100.00 | 100.00 | 100.00 | 100.00 | 100.00 | 90.52 | 92.63 |
| ≤450° C. vol % | 100.00 | 100.00 | 100.00 | 100.00 | 100.00 | 98.17 | 100.00 |
| Carbon Number Derived Diesel Yield (total basis), wt. based (g C10-C22 in product)/(g total wax fed) | 0.76 | 0.74 | 0.77 | 0.75 | 0.76 | 0.77 | 0.76 |
| Carbon Number Derived Conversion, wt. based (g ≥ C23 fed − g ≥ C23 in product)/(g ≥ C23 fed) | 0.83 | 0.84 | 0.84 | 0.84 | 0.84 | 0.80 | 0.81 |
| Carbon Number Derived Diesel (C10-C22) Selectivity, wt. based (g C10-C22 generated)/(g ≥ C23 consumed) | 0.53 | 0.46 | 0.55 | 0.49 | 0.53 | 0.57 | 0.53 |

TABLE 3-continued

| Reactor 3 Catalyst Mass (g) | | | 0.226 | | | | |
|---|---|---|---|---|---|---|---|
| Sample | A | B | C | D | E | F | G |
| Carbon Number Derived Diesel (C10-C22) Yield (converted basis), wt. based (g C10-C22 generated)/(g ≥ C23 fed) | 0.44 | 0.39 | 0.46 | 0.41 | 0.44 | 0.46 | 0.42 |
| H2 consumption, based on chemical analyses, carbon basis (H2 scc change hydrocarbon assmg all paraffin)/min | 4.70 | 4.90 | 4.93 | 4.81 | 4.93 | 4.49 | 4.82 |
| H2 consumption, based on chemical analyses, carbon basis (H2 sccm consumed assmg all paraffin)/ccm wax fed | 30.94 | 32.23 | 32.40 | 31.65 | 32.42 | 29.56 | 31.71 |

Hydrocracking process conditions and results for Reactor 3 packed with 6 inches (15.2 cm) of catalyst. Catalyst acivation is performed at nominal pressure of 500 psig (3.45 MPa). Wax feed recovery as condensed product is the mass of condensed product divided by the mass of wax fed. Condensed product distribution is a ratio of the mass collected in the cold collection drum divided by the mass collected in both hot and cold collection drums. Vapor mass balances are calculated using N2 flow as the tracer. N2 reactor sleeve flow rate was kept constant at 35 slpm for all runs.

TABLE 4

| Reactor 4 Sample | A | B | C | D | E | F | G |
|---|---|---|---|---|---|---|---|
| TOS (hrs) | 40 | 64 | 142 | 162 | 186 | 305 | 329 |
| actual WHSV, g wax feed/h/g of catalyst (hr−1) | 29.8 | 29.8 | 20.0 | 20.0 | 20.0 | 20.0 | 20.0 |
| actual LHSV, cc 100° C. wax feed/h/cc of catalyst reactor volume (hr−1) | 24.8 | 24.8 | 16.6 | 16.6 | 16.6 | 16.6 | 16.6 |
| nom. Reactor Temperature (C.) | 370 | 370 | 370 | 370 | 370 | 370 | 370 |
| nom. Reactor Inlet Pressure (psig) | 500 | 500 | 325 | 325 | 325 | 325 | 325 |
| nom. H2 to Wax Feed Ratio (sccm/ccm) | 1500 | 1500 | 356 | 356 | 356 | 356 | 356 |
| nom. H2 to Wax Feed Ratio (g/g) | 0.183 | 0.183 | 0.043 | 0.043 | 0.043 | 0.043 | 0.043 |
| act. minimum vapor/liquid volume ratio at the bed inlet (ccm/ccm) | 106.5 | 106.5 | 38.0 | 38.0 | 38.0 | 38.0 | 38.0 |
| ~interstitial vapor feed vel. to cat. bed, given void fraction (mm/s) | 328.93 | 328.93 | 78.86 | 78.86 | 78.86 | 78.86 | 78.86 |
| ~interstitial liq. feed vel. to cat. bed, given void fraction, liq. all liq. (mm/s) | 3.09 | 3.09 | 2.07 | 2.07 | 2.07 | 2.07 | 2.07 |
| ~superficial velocity in bed, vapor (m/s) | 0.112 | 0.112 | 0.0268 | 0.0268 | 0.0268 | 0.0268 | 0.0268 |
| ~superficial velocity in bed, liq. all liq. (m/s) | 0.00105 | 0.00105 | 0.00071 | 0.00071 | 0.00071 | 0.00071 | 0.00071 |
| H2 GHSV, sccm H2 feed/cc catalyst (hr−1) | 37,333 | 37,333 | 5,907 | 5,907 | 5,907 | 5,907 | 5,907 |
| act. total GHSV, sccm H2 feed/cc catalyst (hr−1) | 39,298 | 39,298 | 6,218 | 6,218 | 6,218 | 6,218 | 6,218 |
| Tracer N2 in Vapor Feed (mol %) | 5.00 | 5.00 | 5.00 | 5.00 | 5.00 | 5.00 | 5.00 |
| C1 in Product Gas (mol %) | 0 | 0 | 0 | 0 | 0 | 0 | 0 |
| C2 in Product Gas (mol %) | 0.008 | 0.008 | 0.025 | 0.023 | 0.023 | 0.022 | 0.01 |
| C3 in Product Gas (mol %) | 0.39 | 0.39 | 1.24 | 1.18 | 1.18 | 0.99 | 0.34 |
| i-C4 in Product Ga (mol %) | 0.27 | 0.27 | 0.87 | 0.84 | 0.85 | 0.67 | 0.15 |
| n-C4 in Produc Gas (mol %) | 0.38 | 0.38 | 1.04 | 1.08 | 1.1 | 0.85 | 0.29 |
| C5 in Product Gas (mol %) | 0.34 | 0.34 | 0.54 | 0.9 | 1.05 | 1.08 | 0.56 |
| C6 in Product Gas (mol %) | 0.07 | 0.07 | 0.02 | 0.3 | 0.38 | 0.14 | 0.1 |
| C7 in Product Gas (mol %) | 0.11 | 0.12 | 0 | 0.05 | 0.08 | 0 | 0.04 |
| C8 in Product Gas (mol %) | 0.06 | 0.06 | 0 | 0.006 | 0.005 | 0.006 | 0.004 |
| Condensed Product Distribution (wt % lights) | 22.8% | 23.3% | 57.1% | 14.2% | 13.0% | 9.5% | 16.3% |
| Density of Mixed Condensed Product at 25° C. (g/ml) | 0.7518 | 0.7584 | 0.7738 | 0.773 | 0.7454 | 0.7575 | 0.753 |

TABLE 4-continued

| Reactor 4 Sample | A | B | C | D | E | F | G |
|---|---|---|---|---|---|---|---|
| Overall Mass Balance, Out/In (g/g) | 103.04% | 102.75% | 98.16% | 99.18% | 99.40% | 99.09% | 95.21% |
| hydrocarbon balance check (g out/g in) | 1.00 | 1.00 | 0.97 | 0.97 | 0.97 | 0.97 | 0.94 |
| ASSUMED FEED COMPOSITIONS | | | | | | | |
| Days between date for first feed sample in average and date for last feed sample in average | 70 | 70 | 70 | 70 | 70 | 70 | 70 |
| <C10 mass % | 1.08% | 1.08% | 1.08% | 1.08% | 1.08% | 1.08% | 1.08% |
| <C15 mass % | 18.99% | 18.99% | 18.99% | 18.99% | 18.99% | 18.99% | 18.99% |
| <C20 mass % | 41.24% | 41.24% | 41.24% | 41.24% | 41.24% | 41.24% | 41.24% |
| <C25 mass % | 57.69% | 57.69% | 57.69% | 57.69% | 57.69% | 57.69% | 57.69% |
| <C30 mass % | 69.86% | 69.86% | 69.86% | 69.86% | 69.86% | 69.86% | 69.86% |
| <C23 mass % | 51.72% | 51.72% | 51.72% | 51.72% | 51.72% | 51.72% | 51.72% |
| <C24 mass % | 54.80% | 54.80% | 54.80% | 54.80% | 54.80% | 54.80% | 54.80% |
| H mass/C mass, % | 17.59% | 17.59% | 17.59% | 17.59% | 17.59% | 17.59% | 17.59% |
| H mass % | 14.96% | 14.96% | 14.96% | 14.96% | 14.96% | 14.96% | 14.96% |
| PRODUCT COMPOSITIONS, INCLUDING GAS PHASE | | | | | | | |
| <C5 mass % | 4.9% | 4.9% | 3.3% | 3.3% | 3.5% | 2.6% | 0.9% |
| <C10 mass % | 16.4% | 16.4% | 16.5% | 14.6% | 15.3% | 13.6% | 11.3% |
| <C15 mass % | 45.1% | 45.7% | 52.0% | 47.7% | 48.5% | 45.4% | 43.1% |
| <C20 mass % | 75.3% | 76.2% | 83.3% | 79.5% | 80.0% | 77.0% | 74.1% |
| <C25 mass % | 95.8% | 96.3% | 98.3% | 96.4% | 96.4% | 95.0% | 92.6% |
| <C30 mass % | 100.0% | 100.0% | 100.0% | 100.0% | 100.0% | 100.0% | 99.3% |
| <C23 mass % | 89.5% | 90.2% | 94.6% | 91.7% | 91.9% | 89.8% | 87.0% |
| <C24 mass % | 93.0% | 93.6% | 96.8% | 94.3% | 94.4% | 92.6% | 90.1% |
| H mass/C mass, % | 18.2% | 18.2% | 18.2% | 18.1% | 18.1% | 18.1% | 18.0% |
| H mass % | 15.4% | 15.4% | 15.4% | 15.3% | 15.4% | 15.3% | 15.3% |
| PRODUCT COMPOSITIONS, w/o GAS PHASE | | | | | | | |
| <C10 mass % iso | 3.6% | 3.6% | 7.0% | 5.3% | 5.3% | 5.0% | 4.8% |
| <C17 mass % iso | 23.4% | 24.7% | 34.9% | 31.7% | 31.9% | 29.7% | 27.8% |
| <C23 mass % iso | 46.3% | 48.0% | 56.7% | 54.3% | 54.4% | 52.4% | 49.2% |
| <C10 mass % normal | 4.3% | 4.3% | 6.0% | 4.6% | 4.6% | 4.6% | 4.7% |
| <C17 mass % normal | 30.0% | 29.4% | 29.6% | 27.9% | 28.1% | 27.5% | 27.7% |
| <C23 mass % normal | 42.1% | 41.2% | 37.7% | 36.9% | 37.0% | 36.9% | 37.6% |
| C10-C16, iso/normal | 0.77 | 0.84 | 1.18 | 1.13 | 1.13 | 1.08 | 1.00 |
| C17-C22, iso/normal | 1.89 | 1.97 | 2.69 | 2.51 | 2.53 | 2.41 | 2.16 |
| ASSUMED FEED COMPOSITIONS | | | | | | | |
| ASTM correlation | D2887H~D6352 | D2887H~D6352 | D2887H~D6352 | D2887H~D6352 | D2887H~D6352 | D2887H~D6352 | D2887H~D6352 |
| Days between date for first feed sample in average and date for last feed sample in average | 70 | 70 | 70 | 70 | 70 | 70 | 70 |
| ≤150° C. mass % | 1.37 | 1.37 | 1.37 | 1.37 | 1.37 | 1.37 | 1.37 |
| ≤160° C. mass % | 2.25 | 2.25 | 2.25 | 2.25 | 2.25 | 2.25 | 2.25 |
| ≤175° C. mass % | 3.57 | 3.57 | 3.57 | 3.57 | 3.57 | 3.57 | 3.57 |
| ≤200° C. mass % | 6.39 | 6.39 | 6.39 | 6.39 | 6.39 | 6.39 | 6.39 |
| ≤250° C. mass % | 15.01 | 15.01 | 15.01 | 15.01 | 15.01 | 15.01 | 15.01 |
| ≤260° C. mass % | 17.72 | 17.72 | 17.72 | 17.72 | 17.72 | 17.72 | 17.72 |
| ≤300° C. mass % | 30.04 | 30.04 | 30.04 | 30.04 | 30.04 | 30.04 | 30.04 |
| ≤350° C. mass % | 44.12 | 44.12 | 44.12 | 44.12 | 44.12 | 44.12 | 44.12 |
| ≤370° C. mass % | 50.10 | 50.10 | 50.10 | 50.10 | 50.10 | 50.10 | 50.10 |
| ≤400° C. mass % | 57.45 | 57.45 | 57.45 | 57.45 | 57.45 | 57.45 | 57.45 |
| ≤450° C. mass % | 69.99 | 69.99 | 69.99 | 69.99 | 69.99 | 69.99 | 69.99 |
| ASSUMED FEED COMPOSITIONS | | | | | | | |
| ASTM correlation | D2887H~D6352 | D2887H~D6352 | D2887H~D6352 | D2887H~D6352 | D2887H~D6352 | D2887H~D6352 | D2887H~D6352 |
| Days between date for first feed sample in average and date for last feed sample in average | 70 | 70 | 70 | 70 | 70 | 70 | 70 |
| ≤150° C. vol % | 0.017 | 0.017 | 0.017 | 0.017 | 0.017 | 0.017 | 0.017 |
| ≤160° C. vol % | 0.022 | 0.022 | 0.022 | 0.022 | 0.022 | 0.022 | 0.022 |
| ≤175° C. vol % | 0.029 | 0.029 | 0.029 | 0.029 | 0.029 | 0.029 | 0.029 |
| ≤200° C. vol % | 0.041 | 0.041 | 0.041 | 0.041 | 0.041 | 0.041 | 0.041 |

TABLE 4-continued

| Reactor 4 Sample | A | B | C | D | E | F | G |
|---|---|---|---|---|---|---|---|
| ≤250° C. vol % | 0.096 | 0.096 | 0.096 | 0.096 | 0.096 | 0.096 | 0.096 |
| ≤260° C. vol % | 0.114 | 0.114 | 0.114 | 0.114 | 0.114 | 0.114 | 0.114 |
| ≤300° C. vol % | 0.224 | 0.224 | 0.224 | 0.224 | 0.224 | 0.224 | 0.224 |
| ≤350° C. vol % | 0.410 | 0.410 | 0.410 | 0.410 | 0.410 | 0.410 | 0.410 |
| ≤370° C. vol % | 0.460 | 0.460 | 0.460 | 0.460 | 0.460 | 0.460 | 0.460 |
| ≤400° C. vol % | 0.527 | 0.527 | 0.527 | 0.527 | 0.527 | 0.527 | 0.527 |
| ≤450° C. vol % | 0.629 | 0.629 | 0.629 | 0.629 | 0.629 | 0.629 | 0.629 |
| PRODUCT COMPOSITIONS, EXCLUDING GAS PHASE | | | | | | | |
| ASTM correlation | ASTM D 2887 | ASTM D 2887 | ASTM D 2887 | ASTM D 2887 | ASTM D 2887 | ASTM D 2887 | ASTM D 2887 |
| ≤150° C. mass % | 5.86 | 5.89 | 10.17 | 7.76 | 7.81 | 7.53 | 7.76 |
| ≤160° C. mass % | 7.64 | 7.72 | 12.38 | 9.37 | 9.47 | 9.13 | 9.46 |
| ≤175° C. mass % | 10.40 | 10.75 | 15.50 | 12.09 | 12.13 | 12.00 | 12.17 |
| ≤200° C. mass % | 16.46 | 17.00 | 22.13 | 18.23 | 18.33 | 18.00 | 18.29 |
| ≤250° C. mass % | 30.42 | 31.24 | 37.21 | 32.93 | 33.05 | 32.20 | 32.23 |
| ≤260° C. mass % | 35.13 | 35.75 | 41.39 | 37.14 | 37.23 | 36.36 | 36.36 |
| ≤300° C. mass % | 50.18 | 51.35 | 56.35 | 52.13 | 52.19 | 51.00 | 50.42 |
| ≤350° C. mass % | 72.08 | 73.83 | 75.00 | 71.21 | 71.21 | 69.80 | 68.81 |
| ≤370° C. mass % | 80.58 | 82.45 | 81.41 | 77.88 | 77.88 | 76.47 | 75.33 |
| ≤400° C. mass % | 91.56 | 93.05 | 89.00 | 86.05 | 86.00 | 84.71 | 83.52 |
| ≤450° C. mass % | 99.78 | 100.00 | 96.26 | 94.33 | 94.33 | 93.46 | 92.58 |
| PRODUCT COMPOSITIONS, EXCLUDING GAS PHASE | | | | | | | |
| ASTM correlation | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) |
| ≤150° C. vol % | | | 4.61 | 1.95 | 1.99 | 2.64 | 1.67 |
| ≤160° C. vol % | 1.88 | 1.89 | 6.47 | 3.82 | 3.87 | 4.32 | 3.60 |
| ≤175° C. vol % | 4.80 | 4.84 | 9.26 | 6.63 | 6.69 | 6.86 | 6.51 |
| ≤200° C. vol % | 9.69 | 9.76 | 16.69 | 12.40 | 12.53 | 12.13 | 12.35 |
| ≤250° C. vol % | 28.28 | 29.03 | 36.64 | 31.73 | 31.82 | 30.81 | 30.95 |
| ≤260° C. vol % | 32.86 | 33.86 | 41.21 | 36.27 | 36.36 | 35.32 | 35.26 |
| ≤300° C. vol % | 52.93 | 54.78 | 59.55 | 54.73 | 54.77 | 53.39 | 52.82 |
| ≤350° C. vol % | 79.49 | 81.62 | 79.92 | 75.60 | 75.56 | 73.83 | 72.58 |
| ≤370° C. vol % | 88.88 | 90.84 | 85.50 | 82.09 | 82.04 | 80.65 | 79.21 |
| ≤400° C. vol % | 99.45 | 100.00 | 92.50 | 89.74 | 89.69 | 88.11 | 86.67 |
| ≤450° C. vol % | 100.00 | 100.00 | 100.00 | 98.01 | 98.00 | 97.04 | 96.09 |
| Carbon Number Derived Diesel Yield (total basis), wt. based (g C10-C22 in product)/(g total wax fed) | 0.73 | 0.74 | 0.76 | 0.75 | 0.75 | 0.74 | 0.72 |
| Carbon Number Derived Conversion, wt. based (g ≥ C23 fed − g ≥ C23 in product)/(g ≥ C23 fed) | 0.78 | 0.80 | 0.89 | 0.83 | 0.84 | 0.79 | 0.75 |
| Carbon Number Derived Diesel (C10-C22) Selectivity, wt. based (g C10-C22 generated)/(g ≥ C23 consumed) | 0.59 | 0.60 | 0.58 | 0.61 | 0.59 | 0.62 | 0.58 |
| Carbon Number Derived Diesel (C10-C22) Yield (converted basis), wt. based (g C10-C22 generated)/(g ≥ C23 fed) | 0.46 | 0.47 | 0.52 | 0.51 | 0.50 | 0.49 | 0.43 |
| H2 consumption, based on chemical analyses, carbon basis (H2 scc change hydrocarbon assmg all paraffin)/min | 6.12 | 6.16 | 4.11 | 3.82 | 3.95 | 3.53 | 2.91 |
| H2 consumption, based on chemical analyses, carbon basis (H2 sccm consumed assmg all paraffin)/ccm wax fed | 40.29 | 40.52 | 40.28 | 37.49 | 38.73 | 34.61 | 28.56 |

TABLE 5

| Reactor 5 Sample | A | B | C | D | E | F |
|---|---|---|---|---|---|---|
| TOS (hrs) | 100 | 122 | 145 | 169 | 245 | 267 |
| actual WHSV, g wax feed/h/g of catalyst (hr−1) | 29.8 | 29.8 | 29.8 | 29.8 | 20.0 | 20.0 |
| actual LHSV, cc 100° C. wax feed/h/cc of catalyst reactor volume (hr−1) | 24.8 | 24.8 | 24.8 | 24.8 | 16.6 | 16.6 |
| nom. Reactor Temperature (C.) | 370 | 370 | 370 | 370 | 370 | 370 |
| nom. Reactor Inlet Pressure (psig) | 500 | 500 | 500 | 500 | 500 | 500 |
| nom. H2 to Wax Feed Ratio (sccm/ccm) | 1500 | 1500 | 1500 | 1500 | 1500 | 1500 |
| nom. H2 to Wax Feed Ratio (g/g) | 0.183 | 0.183 | 0.183 | 0.183 | 0.183 | 0.183 |
| act. minimum vapor/liquid volume ratio at the bed inlet (ccm/ccm) | 106.5 | 106.5 | 106.5 | 106.5 | 105.8 | 105.8 |
| ~interstitial vapor feed vel. to cat. bed, given void fraction (mm/s) | 328.93 | 328.93 | 328.93 | 328.93 | 219.25 | 219.25 |
| ~interstitial liq. feed vel. to cat. bed, given void fraction, liq. all liq. (mm/s) | 3.09 | 3.09 | 3.09 | 3.09 | 2.07 | 2.07 |
| ~superficial velocity in bed, vapor (m/s) | 0.112 | 0.112 | 0.112 | 0.112 | 0.0745 | 0.0745 |
| ~superficial velocity in bed, liq. all liq. (m/s) | 0.00105 | 0.00105 | 0.00105 | 0.00105 | 0.000705 | 0.000705 |
| H2 GHSV, sccm H2 feed/cc catalyst (hr−1) | 37,333 | 37,333 | 37,333 | 37,333 | 24,883 | 24,883 |
| act. total GHSV, sccm H2 feed/cc catalyst (hr−1) | 39,298 | 39,298 | 39,298 | 39,298 | 26,193 | 26,193 |
| Tracer N2 in Vapor Feed (mol %) | 5.00 | 5.00 | 5.00 | 5.00 | 5.00 | 5.00 |
| C1 in Product Gas (mol %) | 0.01 | 0.01 | 0.01 | 0.01 | 0.01 | 0.01 |
| C2 in Product Gas (mol %) | 0.003 | 0.003 | 0.003 | 0.003 | 0.004 | 0.004 |
| C3 in Product Gas (mol %) | 0.15 | 0.15 | 0.14 | 0.14 | 0.22 | 0.22 |
| i-C4 in Product Gas (mol %) | 0.08 | 0.08 | 0.08 | 0.08 | 0.14 | 0.14 |
| n-C4 in Product Gas (mol %) | 0.13 | 0.12 | 0.12 | 0.12 | 0.19 | 0.19 |
| C5 in Product Gas (mol %) | 0.14 | 0.14 | 0.14 | 0.14 | 0.22 | 0.23 |
| C6 in Product Gas (mol %) | 0.12 | 0.12 | 0.12 | 0.11 | 0.2 | 0.19 |
| C7 in Product Gas (mol %) | 0.05 | 0.07 | 0.07 | 0.07 | 0.1 | 0.1 |
| C8 in Product Gas (mol %) | 0.007 | 0.02 | 0.02 | 0.02 | 0.02 | 0.02 |
| Condensed Product Distribution (wt % lights) | 35.3% | | 25.8% | 29.8% | 22.2% | 21.7% |
| Density of Mixed Condensed Product at 25° C. (g/ml) | 0.7453 | 0.7377 | 0.7453 | 0.731 | 0.7225 | 0.7423 |
| Overall Mass Balance, Out/In (g/g) | 99.02% | 4.46% | 98.05% | 97.99% | 98.28% | 107.65% |
| hydrocarbon balance check (g out/g in) | 0.98 | 0.03 | 0.97 | 0.97 | 0.96 | 1.06 |
| ASSUMED FEED COMPOSITIONS | | | | | | |
| Days between date for first feed sample in average and date for last feed sample in average | 70 | 70 | 70 | 70 | 70 | 70 |
| <C10 mass % | 1.08% | 1.08% | 1.08% | 1.08% | 1.08% | 1.08% |
| <C15 mass % | 18.99% | 18.99% | 18.99% | 18.99% | 18.99% | 18.99% |
| <C20 mass % | 41.24% | 41.24% | 41.24% | 41.24% | 41.24% | 41.24% |
| <C25 mass % | 57.69% | 57.69% | 57.69% | 57.69% | 57.69% | 57.69% |
| <C30 mass % | 69.86% | 69.86% | 69.86% | 69.86% | 69.86% | 69.86% |
| <C23 mass % | 51.72% | 51.72% | 51.72% | 51.72% | 51.72% | 51.72% |
| <C24 mass % | 54.80% | 54.80% | 54.80% | 54.80% | 54.80% | 54.80% |
| H mass/C mass, % | 17.59% | 17.59% | 17.59% | 17.59% | 17.59% | 17.59% |
| H mass % | 14.96% | 14.96% | 14.96% | 14.96% | 14.96% | 14.96% |
| PRODUCT COMPOSITIONS, INCLUDING GAS PHASE | | | | | | |
| <C5 mass % | 1.7% | | 1.7% | 1.7% | 2.6% | 2.4% |
| <C10 mass % | 9.1% | | 8.9% | 9.3% | 13.4% | 12.9% |
| <C15 mass % | 34.4% | | 34.2% | 35.1% | 41.8% | 41.5% |
| <C20 mass % | 63.2% | | 62.8% | 63.5% | 71.3% | 71.5% |
| <C25 mass % | 84.8% | | 84.5% | 84.9% | 92.4% | 92.5% |
| <C30 mass % | 97.1% | | 96.9% | 97.0% | 100.0% | 100.0% |
| <C23 mass % | 77.3% | | 76.9% | 77.5% | 85.4% | 85.4% |
| <C24 mass % | 81.2% | | 80.9% | 81.4% | 89.2% | 89.2% |

TABLE 5-continued

| Reactor 5 Sample | A | B | C | D | E | F |
|---|---|---|---|---|---|---|
| H mass/C mass, % | 17.9% | | 17.9% | 17.9% | 18.1% | 18.0% |
| H mass % | 15.2% | | 15.2% | 15.2% | 15.3% | 15.3% |
| PRODUCT COMPOSITIONS, w/o GAS PHASE | | | | | | |
| <C10 mass % iso | 1.5% | | 1.4% | 1.5% | 2.8% | 2.8% |
| <C17 mass % iso | 10.7% | | 10.5% | 10.8% | 18.2% | 18.3% |
| <C23 mass % iso | 24.1% | | 24.3% | 24.8% | 37.1% | 37.1% |
| <C10 mass % normal | 3.6% | | 3.3% | 3.7% | 4.3% | 4.3% |
| <C17 mass % normal | 33.4% | | 33.1% | 33.7% | 32.6% | 32.5% |
| <C23 mass % normal | 52.3% | | 51.6% | 51.7% | 47.2% | 47.4% |
| C10-C16, iso/normal | 0.31 | | 0.31 | 0.31 | 0.54 | 0.55 |
| C17-C22, iso/normal | 0.71 | | 0.75 | 0.78 | 1.29 | 1.26 |
| PRODUCT COMPOSITIONS, EXCLUDING GAS PHASE | | | | | | |
| ASTM correlation | ASTM D 2887 | ASTM D 2887 | ASTM D 2887 | ASTM D 2887 | ASTM D 2887 | ASTM D 2887 |
| ≤150° C. mass % | 2.94 | 2.88 | 2.93 | 2.93 | 4.83 | 4.90 |
| ≤160° C. mass % | 4.32 | 3.69 | 4.19 | 4.29 | 6.51 | 6.72 |
| ≤175° C. mass % | 6.00 | 5.67 | 6.00 | 6.00 | 8.80 | 9.40 |
| ≤200° C. mass % | 10.23 | 9.74 | 10.20 | 10.28 | 14.52 | 15.36 |
| ≤250° C. mass % | 20.51 | 19.58 | 20.40 | 20.77 | 27.47 | 28.55 |
| ≤260° C. mass % | 24.50 | 23.53 | 24.41 | 25.03 | 32.21 | 33.30 |
| ≤300° C. mass % | 36.54 | 35.56 | 36.36 | 36.88 | 46.22 | 47.35 |
| ≤350° C. mass % | 55.44 | 54.53 | 55.06 | 55.93 | 67.31 | 68.43 |
| ≤370° C. mass % | 62.64 | 61.73 | 62.22 | 63.13 | 75.50 | 76.50 |
| ≤400° C. mass % | 73.80 | 72.88 | 73.38 | 74.44 | 87.00 | 87.87 |
| ≤450° C. mass % | 88.76 | 87.95 | 88.36 | 89.32 | 97.93 | 98.37 |
| PRODUCT COMPOSITIONS, EXCLUDING GAS PHASE | | | | | | |
| ASTM correlation | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) | ASTM D 86 corr. (STP 577) |
| ≤150° C. vol % | | | | | | |
| ≤160° C. vol % | | | | | 0.47 | 1.16 |
| ≤175° C. vol % | 0.27 | | 0.26 | 0.20 | 3.71 | 4.27 |
| ≤200° C. vol % | 5.04 | 4.44 | 4.98 | 5.10 | 9.09 | 9.46 |
| ≤250° C. vol % | 17.36 | 15.81 | 17.05 | 18.01 | 25.75 | 26.33 |
| ≤260° C. vol % | 20.55 | 18.80 | 20.08 | 21.48 | 29.92 | 30.57 |
| ≤300° C. vol % | 36.99 | 34.68 | 36.24 | 37.78 | 49.21 | 50.10 |
| ≤350° C. vol % | 59.55 | 58.09 | 59.03 | 60.09 | 73.66 | 74.76 |
| ≤370° C. vol % | 67.98 | 66.69 | 67.42 | 68.78 | 83.03 | 84.00 |
| ≤400° C. vol % | 79.77 | 78.54 | 79.15 | 80.51 | 93.99 | 95.23 |
| ≤450° C. vol % | 94.26 | 93.43 | 93.85 | 94.79 | 100.00 | 100.00 |
| Carbon Number Derived Diesel Yield (total basis), wt. based (g C10-C22 in product)/(g total wax fed) | 0.67 | | 0.66 | 0.66 | 0.69 | 0.77 |
| Carbon Number Derived Conversion, wt. based (g ≥ C23 fed − g ≥ C23 in product)/(g ≥ C23 fed) | 0.54 | | 0.54 | 0.55 | 0.71 | 0.68 |
| Carbon Number Derived Diesel (C10-C22) Selectivity, wt. based (g C10-C22 generated)/(g ≥ C23 consumed) | 0.62 | | 0.59 | 0.58 | 0.55 | 0.79 |
| Carbon Number Derived Diesel (C10-C22) Yield (converted basis), wt. based (g C10-C22 generated)/(g ≥ C23 fed) | 0.33 | | 0.31 | 0.32 | 0.39 | 0.54 |
| H2 consumption, based on chemical analyses, carbon basis (H2 scc change hydrocarbon assmg all paraffin)/min | 3.62 | | 3.56 | 3.67 | 3.35 | 3.26 |
| H2 consumption, based on chemical analyses, carbon basis (H2 sccm consumed assmg all paraffin)/ccm wax fed | 23.80 | | 23.43 | 24.12 | 32.82 | 31.95 |

TABLE 6

| Reactor 3 | Sample | | | | |
|---|---|---|---|---|---|
| Regenerated Catalyst Mass (g) | A<br>0.226 | B<br>0.226 | C<br>0.226 | D<br>0.226 | E<br>0.226 |
| TOS (hrs) | 282 | 305 | 329 | 401 | 427 |
| actual WHSV, g wax feed/h/g of catalyst (hr−1) | 29.9 | 29.9 | 29.9 | 29.9 | 29.9 |
| actual LHSV, cc 100° C. wax feed/h/cc of catalyst reactor volume (hr−1) | 24.8 | 24.8 | 24.8 | 24.8 | 24.8 |
| nom. Reactor Temperature (C.) | 370 | 370 | 370 | 370 | 370 |
| nom. Reactor Inlet Pressure (psig) | 500 | 500 | 500 | 500 | 500 |
| nom. H2 to Wax Feed Ratio (sccm/ccm) | 1500 | 1500 | 1500 | 1500 | 1500 |
| nom. H2 to Wax Feed Ratio (g/g) | 0.183 | 0.183 | 0.183 | 0.183 | 0.183 |
| act. minimum vapor/liquid volume ratio at the bed inlet (ccm/ccm) | 106.5 | 106.5 | 106.5 | 106.5 | 106.5 |
| ~interstitial vapor feed vel. to cat. bed, given void fraction (mm/s) | 328.93 | 328.93 | 328.93 | 328.93 | 328.93 |
| ~interstitial liq. feed vel. to cat. bed, given void fraction, liq. all liq. (mm/s) | 3.09 | 3.09 | 3.09 | 3.09 | 3.09 |
| ~superficial velocity in bed, vapor (m/s) | 0.112 | 0.112 | 0.112 | 0.112 | 0.112 |
| ~superficial velocity in bed, liq. all liq. (m/s) | 0.00105 | 0.00105 | 0.00105 | 0.00105 | 0.00105 |
| H2 GHSV, sccm H2 feed/cc catalyst (hr−1) | 37,333 | 37,333 | 37,333 | 37,333 | 37,333 |
| act. total GHSV, sccm H2 feed/cc catalyst (hr−1) | 39,298 | 39,298 | 39,298 | 39,298 | 39,298 |
| Tracer N2 in Vapor Feed (mol %) | 5.00 | 5.00 | 5.00 | 5.00 | 5.00 |
| C1 in Product Gas (mol %) | 0 | 0 | 0 | 0 | 0 |
| C2 in Product Gas (mol %) | 0.004 | 0.006 | 0.005 | 0.005 | 0.005 |
| C3 in Product Gas (mol %) | 0.23 | 0.22 | 0.22 | 0.21 | 0.2 |
| i-C4 in Product Gas (mol %) | 0.17 | 0.15 | 0.15 | 0.13 | 0.13 |
| n-C4 in Product Gas (mol %) | 0.25 | 0.22 | 0.22 | 0.17 | 0.17 |
| C5 in Product Gas (mol %) | 0.24 | 0.23 | 0.23 | 0.23 | 0.23 |
| C6 in Product Gas (mol %) | 0.18 | 0.14 | 0.14 | 0.11 | 0.13 |
| C7 in Product Gas (mol %) | 0.11 | 0.05 | 0.1 | 0.03 | 0.09 |
| C8 in Product Gas (mol %) | 0.03 | 0.01 | 0.01 | 0.01 | 0.01 |
| Condensed Product Distribution (wt % lights) | 31.7% | 24.2% | 30.0% | 22.4% | 33.4% |
| Density of Mixed Condensed Product at 25° C. (g/ml) | 0.7704 | 0.773 | 0.7713 | 0.7746 | 0.7751 |
| Overall Mass Balance, Out/In (g/g) | 101.12% | 100.01% | 99.48% | 98.77% | 99.47% |
| hydrocarbon balance check (g out/g in) | 0.99 | 0.98 | 0.98 | 0.97 | 0.98 |
| ASSUMED FEED COMPOSITIONS | | | | | |
| Days between date for first feed sample in average and date for last feed sample in average | 70 | 70 | 70 | 70 | 70 |

TABLE 6-continued

| Reactor 3 | Sample | | | | |
|---|---|---|---|---|---|
| Regenerated Catalyst Mass (g) | A 0.226 | B 0.226 | C 0.226 | D 0.226 | E 0.226 |
| <C10 mass % | 1.08% | 1.08% | 1.08% | 1.08% | 1.08% |
| <C15 mass % | 18.99% | 18.99% | 18.99% | 18.99% | 18.99% |
| <C20 mass % | 41.24% | 41.24% | 41.24% | 41.24% | 41.24% |
| <C25 mass % | 57.69% | 57.69% | 57.69% | 57.69% | 57.69% |
| <C30 mass % | 69.86% | 69.86% | 69.86% | 69.86% | 69.86% |
| <C23 mass % | 51.72% | 51.72% | 51.72% | 51.72% | 51.72% |
| <C24 mass % | 54.80% | 54.80% | 54.80% | 54.80% | 54.80% |
| H mass/C mass, % | 17.59% | 17.59% | 17.59% | 17.59% | 17.59% |
| H mass % | 14.96% | 14.96% | 14.96% | 14.96% | 14.96% |
| PRODUCT COMPOSITIONS, INCLUDING GAS PHASE | | | | | |
| <C5 mass % | 3.2% | 2.80% | 2.70% | 2.50% | 2.40% |
| <C10 mass % | 13.5% | 11.40% | 12.40% | 11.00% | 12.10% |
| <C15 mass % | 42.4% | 38.50% | 41.90% | 39.20% | 41.90% |
| <C20 mass % | 72.3% | 68.70% | 72.10% | 69.40% | 72.20% |
| <C25 mass % | 93.4% | 91.10% | 93.40% | 91.70% | 93.20% |
| <C30 mass % | 100.0% | 99.90% | 100.00% | 100.00% | 99.90% |
| <C23 mass % | 86.5% | 83.60% | 86.50% | 84.20% | 86.30% |
| <C24 mass % | 90.2% | 87.60% | 90.20% | 88.20% | 90.10% |
| H mass/C mass, % | 18.1% | 18.06% | 18.06% | 18.06% | 18.06% |
| H mass % | 15.3% | 15.30% | 15.30% | 15.30% | 15.30% |
| PRODUCT COMPOSITIONS, w/o GAS PHASE | | | | | |
| <C10 mass % iso | 2.5% | 2.2% | 2.6% | 2.3% | 2.6% |
| <C17 mass % iso | 19.2% | 17.6% | 18.9% | 18.3% | 19.2% |
| <C23 mass % iso | 39.0% | 37.9% | 38.4% | 38.3% | 38.2% |
| <C10 mass % normal | 3.9% | 3.6% | 4.1% | 3.7% | 4.0% |
| <C17 mass % normal | 32.0% | 30.3% | 32.9% | 30.7% | 32.7% |
| <C23 mass % normal | 46.5% | 44.60% | 47.30% | 45.00% | 47.30% |
| C10-C16, iso/normal | 0.59 | 0.58 | 0.57 | 0.59 | 0.58 |
| C17-C22, iso/normal | 1.37 | 1.42 | 1.35 | 1.40 | 1.30 |
| Carbon Number Derived Diesel Yield (total basis), wt. based (g C10-C22 in product)/(g total wax fed) | 0.72 | 0.71 | 0.72 | 0.71 | 0.72 |
| Carbon Number Derived Conversion, wt. based (g ≥ C23 fed-g ≥ C23 in product)/(g ≥ C23 fed) | 0.72 | 0.67 | 0.73 | 0.68 | 0.72 |
| Carbon Number Derived Diesel (C10-C22) Selectivity, wt. based (g C10-C22 generated)/(g ≥C23 consumed) | 0.62 | 0.63 | 0.62 | 0.62 | 0.63 |
| Carbon Number Derived Diesel (C10-C22) Yield (converted basis), wt. based (g C10-C22 generated)/(g ≥ C23 fed) | 0.45 | 0.42 | 0.45 | 0.42 | 0.45 |
| H2 consumption, based on chemical analyses, carbon basis (H2 scc change hydrocarbon assmg all paraffin)/min | 5.01 | 5.01 | 5.01 | 5.01 | 5.01 |
| H2 consumption, based on chemical analyses, carbon basis (H2 sccm consumed assmg all paraffin)/ccm wax fed | 32.97 | 32.97 | 32.97 | 32.97 | 32.97 |

TABLE 7

| Reactor 4 | Sample | | | | | |
|---|---|---|---|---|---|---|
| | A | B | C | D | E | F |
| Regenerated Catalyst Mass (g) | 0.2265 | 0.2265 | 0.2265 | 0.2265 | 0.2265 | 0.2265 |
| TOS (hrs) | 137 | 162 | 304 | 568 | 714 | 832 |
| actual WHSV, g wax feed/h/g of catalyst (hr−1) | 29.8 | 29.8 | 4.9 | 4.9 | 4.9 | 4.9 |
| actual LHSV, cc 100° C. wax feed/h/cc of catalyst reactor volume (hr−1) | 24.8 | 24.8 | 4.1 | 4.1 | 4.1 | 4.1 |
| nom. Reactor Temperature (C.) | 370 | 370 | 370 | 340 | 340 | 340 |
| nom. Reactor Inlet Pressure (psig) | 500 | 500 | 500 | 500 | 300 | 300 |
| nom. H2 to Wax Feed Ratio (sccm/ccm) | 1500 | 1500 | 1500 | 1500 | 1500 | 1250 |
| nom. H2 to Wax Feed Ratio (g/g) | 0.183 | 0.183 | 0.183 | 0.183 | 0.183 | 0.152 |
| act. minimum vapor/liquid volume ratio at the bed inlet (ccm/ccm) | 106.6 | 106.6 | 108.1 | 103.1 | 168.6 | 140.5 |
| ~interstitial vapor feed vel. to cat. bed, given void fraction (mm/s) | 329.22 | 329.22 | 54.92 | 52.35 | 85.63 | 71.36 |
| ~interstitial liq. feed vel. to cat. bed, given void fraction, liq. all liq. (mm/s) | 3.09 | 3.09 | 0.51 | 0.51 | 0.51 | 0.51 |
| ~superficial velocity in bed, vapor (m/s) | 0.112 | 0.112 | 0.0187 | 0.0178 | 0.0291 | 0.0243 |
| ~superficial velocity in bed, liq. all liq. (m/s) | 0.00105 | 0.00105 | 0.000173 | 0.000165 | 0.00027 | 0.000224 |
| H2 GHSV, sccm H2 feed/cc catalyst (hr−1) | 37,364 | 37,364 | 6,232 | 6,232 | 6,232 | 5,194 |
| act. total GHSV, sccm H2 feed/cc catalyst (hr−1) | 39,330 | 39,330 | 6,560 | 6,560 | 6,560 | 5,467 |
| Tracer N2 in Vapor Feed (mol %) | 5.00 | 5.00 | 5.00 | 5.00 | 5.00 | 5.00 |
| C1 in Product Gas (mol %) | 0 | 0 | 0.009 | 0 | 0 | 0.01 |
| C2 in Product Gas (mol %) | 0.005 | 0.004 | 0.02 | 0.003 | 0.004 | 0.007 |
| C3 in Product Gas (mol %) | 0.15 | 0.16 | 1 | 0.23 | 0.23 | 0.27 |
| i-C4 in Product Gas (mol %) | 0.08 | 0.08 | 0.6 | 0.11 | 0.14 | 0.17 |
| n-C4 in Product Gas (mol %) | 0.13 | 0.12 | 0.75 | 0.18 | 0.19 | 0.22 |
| C5 in Product Gas (mol %) | 0.15 | 0.15 | 0.8 | 0.23 | 0.24 | 0.29 |
| C6 in Product Gas (mol %) | 0.05 | 0.09 | 0.09 | 0.06 | 0.19 | 0.14 |
| C7 in Product Gas (mol %) | 0.03 | 0.04 | 0.02 | 0.13 | 0.12 | 0.01 |
| C8 in Product Gas (mol %) | 0.03 | 0.02 | 0.01 | 0.01 | 0.02 | 0 |
| Condensed Product Distribution (wt % lights) | 63.2% | 29.9% | 61.9% | 13.7% | 15.0% | 13.5% |
| Density of Mixed Condensed Product at 25° C. (g/ml) | 0.7762 | 0.7836 | 0.746 | 0.7714 | 0.7683 | 0.7715 |
| Overall Mass Balance, Out/In (g/g) | 99.30% | 96.03% | 87.59% | 99.34% | 98.18% | 95.43% |
| hydrocarbon balance check (g out/g in) | 0.98 | 0.95 | 0.82 | 0.98 | 0.96 | 0.94 |
| ASSUMED FEED COMPOSITIONS | | | | | | |
| Days between date for first feed sample in average and date for last feed sample in average | 70 | 70 | 70 | 70 | 70 | 70 |
| <C10 mass % | 1.08% | 1.08% | 1.08% | 1.08% | 1.08% | 1.08% |
| <C15 mass % | 18.99% | 18.99% | 18.99% | 18.99% | 18.99% | 18.99% |
| <C20 mass % | 41.24% | 41.24% | 41.24% | 41.24% | 41.24% | 41.24% |
| <C25 mass % | 57.69% | 57.69% | 57.69% | 57.69% | 57.69% | 57.69% |
| <C30 mass % | 69.86% | 69.86% | 69.86% | 69.86% | 69.86% | 69.86% |
| <C23 mass % | 51.72% | 51.72% | 51.72% | 51.72% | 51.72% | 51.72% |
| <C24 mass % | 54.80% | 54.80% | 54.80% | 54.80% | 54.80% | 54.80% |
| H mass/C mass, % | 17.59% | 17.59% | 17.59% | 17.59% | 17.59% | 17.59% |
| H mass % | 14.96% | 14.96% | 14.96% | 14.96% | 14.96% | 14.96% |
| PRODUCT COMPOSITIONS, INCLUDING GAS PHASE | | | | | | |
| <C5 mass % | 1.70% | 1.80% | 12.40% | 2.50% | 2.70% | 2.70% |
| <C10 mass % | 6.80% | 6.70% | 31.90% | 8.40% | 10.00% | 8.40% |
| <C15 mass % | 29.90% | 29.70% | 77.90% | 34.10% | 36.30% | 34.70% |
| <C20 mass % | 58.10% | 59.10% | 99.70% | 64.70% | 68.80% | 67.90% |
| <C25 mass % | 80.80% | 83.00% | 100.00% | 87.00% | 92.80% | 92.40% |
| <C30 mass % | 95.00% | 97.00% | 100.00% | 97.70% | 100.00% | 100.00% |
| <C23 mass % | 72.60% | 74.50% | 100.00% | 79.50% | 84.90% | 84.50% |

TABLE 7-continued

| Reactor 4 | Sample | | | | | |
|---|---|---|---|---|---|---|
| Regenerated | A | B | C | D | E | F |
| Catalyst Mass (g) | 0.2265 | 0.2265 | 0.2265 | 0.2265 | 0.2265 | 0.2265 |
| <C24 mass % | 76.90% | 78.90% | 100.00% | 83.50% | 89.20% | 88.80% |
| H mass/C mass, % | 17.87% | 17.88% | 18.72% | 17.95% | 18.01% | 17.98% |
| H mass % | 15.16% | 15.17% | 15.77% | 15.22% | 15.26% | 15.24% |
| PRODUCT COMPOSITIONS, w/o GAS PHASE | | | | | | |
| <C10 mass % iso | 0.9% | 0.8% | 9.7% | 0.8% | 1.2% | 1.3% |
| <C17 mass % iso | 9.5% | 10.5% | 66.3% | 14.2% | 16.4% | 17.1% |
| <C23 mass % iso | 24.5% | 27.8% | 75.7% | 35.5% | 39.6% | 41.6% |
| <C10 mass % normal | 2.3% | 1.9% | 5.8% | 1.8% | 1.9% | 1.9% |
| <C17 mass % normal | 29.6% | 28.7% | 23.3% | 29.2% | 29.3% | 28.2% |
| <C23 mass % normal | 47.10% | 45.60% | 24.20% | 42.70% | 44.10% | 42.00% |
| C10-C16, iso/normal | 0.32 | 0.36 | 3.23 | 0.49 | 0.55 | 0.60 |
| C17-C22, iso/normal | 0.86 | 1.02 | 10.44 | 1.58 | 1.57 | 1.78 |
| Carbon Number Derived Diesel Yield (total basis), wt. based (g C10-C22 in product)/ (g total wax fed) | 0.65 | 0.64 | 0.56 | 0.69 | 0.72 | 0.71 |
| Carbon Number Derived Conversion, wt. based (g ≥ C23 fed − g ≥ C23 in product)/(g ≥ C23 fed) | 0.44 | 0.50 | 1.00 | 0.59 | 0.70 | 0.70 |
| Carbon Number Derived Diesel (C10-C22) Selectivity, wt. based (g C10-C22 generated)/(g ≥ C23 consumed) | 0.65 | 0.57 | 0.10 | 0.66 | 0.63 | 0.61 |
| Carbon Number Derived Diesel (C10-C22) Yield (converted basis), wt. based (g C10-C22 generated)/(g ≥ C23 fed) | 0.29 | 0.28 | 0.10 | 0.39 | 0.44 | 0.43 |
| H2 consumption, based on chemical analyses, carbon basis (H2 scc change hydrocarbon assmg all paraffin)/min | 2.94 | 3.09 | 1.98 | 0.63 | 0.73 | 0.68 |
| H2 consumption, based on chemical analyses, carbon basis (H2 sccm consumed assmg all paraffin)/ccm wax fed | 19.33 | 20.30 | 79.10 | 25.17 | 29.07 | 27.12 |

Figure 34:
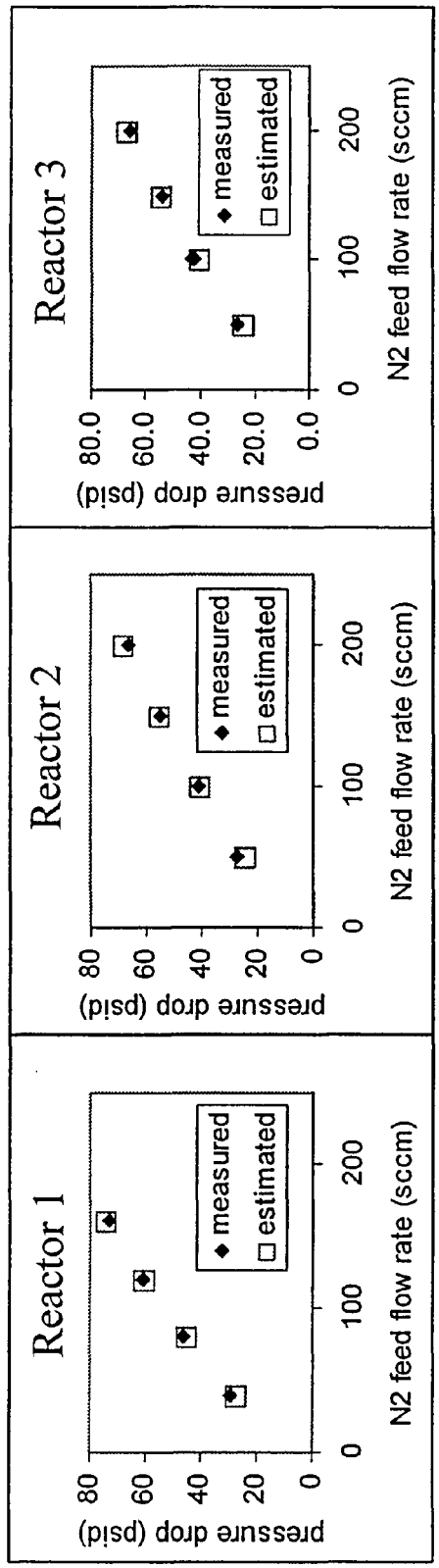
FIG. 34 consists of charts showing pressure drop measurements and estimates for Reactors 1-3 used in Example 1.

In order to ensure consistency between reactor runs the cold flow pressure drop (100% nitrogen gas at 25° C.) is measured prior to operation. Cold flow pressure drop is assessed by flowing nitrogen through the reactors at several feed rates. Bed voidage is estimated by using the Ergun equation and fixed values of sphericity, average particle diameter for the pre-bed material and average (Dp(50)) catalyst diameter particles. Voidage is adjusted until predicted and measured pressured drops are in agreement. Measured results and estimates are plotted for Reactors 1-3 in FIG. 34. The void fractions corresponding to the estimates are summarized in Table 8. Particle sphericity is estimated from the micrographs shown in FIG. 33. Results indicate repeatable reactor loading.

TABLE 8

| Reactor | 1 | 2 | 3 |
|---|---|---|---|
| pre bed length (in) | 3 | 4 | 4 |
| main bed length (in) | 18 | 6 | 6 |
| main bed void fraction | 0.356 | 0.34 | 0.34 |
| pre bed particle diameter (um) | | 98 | |
| main bed particle diameter (um) | | 127 | |
| reactor inside diameter (in) | | 0.069 | |
| particle sphericity | | 0.8 | |

Table 8. Assumed and estimated bed properties used to ensure reactor bed consistency. Average particle diameter is estimated from micrograph views of the catalyst and kept constant throughout. Cold flow pressure drop measurements are obtained prior to reactor operation using 100% nitrogen gas at 25° C.

Two estimates of the vapor/liquid volume ratios (phase distribution) at the catalyst reactor inlet are made using a ChemCAD flash model using the Grayson-Streed vapor liquid equilibrium equations and assuming a FT product hydrocarbon distribution with an α of 0.88 as the liquid feed; all material with a higher molecular weight than $C_{36}$ is included in the $C_{36}$ mass fraction. The grouping of the higher molecular weight feed into the $C_{36}$ fraction is expected to lead to under-prediction of the liquid phase fraction. Table 9 summarizes the predictions, showing that under the range of conditions in the experiments, the reaction involves a three-phase system.

TABLE 9

| wax feed | | vapor feed | | vapor/ liquid ratio | | vapor/liquid ratio, kg/kg | |
|---|---|---|---|---|---|---|---|
| | | | | | | before flash | after flash |
| Sm3/h | m3/h | Sm3/h | m3/h | sccm/ccm | ccm/ccm | | |
| 0.600 | 0.082 | 900 | 65.0 | 1,500 | 792 | 0.18 | 10.82 |
| 0.600 | 0.221 | 300 | 23.6 | 500 | 107 | 0.06 | 3.21 |

Figure 35A:
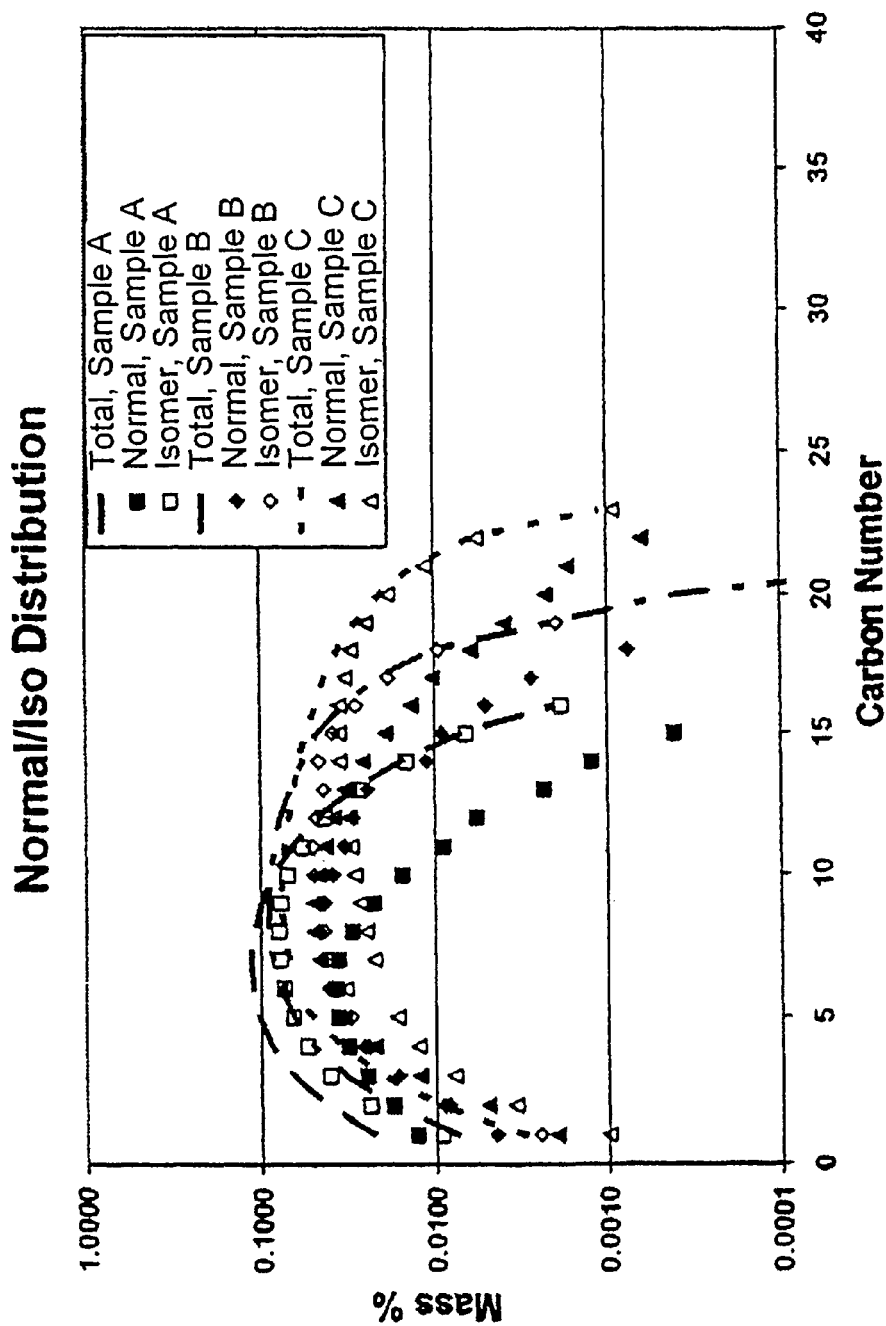
FIGS. 35a and b are graphs showing normal/iso distributions for the product from the Reactor 2 test run in Example 1.

Table 5. ChemCAD simulated hydrocracker feed phase distribution is obtained using Grayson-Streed vapor liquid equilibrium equations. The simulated flash involves 500 psig (3.45 MPa), 370° C Feed and product samples for the experimental cases considered are analyzed to obtain simulated distillation curves and iso/normal carbon number distributions (results for the heavy and light product fractions are added to calculate overall product profiles, in accordance to their mass fractions; the composition and mass of the vapor product stream are not included in the calculation). Some of the results are shown in FIGS. 35a, b, and c. The iso/normal distributions further emphasize the effectiveness of the hydrocracking, creating large isomer fractions that are likely to contribute to the lowering of the cloud point and improvement in flow properties of the product. At the lower WHSV, all hydrocarbons show higher isomer than normal product distribution. As the WHSV increases, the higher molecular weight products show greater extent of isomerization. Conversion to diesel and diesel yield are calculated for each of the catalytic bed cases whose results are shown in FIGS. 35a, b, and c using both the simulated distillation results and carbon number distributions. These are summarized in Table 10.

TABLE 10

| Reactor 2 run designation | | feed used (g) | heavy liquid product collection (g) | light liquid product collection (g) |
|---|---|---|---|---|
| 10 hr-1, 370° C. | A | 152.9 | 43.6 | 73.4 |
| 20 hr-1, 370° C. | B | 91.1 | 51.9 | 28.4 |
| 30 hr-1, 370° C. | C | 113.7 | 78.6 | 25.6 |

| | carbon number distribution (mass %) | | | simulated distillation (mass %) | | |
|---|---|---|---|---|---|---|
| run designation | conver- sion | diesel yield | selectivity to diesel | conver- sion | diesel yield | selectivity to diesel |
| 10 hr-1, 370° C. | 99.7 | 2.9 | 2.9 | 99.4 | -7.1 | -7.1 |
| 20 hr-1, 370° C. | 97.1 | 48.8 | 47.4 | 90.6 | 43.2 | 39.2 |
| 30 hr-1, 370° C. | 75.7 | 57.1 | 43.2 | 62.3 | 50.2 | 31.2 |

Table 10. Conversion, selectivity and yield extrapolated from simulated distillation and carbon number distributions, adopting designations and cutoff points. The diesel fraction is designated as $C_{10}$ to $C_{22}$ with a boiling point ranging from 175° C. to 370° C.

Figure 42:
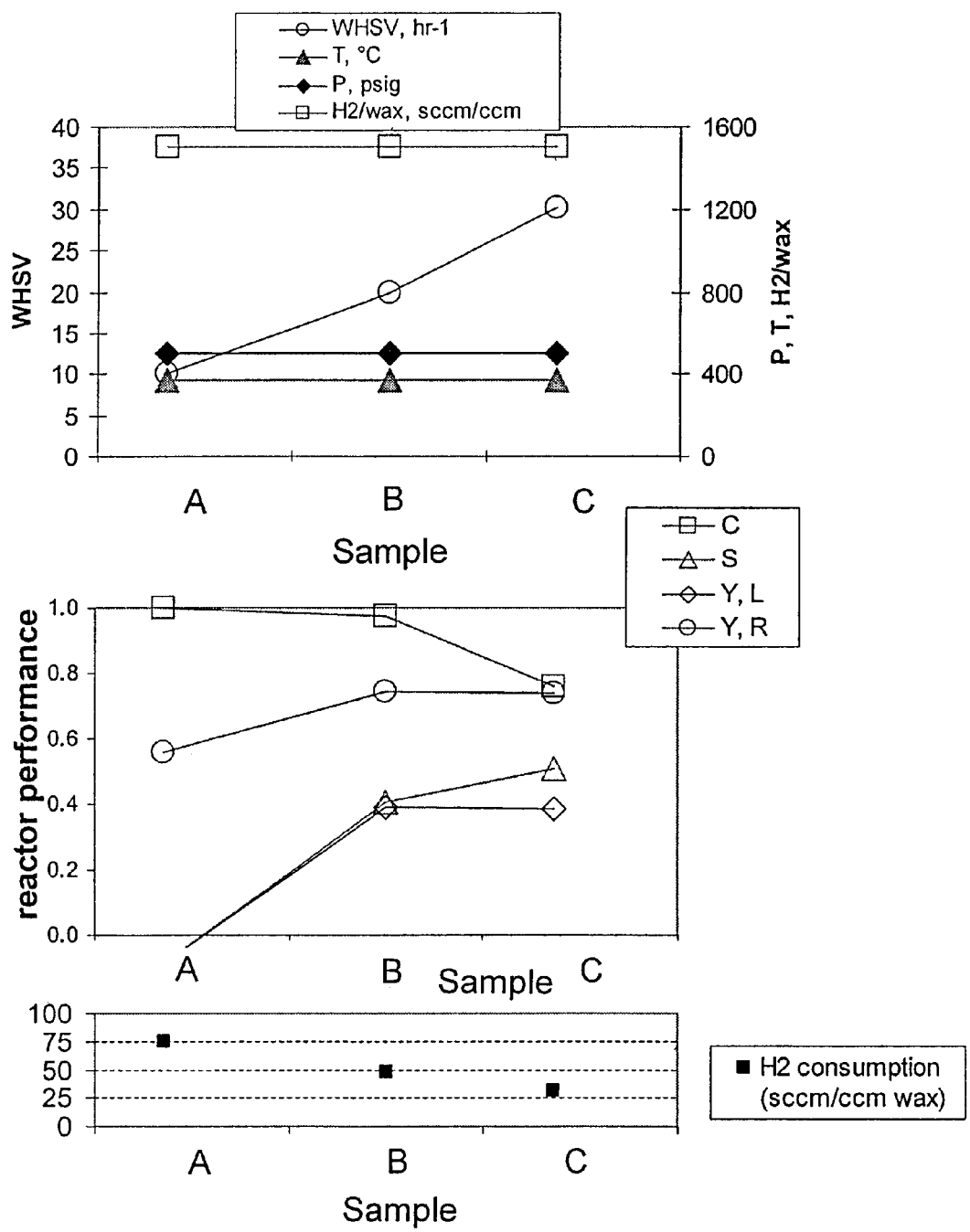
FIG. 42 consists of three plots showing run conditions and performance measures for Reactor 2 in Example 1 over the course of the operation of Reactor 2.
Figure 43:
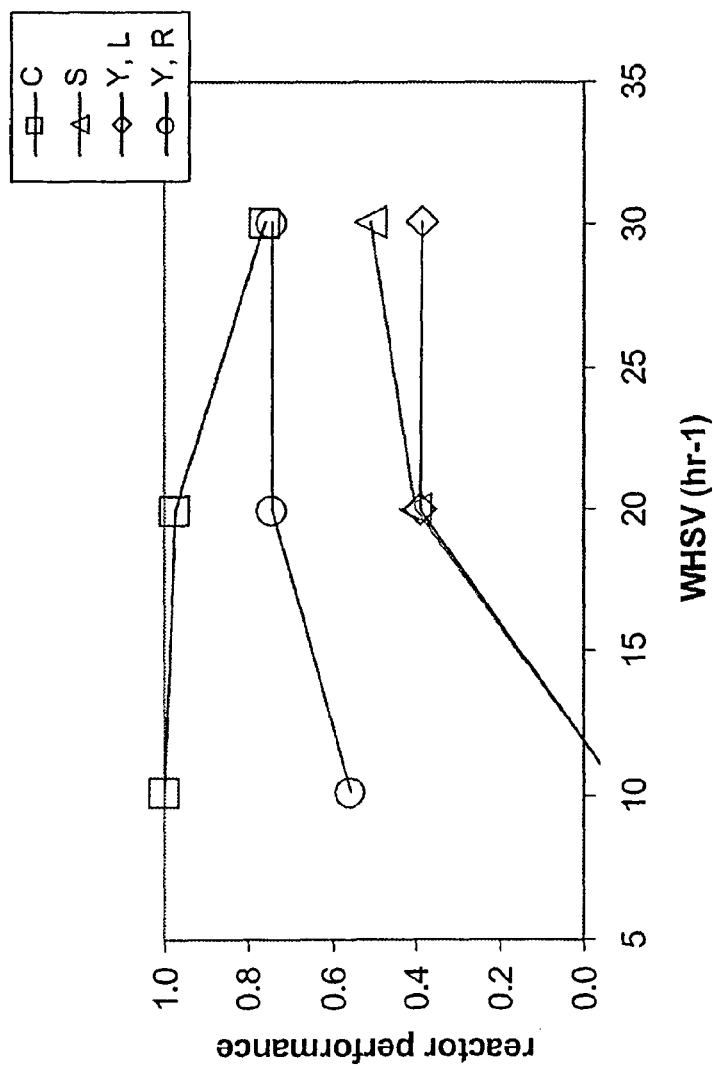
FIG. 43 is a plot showing performance measures for Reactor 2 in Example 1 as a function of the weight hourly space velocity (WHSV) for the wax reactant used in the test run.

The results for Reactor 2 in Table 2 show reactor performance at high feed flow rates and standard pressures, temperatures, and hydrogen/wax feed ratios. These runs demonstrate the impact of WHSV on process output. For ease of reference, run conditions, performance measures and specific hydrogen consumption over the course of the run for Reactor 2 are plotted in FIG. 42. As the only variable for this run is the wax WHSV, the performance measures are also plotted in terms of WHSV, in FIG. 43. As these figures indicate, increasing wax WHSV from 10 to 20 $hr^{-1}$, keeping all other conditions constant, leads to a slight decrease in conversion, but increased selectivity to diesel, and increased diesel yield, measured on both converted (L) and total (R) basis. Further increase in wax to obtain a feed rate of WHSV from 20 to 30 $hr^{-1}$ leads to a further decrease in conversion, but increased selectivity to diesel. Increased specific hydrogen consumption measures at lower WHSV plotted in FIG. 42 supports the observation of overcaking.

Figure 35C:
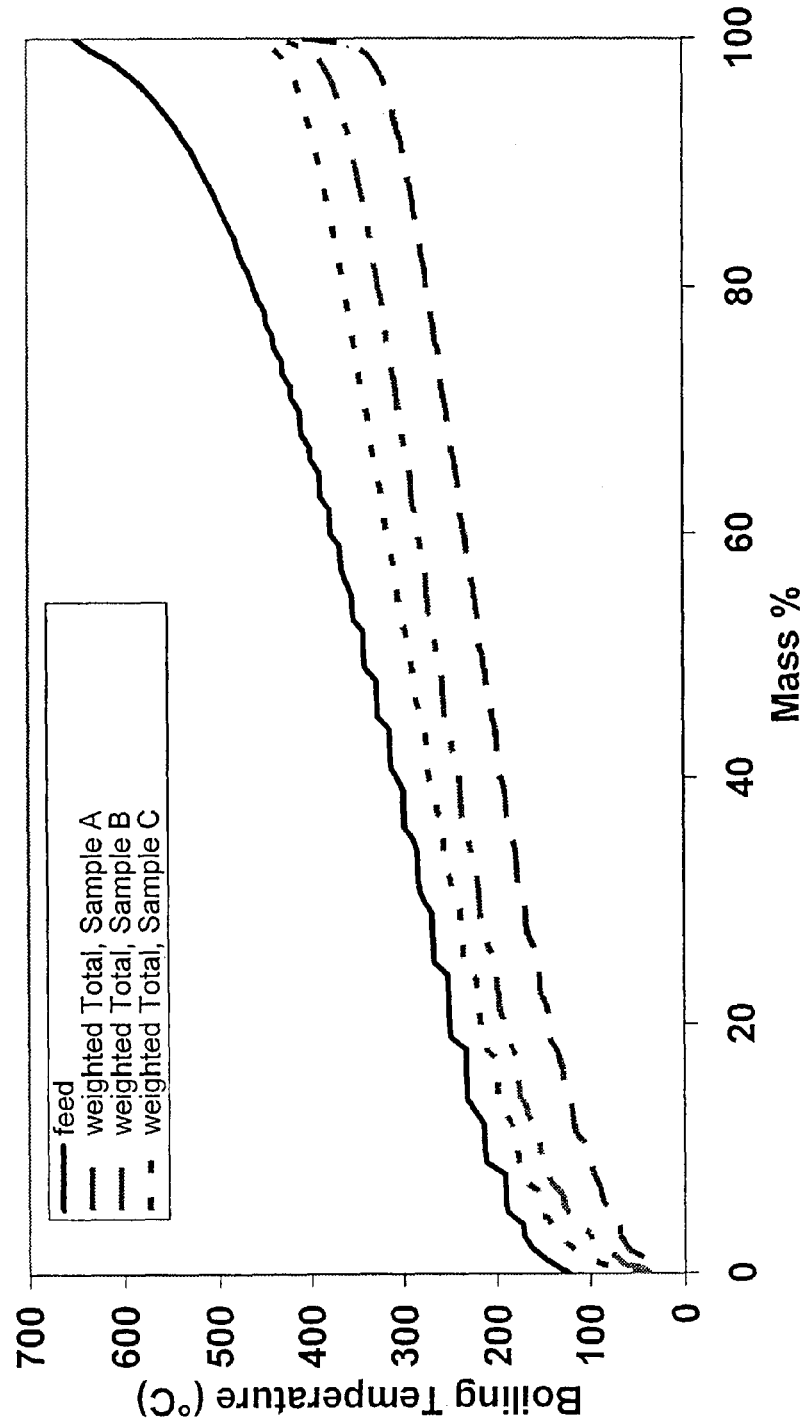
FIG. 35c is a graph showing simulated distillation curves for the product from the Reactor 2 test run in Example 1.
Figure 35D:
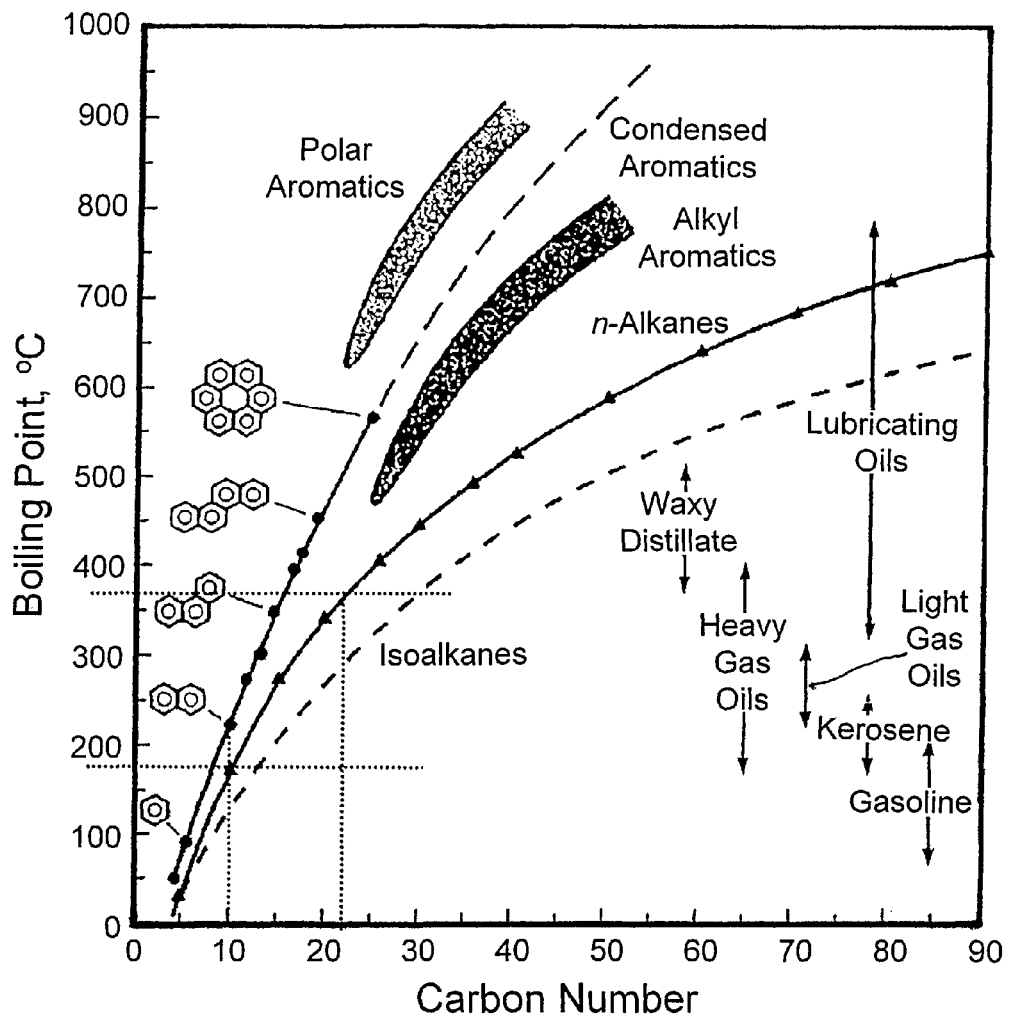
FIG. 35d is a graph showing the relationship between boiling points and carbon numbers.
Figure 44:
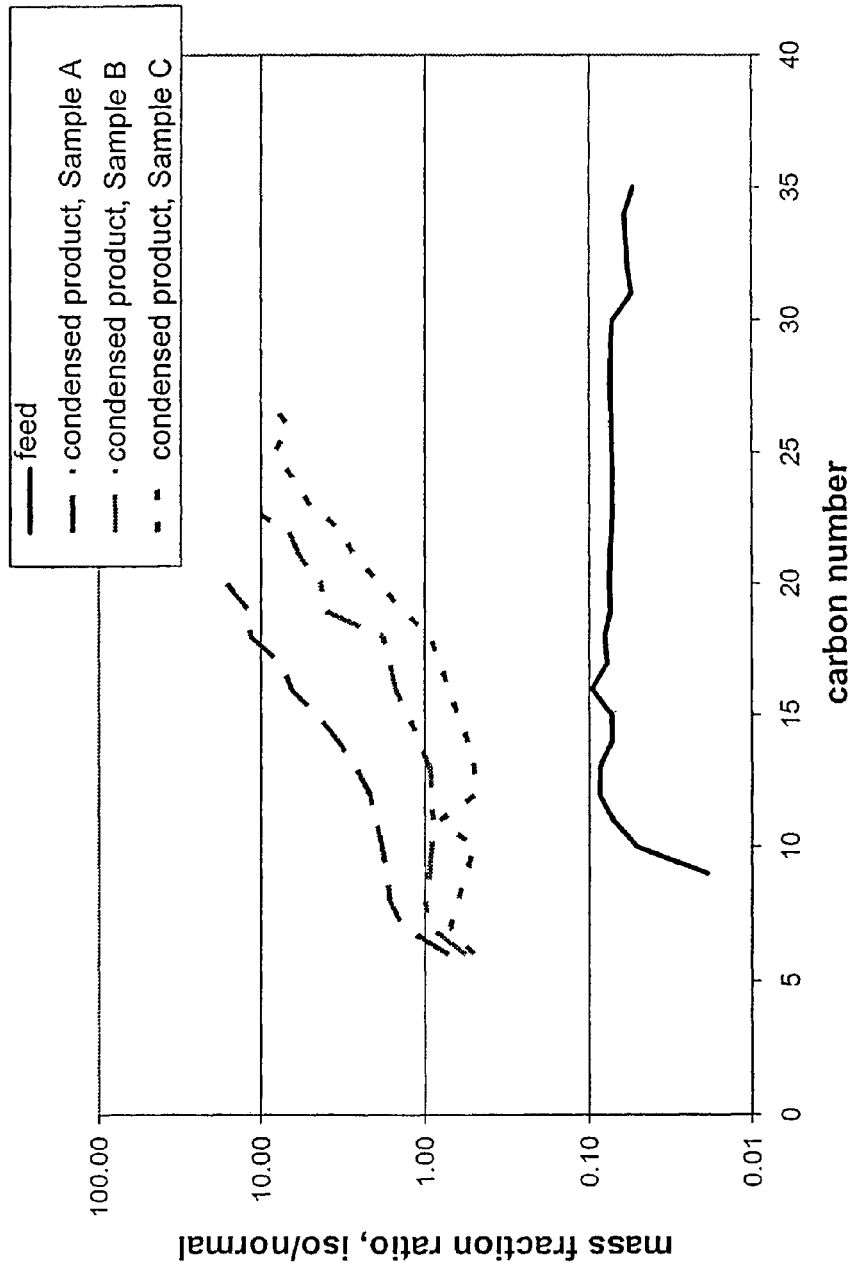
FIG. 44 is a plot showing the iso paraffin/normal paraffin mass fraction ratio as a function of carbon number for the product obtained in Reactor 2 of Example 1.
Figure 45:
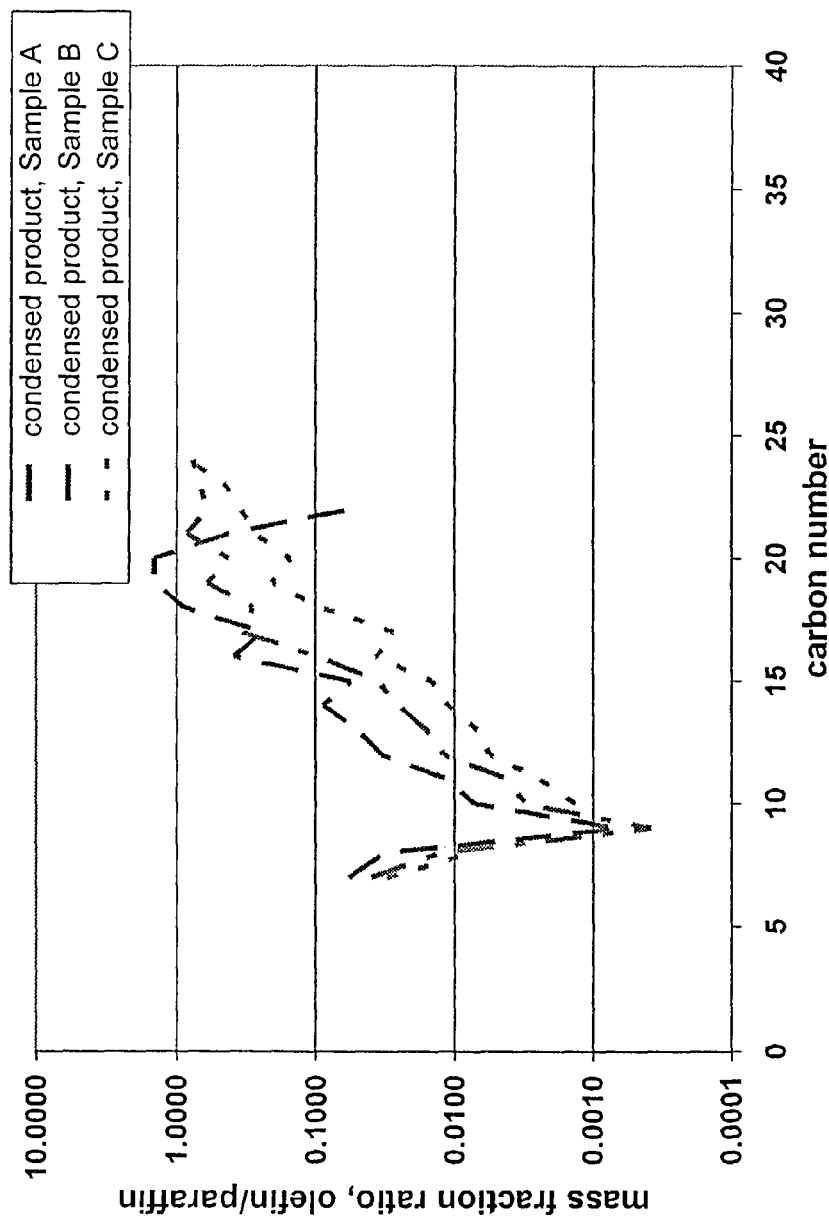
FIG. 45 is a plot showing the olefin/paraffin mass fraction ratio as a function of carbon number for the product obtained from Reactor 2 in Example 1.

The impact of varying WHSV can also be seen by plotting the carbon number distribution of the products and the feed, which is shown in FIG. 35b. Increased flow rate leads to increased hydrocracking, shifting the distribution towards lower carbon numbers. Overall, significant hydrocracking occurs, as evidenced by comparing product against feed profiles. FIG. 35c shows simulated distillation profiles for these runs, as well; the trends reinforce conclusions relating to FIG. 35b. A plot of the iso/normal distribution profiles for the condensed product fraction is shown in FIG. 44. This reveals that the feed, almost completely normal, undergoes significant isomerization in the process of hydrocracking. Increasing WHSV appears to lead to a decrease in the extent of isomerization. Olefins are present in the hydrocracked product (FIG. 45). As with the case for the isomers to normal ratio, the olefin fraction increases with increasing carbon number and is inversely proportional to the WHSV. Increased isomer and olefin contents for the higher carbon numbers are a likely reflection of known preferential adsorption and hydrocracking for higher molecular weight fractions of the wax.

Figure 46:
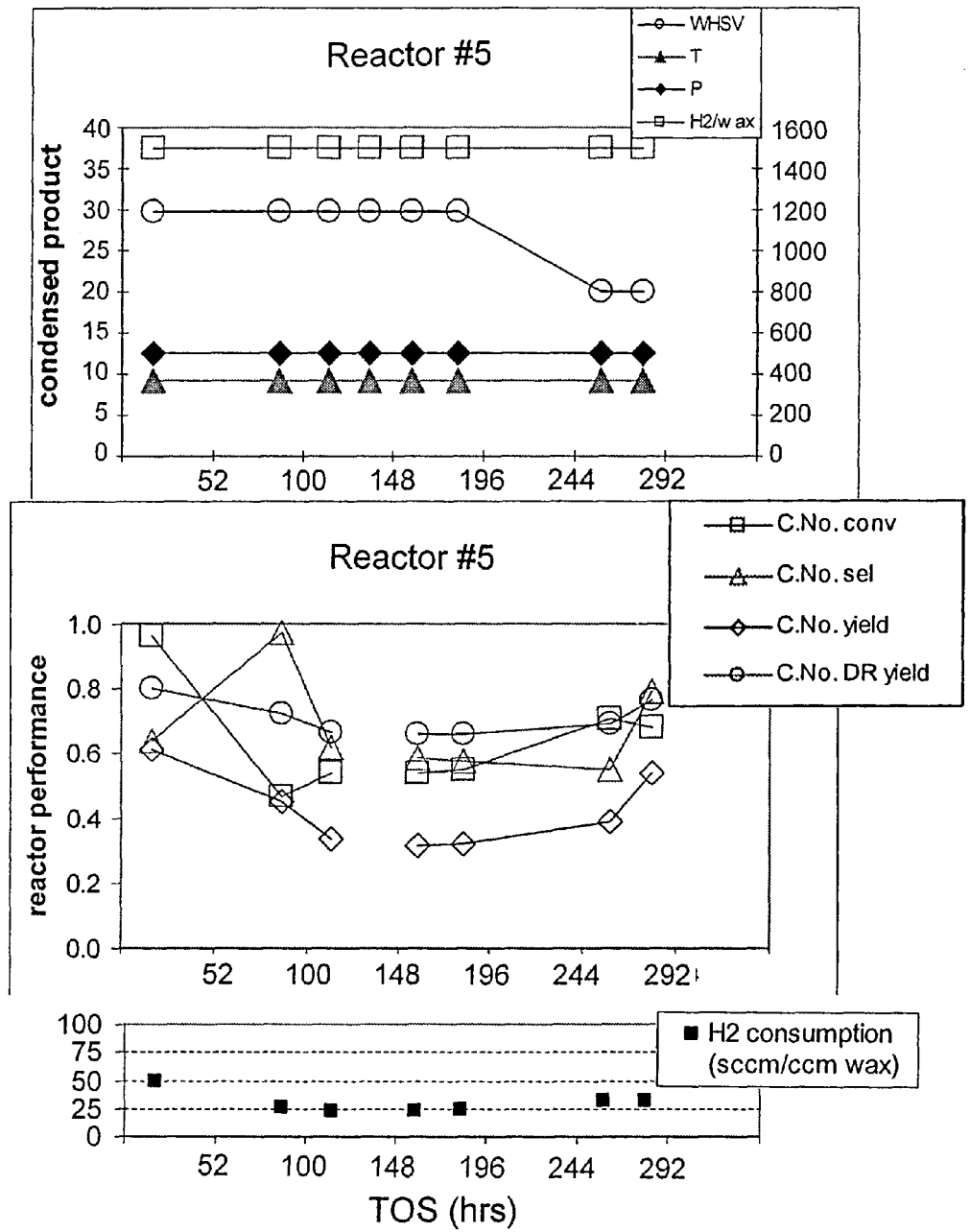
FIG. 46 consists of three plots showing run conditions and performance measures for Reactor 5 in Example 1 over the course of the operation of Reactor 5.
Figure 47:
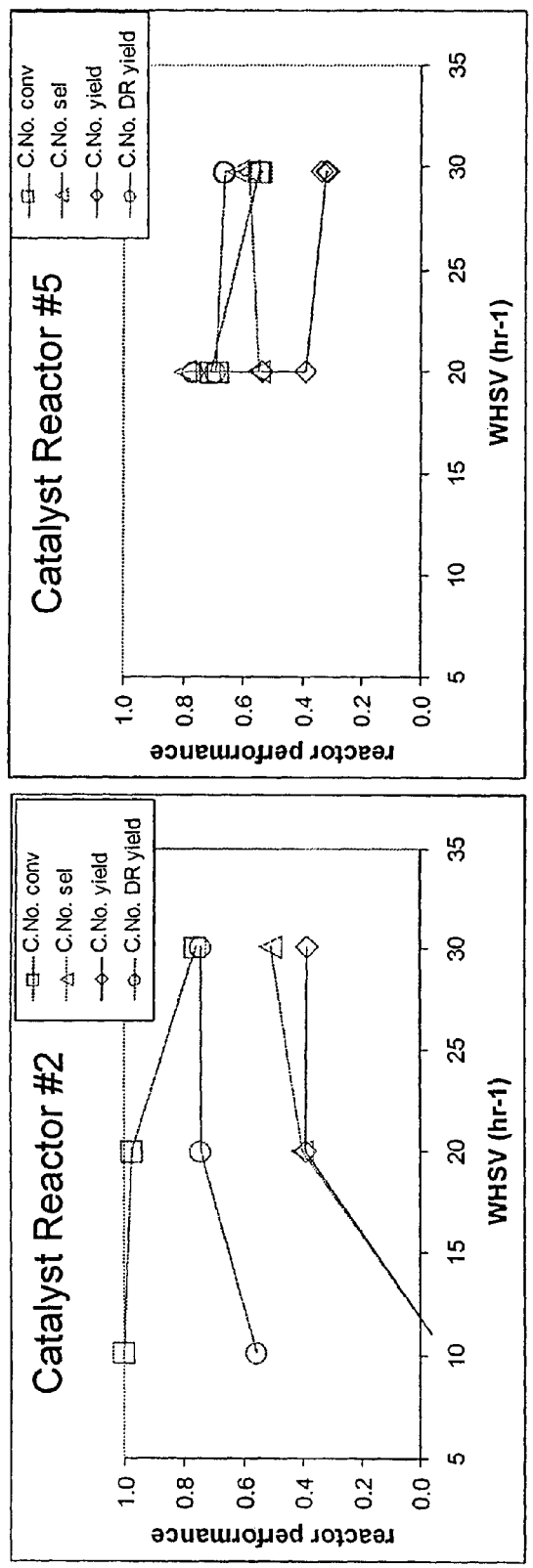
FIG. 47 consists of two plots showing performance measures for Reactors 2 and 5 in Example 1 as a function of the WHSV for the wax reactant used in the test runs.

The results for Reactor 5 (FIG. 46) demonstrate that several days may be necessary to obtain steady reactor performance in some instances. This break-in period is generally disregarded and the operation after this time-on-stream (TOS) is referred to as "equilibrated" operation. When the initial period is disregarded a trend can be seen, as shown in FIG. 47, allowing comparison between the performances of Reactor 5 and Reactor 2. For the same WHSV, the two reactors show similar selectivity and yield values. Conversion trends as a function of WHSV are also very similar, although Reactor 5 results in lower conversions. The jump in conversion can be attributed to the difference in feed composition, as shown in FIG. 41. As shown in FIG. 46, because of the feed composition difference, hydrogen consumption may not be directly comparable across reactors. However, increased consumption is evident for steady operation at the lower WHSV. Significantly more hydrogen is fed than is consumed.

Figure 48:
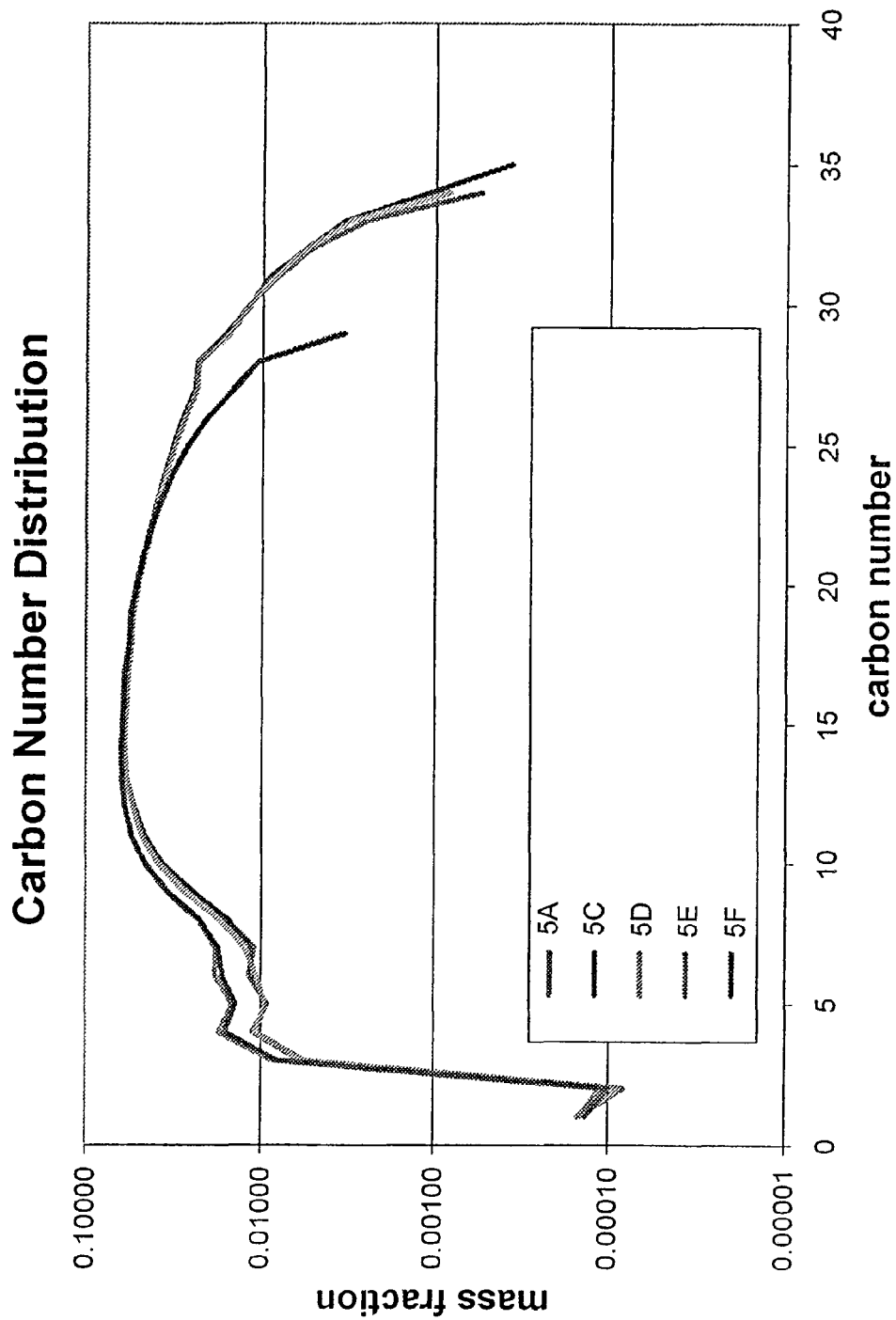
FIG. 48 is a plot showing mass fraction as a function of carbon number for the product obtained in Reactor 5 of Example 1.
Figure 49:
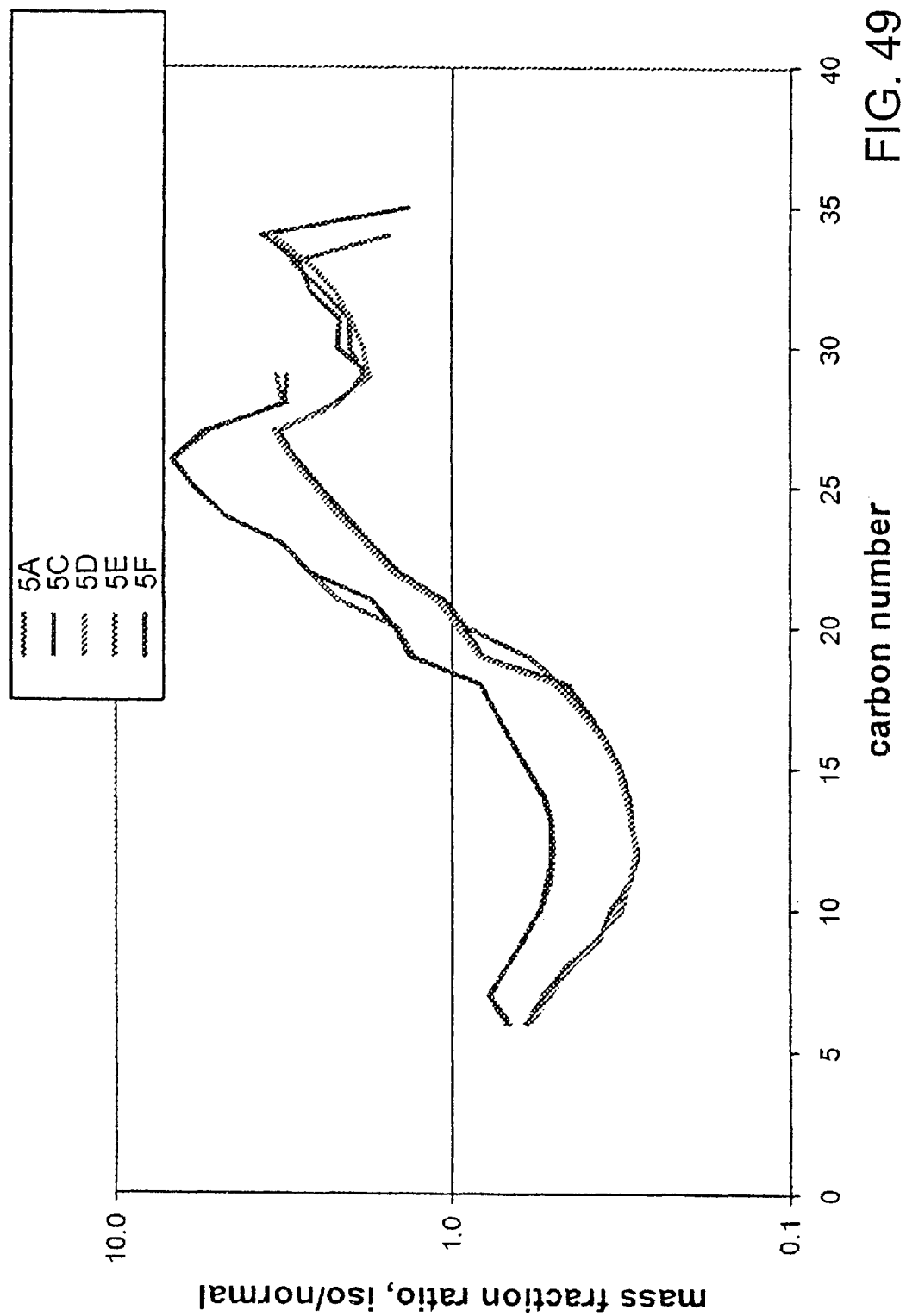
FIG. 49 is a plot showing the iso paraffin/normal paraffin mass fraction ratio as a function of carbon number for the product obtained in Reactor 5 of Example 1.
Figure 50:
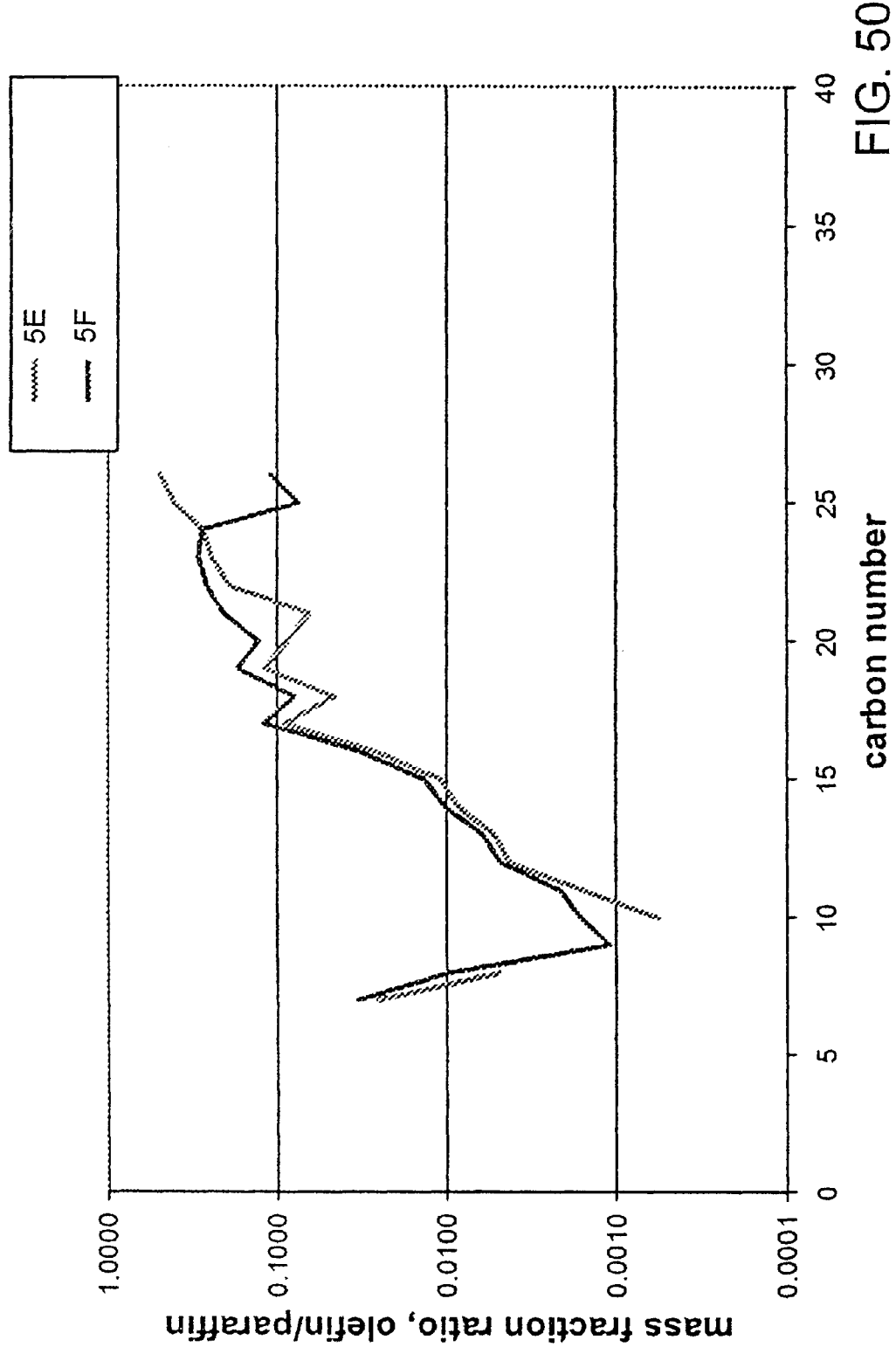
FIG. 50 is a plot showing the olefin/paraffin mass fraction ratio as a function of carbon number for the product obtained in Reactor 5 of Example 1.

WHSV effects are also clarified by looking at the carbon number distributions for the equilibrated cases of Reactor 5, shown in FIG. 48. Profiles of iso/normal and olefin/paraffin ratios shown in FIGS. 49 and 50, respectively, also show the same trends seen for Reactor 2, although the olefin profiles for the two WHSV almost completely coincide. The following abbreviations are used in FIGS. 48-50 to identify the test samples:

5A: Reactor 5, Sample A, Table 5
5C: Reactor 5, Sample C, Table 5
5D: Reactor 5, Sample D, Table 5
5E: Reactor 5, Sample E, Table 5
5F: Reactor 5, Sample F, Table 5

Figure 51:
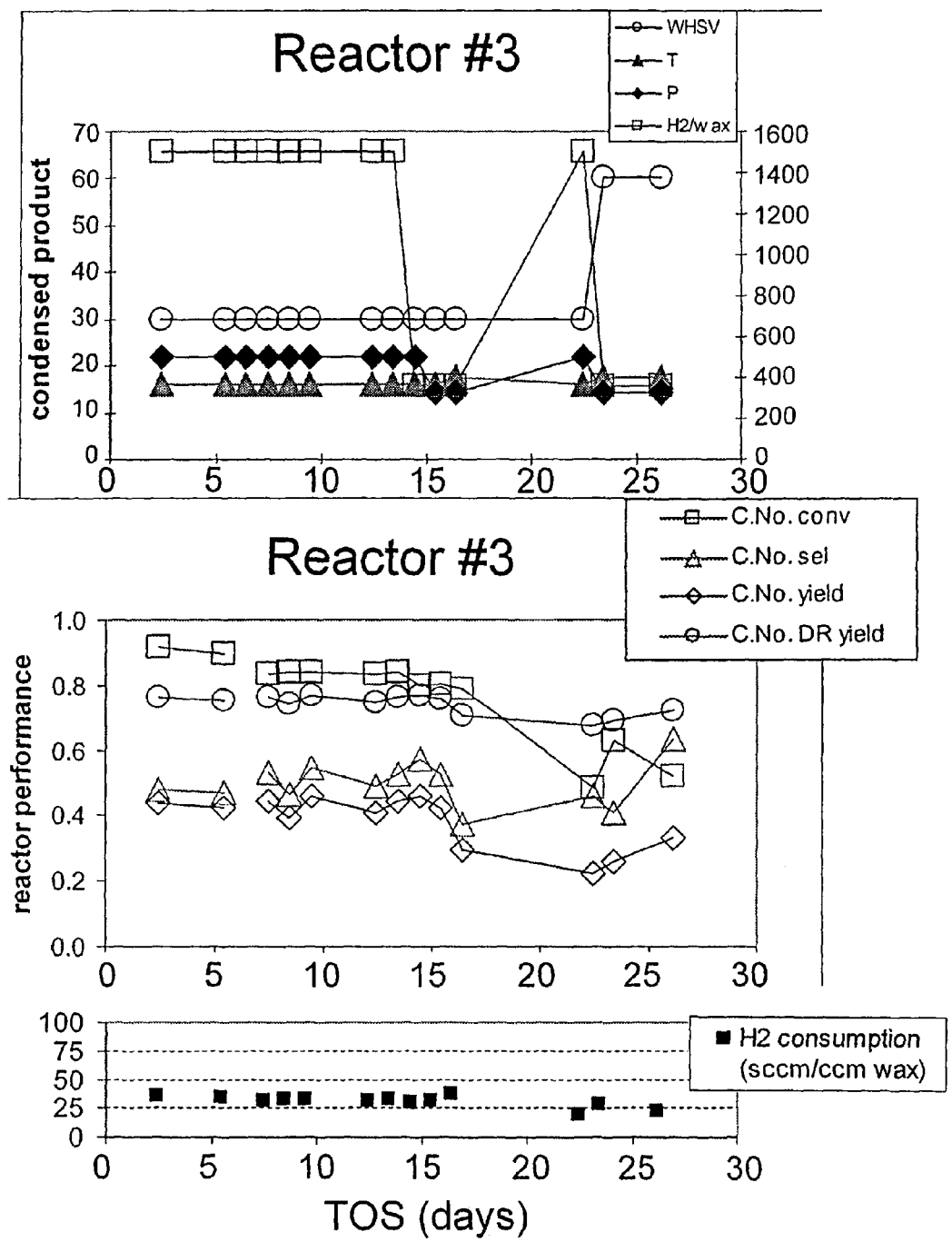
FIG. 51 consists of three plots showing run conditions and performance measures for Reactor 3 in Example 1 over the course of the operation of Reactor 3.
Figure 52:
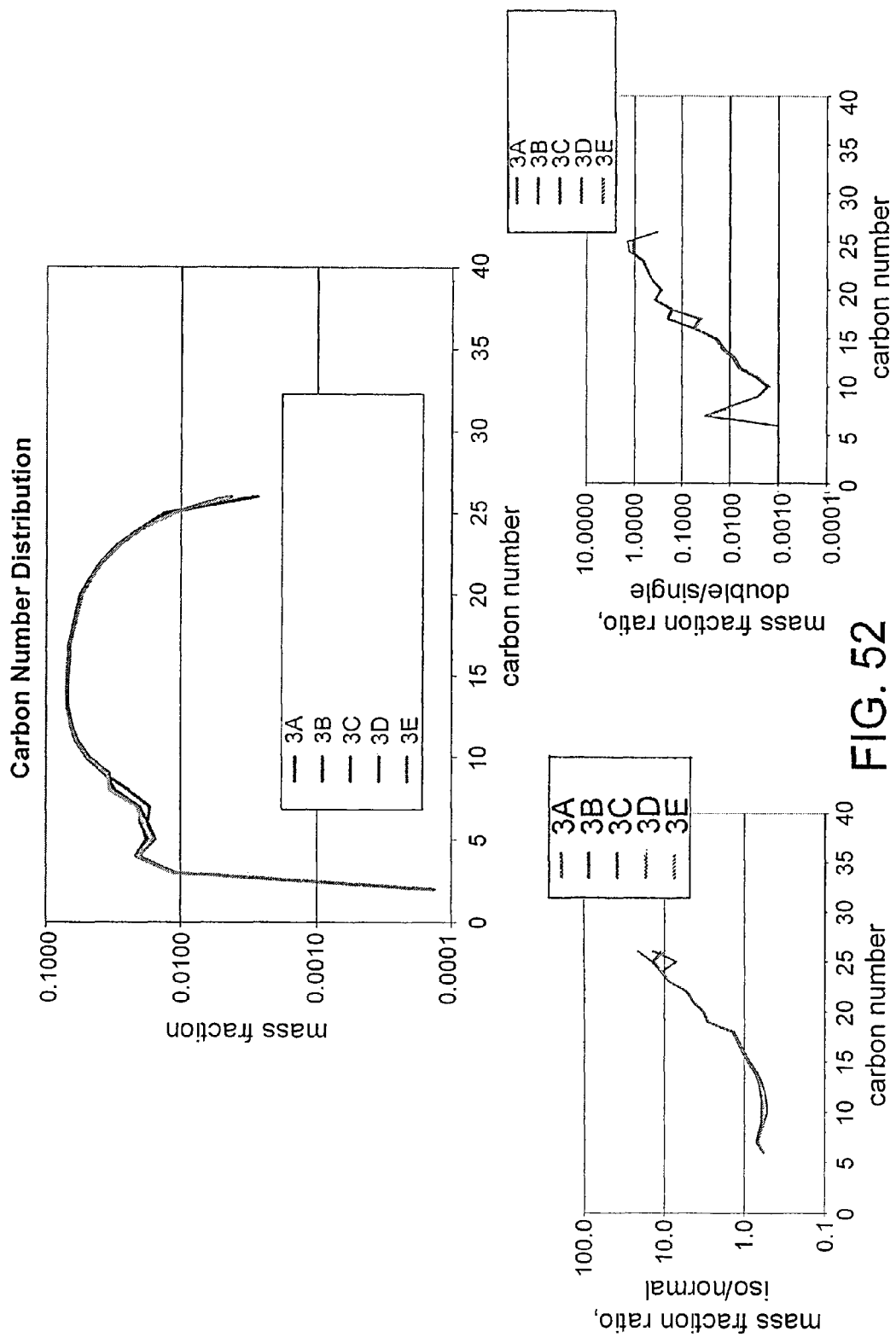
FIG. 52 consists of three plots showing mass fraction as a function of carbon number, iso paraffin/normal paraffin mass fraction ratios as a function of carbon number, and olefin/paraffin mass fraction ratios as a function of carbon number for the product obtained in Reactor 3 of Example 1.

Run conditions and corresponding performance measures over the course of operation for Reactor 3 in Table 3 are plotted as a function of time in FIG. 51. A wide range of conditions are run through the course of the operation of this reactor. Reactor 3 shows long term behavior of the system operating at the same conditions, for the first part of its operation. Operational changes, made after the first part of the operation coincide with a change in feed composition. Carbon number, iso/normal, and olefin/paraffin distributions for the equilibrated cases are plotted in FIG. 52. The following abbreviations are used in FIG. 52 to identify the test samples:

3A: Reactor 3, Sample A, Table 3
3B: Reactor 3, Sample B, Table 3
3C: Reactor 3, Sample C, Table 3
3D: Reactor 3, Sample D, Table 3
3E: Reactor 3, Sample E, Table 3

The almost exact agreement in these values indicates stable and consistent operation over reasonably long time periods. As shown in FIG. 51, specific hydrogen consumption is consistent over the stable operation period and holds at approximately the same value after the initial decrease in $H_2$/wax feed ratio.

Figure 53:
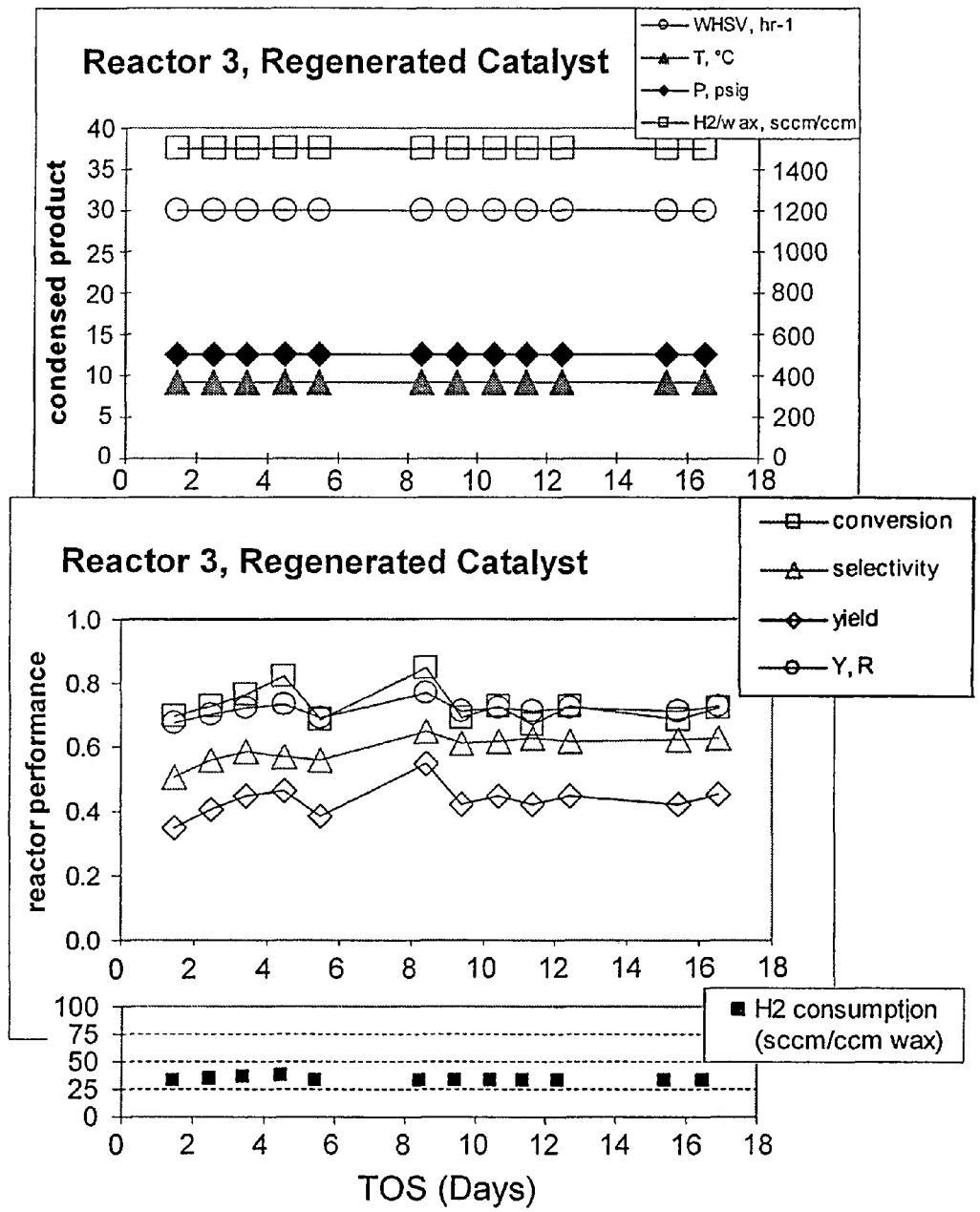
FIG. 53 consists of three plots for Reactor 3 in Example 1 with a regenerated catalyst, the plots showing run conditions and performance measures over the course of the operation of the reactor.

Run conditions and corresponding performance measures shown in Table 6 for the regenerated catalyst for Reactor 3 are plotted as a function of time in FIG. 53. Conditions are held constant for the duration of the operation, and performance is noted to improve in the course of startup, but settle to an intermediate level after about 250 hours (about 10 days) of operation. Run consistency is clearly evidenced by the consistent specific hydrogen consumption, plotted in FIG. 53.

Figure 55:
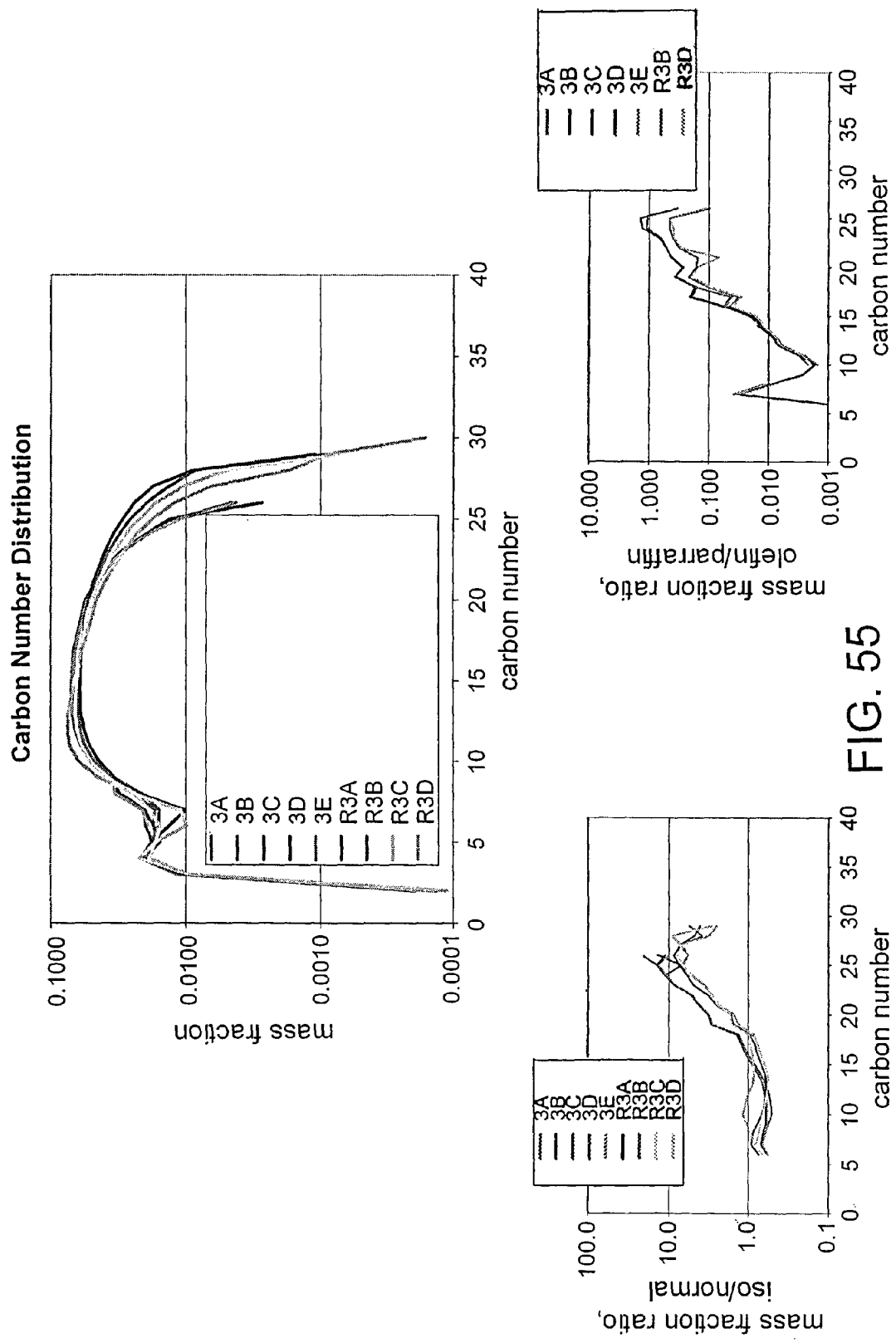
FIG. 55 consists of the three plots showing mass fraction as a function of carbon number, iso paraffin/normal paraffin mass fraction ratios as a functions of carbon number, and olefin/paraffin mass fraction ratios as a function of carbon number for the product obtained in Reactor 3 of Example 1 employing a fresh catalyst and for the product from Reactor 3 of Example 1 employing a regenerated catalyst.

Differences in product distributions for the fresh and regenerated catalysts for Reactor 3 are shown in FIG. 55. These particular differences are most likely attributable to a heavier feed for the regenerated reactor. The following abbreviations are used in FIG. 55 to identify the test samples:

3A: Reactor 3, Sample A, Table 3
3B: Reactor 3, Sample B, Table 3
3C: Reactor 3, Sample C, Table 3
3D: Reactor 3, Sample D, Table 3
3E: Reactor 3, Sample E, Table 3
R3A: Reactor 3, Regenerated Catalyst, Sample A, Table 6
R3B: Reactor 3, Regenerated Catalyst, Sample B, Table 6
R3C: Reactor 3, Regenerated Catalyst, Sample C, Table 6
R3D: Reactor 3, Regenerated Catalyst, Sample D, Table 6

Figure 54:
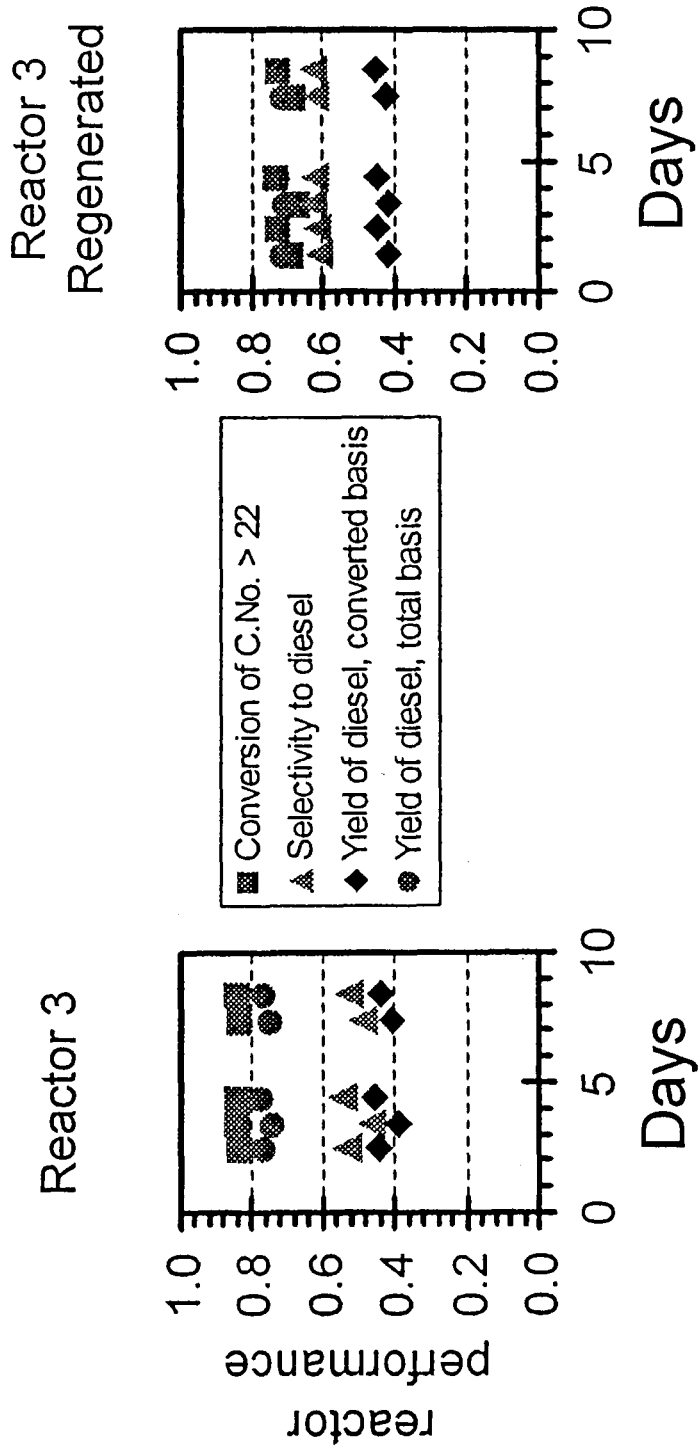
FIG. 54 consists of two plots providing a comparison of the reactor performance for Reactor 3 employing a fresh catalyst and Reactor 3 employing a regenerated catalyst.

Superposition of performance for the fresh and regenerated reactors, shown in FIG. 54, shows consistent yields for the reactor upon stable operation, in spite of differences in conversion and selectivity which are attributed to the change in feedstock.

To validate the microchannel processing advantage under milder conditions, the operating pressure and the $H_2$/wax ratio is changed as shown in runs 3E, 3F and 3G from Table 3 which are carried out at a relatively high LHSV of $30^{-1}$ hr. Initially (for Run 3E) the reactor is operated at 500 psig (3.45 MPa) and a $H_2$:wax ratio of 1500:1. The $H_2$:wax ratio is first lowered to 356:1 (Run 3F) and then the operating pressure is decreased to 325 psig (2.24 MPa) (Run 3G) while holding the other process conditions constant. Despite these significantly milder operating conditions the overall process performance remains unaffected as evidenced by the carbon number derived conversion and diesel yield. The relative hydrogen consumption also remains virtually unchanged indicating a similar suite of products under these widely different process conditions. This is further evidenced by the unchanged iso-to-normal ratio for the product. The ability of the microchannel reactor to maintain the process performance at lower pressures and $H_2$:wax ratios even at the high LHSV operation may be attributed to the excellent heat and mass transfer at the microscale.

Figure 56:
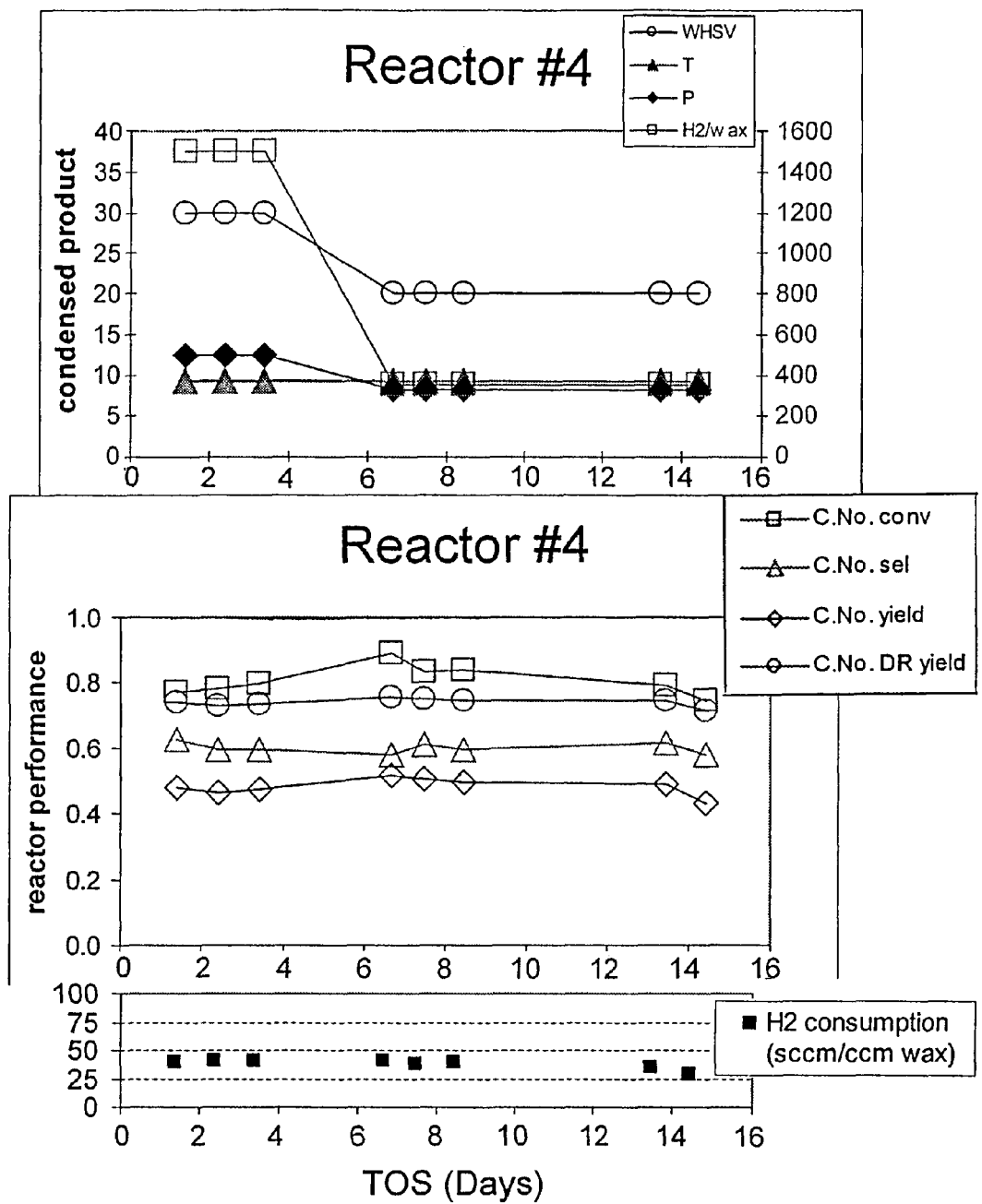
FIG. 56 consists of three plots showing run conditions and performance measures for Reactor 4 in Example 1 over the course of the operation of the reactor.
Figure 57:
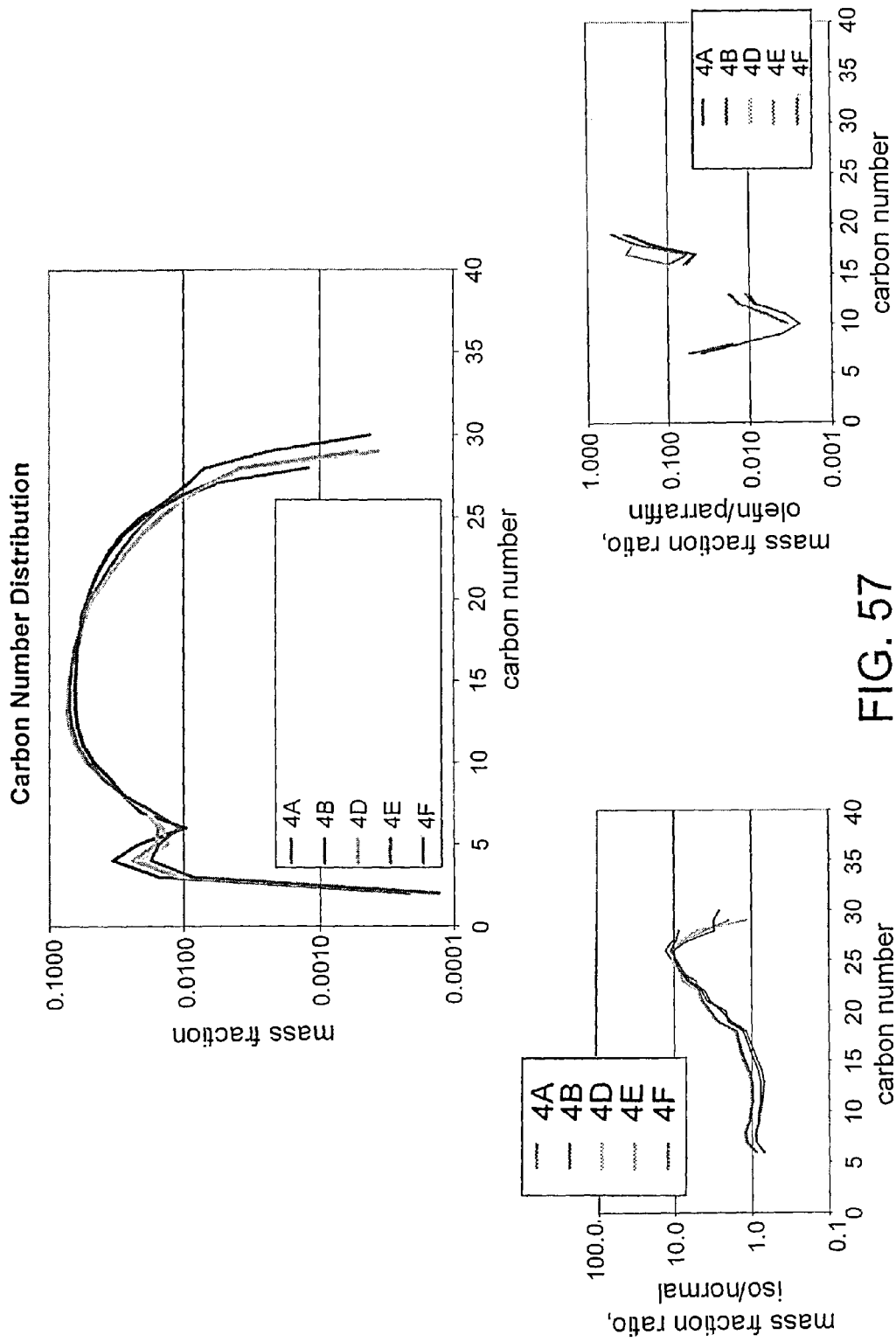
FIG. 57 consists of three plots showing mass fraction as a function of carbon number, iso paraffin/normal paraffin mass fraction ratios as a function of carbon number, and olefin/paraffin mass fraction ratios as a function of carbon number for the product obtained in Reactor 4 of Example 1.

Run conditions and corresponding performance measures over the course of operation for Reactor 4, are plotted as a function of time in FIG. 56. The reactor is initially run at the reference conditions before decreasing WHSV and the hydrogen/wax ratio. The impact of these changes, based on the performance measures, is barely perceptible, although conversion seems to begin a steady and very gradual decline, until a final, sharper performance degradation. As evidenced by FIG. 56, significantly decreased specific hydrogen feed does not impact specific hydrogen consumption. Carbon number, iso/normal and olefin/paraffin distribution profiles for the equilibrated runs (excluding the first points of either conditions and the last point of the run) are shown in FIG. 57. The following abbreviations are used in FIG. 57 to identify the test samples:

4A: Reactor 4, Sample A, Table 4
4B: Reactor 4, Sample B, Table 4
4D: Reactor 4, Sample D, Table 4
4E: Reactor 4, Sample E, Table 4
4F: Reactor 4, Sample F, Table 4

These indicate very slight changes, as well. The decrease in WHSV and $H_2$/wax feed ratio leads to a shift towards higher carbon numbers but increased isomer/normal and olefin/paraffin ratios. There is no clear indication of a change in the location of the cusp in FIG. 57.

Figure 58:
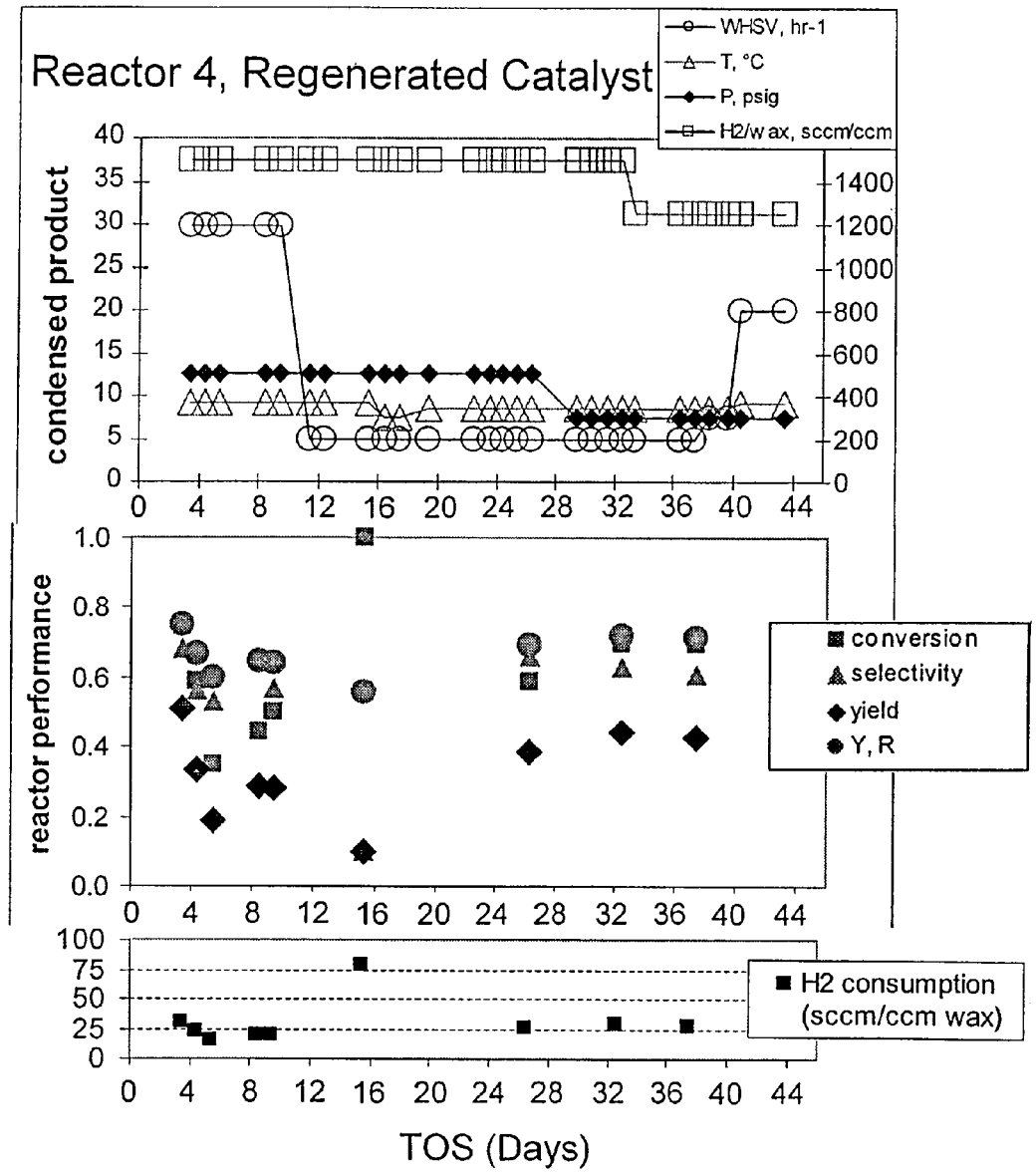
FIG. 58 consists of three plots for Reactor 4 in Example 1 with a regenerated catalyst, the plots showing run conditions and performance measure over the course of the operation of the reactor.

Run conditions and corresponding performance measures over the course of operation for Reactor 4, following regeneration of the catalyst, are plotted as a function of time in FIG. 58. Wide condition ranges are evaluated with Reactor 4, including using a WHSV as low as 5 $hr^{-1}$, feed pressures and temperatures as low as 300 psig (2.07 MPa) and 340° C., respectively. These include operating at a WHSV of 30 $hr^{-1}$, a temperature of 370° C., a pressure of 500 psig (3.45 MPa), and an $H_2$/wax ratio of 1500:1 sscm/ccm. As shown in FIG. 58, dropping the WHSV to 5 $hr^{-1}$ leads to complete conversion of the heavy fraction and very low yield to diesel, as the product is largely hydrocracked to shorter hydrocarbon chains. Overcracking is evidenced by the increase in specific hydrogen consumption, shown in FIG. 58. Decreasing pressure from 500 to 300 psig (3.45 to 2.07 MPa) leads to a slight improvement in performance. A decrease in the $H_2$/wax feed ratio from 1500 to 1250 leads to a slight performance deterioration. Upon decreasing $H_2$/wax feed ratio, the product, which is colorless, turns in color to a yellowish tinge. This yellowish tinge is not lost upon returning to high $H_2$/wax ratio conditions.

Figure 59:
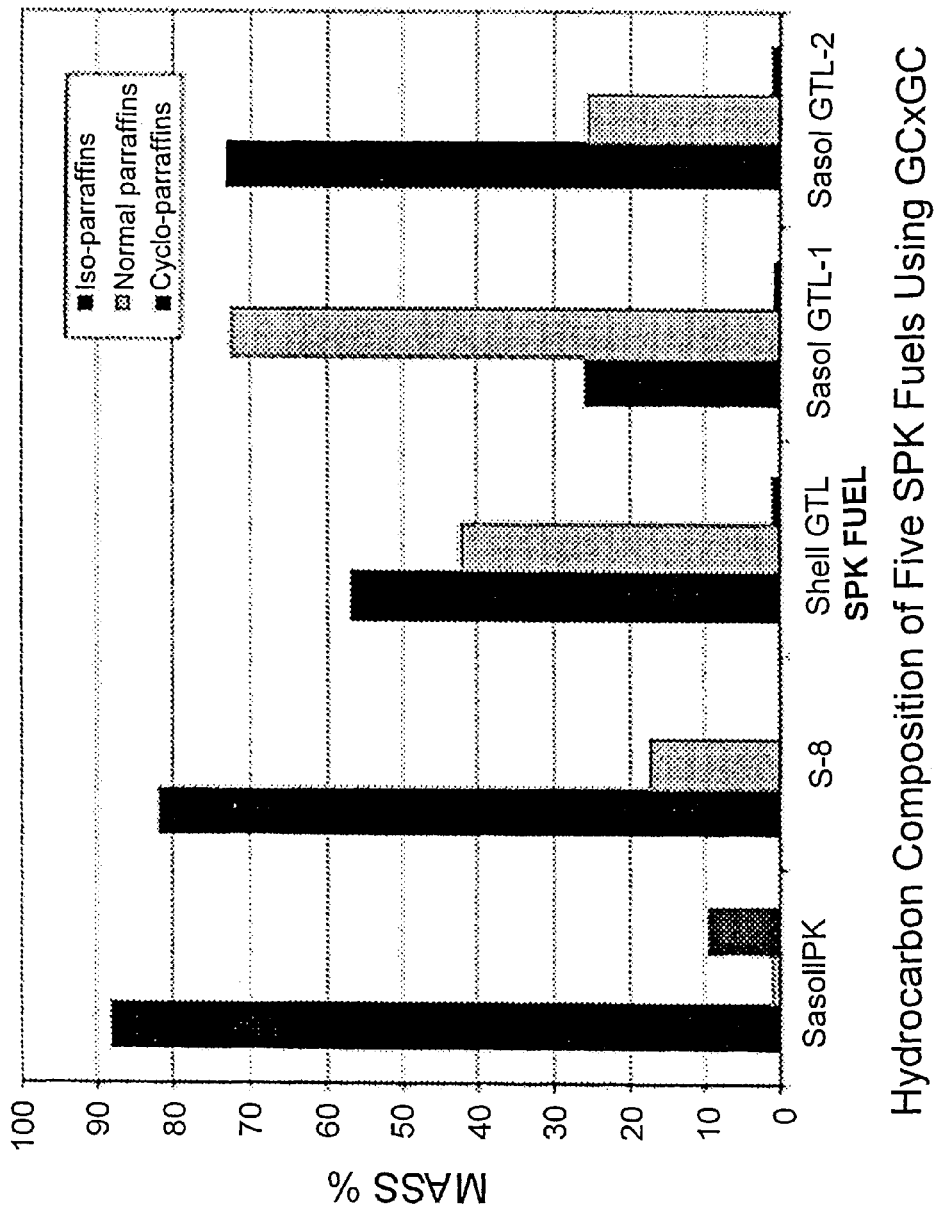
FIGS. 59 and 60 show iso paraffin, normal paraffin and cyclo paraffin distributions for five synthetic fuels.
Figure 60:
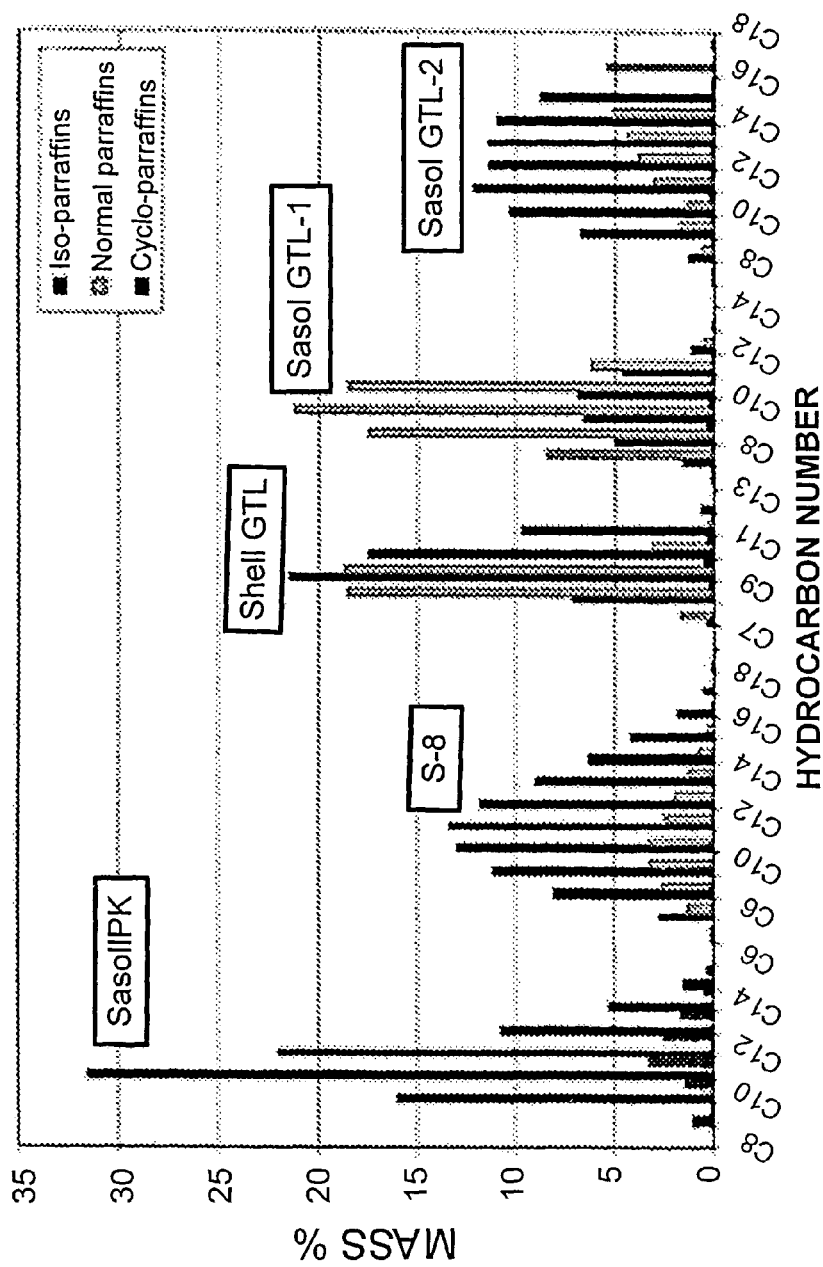

As shown in FIGS. 59 and 60, which is taken from a September 2008 report by the Universal Technology Corporation (C. A. Moses, CRC Project No. AV-2-04a, U.S. Air Force Research Laboratories Contract F33415-02-D-2299), acceptable synthetic jet fuel can have a wide range of paraffin distributions. Several studies have identified an apparent relationship between the quality of the hydrocracked product and the iso and normal paraffin content and distribution. Blending heavy and light fractions to obtain the distributions identified in Table 11 may be useful for providing an acceptable diesel product. High isomer content for the longer chain product may lead to enhanced flow properties. Lower isomer content for the lower chain fraction may be associated with higher cetane numbers.

TABLE 11

Isoparaffins:n-Paraffins of Middle Distillate Fractions

| Boiling Range | Corresponding Carbon Range | Average Iso:Normal Paraffins Ratio Range | Typical value |
|---|---|---|---|
| 160-270° C. | $C_{10}$-$C_{17}$ | 0.5-4.0 | 2.2 |
| 270-370° C. | $C_{17}$-$C_{23}$ | 4.0-14.0 | 10.5 |

Figure 61:
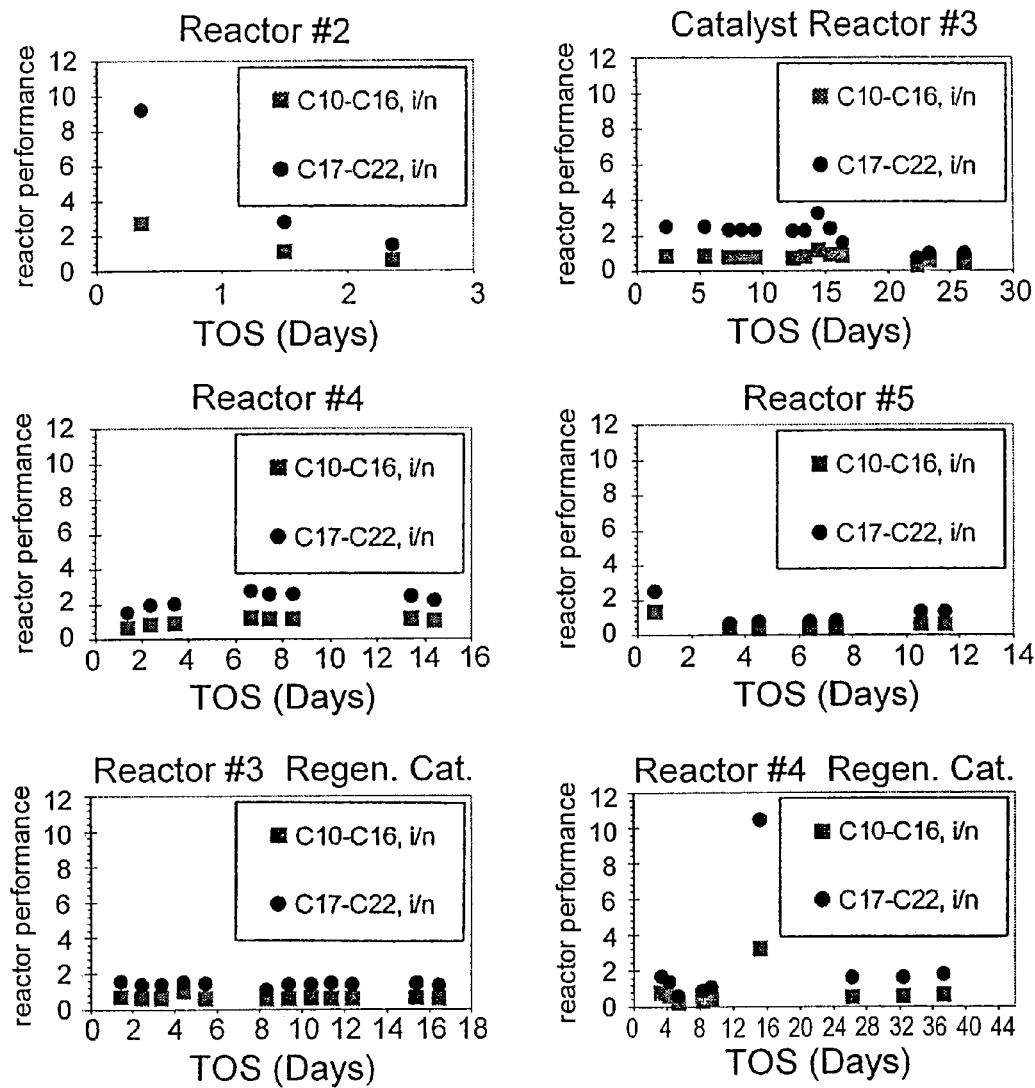
FIG. 61 consists of six plots showing iso/normal paraffin ratio profiles as a function of time for diesel fractions in the products from Reactors 2-5 employing fresh catalysts as well as Reactors 3 and 4 employing regenerated catalysts.

Using the criterion from Table 11, the results for the products from the above test runs are plotted to show the iso/normal ratio profiles for the diesel fractions of interest. These results are presented in FIG. 61 for the Reactors 2-5 employing a fresh catalyst, and the Reactors 3 and 4 employing a regenerated catalyst, from Tables 2-7. Data are presented as a function of time on stream (TOS), to allow direct comparison with the run conditions for each reactor.

Figure 62:
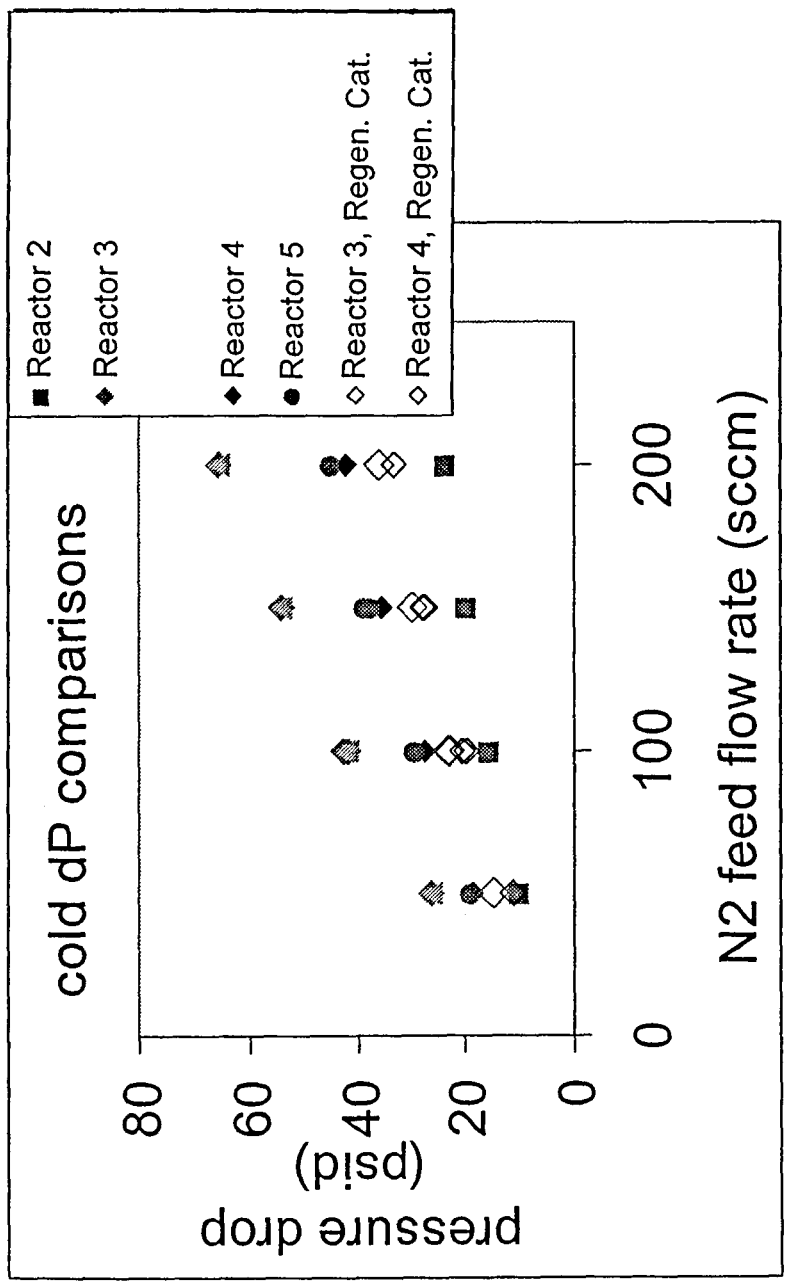
FIG. 62 is a plot showing cold flow pressure drops for Reactors 2-5 employing a fresh catalyst, as well as Reactors 3 and 4 employing a regenerated catalyst.
Figure 63:
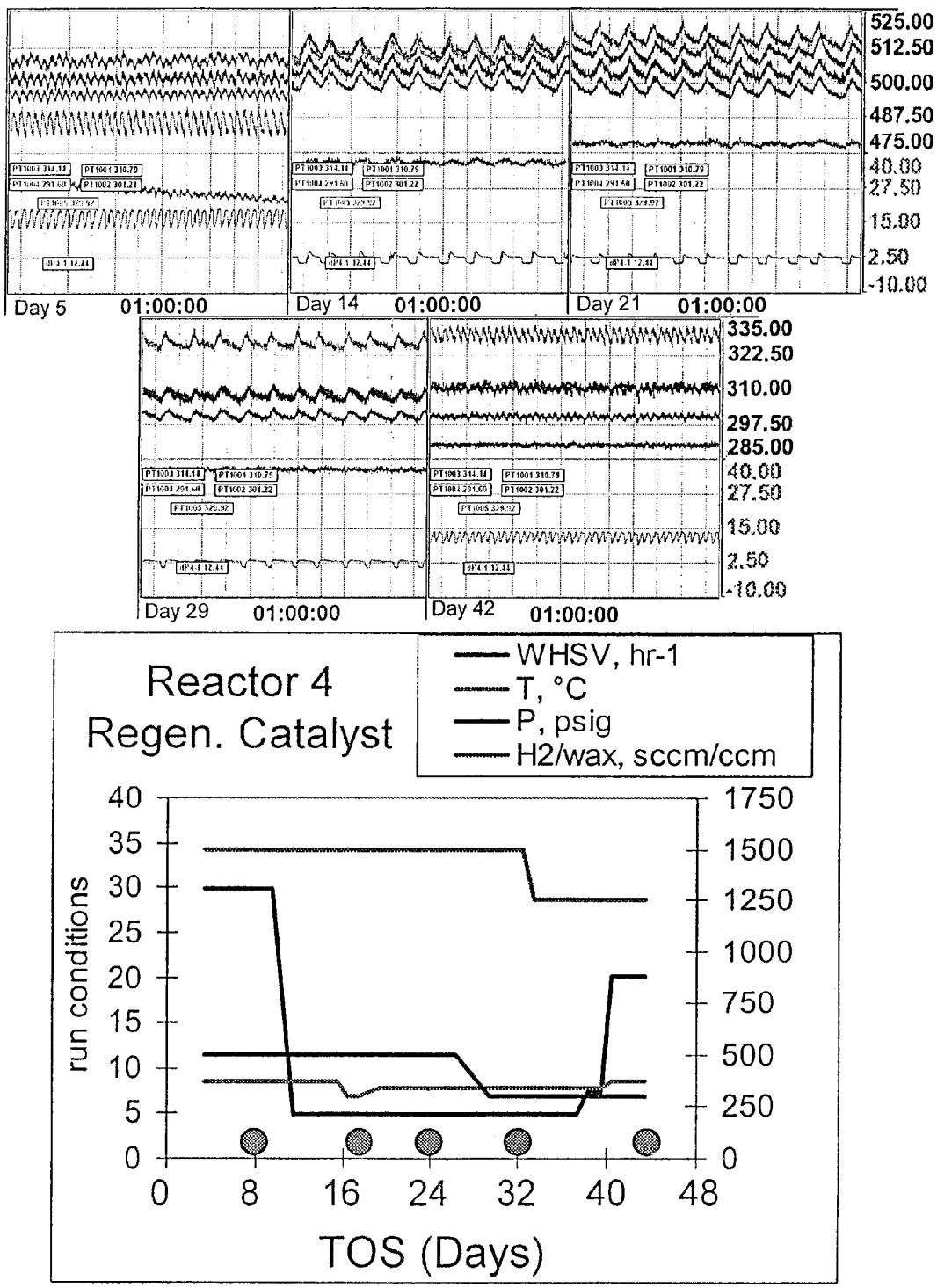
FIG. 63 consists of plots showing operational pressure fluctuations observed over the course of one hour of operation for Reactor 4 in Example 1 on five different days of operation, the reactor employing a regenerated catalyst, and a plot showing processing conditions for the reactor as a function of time.
Figure 64:
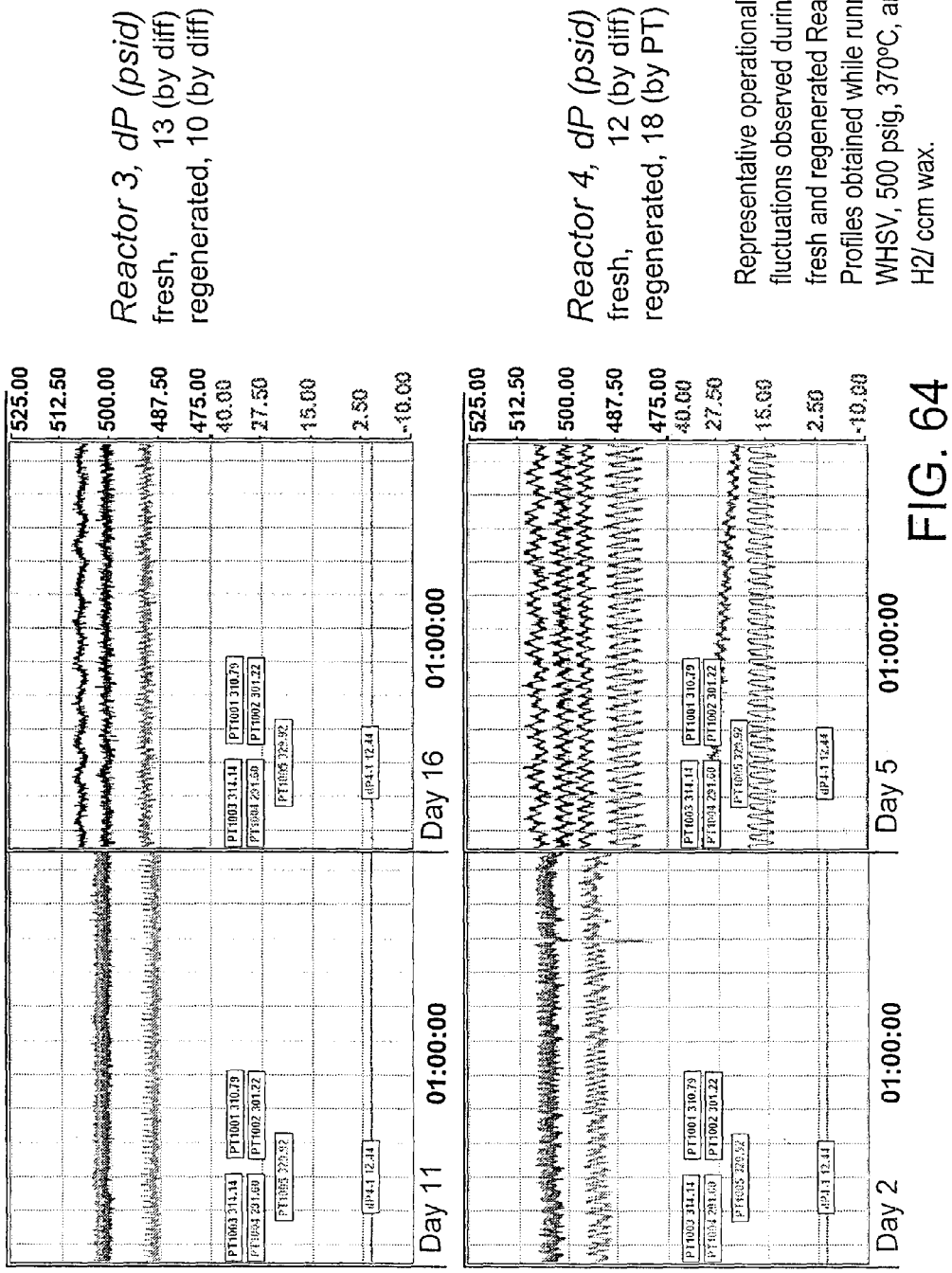
FIG. 64 consists of plots showing representative pressure fluctuations over the course of one hour of operation for Reactors 3 and 4 employing both fresh and regenerated catalysts.
Figure 65:
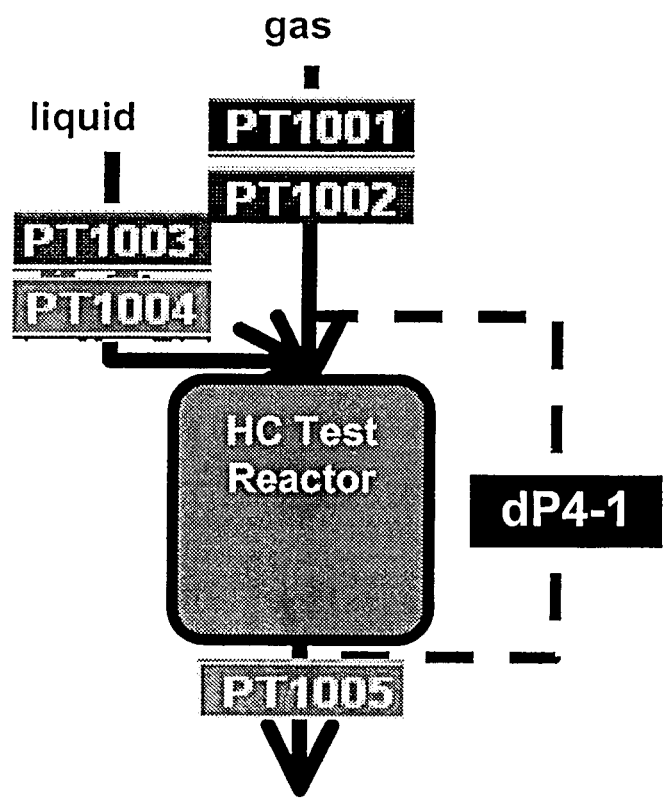
FIG. 65 is a schematic illustration showing the pressure transducer used with the test stand for the reactors in Example 1.

Cold flow pressure drop (measured by difference) shows a wide variability. These are shown in FIG. 62. Although regeneration appears to lead to a decrease in this value (for both regenerated Reactors 3 and 4), the extent of the change is unclear. Repeated reactor assemblies have shown that interlocking of the feed block and reactor tube needs care and attention, since over-compression of the upstream Mott filter during swageloking of the tube increases the pressure drop measured. Reactors 4 and 5 are assembled with this consideration in mind and have consistent and lower pressure drops than other assemblies.

Physical distillation of two product samples shows agreement between simulated and physical distillation results. Cloud point measurements for the diesel fractions are −10° C. and lower. Table 12 lists the characterization results. The cloud point measurement for the later analysis is not obtained by the ASTM method but is deemed to be conservative (expected to be lower when measured by the ASTM protocol).

TABLE 12

| Analysis | Specification (ASTM D-975) | Actual Value Reactor 2 | Actual Value Fresh Reactor 4 |
|---|---|---|---|
| ASTM D445 Viscosity at 40° C. | 1.9-4.1 cSt | 2.1 cSt | 2.5 cSt |
| ASTM D93 Flash | 52° C. min | 69° C. | 66° C. |
| ASTM D86 Distillation, 90% Off | 338° C. max | 308° C. | 325° C. |
| Cloud Point | Regional | −16° C. (ASTM D2500) | −13.3° C. (estimate) |
| ASTM D97 Pour Point | Regional | −21° C. | not available |
| Cyclanes (C6-C13) | | 0.08 wt % | 0.44 wt % |
| Aromatics (C7-C18) | | 0.01 wt % | 0.26 wt % |

Table 12. Characterization of distilled product fractions. Reactor 2 results correspond to a sample collected, for operation at 30 hr−1 WHSV, 500 psig (3.45 MPa), 370° C., and 1500 sccm H2/ccm wax. Fresh Reactor 4 results correspond to a sample collected, for operation at 20 hr−1 WHSV, 325 psig (2.24 MPa), 370° C., and 356 sccm H2/ccm wax.

The ability to of microchannel reactors to conduct the hydro-dearomatization and hydro-deoxygenation reactions in conjunction with the hydrocracking reactions is evaluated using the same experimental set-up and the catalyst as described before. A simulated feed containing ~89 wt % C24 (tetracosane), ~10 wt % naphthalene and ~1 wt % C14-OH (tetradecanol) is used. The reactor described above is packed with ~0.23 g of catalyst over a 6 inch (15.2 cm) bed length.

Two test runs is carried out at a temperature of 370° C., pressure of 500 psig (3.45 MPa), a $H_2$:Wax ratio of 1500:1 and varying the wax (simulated feed) flow rate from 5 hr$^{-1}$ to 20 hr$^{-1}$ LHSV. During the reaction, the C24 is hydrocracked to lower molecular weight hydrocarbons. The naphthalene in the feed is hydrogenated to tetralin and decalin which in turn can undergo ring opening (hydrogenolysis) or cracking to lower molecular weight products. Tetradecanol, on the other hand, is expected to adsorb on the acid sites and be de-oxygenated to form olefin and water.

Analysis of the products indicate a complete conversion of naphthalene and tetradecanol under the process conditions investigated. Hydrogenated derivatives of naphthalene viz., tetralin (one ring saturated) and decalin (both rings saturated) are seen in the product sample. High ratio of decalin to tetralin indicative of an ease of saturation of the aromatic compound under the conditions tested. Results also indicate that with increasing weight hourly space velocity of the wax feed, a preferential de-oxygenation and de-aromatization can be achieved over the cracking process as evidenced by the amount of unconverted C24 in the feed. The part of n$C_{24}$ that remains unconverted in this reaction shows a very high isomer-to-normal ratio in the product. Specifically, for the case of 20 hr$^{-1}$ WHSV the i-$C_{24}$ to n-$C_{24}$ ratio in the product is approximately 7. Table 13 below summarizes the data:

TABLE 13

| | Sample 1 | Sample 2 |
|---|---|---|
| Liquid WHSV | 5 hr$^{-1}$ | 20 hr$^{-1}$ |
| C24 Conversion | 99.4% | 59.5% |
| Naphthalene Conversion | 100% | 100% |
| Tetradecanol Conversion | 100% | 100% |
| Decalin/Tetralin ratio | 5.6 | 4.3 |

Figure 79:
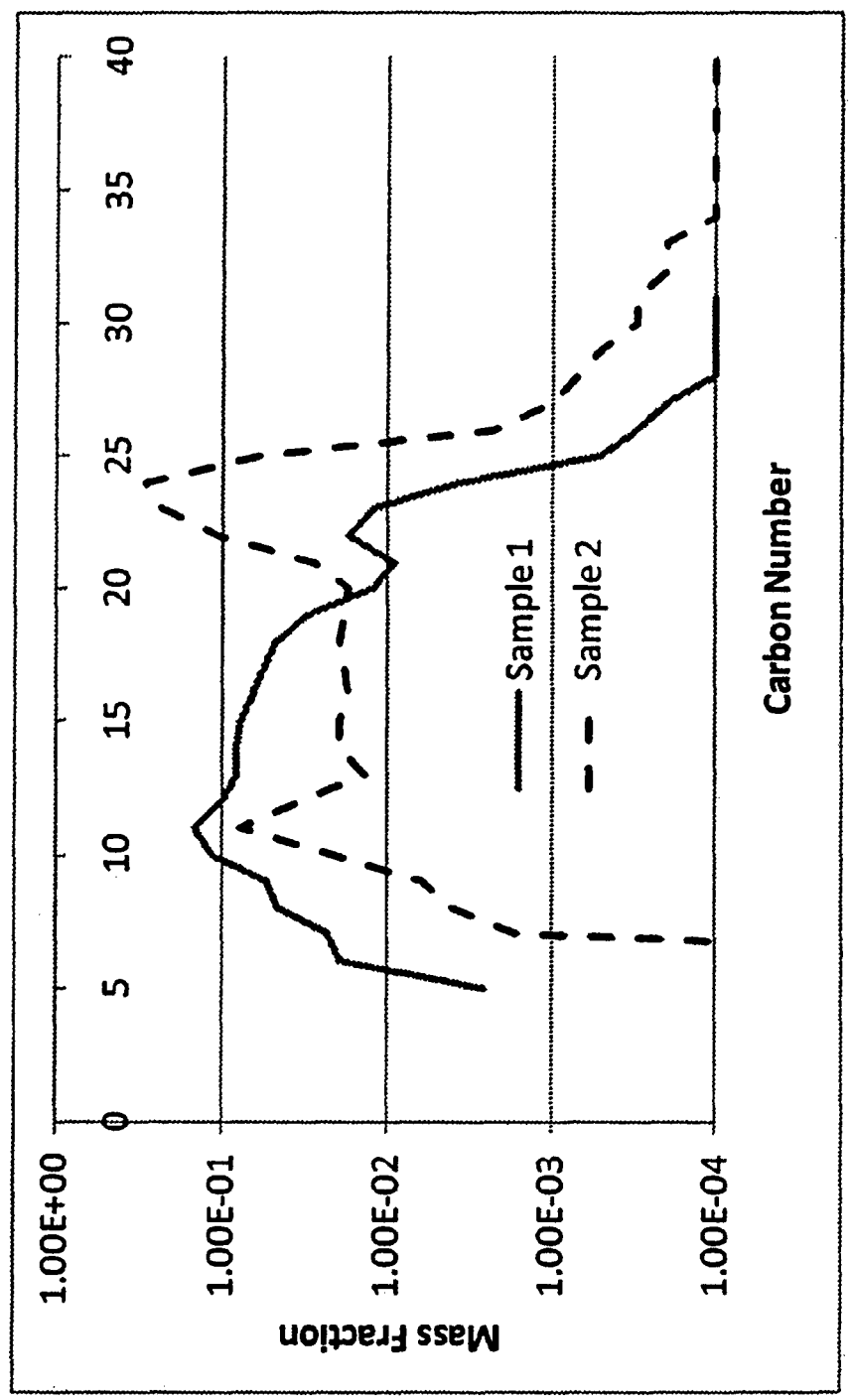
FIG. 79 is a plot showing mass fraction versus carbon number for Samples 1 and 2 identified in Table 13.

FIG. 79 shows the carbon number distribution for the samples discussed above. Sample 2 with the higher WHSV shows a peak corresponding to the unconverted C24 from the reaction. Both samples show a peak closer to the C10 carbon number that arises from the de-oxygenated tetradecanol which gets converted to an olefin that gets saturated in the reaction.

Example 2

A Fischer-Tropsch catalyst with a median particle size of 260 microns and a total cobalt loading of 50 wt % is used in a microchannel reactor. The individual microchannels have a nominal dimension of 0.125 by 0.0375 by 7.375 inches (3.175 mm×0.95 mm×18.73 cm). The reactor has a total of 272 process microchannels deployed on in two layers. Each of the of the individual microchannels is targeted to be filled with catalyst to a level of 6.66 inches (16.92 cm), the balance of the channel length on the inlet side being filled with silicon carbide. The bed density (Packed apparent bed density or PABD) is 1.07 g/ml as loaded in the microchannels as compared to 1.08 g/ml determined for the catalyst material externally (see Table 13). The reactor is brought on line and operated with an inlet pressure of 350 psig (24.1 bars) and a coolant temperature averaging 210° C. Feed gas consists of hydrogen, carbon monoxide and nitrogen. The hydrogen to CO molar ratio is 2:1 and the feed contains 16.5 mol % nitrogen. The total flow is 27.7 SLPM, equivalent to a contact time of 290 ms.

Figure 39:
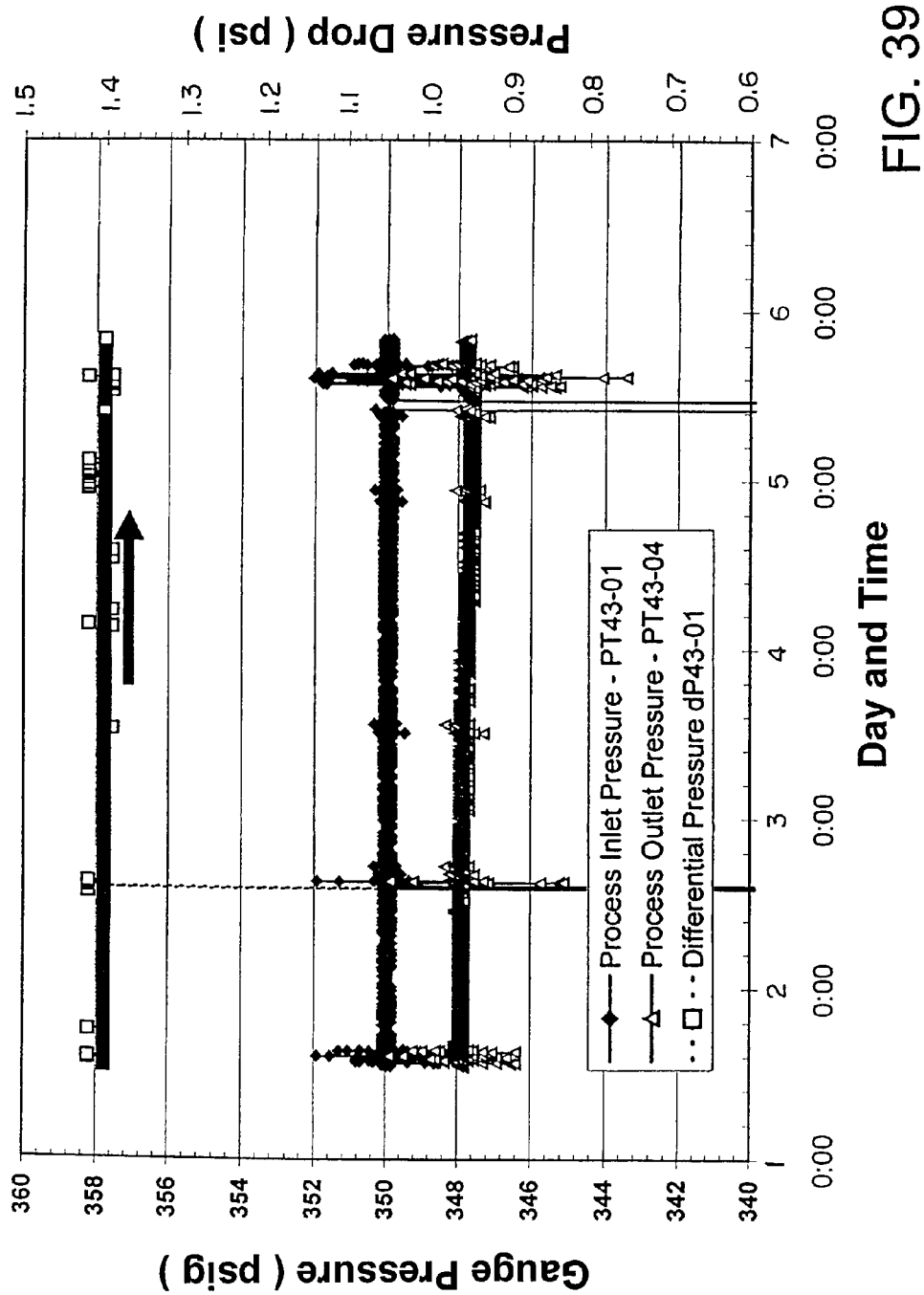
FIG. 39 is a chart showing inlet and outlet pressures and pressure drops for the Fischer-Tropsch (FT) reactor used in Example 2.
Figure 40:
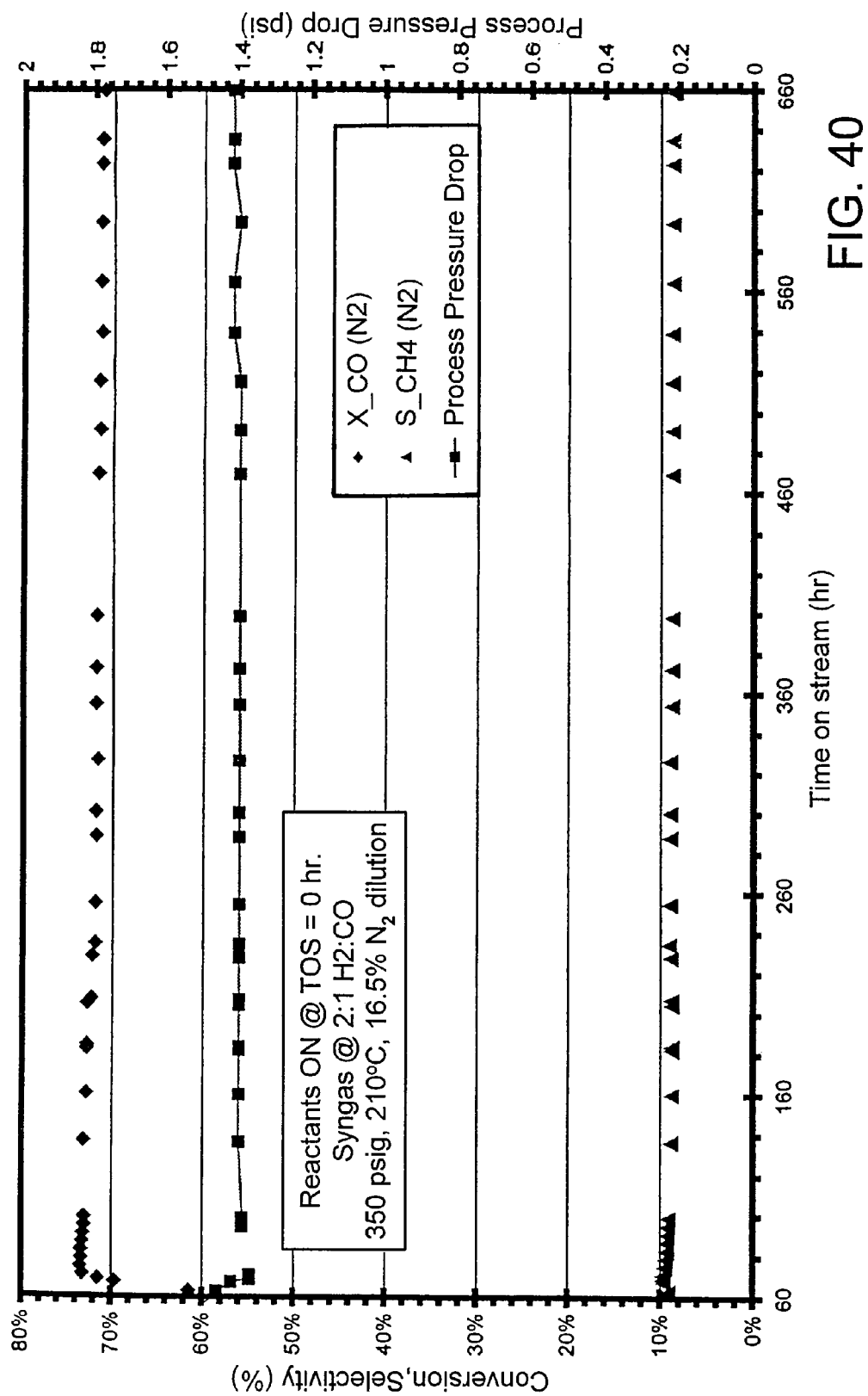
FIG. 40 is a chart showing conversion selectivity and pressure drop as a function of time for the FT reaction in Example 2.

Conversion of CO is in excess of 70% and selectivity to methane is in the range of 8.9% (see FIG. 40). Once at steady state the process pressure drop is steady, within the resolution of the pressure transducer, at 1.40 psi (9.65 kilopascals) and rises slightly as conversion fell with time on stream. No evidence of slugging or bubbling is detected. As shown in Table 13, pressure drop is higher than expected for gas flow only (no liquid in the catalyst bed). The inlet and outlet pressure as well as the pressure drop for the FT reactor are shown in FIG. 39. The pressure drop as a function of time on stream (TOS) is shown in FIG. 40.

TABLE 13

| | | |
|---|---|---|
| PABD (Externally determined) | 1.08 | [gram/cc] |
| Total volume of reactor# | 151.5 | [cc] |
| Total height of channels | 7.375 | [inches] |
| Target height of channels* | 6.66 | [inches] |
| Mass needed to fill target height of PABD | 147.76 | [grams] |
| Mass put into the device | 143.22 | [grams] |
| Average overfill above channels | −0.134 | [inches] |
| Density of bed | 1.07 | [gram/cc] |
| Percent difference from PABD | −1.1% | |

Methanol fill method for better wetting
*Assumes bottom below channels is 0.625 inch (1.59 cm) instead of 0.750 inch (1.91 cm) and the top heat exchange channel is 0.715 inch (1.82 cm) below the top.

TABLE 14

| Sample | TOS [hours] | Average T-Well Temperature [° C.] | Inlet Pressure | V_dot-inlet [SLPM] | Estimated exit flow [SLPM] |
|---|---|---|---|---|---|
| A | 18.167 | 180.3 | 349.8 | 27.7 | 25.800 |
| B | 19.317 | 180.3 | 349.8 | 27.7 | 25.878 |
| C | 20.750 | 180.2 | 350 | 27.7 | 25.889 |
| D | 31.633 | 189.9 | 350 | 27.7 | 24.043 |
| E | 34.517 | 190.1 | 350 | 27.7 | 23.924 |
| F | 37.233 | 190.3 | 350 | 27.7 | 23.792 |
| G | 38.017 | 190.3 | 350 | 27.7 | 23.815 |
| H | 42.683 | 190.4 | 350 | 27.7 | 23.689 |
| I | 46.267 | 190.4 | 350 | 27.7 | 23.700 |
| J | 54.767 | 200.3 | 350 | 27.7 | 19.361 |
| K | 56.550 | 200.3 | 350 | 27.7 | 19.196 |
| L | 62.817 | 205.0 | 350 | 27.7 | 17.732 |
| M | 67.483 | 208.5 | 350 | 27.7 | 16.420 |
| N | 68.817 | 210.3 | 350 | 27.7 | 16.122 |
| O | 70.983 | 210.3 | 350 | 27.7 | 15.847 |
| P | 94.983 | 210.4 | 350 | 27.7 | 15.865 |
| Q | 98.983 | 210.4 | 350 | 27.7 | 15.868 |
| R | 136.733 | 210.4 | 350 | 27.7 | 15.848 |
| S | 161.317 | 210.4 | 350 | 27.7 | 15.894 |

Table 14: Measured process pressure drop compared to that predicted by the Eurgun equation reduction in the total flow with axial position in the reactor due to the reaction is taken into consideration for the dry gas pressure drop.

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process, comprising: flowing a gas comprising hydrogen and a liquid comprising a hydrocarbon reactant in a microchannel reactor, the microchannel reactor containing a catalyst, the gas and the liquid contacting the catalyst, the hydrogen reacting with the hydrocarbon reactant in the presence of the catalyst to form one or more products; and removing the one or more products from the microchannel reactor; wherein:
   (a) the hydrocarbon reactant comprises a hydrocarbon with a first hydrocarbon chain length, the hydrocarbon reactant being converted to two or more hydrocarbon products, the hydrocarbon products having chain lengths that are shorter than the first hydrocarbon chain length; or
   (b) the hydrocarbon reactant comprises one or more heteroatoms bonded to the hydrocarbon reactant and at least one of the heteroatoms reacts with the hydrogen to form a heteroatom containing compound, the product comprising a hydrocarbon product characterized by the absence of heteroatoms bonded to the hydrocarbon product or a reduced number of heteroatoms bonded to the hydrocarbon product as compared to the number of heteroatoms bonded to the hydrocarbon reactant; and
wherein the microchannel reactor has a length, a width and a height and comprises: a plurality of process microchannels, the catalyst being in the process microchannels; and a flow distribution apparatus for distributing flow of the liquid to the process microchannels, the flow distribution apparatus comprising a feed manifold on a side of the microchannel reactor, and a submanifold and a flow restriction section within the microchannel reactor, the process microchannels extending along the length of the microchannel reactor and the submanifold extending along the width of the microchannel reactor; wherein the liquid flows through the feed manifold into the microchannel reactor and through the submanifold across the width of the microchannel reactor and into the flow restriction section and from the flow restriction section into the process microchannels where it contacts the gas and the catalyst.

2. The process of claim 1 wherein the process is a hydrocracking process and the catalyst is a hydrocracking catalyst.

3. The process of claim 1 wherein the pressure in the microchannel reactor is in the range from about 0.2 to about 20 MPa.

4. The process of claim 1 wherein the temperature in the microchannel reactor is in the range from about 50° C. to about 500° C.

5. The process of claim 1 wherein the ratio of hydrogen to hydrocarbon reactant is in the range from about 10 to about 6000 standard cubic centimeters of hydrogen per cubic centimeter of hydrocarbon reactant.

6. The process of claim 1 wherein heat is transferred from the process microchannels to a heat exchanger.

7. The process of claim 1 wherein mass transfer occurs between the gas and liquid.

8. The process of claim 1 wherein the process is conducted in a plant facility, the plant facility comprising a plurality of microchannel reactors, the catalyst in one or more of the microchannel reactors being regenerated while the process is carried out in the other microchannel reactors in the plant facility.

9. The process of claim 1 wherein the process is conducted using a regenerated catalyst at a liquid hourly space velocity of about 5 hr$^{-1}$ or above.

10. The process of claim 1 wherein the process is a hydrotreating process and the catalyst is a hydrotreating catalyst.

11. The process of claim 1 wherein the hydrocarbon reactant comprises a melted Fischer-Tropsch wax, and the catalyst comprises a hydrocracking catalyst.

* * * * *